(12) United States Patent
Kashiwagi et al.

(10) Patent No.: US 6,519,414 B2
(45) Date of Patent: *Feb. 11, 2003

(54) METHOD AND AN APPARATUS FOR REPRODUCING BITSTREAM HAVING NON-SEQUENTIAL SYSTEM CLOCK DATA SEAMLESSLY THEREBETWEEN

(75) Inventors: Yoshiichiro Kashiwagi, Yawata (JP); Takumi Hasebe, Yawata (JP); Kazuhiro Tsuga, Takarazuka (JP); Kazuhiko Nakamura, Hirakata (JP); Yoshihiro Mori, Hirakata (JP); Masayuki Kozuka, Neyagawa (JP); Yoshihisa Fukushima, Osaka (JP); Toshiyuki Kawara, Hirakata (JP); Yasushi Azumatani, Takatsuki (JP); Tomoyuki Okada, Katano (JP); Kenichi Matsui, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,006

(22) Filed: Aug. 21, 2001

(65) Prior Publication Data

US 2002/0003951 A1 Jan. 10, 2002

Related U.S. Application Data

(62) Division of application No. 09/195,998, filed on Nov. 20, 1998, now Pat. No. 6,393,574, which is a division of application No. 08/721,736, filed on Sep. 27, 1996, now Pat. No. 5,923,869.

(30) Foreign Application Priority Data

Sep. 29, 1995 (JP) .............................................. 7-276710
Feb. 28, 1996 (JP) .............................................. 8-41583

(51) Int. Cl.$^7$ .............................. H04N 5/91; H04N 5/85
(52) U.S. Cl. ....................................... 386/95; 386/126
(58) Field of Search ............................. 386/46, 95, 111, 386/112, 109, 125, 126, 97, 98; 434/307 A

(56) References Cited

U.S. PATENT DOCUMENTS

| 4,321,635 A | 3/1982 | Tsuyuguchi |
| 5,173,900 A | 12/1992 | Miller et al. |

(List continued on next page.)

FOREIGN PATENT DOCUMENTS

| EP | 0554967 | 8/1993 |
| EP | 0661876 | 7/1995 |
| JP | 8-505024 | 5/1996 |
| JP | 8-251538 | 9/1996 |
| WO | 92/05554 | 4/1992 |

OTHER PUBLICATIONS

Information Technology—Generic Coding of Moving Pictures and Associated Audio: Systems, ISO/IEC 13818–1, pp. xvii–xviii, Apr. 25, 1995.

Primary Examiner—Huy Nguyen
(74) Attorney, Agent, or Firm—Wenderoth, Lind & Ponack, L.L.P.

(57) ABSTRACT

A system stream contiguous reproduction apparatus to which are input one or more system streams interleaving at least moving picture data and audio data, and system stream connection information includes a system clock STC generator for producing the system clock that is used as the system stream reproduction reference clock. The system stream contiguous reproduction apparatus further includes one or more signal processing decoders that operate referenced to the system clock STC, decoder buffers for temporarily storing the system stream data transferred to the corresponding signal processing decoders, and STC selectors for selecting a system clock STC referenced by the signal processing decoders when decoding the first system stream, and another system clock STC referenced by the signal processing decoders when decoding a second system stream reproduced contiguously to the first system stream.

3 Claims, 67 Drawing Sheets

U.S. PATENT DOCUMENTS

| | | |
|---|---|---|
| 5,481,543 A | 1/1996 | Veitman |
| 5,574,505 A | 11/1996 | Lyons et al. |
| 5,671,226 A | 9/1997 | Murakami et al. |
| 5,745,645 A | 4/1998 | Nakamura et al. |
| 5,784,528 A | 7/1998 | Yamane et al. |
| 5,854,873 A | 12/1998 | Mori et al. |
| 5,884,004 A | 3/1999 | Sato et al. |
| 5,902,115 A * | 5/1999 | Katayama .................... 386/97 |
| 5,905,845 A | 5/1999 | Okada et al. |
| 5,937,138 A | 8/1999 | Fukuda et al. |

* cited by examiner

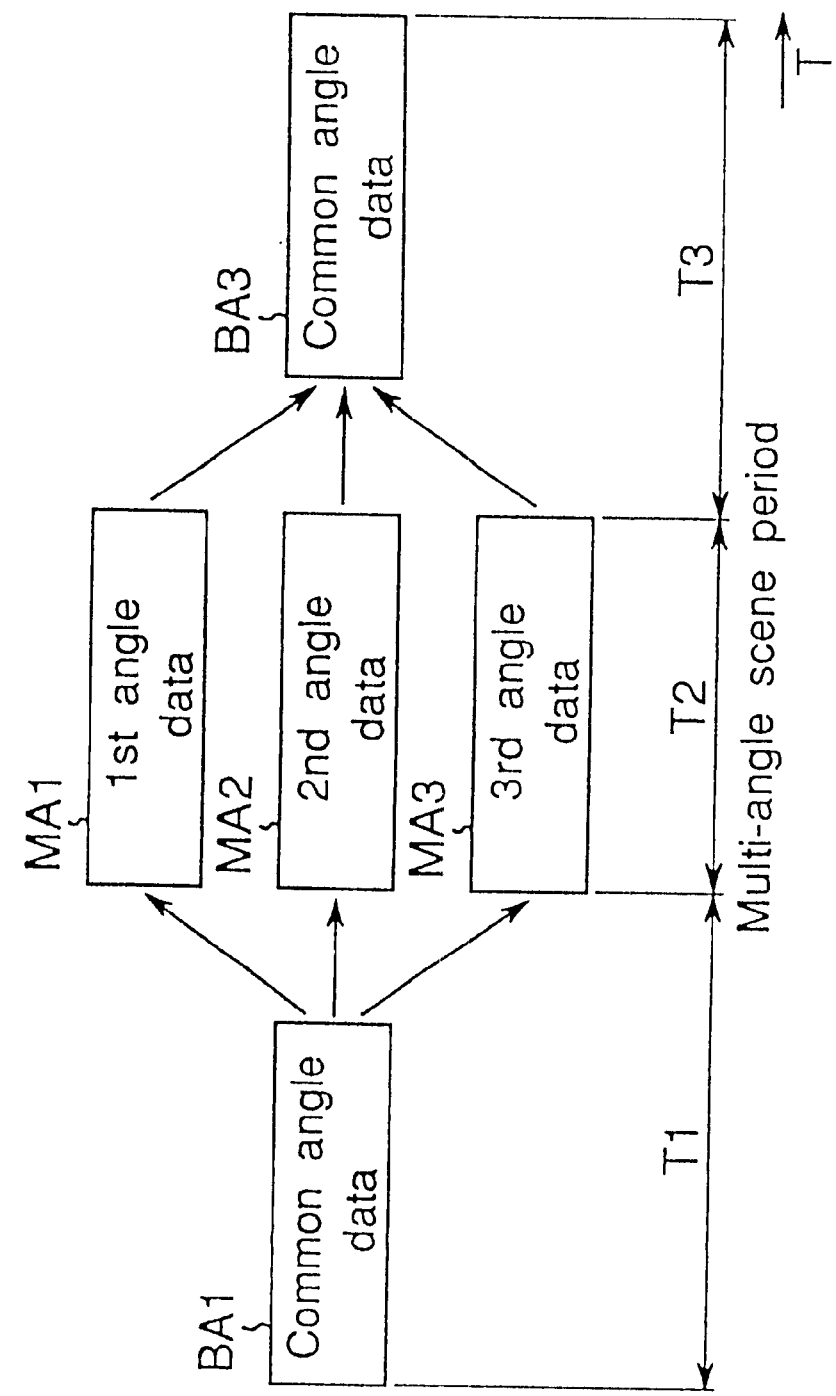

Fig.29

| |
|---|
| VOB number (VOB_NO) |
| Video encode start time (V_STTM) |
| Video encode end time (V_ENDTM) |
| Video encode mode (V_ENCMD) |
| Video encode bit rate (V_RATE) |
| Video encode maximum bit rate (V_MRATE) |
| GOP structure fixing flag (GOP_FXflag) |
| Video encode GOP structure (GOPST) |
| Video encode initial data (V_INST) |
| Video encode end data (V_ENDST) |
| Audio encode start time (A_STTM) |
| Audio encode end time (A_ENDTM) |
| Audio encode bit rate (A_RATE) |
| AUdio encode method (A_ENCMD) |
| Audio start gap (A_STGAP) |
| Audio end gap (A_ENDGAP) |
| Preceding VOB number (B_VOB_NO) |
| Following VOB number (F_VOB_NO) |

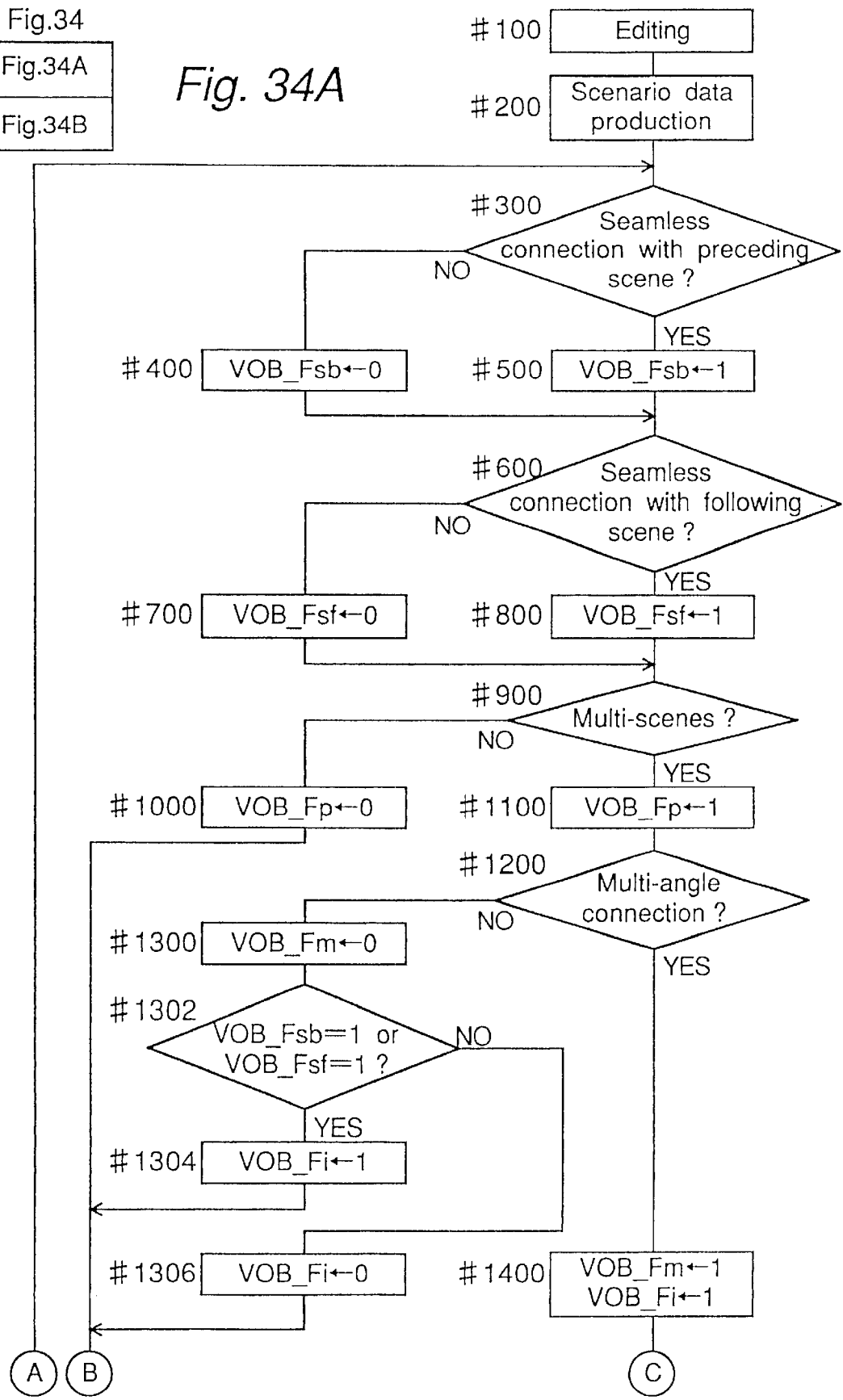

Fig.54

| | Register Name | Value |
|---|---|---|
| Scenario info. register | Angle No. (ANGLE_NO_reg) | |
| | VTS No. (VTS_NO_reg) | |
| | PGC No. (VTS_PGCI_NO_reg) | |
| | Audio ID (AUDIO_ID_reg) | |
| | Sub-picture ID (SP_ID_reg) | |
| | SCR buffer (SCR_buffer) | |
| Cell information register | Cell block mode (CBM_reg) | N_BLOCK: Not a Cell in the block |
| | | F_CELL: First Cell in the block |
| | | BLOCK: Cell in the block |
| | | L_CELL: Last Cell in the block |
| | Cellblock type (CBT_reg) | N_BLOCK: Not a part of in the block |
| | | A_BLOCK: Angle block |
| | Seamless reproduction flag (SPF_reg) | SML: A Cell shall be presented seamlessly |
| | | NSML: A Cell shall not be presented seamlessly |
| | Interleave allocation flag (IAF_reg) | N_ILVB: Exist in the Contiguous block |
| | | ILVB: Exist in the Interleaved block |
| | STC re-setting flag (STCDF_reg) | STC_NRESET: STC reset is not necessary |
| | | STC_RESET: STC reset is necessary |
| | Seamless angle switching flag (SACF_reg) | SML: A Cell shall be presented seamlessly |
| | | NSML: A Cell shall not be presented seamlessly |
| | Starting address of first VOBU in cell (C_FVOBU_SA_reg) | |
| | Starting address of last VOBU in cell (C_LVOBU_SA_reg) | |

Fig.55

| | Register Name | |
|---|---|---|
| Information registers for Non-seamless multi-angle control | N.A.N.A. 1 (NSML_AGL_C1_DSTA_reg) | |
| | N.A.N.A. 2 (NSML_AGL_C2_DSTA_reg) | |
| | N.A.N.A. 3 (NSML_AGL_C3_DSTA_reg) | |
| | N.A.N.A. 4 (NSML_AGL_C4_DSTA_reg) | |
| | N.A.N.A. 5 (NSML_AGL_C5_DSTA_reg) | |
| | N.A.N.A. 6 (NSML_AGL_C6_DSTA_reg) | |
| | N.A.N.A. 7 (NSML_AGL_C7_DSTA_reg) | |
| | N.A.N.A. 8 (NSML_AGL_C8_DSTA_reg) | |
| | N.A.N.A. 9 (NSML_AGL_C9_DSTA_reg) | |
| Information registers for seamless multi-angle control | Register Name | |
| | S.A.S.A. 1 (SML_AGL_C1_DSTA_reg) | |
| | S.A.S.A. 2 (SML_AGL_C2_DSTA_reg) | |
| | S.A.S.A. 3 (SML_AGL_C3_DSTA_reg) | |
| | S.A.S.A. 4 (SML_AGL_C4_DSTA_reg) | |
| | S.A.S.A. 5 (SML_AGL_C5_DSTA_reg) | |
| | S.A.S.A. 6 (SML_AGL_C6_DSTA_reg) | |
| | S.A.S.A. 7 (SML_AGL_C7_DSTA_reg) | |
| | S.A.S.A. 8 (SML_AGL_C8_DSTA_reg) | |
| | S.A.S.A. 9 (SML_AGL_C9_DSTA_reg) | |
| VOBU info. Register | Register Name | |
| | VOBU final address (VOBU_EA_reg) | |
| Registers for seamless reproduction | Register Name | Value |
| | Interleave unit flag (ILVU_flag_reg) | ILVU: VOBU is in ILVU |
| | | N_ILVU: VOBU is not in ILVU |
| | Unit end flag (UNIT_END_flag_reg) | END: At the end of ILVU |
| | | N_END: Not at the end of ILVU |
| | Final pack address of ILVU (ILVU_EA_reg) | |
| | Starting address of next ILVU (NT_ILVU_SA_reg) | |
| | I. V. F. P. S. T. (VOB_V_SPTM_reg) | |
| | F. V. F. P. T. T. (VOB_V_EPTM_reg) | |
| | Audio reproduction stopping time 1 (VOB_A_STP_PTM1_reg) | |
| | Audio reproduction stopping time 2 (VOB_A_STP_PTM2_reg) | |
| | Audio reproduction stopping period 1 (VOB_A_GAP_LEN1_reg) | |
| | Audio reproduction stopping period 2 (VOB_A_GAP_LEN2_reg) | |

*Fig.60*

31124 | Output STCc to STC selectors for System, Audio, Video, and Sub picture decoders

METHOD AND AN APPARATUS FOR REPRODUCING BITSTREAM HAVING NON-SEQUENTIAL SYSTEM CLOCK DATA SEAMLESSLY THEREBETWEEN

This is a divisional application of Ser, No. 09/195,998, filed Nov. 20, 1998, now U.S. Pat. No. 6,393,574, which is a divisional application of Ser. No. 08/721,736, filed Sep. 27, 1996, now U.S. Pat. No. 5,923,869.

BACKGROUND OF THE INVENTION

1. Field of the Invention

The present invention relates to a method and apparatus for seamlessly reproducing a bitstream having non-sequential system clock data therein and, more specifically, to a bitstream for use in an authoring system for variously processing a data bitstream comprising video data, audio data, and sub-picture data constituting each of plural program titles containing related video data, audio data, and sub-picture data content to generate a bitstream from which a new title containing the content desired by the user can be reproduced, and efficiently recording and reproducing the generated bitstream using a particular recording medium.

2. Description of the Prior Art

Authoring systems used to produce program titles comprising related video data, audio data, and sub-picture data by digitally processing, for example, multimedia data comprising video, audio, and sub-picture data recorded to laser disk or video CD formats are currently available. Systems using Video-Cds in particular are able to record video data to a CD format disk, which was originally designed with an approximately 600 MB recording capacity for storing digital audio data only, by using such high efficiency video compression techniques as MPEG. As a result of the increased effective recording capacity achieved using data compression techniques, karaoke titles and other conventional laser disk applications are gradually being transferred to the video CD format.

Users today expect both sophisticated title content and high reproduction quality. To meet these expectations, each title must be composed from bitstreams with an increasingly deep hierarchical structure. The data size of multimedia titles written with bitstreams having such deep hierarchical structures, however, is ten or more times greater than the data size of less complex titles. The need to edit small image (title) details also makes it necessary to process and control the bitstream using low order hierarchical data units.

It is therefore necessary to develop and prove a bitstream structure and an advanced digital processing method including both recording and reproduction capabilities whereby a large volume, multiple level hierarchical digital bitstream can be efficiently controlled at each level of the hierarchy. Also needed are an apparatus for executing this digital processing method, and a recording media to which the bitstream digitally processed by the apparatus can be efficiently recorded for storage and from which the recorded information can be quickly reproduced.

Means for increasing the storage capacity of conventional optical disks have been widely researched to address the recording medium aspect of this problem. One way to increase the storage capacity of the optical disk is to reduce the spot diameter D of the optical (laser) beam. If the wavelength of the laser beam is 1 and the aperture of the objective lens is NA, then the spot diameter D is proportional to 1/NA, and the storage capacity can be efficiently improved by decreasing 1 and increasing NA.

As described, for example, in U.S. Pat. No. 5,235,581, however, coma caused by a relative tilt between the disk surface.and the optical axis of the laser beam (hereafter "tilt") increases when a large aperture (high NA) lens is used. To prevent tilt-induced coma, the transparent substrate must be made very thin. The problem is that the mechanical strength of the disk is low when the transparent substrate is very thin.

MPEG1, the conventional method of recording and reproducing video, audio, and graphic signal data, has also been replaced by the more robust MPEG2 method, which can transfer large data volumes at a higher rate. It should be noted that the compression method and data format of the MPEG2 standard differ somewhat from those of MPEG1. The specific content of and differences between MPEG1 and MPEG2 are described in detail in the ISO-11172 and ISO-13818 MPEG standards, and further description thereof is omitted below.

Note, however, that while the structure of the encoded video stream is defined in the MPEG2 specification, the hierarchical structure of the system stream and the method of processing lower hierarchical levels are not defined.

As described above, it is therefore not possible in a conventional authoring system to process a large data stream containing sufficient information to satisfy many different user requirements. Moreover, even if such a processing method were available, the processed data recorded thereto cannot be repeatedly used to reduce data redundancy because there is no large capacity recording medium currently available that can efficiently record and reproduce high volume bitstreams such as described above.

More specifically, particular significant hardware and software requirements must be satisfied in order to process a bitstream using a data unit smaller than the title. These specific hardware requirements include significantly increasing the storage capacity of the recording medium and increasing the speed of digital processing; software requirements include inventing an advanced digital processing method including a sophisticated data structure.

Therefore, the object of the present invention is to provide an effective authoring system for controlling a multimedia data bitstream with advanced hardware and software requirements using a data unit smaller than the title to better address advanced user requirements.

To share data between plural titles and thereby efficiently utilize optical disk capacity, multi-scene control whereby scene data common to plural titles and the desired scenes on the same time-base from within multi-scene periods containing plural scenes unique to particular reproduction paths can be freely selected and reproduced is desirable.

However, when plural scenes unique to a reproduction path within the multi-scene period are arranged on the same time-base, the scene data must be contiguous. Unselected multi-scene data is therefore unavoidably inserted between the selected common scene data and the selected multi-scene data. The problem this creates when reproducing.multi-scene data is,that reproduction is interrupted by this unselected scene data.

In other words, except when a video object VOB, which is normally a single-stream title editing unit, is divided into discrete streams, seamless reproduction cannot be achieved by simply connecting and reproducing individual VOBs. This is because while the reproduction of video, audio, and sub-picture streams forming each VOB must be synchronized, the means for achieving this synchronization is enclosed in each VOB. As a result, the synchronization means will not function normally at VOB connections if the VOBs are simply connected together.

The object of the present invention is therefore to provide a reproduction apparatus enabling seamless reproduction whereby scene data can be reproduced without intermittence even from these multi-scene periods.

The object of the present invention is therefore to provide an optical disk medium from which data can be seamlessly reproduced without audio or video intermitting even in such multi-scene periods, and a reproducing apparatus implementing the recording and reproducing method.

The present application is based upon Japanese Patent Application No. 7-276710 and 8-041583, which were filed on Sep. 29, 1995 and Feb. 28, 1996, respectively, the entire contents of which are expressly incorporated by reference herein.

SUMMARY OF THE INVENTION

The present invention has been developed with a view to substantially solving the above described disadvantages and has for its essential object to provide an improved method and apparatus for reproducing a bitstream having non-sequential system clock data seamlessly therebetween.

In order to achieve the aforementioned objective, a system stream contiguous reproduction apparatus to which are input one or more system streams interleaving at least moving picture data and audio data, and system stream connection information comprises a system clock STC generator for producing the system clock that is used as the system stream reproduction reference clock, one or more signal processing decoders that operate referenced to the system clock STC, decoder buffers for temporarily storing the system stream data transferred to the corresponding signal processing decoders, and STC selectors for selecting a system clock STC referenced by the signal processing decoders when decoding the first system stream, and another system clock STC referenced by the signal processing decoders when decoding a second system stream reproduced contiguously to the first system stream.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 23 is a graph in assistance of explaining a concept of Multi-angle scene control according to the present invention, FIG. 29 is a graph schematically showing an encoding parameters used by the video encoder of FIG. 25, FIG. 43 is a flow chart showing an operation of the syncronization controller of. FIG. 42, FIG. 44 is a graph in assistance of explaining the relationship between the system clock reference SCR, the audio playback starting time information APTS, the decoder reference clock STC, and the video playback starting time VPTS, FIG. 60 is a flow chart showing an operation of the STC selection controller of FIG. 39, during FIG. 60 is a flow chart showing an operation of the STC selection controller of FIG. 39, during an a non-seamless reproduction operation.

DETAILED DESCRIPTION OF THE PREFERRED EMBODIMENTS

Data Structure of the Authoring System

The logic structure of the multimedia data bitstream processed using the recording apparatus, recording medium, reproduction apparatus, and authoring system according to the present invention is described first below with reference to FIG. 1.

In this structure, one title refers to the combination of video and audio data expressing program content recognized by a user for education, entertainment, or other purpose. Referenced to a motion picture (movie), one title may correspond to the content of an entire movie, or to just one scene within said movie.

A video title set (VTS) comprises the bitstream data containing the information for a specific number of titles. More specifically, each VTS comprises the video, audio, and other reproduction data representing the content of each title in the set, and control data for controlling the content data.

The video zone VZ is the video data unit processed by the authoring system, and comprises a specific number of video title sets. More specifically, each video zone is a linear sequence of K+1 video title sets numbered VTS #0–VTS #K where K is an integer value of zero or greater. One video title set, preferably the first video title set VTS #0, is used as the video manager describing the content information of the titles contained in each video title set.

The multimedia bitstream MBS is the largest control unit of the multimedia data bitstream handled by the authoring system of the present invention, and comprises plural video zones VZ.

Authoring Encoder EC

Figure 2:
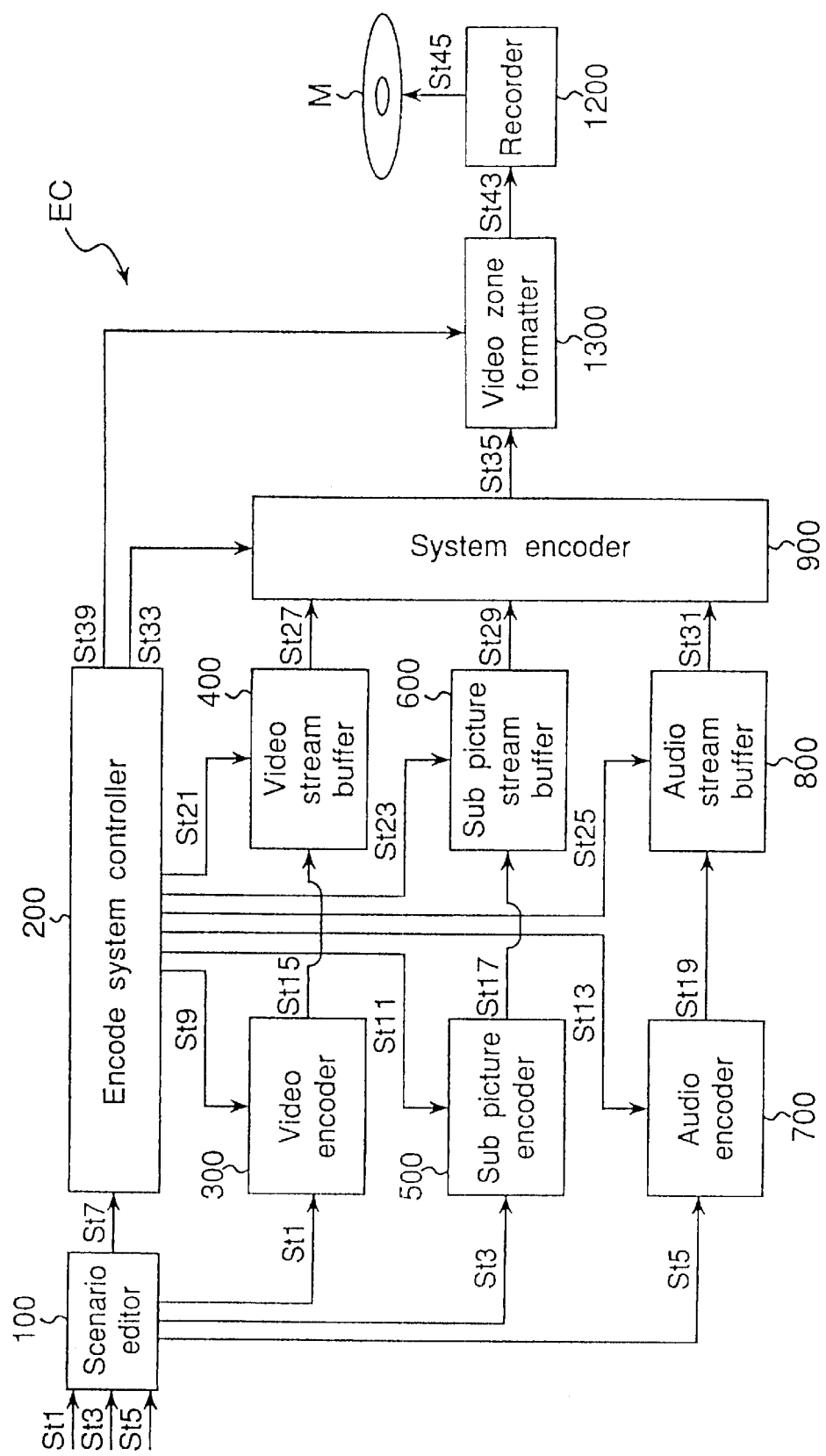
FIG. 2 is a block diagram showing an authoring encoder according to the present invention.

A preferred embodiment of the authoring encoder EC according to the present invention for generating a new multimedia bitstream MBS by re-encoding the original multimedia bitstream MBS according to the scenario desired by the user is shown in FIG. 2. Note that the original multimedia bitstream MBS comprises a video stream St1 containing the video information, a sub-picture stream St3 containing caption text and other auxiliary video information, and the audio stream St5 containing the audio information.

The video and audio streams are the bitstreams containing the video and audio information obtained from the source within a particular period of time. The sub-picture stream is a bitstream containing momentary video information relevant to a particular scene. The sub-picture data encoded to a single scene may be captured to video memory and displayed continuously from the video memory for plural scenes as may be necessary.

When this multimedia source data St1, St3, and St5 is obtained from a live broadcast, the video and audio signals are supplied in real-time from a video camera or other imaging source; when the multimedia source data is reproduced from a video tape or other recording medium, the audio and video signals are not real-time signals.

While the multimedia source stream is shown in FIG. 2 as comprising these three source signals, this is for convenience only, and it should be noted that the multimedia source stream may contain more than three types of source signals, and may contain source data for different titles. Multimedia source data with audio, video, and sub-picture data for plural titles are referred to below as multi-title streams.

As shown in FIG. 2, the authoring encoder EC comprises a scenario editor 100, encoding system controller 200, video encoder 300, video stream buffer 400, sub-picture encoder 500, sub-picture stream buffer 600, audio encoder 700, audio stream buffer 800, system encoder 900, video zone formatter 1300, recorder 1200, and recording medium M.

The video zone formatter 1300 comprises video object (VOB) buffer 1000, formatter 1100, and volume and file structure formatter 1400.

The bitstream encoded by the authoring encoder EC of the present embodiment is recorded, by way of example only, to an optical disk.

The scenario editor 100 of the authoring encoder EC outputs the scenario data, i.e., the user-defined editing instructions. The scenario data controls editing of the corresponding parts of the multimedia bitstream MBS according to the user's manipulation of the video, sub-picture, and audio components of the original multimedia title. This scenario editor 100 preferably comprises a display, speaker (s), keyboard, CPU, and source stream buffer. The scenario editor 100 is connected to an external multimedia bitstream source from which the multimedia source data St1, St3, and St5 are supplied.

The user is thus able to reproduce the video and audio components of the multimedia source data using the display and speaker to confirm the content of the generated title. The user is then able to edit the title content according to the desired scenario using the keyboard, mouse, and other command input devices while confirming the content of the title on the display and speakers. The result of this multimedia data manipulation is the scenario data St7.

The scenario data St7 is basically a set of instructions describing what source data is selected from all or a subset of the source data containing plural titles within a defined time period, and how the selected source data is reassembled to reproduce the scenario (sequence) intended by the user. Based on the instructions received through the keyboard or other control device, the CPU codes the position, length, and the relative time-based positions of the edited parts of the-respective multimedia source data streams St1, St3, and St5 to generate the scenario data St7.

The source stream buffer has a specific capacity, and is used to delay the multimedia source data streams St1, St3, and St5 a known time Td and then output streams St1, St3, and St5.

This delay is required for synchronization with the editor encoding process. More specifically, when data encoding and user generation of scenario data St7 are executed simultaneously, i.e., when encoding immediately follows editing, time Td is required to determine the content of the multimedia source data editing process based on the scenario data St7 as will be described further below. As a result, the multimedia source data must be delayed by time Td to synchronize the editing process during the actual encoding operation. Because this delay time Td is limited to the time required to synchronize the operation of the various system components in the case of sequential editing as described above, the source stream buffer is normally achieved by means of a high speed storage medium such as semiconductor memory.

During batch editing in which all multimedia source data is encoded at once ("batch encoded") after scenario data St7 is generated for the complete title, delay time Td must be long enough to process the complete title or longer. In this case, the source stream buffer may be a low speed, high capacity storage medium such as video tape, magnetic disk—or optical disk.

The structure (type) of media used for the source stream buffer may therefore be determined according to the delay time Td required and the allowable manufacturing cost.

The encoding system controller 200 is connected to the scenario editor 100 and receives the scenario data St7 therefrom. Based on the time-base position and length information of the edit segment contained in the scenario data St7, the encoding system controller 200 generates the encoding parameter signals St9, St11, and St13 for encoding the edit segment of the multimedia source data. The encoding signals St9, St11, and St13 supply the parameters used for video, sub-picture, and audio encoding, including the encoding start and end timing. Note that multimedia source data St1, St3, and St5 are output after delay time Td by the source stream buffer, and are therefore synchronized to encoding parameter signals St9, St11, and St13.

More specifically, encoding parameter signal St9 is the video encoding signal specifying the encoding timing of video stream St1 to extract the encoding segment from the video stream St1 and generate the video encoding unit. Encoding parameter signal St11 is likewise the sub-picture stream encoding signal used to generate the sub-picture encoding unit by specifying the encoding timing for sub-picture stream St3. Encoding parameter signal St13 is the audio encoding signal used to generate the audio encoding unit by specifying the encoding timing for audio stream St5.

Based on the time-base relationship between the encoding segments of streams St1, St3, and St5 in the multimedia source data contained in scenario data St7, the encoding system controller 200 generates the timing signals St21, St23, and St25 arranging the encoded multimedia-encoded stream in the specified time-base relationship.

The encoding system controller 200 also generates the reproduction time information IT defining the reproduction time of the title editing unit (video object, VOB), and the stream encoding data St33 defining the system encode parameters for multiplexing the encoded multimedia stream containing video, audio, and sub-picture data. Note that the reproduction time information IT and stream encoding data St33 are generated for the video object VOB of each title in one video zone VZ.

The encoding system controller 200 also generates the title sequence control signal St39, which declares the formatting parameters for formatting the title editing units VOB of each of the streams in a particular time-base relationship as a multimedia bitstream. More specifically, the title sequence control signal St39 is used to control the connections between the title editing units (VOB) of each title in the multimedia bitstream MBS, or to control the sequence of the interleaved title editing unit (VOBs) interleaving the title editing units VOB of plural reproduction paths.

The video encoder 300 is connected to the source stream buffer of the scenario editor 100 and to the encoding system controller.200, and receives therefrom the video stream St1 and video encoding parameter signal St9, respectively. Encoding parameters supplied by the video encoding signal St9 include the encoding start and end timing, bit rate, the encoding conditions for the encoding start and end, and the material type. Possible material types include NTSC or PAL video signal, and telecine converted material. Based on the video encoding parameter signal St9, the video encoder 300 encodes a specific part of the video stream St1 to generate the encoded video stream St15.

The sub-picture encoder 500 is similarly connected to the source stream buffer of the scenario editor 100 and to the encoding system controller 200, and receives therefrom the sub-picture stream St3 and sub-picture encoding parameter signal St11, respectively. Based on the sub-picture encoding parameter signal St11, the sub-picture encoder 500 encodes a specific part of the sub-picture stream St3 to generate the encoded sub-picture stream St17.

The audio encoder 700 is also connected to the source stream buffer of the scenario editor 100 and to the encoding system controller 200, and receives therefrom the audio stream St5 and audio encoding parameter signal St13, which supplies the encoding start and end timing. Based on the audio encoding parameter signal St13, the audio encoder 700 encodes a specific part of the audio stream St5 to generate the encoded audio stream St19.

The video stream buffer 400 is connected to the video encoder 300 and to the encoding system controller 200. The video stream buffer 400 stores the encoded video stream St15 input from the video encoder 300, and outputs the stored encoded video stream St15 as the time-delayed encoded video stream St27 based on the timing signal St21 supplied from the encoding system controller 200.

The sub-picture stream buffer 600 is similarly connected to the sub-picture encoder 500 and to the encoding system controller 200. The sub-picture stream buffer 600 stores the encoded sub-picture stream St17 output from the sub-picture encoder 500, and then outputs the stored encoded sub-picture stream St17 as time-delayed encoded sub-picture stream St29 based on the timing signal St23 supplied from the encoding system controller 200.

The audio stream buffer 800 is similarly connected to the audio encoder 700 and to the encoding system controller 200. The audio stream buffer 800 stores the encoded audio stream St19 input from the audio encoder 700, and then outputs the encoded audio stream St19 as the time-delayed encoded audio stream St31 based on the timing signal St25 supplied from the encoding system controller 200.

The system encoder 900 is connected to the video stream buffer 400, sub-picture stream buffer 600, audio stream buffer 800, and the encoding system controller 200, and is respectively supplied thereby with the time-delayed encoded video stream St27, time-delayed encoded sub-picture stream .St29, time-delayed encoded audio stream St31, and the stream encoding data St33. Note that the system encoder 900 is a multiplexer that multiplexes the time-delayed streams St27, St29, and St31 based on the stream encoding data St33 (timing signal) to generate title editing unit (VOB) St35. The stream encoding data St33 contains the system encoding parameters, including the encoding start and end timing.

The video zone formatter 1300 is connected to the system encoder 900 and the encoding system controller 200 from which the title editing unit (VOB) St35 and title sequence control signal St39 (timing signal) are respectively supplied. The title sequence control signal St39 contains the formatting start and end timing, and the formatting parameters used to generate (format) a multimedia bitstream MBS. The video zone formatter 1300 rearranges the title editing units (VOB) St35 in one video zone VZ in the scenario sequence defined by the user based on the title sequence control signal St39 to generate the edited multimedia stream data St43.

The multimedia bitstream MBS St43 edited according to the user-defined scenario is then sent to the recorder 1200. The recorder 1200 processes the edited multimedia stream data St43 to the data stream St45 format of the recording medium M, and thus records the formatted data stream St45 to the recording medium M. Note that the multimedia bitstream MBS recorded to the recording medium M contains the volume file structure VFS, which includes the physical address of the data on the recording medium generated by the video zone formatter 1300.

Note that the encoded multimedia bitstream MBS St35 may be output directly to the decoder to immediately reproduce the edited title content. It will be obvious that the output multimedia bitstream MBS will not in this case contain the volume file structure VFS.

Authoring Decoder

A preferred embodiment of the authoring decoder DC used to decode the multimedia bitstream MBS edited by the authoring encoder EC of the present invention, and thereby reproduce the content of each title unit according to the user-defined scenario, is described next below with reference to FIG. 3. Note that in the preferred embodiment described below the multimedia bitstream St45 encoded by the authoring encoder EC is recorded to the recording medium M.

Figure 3:
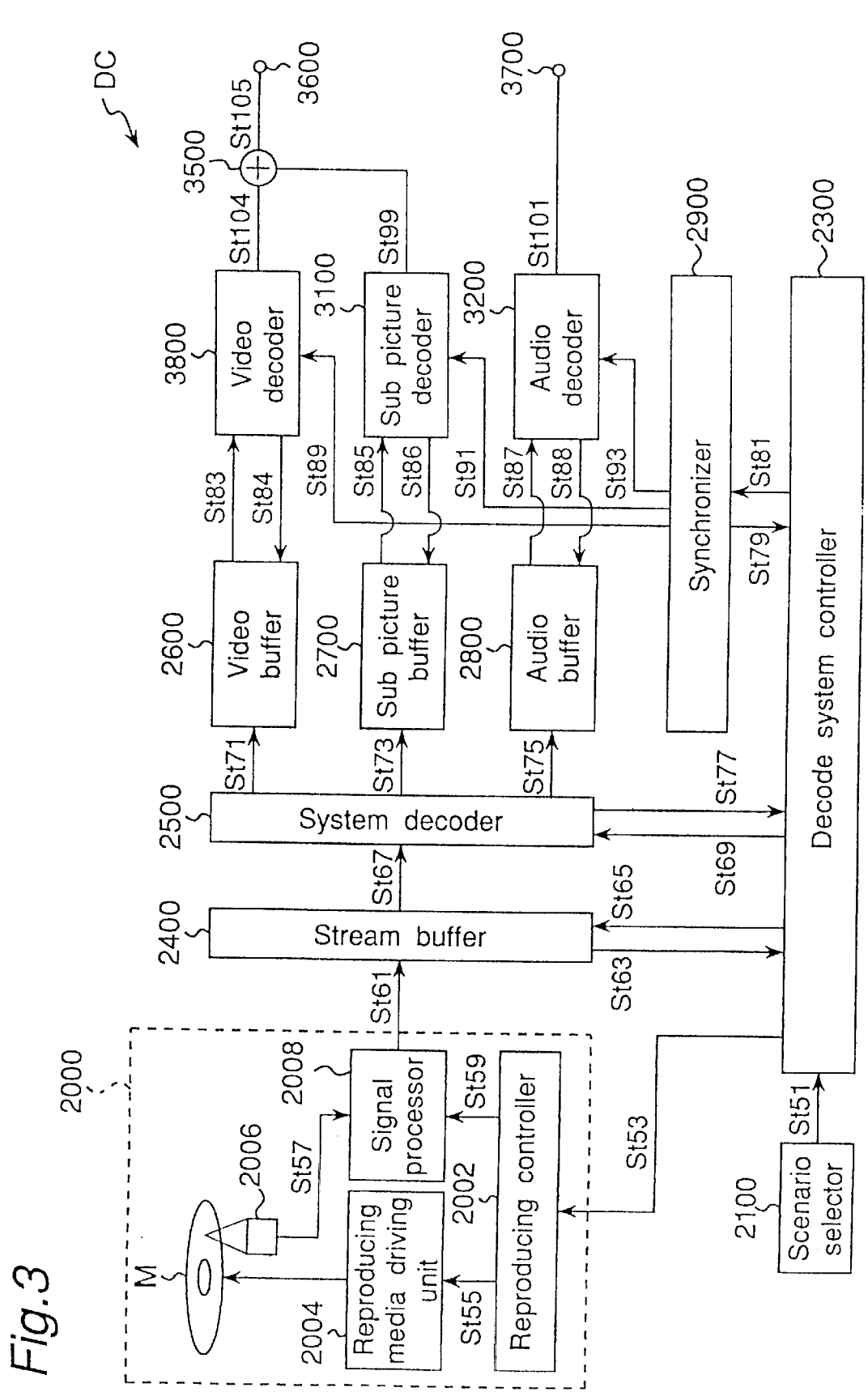
FIG. 3 is a block diagram showing an authoring decoder according to the present invention.

As shown in FIG. 3, the authoring decoder DC comprises a multimedia bitstream producer 2000, scenario selector 2100, decoding system controller 2300, stream buffer 2400, system decoder 2500, video buffer 2600, sub-picture buffer 2700, audio buffer 2800, synchronizer 2900, video decoder 3800, sub-picture decoder 3100, audio decoder 3200, synthesizer 3500, video data output terminal 3600, and audio data output terminal 3700.

The bitstream producer 2000 comprises a recording media drive unit 2004 for driving the recording medium M; a reading head 2006 for reading the information recorded to the recording medium M and producing the binary read signal St57; a signal processor 2008 for variously processing the read signal St57 to generate the reproduced bitstream St61; and a reproduction controller 2002.

The reproduction controller 2002 is connected to the decoding system controller 2300 from which the multimedia bitstream reproduction control signal St53 is supplied, and in turn generates the reproduction control signals St55 and St59 respectively controlling the recording media drive unit (motor) 2004 and signal processor 2008.

So that the user-defined video, sub-picture, and audio portions of the multimedia title edited by the authoring encoder EC are reproduced, the authoring decoder DC comprises a scenario selector 2100 for selecting and reproducing the corresponding scenes (titles). The scenario selector 2100 then outputs the selected titles as scenario data to the authoring decoder DC.

The scenario selector 2100 preferably comprises a keyboard, CPU, and monitor. Using the keyboard, the user then inputs the desired scenario based on the content of the scenario input by the authoring encoder EC. Based on the keyboard input, the CPU generates the scenario selection data St51 specifying the selected scenario. The scenario selector 2100 is connected by an infrared communications device, for example, to the decoding system controller 2300, to which it inputs the scenario selection data St51.

Based on the scenario selection data St51, the decoding system controller 2300 then generates the bitstream reproduction control signal St53 controlling the operation of the bitstream producer 2000.

The stream buffer 2400 has a specific buffer capacity used to temporarily store the reproduced bitstream St61 input from the bitstream producer 2000, extract the address information and initial synchronization data SCR (system clock reference) for each stream, and generate bitstream control data St63. The stream buffer 2400 is also connected to the decoding system controller 2300, to which it supplies, the generated bitstream control data St63.

The synchronizer 2900 is connected to the decoding system controller 2300 from which it receives the system clock reference SCR contained in the synchronization control data St81 to set the internal system clock STC and supply the reset system clock St79 to the decoding system controller 2300.

Based on this system clock St79, the decoding system controller 2300 also generates the stream read signal St65 at a specific interval and outputs the read signal St65 to the stream buffer 2400.

Based on the supplied read signal St65, the stream buffer 2400 outputs the reproduced bitstream St61 at a specific interval to the system decoder 2500 as bitstream St67.

Based on the scenario selection data St51, the decoding system controller 2300 generates the decoding signal St69 defining the stream Ids for the video, sub-picture, and audio bitstreams corresponding to the selected scenario, and outputs to the system decoder 2500.

Based on the instructions contained in the decoding signal St69, the system decoder 2500 respectively outputs the video, sub-picture, and audio bitstreams input from the stream buffer 2400 to the video buffer 2600, sub-picture buffer 2700, and audio buffer 2800 as the encoded video stream St71, encoded sub-picture stream St73, and encoded audio stream St75.

The system decoder 2500 detects the presentation time stamp PTS and decoding time stamp DTS of the smallest control unit in each bitstream St67 to generate the time information signal St77. This time information signal St77 is supplied to the synchronizer 2900 through the decoding system controller 2300 as the synchronization control data St81.

Based on this synchronization control data St81, the synchronizer 2900 determines the decoding start timing whereby each of the bitstreams will be arranged in the correct sequence after decoding, and then generates and inputs the video stream decoding start signal St89 to the video decoder 3800 based on this decoding timing. The synchronizer 2900 also generates and supplies the sub-picture decoding start signal St91 and audio stream decoding start signal St93 to the sub-picture decoder 3100 and audio decoder 3200, respectively.

The video decoder 3800 generates the video output request signal St84 based on the video stream decoding start signal St89, and outputs to the video buffer 2600. In response to the video output request signal St84, the video buffer 2600 outputs the video stream St83 to the video decoder 3800. The video decoder 3800 thus detects the presentation time information contained in the video stream St83, and disables the video output request signal St84 when the length of the received video stream St83 is equivalent to the specified presentation time. A video stream equal in length to the specified presentation time is thus decoded by the video decoder 3800, which outputs the reproduced video signal St104 to the synthesizer 3500.

The sub-picture decoder 3100 similarly generates the sub-picture output request signal St86 based on the sub-picture decoding start signal St91, and outputs to the sub-picture buffer 2700. In response to the sub-picture output request signal St86, the sub-picture buffer 2700 outputs the sub-picture stream St85 to the sub-picture decoder 3100. Based on the presentation time information contained in the sub-picture stream St85, the sub-picture decoder 3100 decodes a length of the sub-picture stream St85 corresponding to the specified presentation time to reproduce and supply to the synthesizer 3500 the sub-picture signal St99.

The synthesizer 3500 superimposes the video signal St104 and sub-picture signal St99 to generate and output the multi-picture video signal St105 to the video data output terminal 3600.

The audio decoder 3200 generates and supplies to the audio buffer 2800 the audio output request signal St88 based on the audio stream decoding start signal St93. The audio buffer 2800 thus outputs the audio stream St87 to the audio decoder 3200. The audio decoder 3200 decodes a length of the audio stream St87 corresponding to the specified presentation time-based on the presentation time information contained in the audio stream St87, and outputs the decoded audio stream St101 to the audio data output terminal 3700.

It is thus possible to reproduce a user-defined multimedia bitstream MBS in real-time according to a user-defined scenario. More specifically, each time the user selects a different scenario, the authoring decoder DC is able to reproduce the title content desired by the user in the desired sequence by reproducing the multimedia bitstream MBS corresponding to the selected scenario.

It is therefore possible by means of the authoring system of the present invention to generate a multimedia bitstream according to plural user-defined scenarios by real-time or batch encoding multimedia source data in a manner whereby the substreams of the smallest editing units (scenes), which can be divided into plural substreams, expressing the basic title content are arranged in a specific time-base relationship.

The multimedia bitstream thus encoded can then be reproduced according to the one scenario selected from among plural possible scenarios. It is also possible to change scenarios while playback is in progress, i.e., to select a different scenario and dynamically generate a new multimedia bitstream according to the most recently selected scenario. It is also possible to dynamically select and reproduce any of plural scenes while reproducing the title content according to a desired scenario.

It is therefore possible by means of the authoring system of the present invention to encode and not only reproduce but to repeatedly reproduce a multimedia bitstream MBS in real-time.

A detail of the authoring system is disclosed in Japanese Patent Application filed Sep. 27, 1996, and entitled and assigned to the same assignee as the present application.

Digital Video Disk (DVD)

Figure 4:
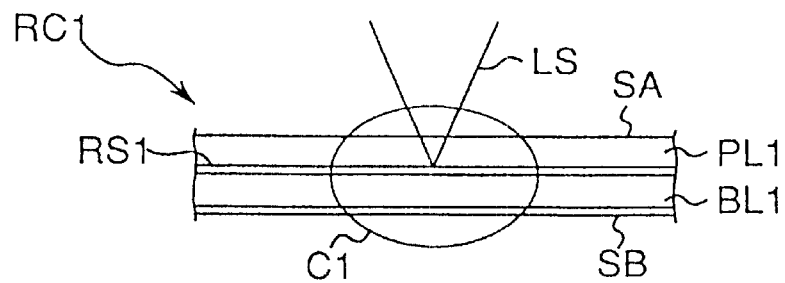
FIG. 4 is a side view of an optical disk storing the multi media bit stream of FIG. 1.

An example of a digital video disk (DVD) with only one recording surface (a single-sided DVD) is shown in FIG. 4.

The DVD recording medium RC1 in the preferred embodiment of the invention comprises a data recording surface RS1 to and from which data is written and read by emitting laser beam LS, and a protective layer PL1 covering the data recording surface RS1. A backing layer BL1 is also provided on the back of data recording surface RS1. The side of the disk on which protective layer PL1 is provided is therefore referred to below as side SA (commonly "side A"), and the opposite side (on which the backing layer BL1 is provided) is referred to as side SB ("side B"). Note that digital video disk recording media having a single data recording surface RS1 on only one side such as this DVD recording medium RC1 is commonly called a single-sided single layer disk.

Figure 5:
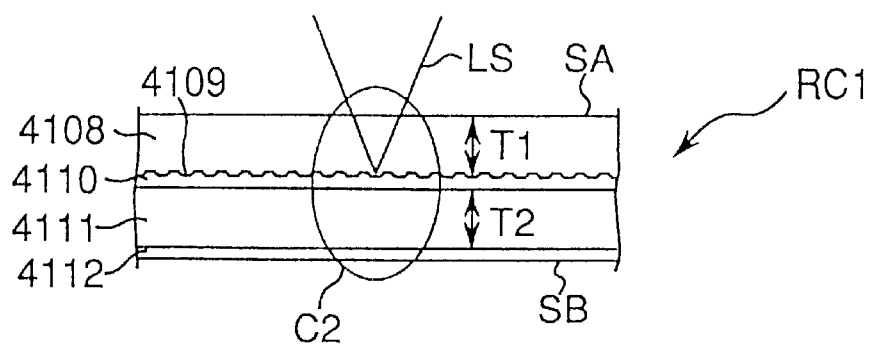
FIG. 5 is an enlarged view showing a portion confined by a circle of FIG. 4.

A detailed illustration of area C1 in FIG. 4 is shown in FIG. 5. Note that the data recording surface RS1 is formed by applying a metallic thin film or other reflective coating as a data layer 4109 on a first transparent layer 4108 having a particular thickness T1. This first transparent layer 4108 also functions as the protective layer PL1. A second transparent substrate 4111 of a thickness T2 functions as the backing layer BL1, and is bonded to the first transparent layer 4108 by means of an adhesive layer 4110 disposed therebetween.

A printing layer 4112 for printing a disk label may also be disposed on the second transparent substrate 4111 as necessary. The printing layer 4112 does not usually cover the entire surface area of the second transparent substrate 4111 (backing layer BL1), but only the area needed to print the text and graphics of the disk label. The area of second transparent substrate 4111 to which the printing layer 4112 is not formed may be left exposed. Light reflected from the data layer 4109 (metallic thin film) forming the data recording surface RS1 can therefore be directly observed where the label is not printed when the digital video disk is viewed from side SB. As a result, the background looks like a silver-white over which the printed text and graphics float when the metallic thin film is an aluminum thin film, for example.

Note that it is only necessary to provide the printing layer 4112 where needed for printing, and it is not necessary to provide the printing layer 4112 over the entire surface of the backing layer BL1.

Figure 6:
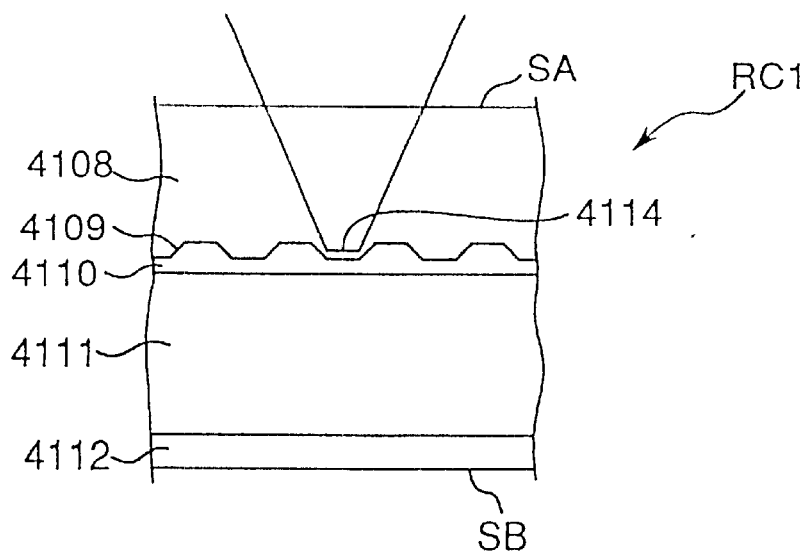
FIG. 6 is an enlarged view showing a portion confined by a circle of FIG. 5.

A detailed illustration of area C2 in FIG. 5 is shown in FIG. 6. Pits and lands are molded to the common contact surface between the first transparent layer 4108 and the data layer 4109 on side SA from which data is read by emitting a laser beam LS, and data is recorded by varying the lengths of the pits and lands (i.e., the length of the intervals between the pits). More specifically, the pit and land configuration formed on the first transparent layer 4108 is transferred to the data layer 4109. The lengths of the pits and lands is shorter, and the pitch of the data tracks formed by the pit sequences is narrower, than with a conventional Compact Disc (CD). The surface recording density is therefore greatly improved.

Side SA of the first transparent layer 4108 on which data pits are not formed is a flat surface. The second transparent substrate 4111 is for reinforcement, and is a transparent panel made from the same material as the first transparent layer 4108 with both sides flat. Thicknesses T1 and T2 are preferably equal and commonly approximately 0.6 mm, but the invention shall not be so limited.

As with a CD, information is read by irradiating the surface with a laser beam LS and detecting the change in the reflectivity of the light spot. Because the objective lens aperture NA can be large and the wavelength l of the light beam small in a digital video disk system, the diameter of the light spot Ls used can be reduced to approximately 1/1.6 the light spot needed to read a CD. Note that this means the resolution of the laser beam LS in the DVD system is approximately 1.6 times the resolution of a conventional CD system.

The optical system used to read data from the digital video disk uses a short 650 nm wavelength red semiconductor laser and an-objective lens with a 0.6 mm aperture NA. By thus also reducing the thickness T of the transparent panels to 0.6 mm, more than 5 GB of data can be stored to one side of a 120 mm diameter optical disk.

It is therefore possible to store motion picture (video) images having an extremely large per unit data size to a digital video disk system disk without losing image quality because the storage capacity of a single-sided, single-layer recording medium RC1 with one data recording surface RS1 as thus described is nearly ten times the storage capacity of a conventional CD. As a result, while the video presentation time of a conventional CD system is approximately 74 minutes if image quality is sacrificed, high quality video images with a video presentation time exceeding two hours can be recorded to a DVD.

The digital video disk is therefore well-suited as a recording medium for video images.

A digital video disk recording medium with plural recording surfaces RS as described above is shown in FIGS. 7 and 8. The DVD recording medium RC2 shown in FIG. 7 comprises two recording surfaces, i.e., first recording surface RS1 and semi-transparent second recording surface RS2, on the same side, i.e. side SA, of the disk. Data can be simultaneously recorded or reproduced from these two recording surfaces by using different laser beams LS1 and LS2 for the first recording surface RS1 and the second recording surface RS2. It is also possible to read/write both recording surfaces RS1 and RS2 using only one of the laser beams LS1 or LS2. Note that recording media thus comprised are called "single-side, dual-layer disks."

It should also be noted that while two recording surfaces RS1 and RS2 are provided in this example, it is also possible to produce digital video disk recording media having more than two recording surfaces RS. Disks thus comprised are known as "single-sided, multi-layer disks."

Figure 7:
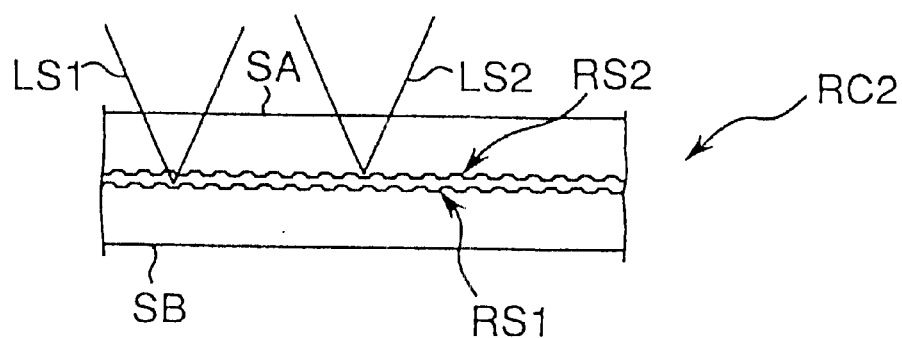
FIG. 7 is a side view showing a variation of the optical disk of FIG. 4.
Figure 8:
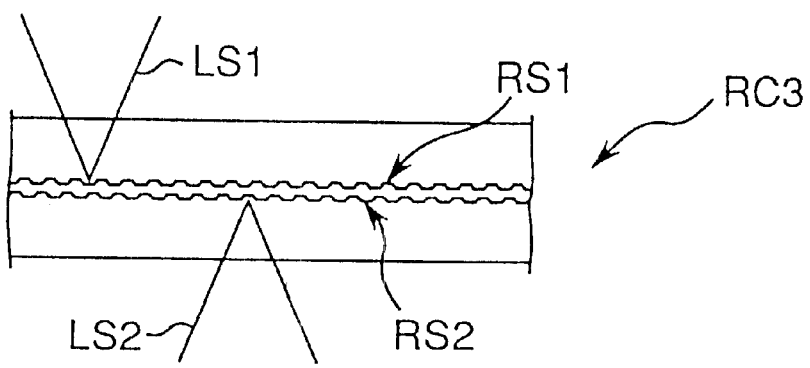
FIG. 8 is a side view showing another variation of the optical disk of FIG. 4.

Though comprising two recording surfaces similarly to the recording media shown in FIG. 7, the DVD recording medium RC3 shown in FIG. 8 has the recording surfaces on opposite sides of the disk, i.e., has the first data recording surface RS1 on side SA and the second data recording surface RS2 on side SB. It will also be obvious that while only two recording surfaces are shown on one digital video disk in this example, more than two recording surfaces may also be formed on a double-sided digital video disk. As with the recording medium shown in FIG. 7, it is also possible to provide two separate laser beams LS1 and LS2 for recording surfaces RS1 and RS2, or to read/write both recording surfaces RS1 and RS2 using a single laser beam. Note that this type of digital video disk is called a "double-sided, dual-layer disk." It will also be obvious that a double-sided digital video disk can be comprised with two or more recording surfaces per side. This type of disk is called a "double-sided, multi-layer disk."

Figure 9:
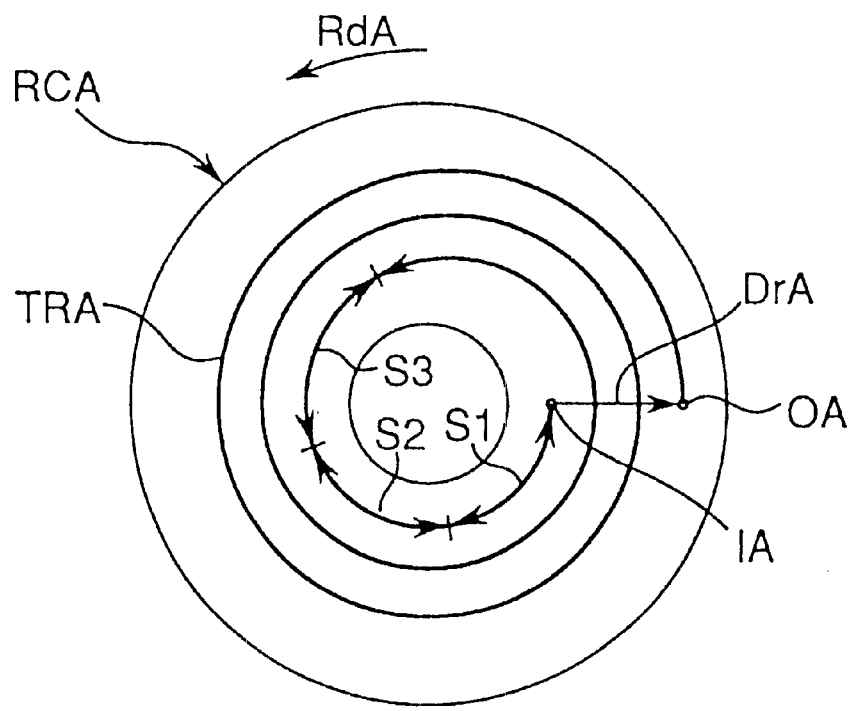
FIG. 9 is a plan view showing one example of track path formed on the recording surface of the optical disk of FIG. 4.
Figure 10:
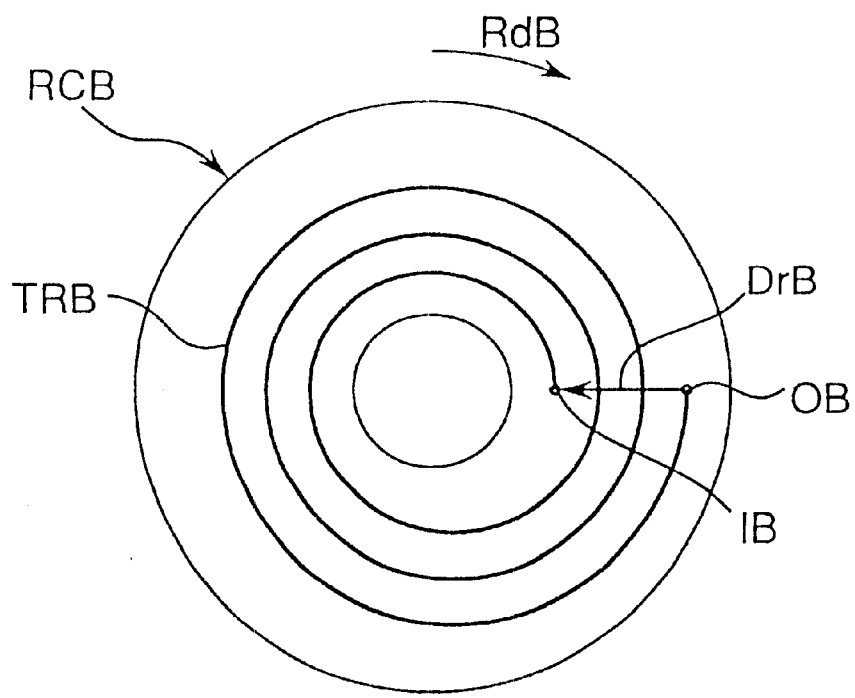
FIG. 10 is a plan view showing another example of track path formed on the recording surface of the optical disk of FIG. 4.

A plan view from the laser beam LS irradiation side of the recording surface RS of the DVD recording medium RC is shown in FIG. 9 and FIG. 10. Note that a continuous spiral data recording track TR is provided from the inside circumference to the outside circumference of the DVD. The data recording track TR is divided into plural sectors each having the same known storage capacity. Note that for simplicity only the data recording track TR is shown in FIG. 9 with more than three sectors per revolution.

As shown in FIG. 9, the data recording track TR is normally formed clockwise inside to outside (see arrow DrA) from the inside end point IA at the inside circumference of disk RCA to the outside end point OA at the outside circumference of the disk with the disk RCA rotating counterclockwise RdA. This type of disk RCA is called a clockwise disk, and the recording track formed thereon is called a clockwise track TRA.

Depending upon the application, the recording track TRB may be formed clockwise from outside to inside circumference (see arrow DrB in FIG. 10) from the outside end point OB at the outside circumference of disk RCB to the inside end point IB at the inside circumference of the disk with the disk RCB rotating clockwise RdB. Because the recording track appears to wind counterclockwise when viewed from the inside circumference to the outside circumference on disks with the recording track formed in the direction of arrow DrB, these disks are referred to as counterclockwise disk RCB with counterclockwise track TRB to distinguish them from disk RCA in FIG. 9. Note that track directions DrA and DrB are the track paths along which the laser beam travels when scanning the tracks for recording and playback. Direction of disk rotation RdA in which disk RCA turns is thus opposite the direction of track path DrA, and direction of disk rotation RdB in which disk RCB turns is thus opposite the direction of track path DrB.

Figure 11:
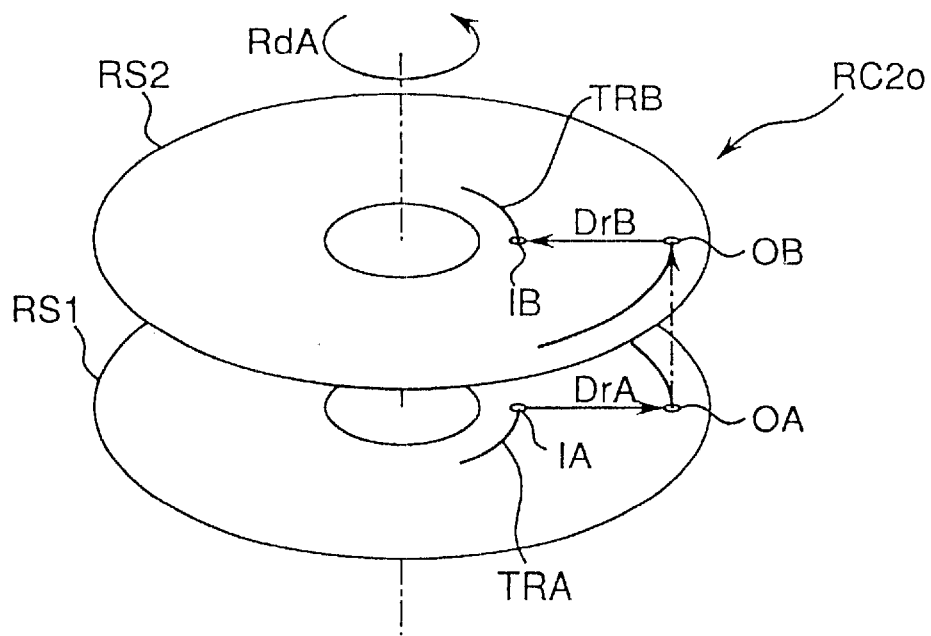
FIG. 11 is a diagonal view schematically showing one example of a track path pattern formed on the optical disk of FIG. 7.

An exploded view of the single-sided, dual-layer disk RC2 shown in FIG. 7 is shown as disk RC2o in FIG. 11. Note that the recording tracks formed on the two recording surfaces run in opposite directions. Specifically, a clockwise recording track TRA as shown in FIG. 9 is formed in clockwise direction DrA on the (lower) first data recording surface RS1, and a counterclockwise recording track TRB formed in counterclockwise direction DrB as shown in FIG. 10 is provided on the (upper) second data recording surface RS2. As a result, the outside end points OA and OB of the first and second (top and bottom) tracks are at the same radial position relative to the center axis of the disk RC2o. Note that track paths DrA and DrB of tracks TR are also the data read/write directions to disk RC. The first and second (top and bottom) recording tracks thus wind opposite each other with this disk RC, i.e., the track paths DrA and DrB of the top and bottom recording layers are opposite track paths.

Opposite track path type, single-sided, duallayer disks RC2o rotate in direction RdA corresponding to the first recording surface RS1 with the laser beam LS travelling along track path DrA to trace the recording track on the first recording surface RS1. When the laser beam LS reaches the outside end point OA,.the laser beam LS can be refocused to end point OB on the second recording surface RS2 to continue tracing the recording track from the first to the second recording surface uninterrupted. The physical distance between the recording tracks TRA and TRB on the first and second recording surfaces RS1 and RS2 can thus be instantaneously eliminated by simply adjusting the focus of the laser beam LS.

It is therefore possible with an opposite track path type, single-sided, dual-layer disk RC2o to easily process the recording tracks disposed to physically discrete top and bottom recording surfaces as a single continuous recording track. It is therefore also possible in an authoring system as described above with reference to FIG. 1 to continuously record the multimedia bitstream MBS that is the largest multimedia data management unit to two discrete recording surfaces RS1 and RS2 on a single recording medium RC2o.

It should be noted that the tracks on recording surfaces RS1 and RS2 can be wound in the directions opposite those described above, i.e., the counterclockwise track TRB may be provided on the first recording surface RS1 and the clockwise track TRA on the second recording surface RS2. In this case the direction of disk rotation is also changed to a clockwise rotation RdB, thereby enabling the two recording surfaces to be used as comprising a single continuous recording track as described above. For simplification, a further example of this type of disk is therefore neither shown nor described below.

It is therefore possible by thus constructing the digital video disk to record the multimedia bitstream MBS for a feature-length title to a single opposite track path type, single-sided, dual-layer disk RC2o. Note that this type of digital video disk medium is called a single-sided dual-layer disk with opposite track paths.

Figure 12:
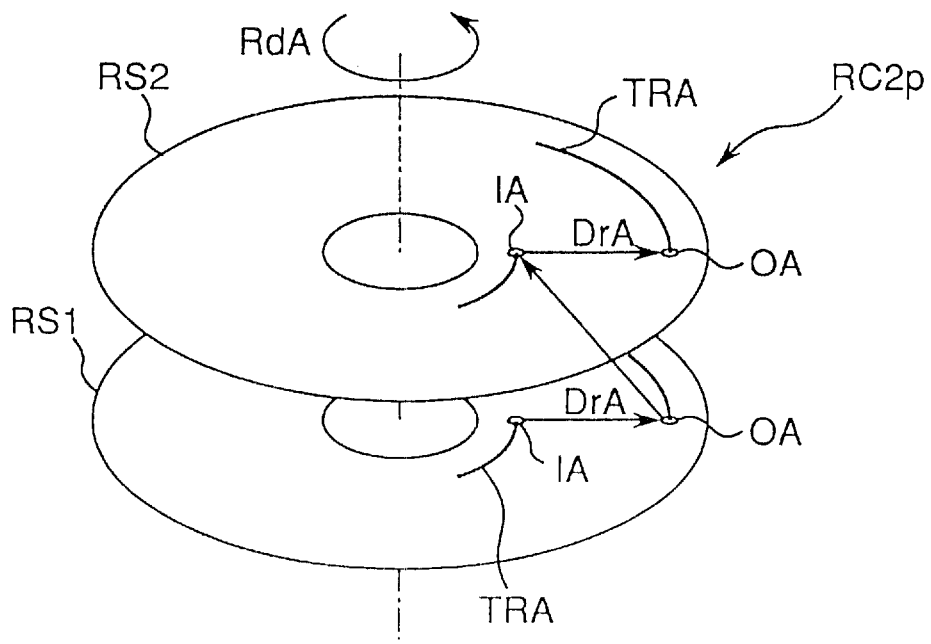
FIG. 12 is a plan view showing another example of track path formed on the recording surface of the optical disk of FIG. 7.

Another example of the single-sided, dual-layer DVD recording medium RC2 shown in FIG. 7 is shown as disk RC2p in FIG. 12. The recording tracks formed on both first and second recording surfaces RS1 and RS2 are clockwise tracks TRA as shown in FIG. 9. In this case, the single-sided, dual-layer disk RC2p rotates counterclockwise in the direction of arrow RdA, and the direction of laser beam LS travel is the same as the direction of the track spiral, i.e., the track paths of the top and bottom recording surfaces are mutually parallel (parallel track paths). The outside end points OA of both top and bottom tracks are again preferably positioned at the same radial position relative to the center axis of the disk RC2p as described above. As also described above with disk RC2o shown in FIG. 11, the access point can be instantaneously shifted from outside end point OA of track TRA on the first recording surface RS1 to the outside end point OA of track TRA on the second recording surface RS2 by appropriately adjusting the focus of the laser beam LS at outside end point OA.

However, for the laser beam LS to continuously access the clockwise recording track TRA on the second recording surface RS2, the recording medium RC2p must be driven in the opposite direction (clockwise, opposite direction RdA). Depending-on the radial position of the laser beam LS, however, it is inefficient to change the rotational direction of the recording medium. As shown by the diagonal arrow in FIG. 12, the laser beam LS is therefore moved from the outside end point OA of the track on the first recording surface RS1 to the inside end point IA of the track on the second recording surface RS2 to use these physically discrete recording tracks as one logically continuous recording track.

Rather than using the recording tracks on top and bottom recording surfaces as one continuous recording track, it is also possible to use the recording tracks to record the multimedia bitstreams MBS for different titles. This type of digital video disk recording medium is called a "single-sided, dual-layer disk with parallel track paths."

Note that if the direction of the tracks formed on the recording surfaces RS1 and RS2 is opposite that described above, i.e., counterclockwise recording tracks TRB are formed, disk operation remains the same as that described above except for the direction of disk rotation, which is clockwise as shown by arrow RdB.

Whether using clockwise or counterclockwise recording tracks, the single-sided, dual-layer disk RC2p with parallel track paths thus described is well-suited to storing on a single disk encyclopedia and similar multimedia bitstreams comprising multiple titles that are frequently and randomly accessed.

Figure 13:
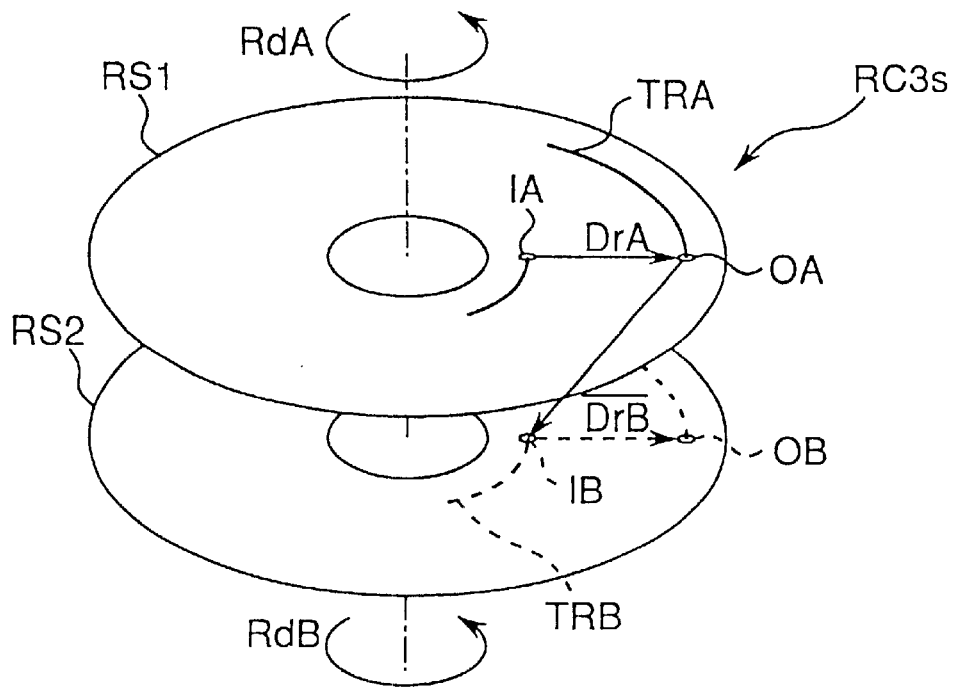
FIG. 13 is a diagonal view schematically showing one example of a track path. pattern formed on the optical disk of FIG. 8.

An exploded view of the dual-sided single-layer DVD recording medium RC3 comprising one recording surface layer RS1 and RS2 on each side as shown in FIG. 8 is shown as DVD recording medium RC3s in FIG. 13. Clockwise recording track TRA is provided on the one recording surface RS1, and a counterclockwise recording track TRB is provided on the other recording surface RS2. As in the preceding recording media, the outside end points OA and OB of the recording tracks on each recording surface are preferably positioned at the same radial position relative to the center axis of the DVD recording medium RC3s.

Note that while the recording tracks on these recording surfaces RS1 and RS2 rotate in opposite directions, the track paths are symmetrical. This type of recording medium is therefore known as a double-sided dual layer disk with symmetrical track paths. This double-sided dual layer disk with symmetrical track paths RC3s rotates in direction RdA when reading/writing the first recording surface RS1. As a result, the track path on the second recording surface RS2 on the opposite side is opposite the direction DrB in which the track winds, i.e., direction DrA. Accessing both recording surfaces RS1 and RS2 using a single laser beam LS is therefore not realistic irrespective of whether access is continuous or non-continuous. In addition, a multimedia bitstream MBS is separately recorded to the recording surfaces on the first and second sides of the disk.

Figure 14:
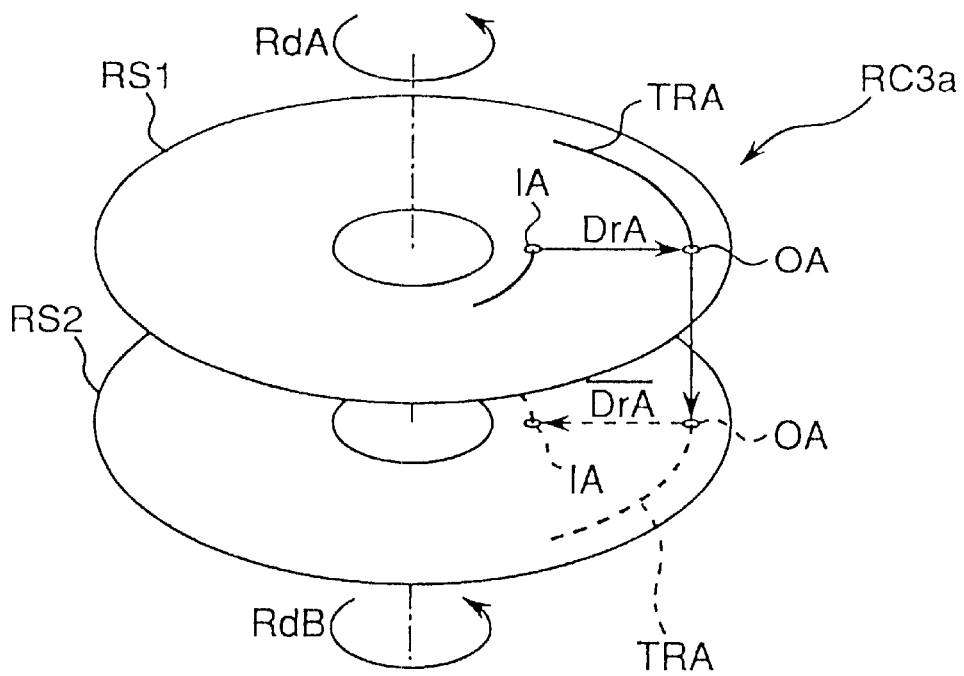
FIG. 14 is a plan view showing another example of track path formed on the recording surface of the optical disk of FIG. 8.

A different example of the double-sided single layer disk RC3 shown in FIG. 8 is shown in FIG. 14 as disk RC3a. Note that this disk comprises clockwise recording tracks TRA as shown in FIG. 9 on both recording surfaces RS1 and RS2. As with the preceding recording media, the outside end points OA and OA of the recording tracks on each recording surface are preferably positioned at the same radial position relative to the center axis of the DVD recording medium RC3a. Unlike the double-sided dual layer disk with symmetrical track paths RC3s described above, the tracks on these recording surfaces RS1 and RS2 are asymmetrical. This type of disk is therefore known as a double-sided dual layer disk with asymmetrical track paths. This double-sided dual layer disk with asymmetrical track paths RC3a rotates in direction RdA when reading/writing the first recording surface RS1. As a result, the track path on the second recording surface RS2 on the opposite side is opposite the direction DrA in which the track winds, i.e., direction DrB.

This means that if a laser beam LS is driven continuously from the inside circumference to the outside circumference on the first recording surface RS1, and then from the outside circumference to the inside circumference on the second recording surface RS2, both sides of the recording medium RC3a can be read/written without turning the disk over and without providing different laser beams for the two sides.

The track paths for recording surfaces RS1 and RS2 are also the same with this double-sided dual layer disk with asymmetrical track paths RC3a. As a result, it is also possible to read/write both sides of the disk without providing separate-laser beams for each side if the recording medium RC3a is turned over between sides, and the read/write apparatus can therefore be constructed economically.

It should be noted that this recording medium remains functionally identical even if counterclockwise recording track TRB is provided in place of clockwise recording track TRA on both recording surfaces RS1 and RS2.

As described above, the true value of a DVD system whereby the storage capacity of the recording medium can be easily increased by using a multiple layer recording surface is realized in multimedia applications whereby plural video data units, plural audio data units, and plural graphics data units recorded to a single disk are reproduced through interactive operation by the user.

It is therefore possible to achieve one long-standing desire of software (programming) providers, specifically, to provide programming content such as a commercial movie on a single recording medium in plural versions for different language and demographic groups while retaining the image quality of the original.

Parental Control

Content providers of movie and video titles have conventionally had to produce, supply, and manage the inventory of individual titles in multiple languages, typically the language of each distribution market, and multi-rated title packages conforming to the parental control (censorship) regulations of individual countries in Europe and North America. The time and resources required for this are significant. While high image quality is obviously important, the programming content must also be consistently reproducible.

The digital video disk recording medium is close to solving these problems.

Multiple angles

One interactive operation widely sought in multimedia applications today is for the user to be able to change the position from which a scene is viewed during reproduction of that scene. This capability is achieved by means of the multiple angle function.

This multiple angle function makes possible applications whereby, for example, a user can watch a baseball game from different angles (or virtual positions in the stadium), and can freely switch between the views while viewing is in progress. In this example of a baseball game, the available angles may include a position behind the backstop centered on the catcher, batter, and pitcher; one from behind the backstop centered on a fielder, the pitcher, and the catcher; and one from center field showing the view to the pitcher and catcher.

To meet these requirements, the digital video disk system uses MPEG, the same basic standard format used with Video-Cds to record the video, audio, graphics, and other signal data. Because of the differences in storage capacity, transfer rates, and signal processing performance within the reproduction apparatus, DVD uses MPEG2, the compression method and data format of which differ slightly from the MPEG1 format used with Video-Cds.

It should be noted that the content of and differences between the MPEG1 and MPEG2 standards have no direct relationship to the intent of the present invention, and further description is therefore omitted below (for more information, see MPEG specifications ISO-11172 and ISO-13818).

The data structure of the DVD system according to the present invention is described in detail below with reference to FIGS. 16, 17, 18, 19, 20, and 21.

Multi-scene Control

A fully functional and practical parental lock playback function and multi-angle scene playback function must enable the user to modify the system output in minor, subtle ways while still presenting substantially the same video and audio output. If these functions are achieved by preparing and recording separate titles satisfying each of the many possible parental lock and multi-angle scene playback requests, titles that are substantially identical and differ in only minor ways must be recorded to the recording medium.

This results in identical data being repeatedly recorded to the larger part of the recording medium, and significantly reduces the utilization efficiency of the available storage capacity. More particularly, it is virtually impossible to record discrete titles satisfying every possible request even using the massive capacity of the digital video disk medium. While it may be concluded that this problem can be easily solved by increasing the capacity of the recording medium, this is an obviously undesirable solution when the effective use of available system resources is considered.

Using multi-scene control, the concept of which is described in another section below, in a DVD system, it is possible to dynamically construct titles for numerous variations of the same basic content using the smallest possible amount of data, and thereby effectively utilize the available system resources (recording medium). More specifically, titles that can be played back with numerous variations are constructed from basic (common) scene periods containing data common to each title, and multi-scene periods comprising groups of different scenes corresponding to the various requests. During reproduction, the user is able to freely and at any time select particular scenes from the multi-scene periods to dynamically construct a title conforming to the desired content, e.g., a title omitting certain scenes using the parental lock control function.

Note that multi-scene control enabling a parental lock playback control function and multi-angle scene playback is described in another section below with reference to FIG. 21.

Data Structure of the DVD System

Figure 22:
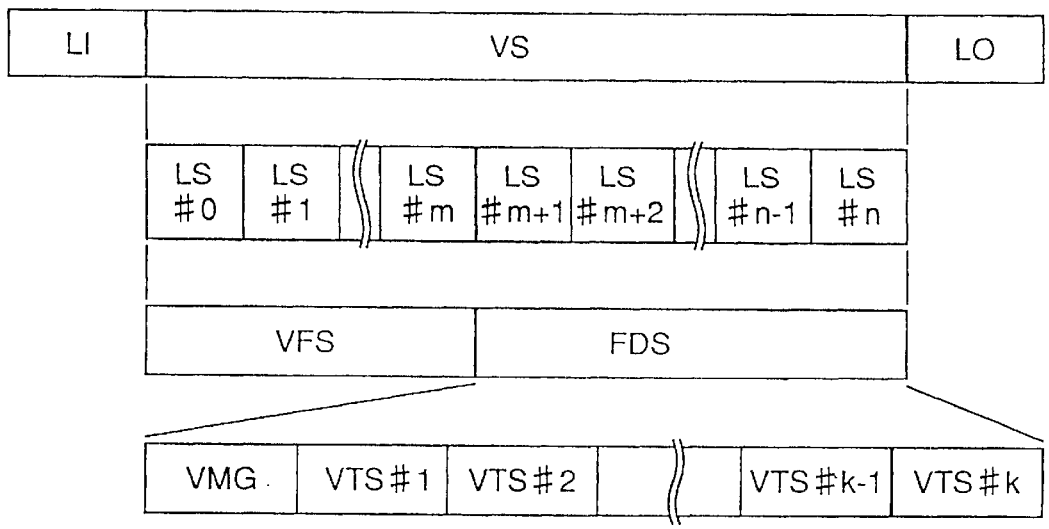
FIG. 22 is a graph schematically showing the data structure used in a digital video disk system according to the present invention.

The data structure used in the authoring system of a digital video disk system according to the present invention is shown in FIG. 22. To record a multimedia bitstream MBS, this digital video disk system divides the recording medium into three major recording areas, the lead-in area LI, the volume space VS, and the lead-out area LO.

The lead-in area-LI is provided at the inside circumference area of the optical disk. In the disks described with reference to FIGS. 9 and 10, the lead-in area LI is positioned at the inside end points IA and IB of each track. Data for stabilizing the operation of the reproducing apparatus when reading starts is written to the lead-in area LI.

The lead-out area LO is correspondingly located at the outside circumference of the optical disk, i.e., at outside end points OA and OB of each track in the disks described with reference to FIGS. 9 and 10. Data identifying the end of the volume space VS is recorded in this lead-out area LO.

The volume space VS is located between the lead-in area LI and lead-out area LO, and is recorded as a one-dimensional array of n+1 (where n is an integer greater than or equal to zero) 2048-byte logic sectors LS. The logic sectors LS are sequentially number #0, #1, #2, . . . #n. The volume space VS is also divided into a volume and file structure management area VFS and a file data structure area FDS.

The volume and file structure management area VFS comprises m+1 logic sectors LS#O to LS#m (where m is an integer greater than or equal to zero and less than n. The file data structure FDS comprises n-m logic sectors LS #m+1 to LS #n.

Figure 1:
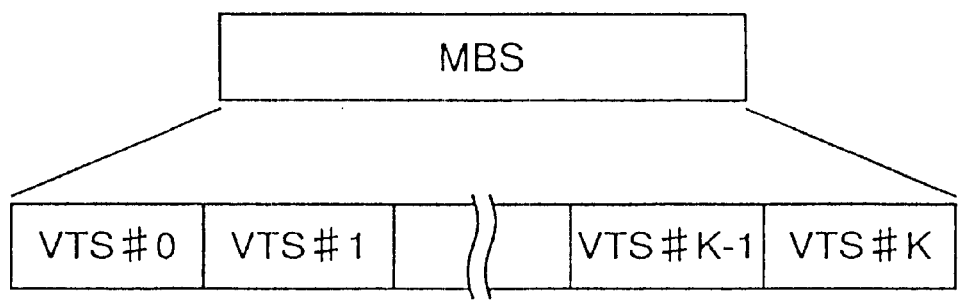
FIG. 1 is a graph schematically showing a structure of multimedia bit stream according to the present invention.

Note that this file data structure area FDS corresponds to the multimedia bitstream MBS shown in FIG. 1 and described above.

The volume file structure VFS is the file system for managing the data stored to the volume space VS as files, and is divided into logic sectors LS#O-LS#m where m is the number of sectors required to store all data needed to manage the entire disk, and is a natural number less than n. Information for the files stored to the file data structure area FDS is written to the volume file structure VFS according to a known specification such as ISO-9660 or ISO-13346.

The file data structure area FDS comprises n-m logic sectors LS#m–LS#n, each comprising a video manager VMG sized to an integer multiple of the logic sector (2048-I, where I is a known integer), and k video title sets VTS #1–VTS#k (where k is a natural number less than 100).

The video manager VMG stores the title management information for the entire disk, and information for building a volume menu used to set and change reproduction control of the entire volume.

Any video title set VTS #k is also called a "video file" representing a title comprising video, audio, and/or still image data.

Figure 16:
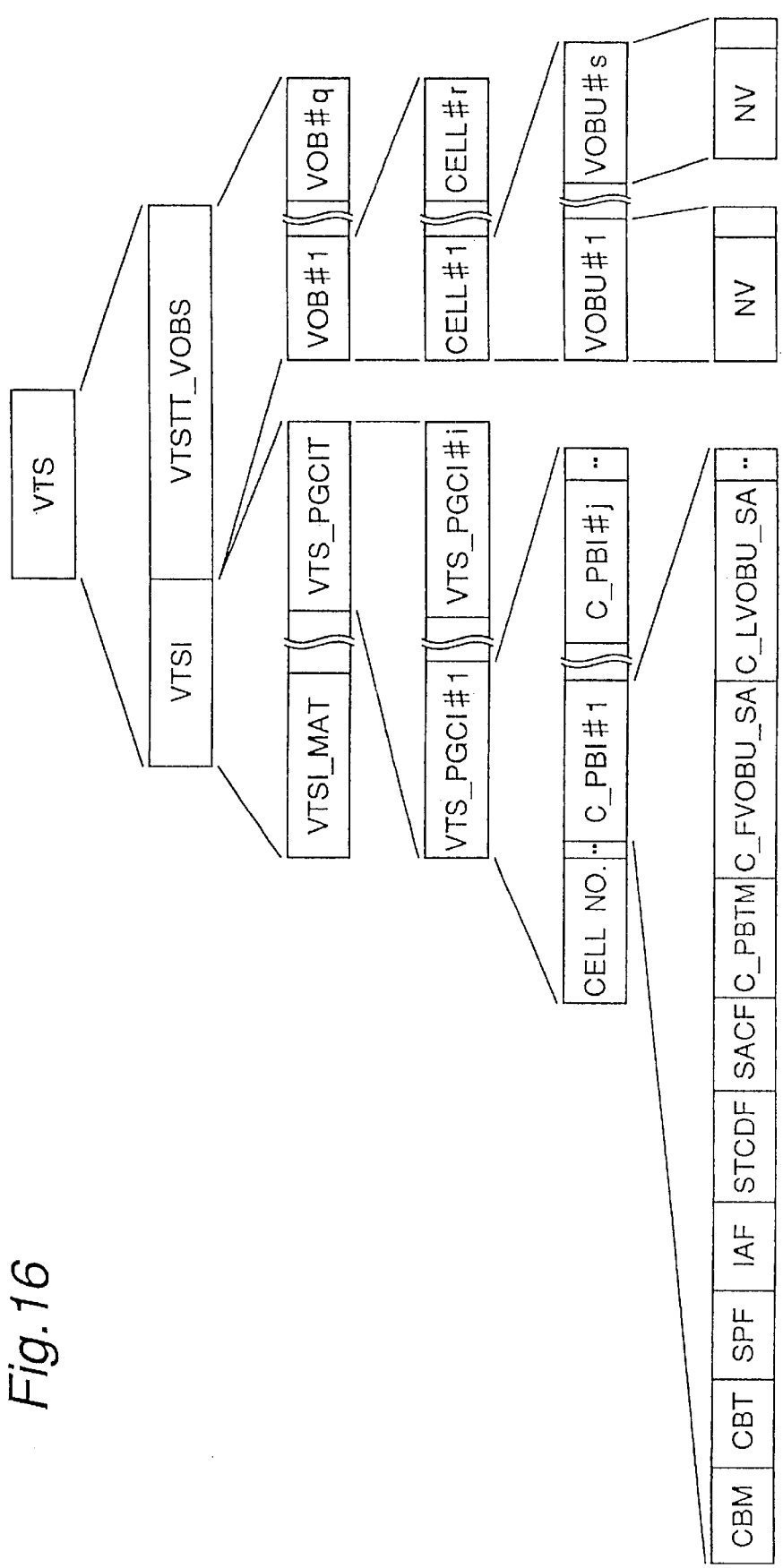
FIG. 16 is a graph schematically showing the structure of a multimedia bit stream for use in Digital Video Disk system according to the present invention.

The internal structure of each video title set VTS shown in FIG. 22 is shown in FIG. 16. Each video title set VTS comprises VTS information VTSI describing the management information for the entire disk, and the VTS title video objects VOB (VTSTT_VOBS), i.e., the system stream of the multimedia bitstream. The VTS information VTSI is described first below, followed by the VTS title VOBS.

The VTS information primarily includes the VTSI management table VTSI_MAT and VTSPGC information table VTS_PGCIT.

The VTSI management table VTSI_MAT stores such information as the internal structure of the video title set VTS, the number of selectable audio streams contained in the video title set VTS, the number of sub-pictures, and the video title set VTS location (storage address).

The VTSPGC information table VTS_PGCIT records i (where i is a natural number) program chain (PGC) data blocks VTS_PGCI #1–VTS_PGCI #i for controlling the playback sequence. Each of the table entries VTS_PGCI #i is a data entry expressing the program chain, and comprises j (where j is a natural number) cell playback information blocks C_PBI #1–C_PBI #j. Each cell playback information block C_PBI #j contains the playback sequence of the cell and playback control information.

The program chain PGC is a conceptual structure describing the story of the title content, and therefore defines the structure of each title by describing the cell playback sequence. Note that these cells are described in detail below.

If, for example, the video title set information relates to the menus, the video title set information VTSI is stored to a buffer in the playback device when playback starts. If the user then presses a MENU button on a remote control device, for example, during playback, the playback device references the buffer to fetch the menu information and display the top menu #1. If the menus are hierarchical, the main menu stored as program chain information VTS_PGCI #1 may be displayed, for example, by pressing the MENU button, VTS_PGCI #2–#9 may correspond to submenus accessed using the numeric keypad on the remote control, and VTS_PGCI #10 and higher may correspond to additional submenus further down the hierarchy. Alternatively, VTS_PGCI #1 may be the top menu displayed by pressing the MENU button, while VTS_PGCI #2 and higher may be voice guidance reproduced by pressing the corresponding numeric key.

The menus themselves are expressed by the plural program chains defined in this table. As a result, the menus may be freely constructed in various ways, and shall not be limited to hierarchical or non-hierarchical menus or menus containing voice guidance.

In the case of a movie, for example, the video title set information VTSI is stored to a buffer in the playback device when playback starts, the playback device references the cell playback sequence described by the program chain PGC, and reproduces the system stream.

The "cells" referenced here may be all or part of the system stream, and are used as access points during playback. Cells can therefore be used, for example, as the "chapters" into which a title may be divided.

Note that each of the PGC information entries C_PBI #j contain both cell playback processing information and a cell information table. The cell playback processing information comprises the processing information needed to reproduce the cell, such as the presentation time and number of repetitions. More specifically, this information includes the cell block mode CBM, cell block type CBT, seamless playback flag SPF, interleaved allocation flag IAF, STC resetting flag STCDF, cell presentation time C_PBTM, seamless angle change flag SACF, first cell VOBU start address C_FVOBU_SA, and the last cell VOBU start address C_LVOBU_SA.

Note that seamless playback refers to the reproduction in a digital video disk system of multimedia data including video, audio, and sub-picture data without intermittent breaks in the data or information. Seamless playback is described in detail in another section below with reference to FIG. 23 and FIG. 24.

The cell block mode CBM indicates whether plural cells constitute one functional block. The cell playback information of each cell in a functional block is arranged consecutively in the PGC information. The cell block mode CBM of the first cell playback information in this sequence contains the value of the first cell in the block, and the cell block mode CBM of the last cell playback information in this sequence contains the value of the last cell in the block. The cell block mode CBM of each cell arrayed between these first and last cells contains a value indicating that the cell is a cell between these first and last cells in that block.

The cell block type CBT identifies the type of the block indicated by the cell block mode CBM. For example, when a multiple angle function is enabled, the cell information corresponding to each of the reproducible angles is programmed as one of the functional blocks mentioned above, and the type of these functional blocks is defined by a value identifying "angle" in the cell block type CBT for each cell in that block.

The seamless playback flag SPF simply indicates whether the corresponding cell is to be linked and played back seamlessly with the cell or cell block reproduced immediately therebefore. To seamlessly reproduce a given cell with the preceding cell or cell block, the seamless playback flag SPF is set to 1 in the cell playback information for that cell; otherwise SPF is set to 0.

The interleaved allocation flag IAF stores a value identifying whether the cell exists in a contiguous or interleaved block. If the cell is part of an interleaved block, the flag IAF is set to 1; otherwise it is set to 0.

The STC resetting flag STCDF identifies whether the system time clock STC used for synchronization must be reset when the cell is played back; when resetting the system time clock STC is necessary, the STC resetting flag STCDF is set to 1.

The seamless angle change flag SACF stores a value indicating whether a cell in a multi-angle period should be connected seamlessly at an angle change. If the angle change is seamless, the seamless angle change flag SACF is set to 1; otherwise it is set to 0.

The cell presentation time C_PBTM expresses the cell presentation time with video frame precision.

The first cell VOBU start address C_FVOBU_SA is the VOBU start address of the first cell in a block, and is also expressed as the distance from the logic sector of the first cell in the VTS title VOBS (VTSTT_VOBS) as measured by the number of sectors.

The last cell VOBU start address C_LVOBU_SA is the VOBU start address of the last cell in the block. The value of this address is expressed as the distance from the logic sector of the first cell in the VTS title VOBS (VTSTT_VOBS) as measured by the number of sectors.

The VTS title VOBS (VTSTT_VOBS), i.e., the multimedia system stream data, is described next. The system stream data VTSTT_VOBS comprises i (where i is a natural number) system streams SS, each of which is referred to as a "video object" (VOB). Each video object VOB #1–VOB #i comprises at least one video data block interleaved with up to a maximum eight audio data blocks and up to a maximum 32 sub-picture data blocks.

Each video object VOB comprises q (where q is a natural number) cells C#1–C#q. Each cell C comprises r (where r is a natural number) video object units VOBU #1–VOBU #r.

Each video object unit VOBU comprises plural groups_of_pictures GOP, and the audio and sub-pictures corresponding to the playback of said plural groups_of_pictures GOP. Note that the group_of_pictures GOP corresponds to the video encoding refresh cycle. Each video object unit VOBU also starts with an NV pack, i.e., the control data for that VOBU.

The structure of the navigation packs NV is described with reference to FIG. 19.

Figure 17:
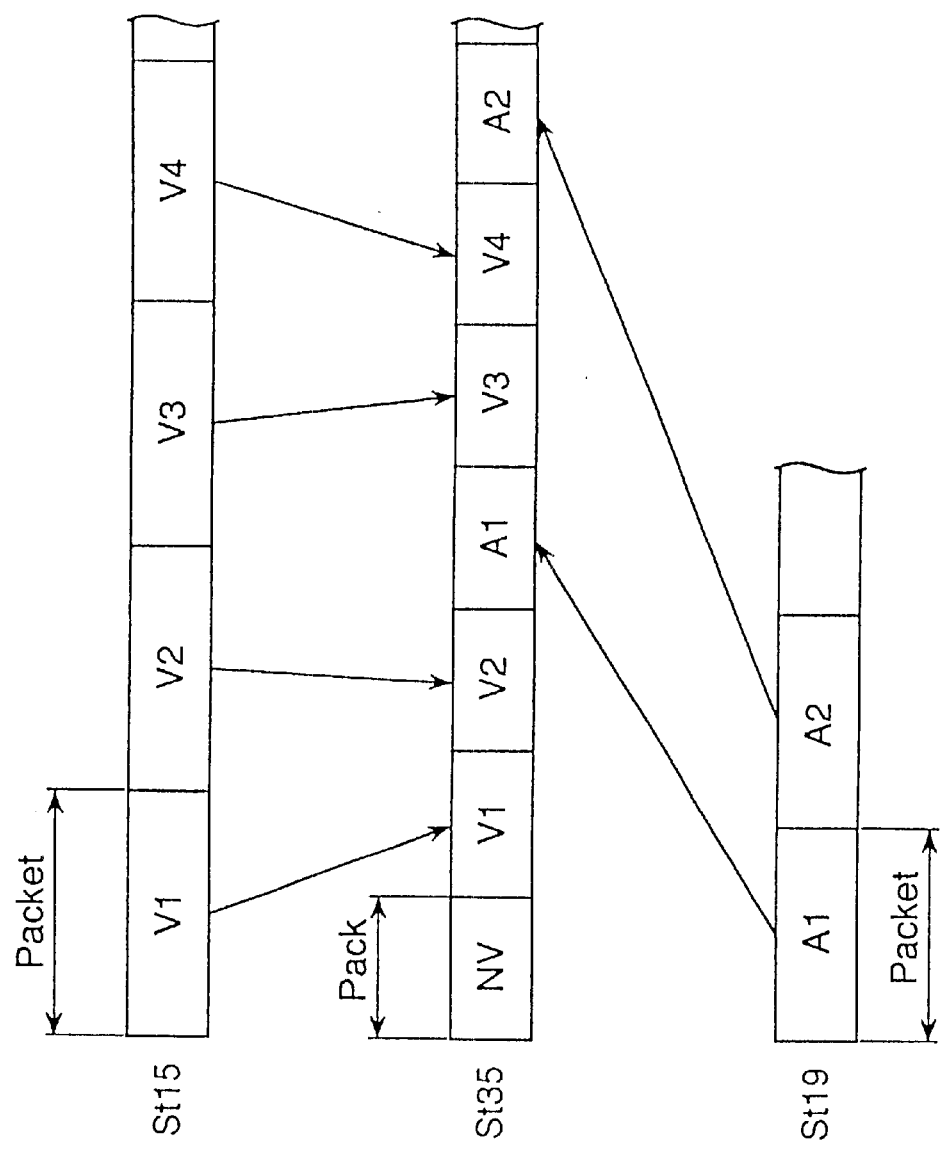
FIG. 17 is a graph schematically showing the encoded video stream according to the present invention.
Figure 25:
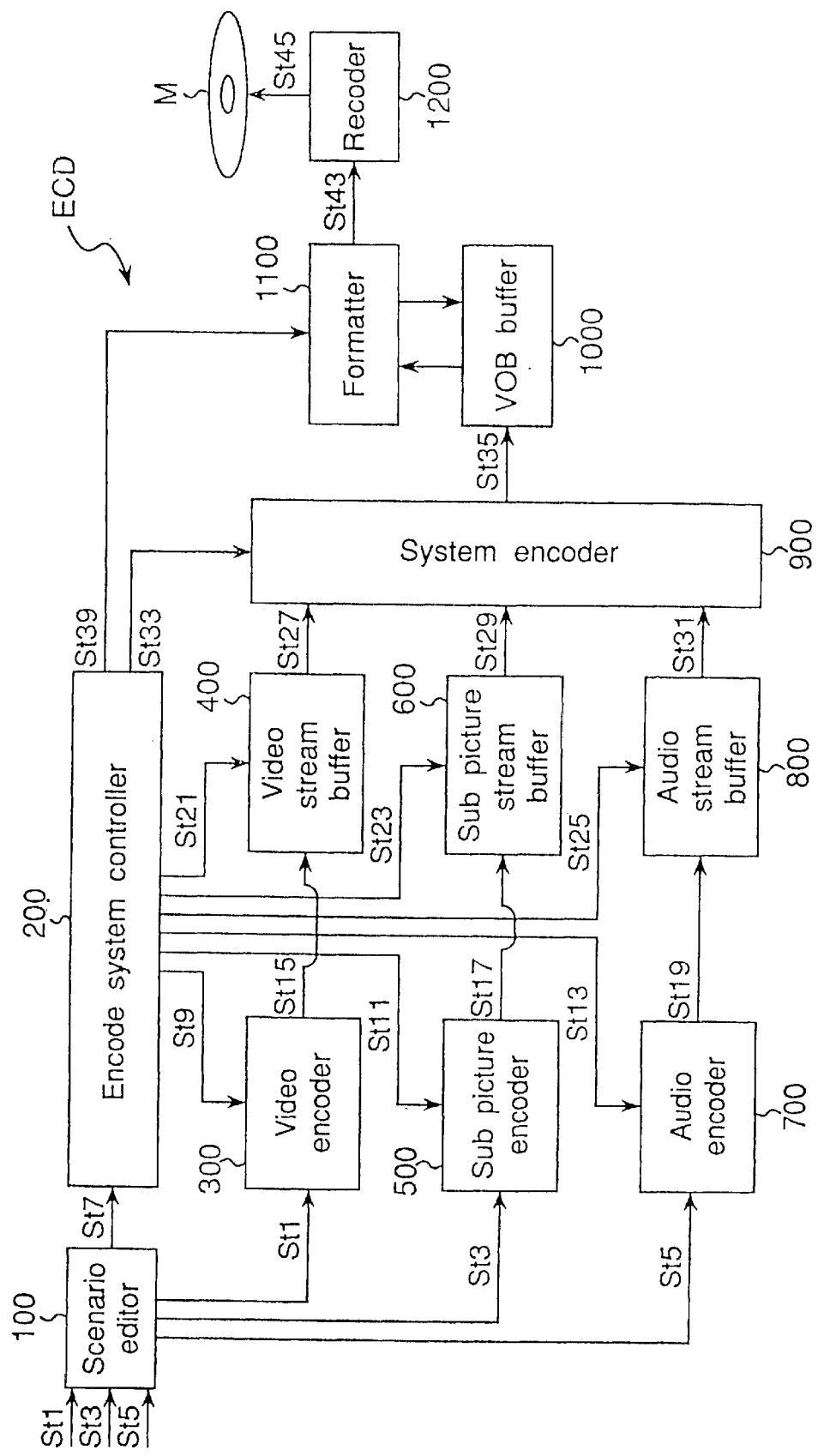
FIG. 25 is a block diagram showing a DVD encoder according to the present invention.

Before describing the navigation pack NV, the internal structure of the video zone VZ (see FIG. 22), i.e., the system stream St35 encoded by the authoring encoder EC described with reference to FIG. 25, is described with reference to FIG. 17. Note that the encoded video stream St15 shown in FIG. 17 is the compressed one-dimensional video data stream encoded by the video encoder 300. The encoded audio stream St19 is likewise the compressed one-dimensional audio data stream multiplexing the right and left stereo audio channels encoded by the audio encoder 700. Note that the audio signal shall not be limited to a stereo signal, and may also be a multichannel surround-sound signal.

The system stream (title editing unit VOB) St35 is a one dimensional array of packs with a byte size corresponding to the logic sectors LS #n having a 2048-byte capacity as described using FIG. 22. A stream control pack is placed at the beginning of the title editing unit (VOB) St35, i.e., at the beginning of the video object unit VOBU. This stream control pack is called the "navigation pack NV", and records the data arrangement in the system stream and other control information.

The encoded video stream St15 and the encoded audio stream St19 are packetized in byte units corresponding to the system stream packs. These packets are shown in FIG. 17 as packets V1, V2, V3, V4 . . . and A1, A2, A3 . . . As shown in FIG. 17, these packets are interleaved in the appropriate sequence as system stream St35, thus forming a packet stream, with consideration given to the decoder buffer size and the time required by the decoder to expand the video and audio data packets. In the example shown in FIG. 17, the packet stream is interleaved in the sequence V1, V2, A1, V3, V4, A2 . . .

Note that the sequence shown in FIG. 17 interleaves one video data unit with one audio data unit. Significantly increased recording/playback capacity, high speed recording/playback, and performance improvements in the signal processing LSI enable the DVD system to record plural audio data and plural sub-picture data (graphics data) to one video data unit in a single interleaved MPEG system stream, and thereby enable the user to select the specific audio data and sub-picture data to be reproduced during playback. The structure of the system stream used in this type of DVD system is shown in FIG. 18 and described below.

Figure 18:
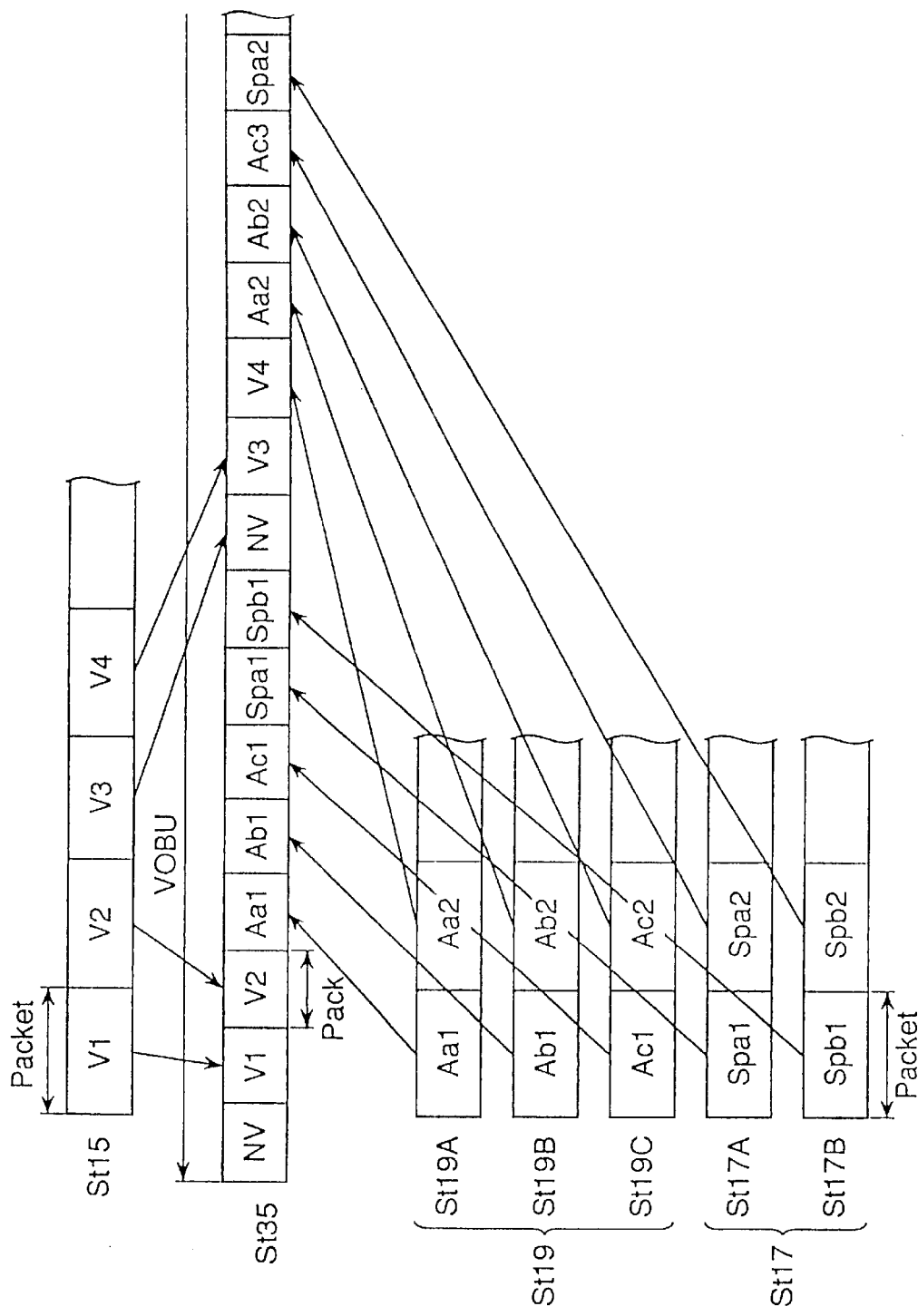
FIG. 18 is a graph schematically showing an internal structure of a video zone of FIG. 16.

As in FIG. 17, the packetized encoded video stream St15 is shown in FIG. 18 as V1, V2, V3, V4, . . . In this example, however, there is not just one encoded audio stream St19, but three encoded audio streams St19A, St19B, and St19C input as the source data. There are also two encoded sub-picture streams St17A and St17B input as the source data sub-picture streams. These six compressed data streams, St15, St19A, St19B, St19C, St17A and St17B, are interleaved to a single system stream St35.

The video data.is encoded according to the MPEG specification with the group_of_pictures GOP being the unit of compression. In general, each group_of_pictures GOP contains 15 frames in the case of an NTSC signal, but the specific number of frames compressed to one GOP is variable. The stream management pack, which describes the management data containing, for example, the relationship between interleaved data, is also interleaved at the GOP unit interval. Because the group_of_pictures GOP unit is based on the video data, changing the number of video frames per GOP unit changes the interval of the stream management packs. This interval is expressed in terms of the presentation time on the digital video disk within a range from 0.4 sec. to 1.0 sec. referenced to the GOP unit. If the presentation time of contiguous plural GOP units is less than 1 sec., the management data packs for the video data of the plural GOP units is interleaved to a single stream.

These management data packs are referred to as navigation packs NV in the digital video disk system. The data from one navigation pack NV to the packet immediately preceding the next navigation pack NV forms one video object unit VOBU. In general, one contiguous playback unit that can be defined as one scene is called a video object VOB, and each video object VOB contains plural video object units VOBU. Data sets of plural video objects VOB form a VOB set (VOBS). Note that these data units were first used in the digital video disk.

When plural of these data streams are interleaved, the navigation packs NV defining the relationship between the interleaved packs must also be interleaved at a defined unit known as the pack number unit. Each_group_of pictures GOP is normally a unit containing approximately 0.5 sec. of video data, which is equivalent to the presentation time required for 12–15 frames, and one navigation pack NV is generally interleaved with the number of data packets required for this presentation time.

Figure 19:
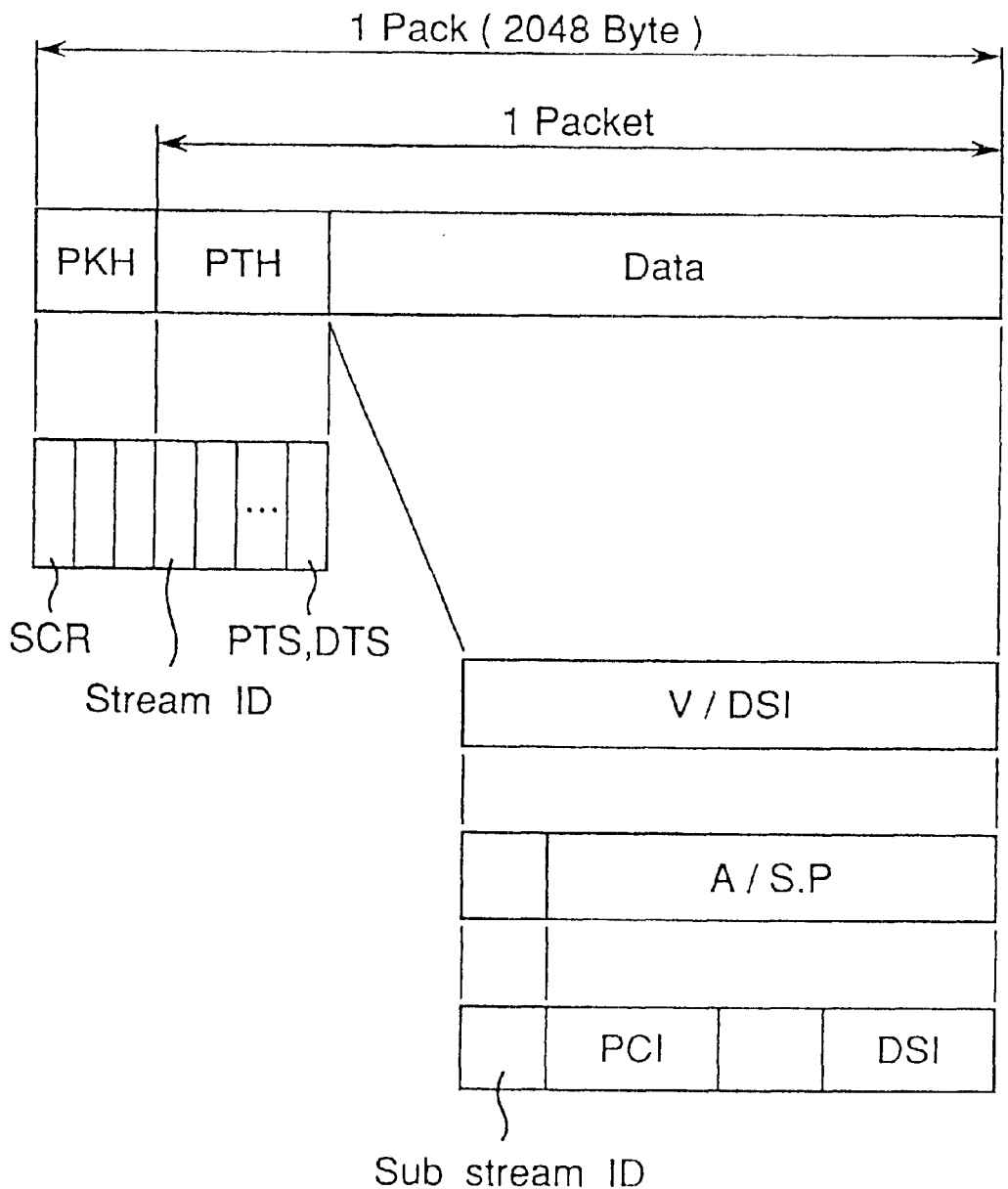
FIG. 19 is a graph schematically showing the stream management information according to the present invention.

The stream management information contained in the interleaved video, audio, and sub-picture data packets constituting the system stream is described below with reference to FIG. 19 As shown in FIG. 19, the data contained in the system stream is recorded in a format packed or packetized according to the MPEG2 standard. The packet structure is essentially the same for video, audio, and sub-picture data. One pack in the digital video disk system has a 2048 byte capacity as described above, and contains a pack header PKH and one packet PES; each packet PES contains a packet header PTH and data block.

The pack header PKH records the time at which that pack is to be sent from stream buffer 2400 to system decoder 2500 (see FIG. 26), i.e., the system clock reference SCR defining the reference time for synchronized audio-visual data playback. The MPEG standard assumes that the system clock reference SCR is the reference clock for the entire decoder operation. With such disk media as the digital video disk, however, time management specific to individual disk players can be used, and a reference clock for the decoder system is therefore separately provided.

The packet header-PTH similarly contains a presentation time stamp PTS and a decoding time stamp DTS, both of which are placed in the packet before the access unit (the decoding unit). The presentation time stamp PTS defines the time at which the video data or audio data contained in the packet should be output as the playback output after being decoded, and the decoding time stamp DTS defines the time at which the video stream should be decoded. Note that the presentation time stamp PTS effectively defines the display start timing of the access unit, and the decoding time stamp DTS effectively defines the decoding start timing of the access unit. If the PTS and DTS are the same time, the DTS is omitted.

The packet header PTH also contains an 8-bit field called the stream ID identifying the packet type, i.e., whether the packet is a video packet containing a video data stream, a private packet, or an MPEG audio packet.

Private packets under the MPEG2 standard are data packets of which the content can be freely defined. Private packet 1 in this embodiment of the invention is used to carry audio data other than the MPEG audio data, and sub-picture data; private packet 2 carries the PCI packet and DSI packet.

Private packets 1 and 2 each comprise a packet header, private data area, and data area. The private data area contains an 8-bit sub-stream ID indicating whether the recorded data is audio data or sub-picture data. The audio data defined by private packet 2 may be defined as any of eight types #0–#7 of linear PCM or AC-3 encoded data. Sub-picture data may be defined as one of up to 32 types #0–#31.

The data area is the field to which data compressed according to the MPEG2 specification is written if the stored data is video data; linear PCM, AC-3, or MPEG encoded data is written if audio data is stored; or graphics data compressed by runlength coding is written if sub-picture data is stored.

MPEG2-compressed video data may be compressed by constant bit rate (CBR) or variable bit rate (VBR) coding. With constant bit rate coding, the video stream is input continuously to the video buffer at a constant rate. This contrasts with variable bit rate coding in which the video stream is input intermittently to the video buffer, thereby making it possible to suppress the generation of unnecessary code. Both constant bit rate and variable bit rate coding can be used in the digital video disk system.

Because MPEG video data is compressed with variable length coding, the data quantity in each group_of_pictures GOP is not constant. The video and audio decoding times also differ, and the time-base relationship between the video and audio data read from an optical disk, and the time-base relationship between the video and audio data output from the decoder, do not match. The method of time-base synchronizing the video and audio data is therefore described in detail below with reference to FIG. 26, but is described briefly below based on constant bit rate coding.

Figure 20:
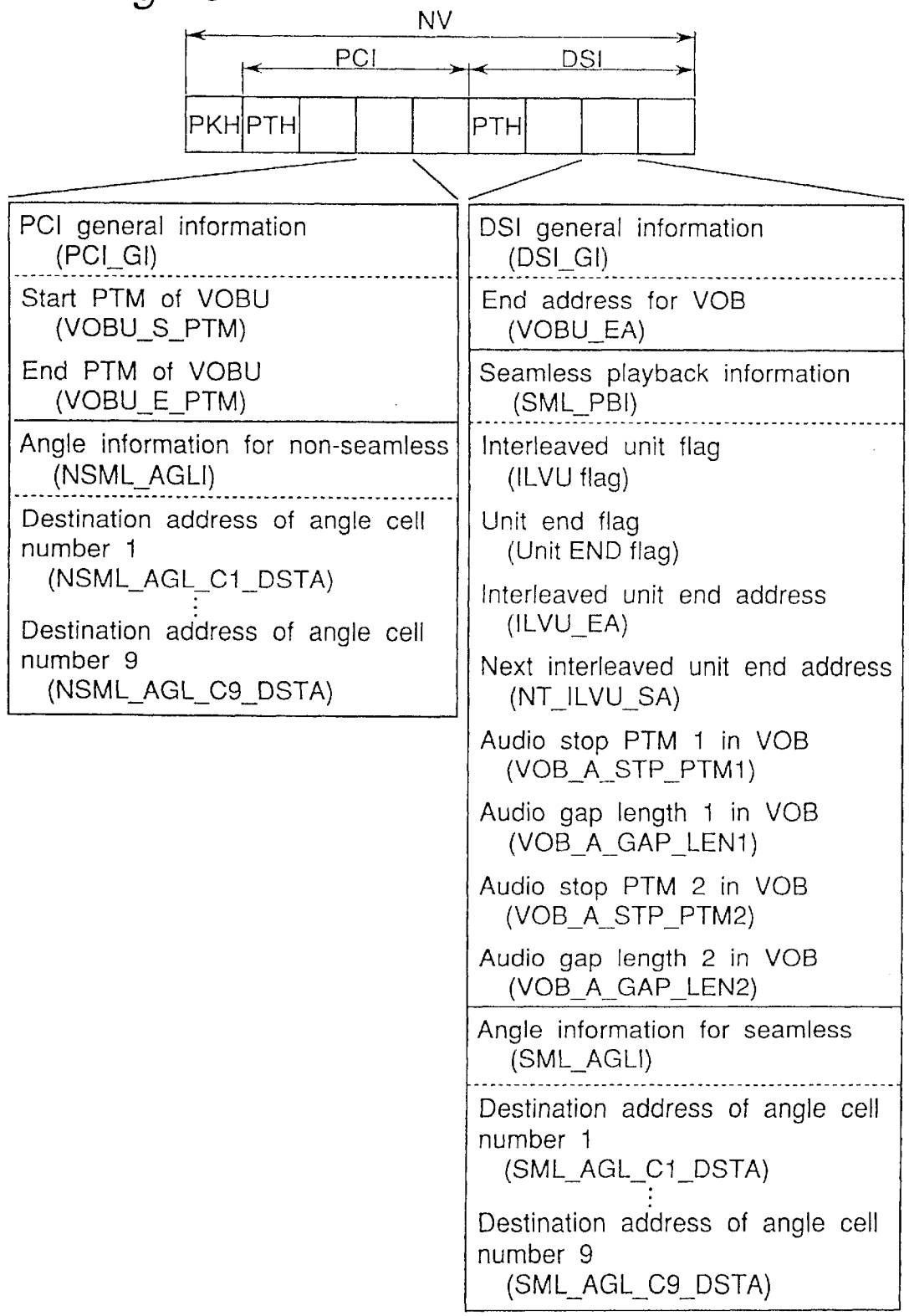
FIG. 20 is a graph schematically showing the structure the navigation pack NV of FIG. 17.

The navigation pack NV structure is shown in FIG. 20. Each navigation pack NV starts with a pack header PKH, and contains a PCI packet and DSI packet.

As described above, the pack header PKH records the time at which that pack is to be sent from stream buffer 2400 to system decoder 2500 (see FIG. 26), i.e., the system clock reference SCR defining the reference time for synchronized audio-visual data playback.

Each PCI packet contains PCI General Information (PCI_GI) and Angle Information for Non-seamless playback (NMSL_AGLI).

The PCI General Information (PCI_GI) declares the display time of the first video frame (the Start PTM of VOBU (VOBU_S_PTM)), and the display time of the last video frame (End PTM of VOBU (VOBU_E_PTM)), in the corresponding video object unit VOBU with system clock precision (90 Khz).

The Angle Information for Non-seamless playback (NMSL_AGLI) states the read start address of the corresponding video object unit VOBU when the angle is changed expressed as the number of sectors from the beginning of the video object VOB. Because there are nine or fewer angles in this example, there are nine angle address declaration cells: Destination Address of Angle Cell #1 for Non-seamless playback (NMSL_AGL_C1_DSTA) to Destination Address of Angle Cell #9 for Non-seamless playback (NMSL_AGL_C9_DSTA).

Each DSI packet contains DSI General Information (DSI_GI), Seamless Playback Information (SML_PBI), and Angle Information for Seamless playback (SML_AGLI).

The DSI General Information (DSI_GI) declares the address of the last pack in the video object unit VOBU, i.e., the End Address for VOB (VOBU_EA), expressed as the number of sectors from the beginning of the video object unit VOBU.

While seamless playback is described in detail later, it should be noted that the continuously read data units must be interleaved (multiplexed) at the system stream level as an interleaved unit ILVU in order to seamlessly reproduce split or combined titles. Plural system streams interleaved with the interleaved unit ILVU as the smallest unit are defined as an interleaved block.

The Seamless Playback Information (SML_PBI) is declared to seamlessly reproduce the stream interleaved with the interleaved unit ILVU as the smallest data unit, and contains an Interleaved Unit Flag (ILVU flag) identifying whether the corresponding video object unit VOBU is an interleaved block. The ILVU flag indicates whether the video object unit VOBU is in an interleaved block, and is set to 1 when it is. Otherwise the ILVU flag is set to 0.

When a video object unit VOBU is in an interleaved block, a Unit END flag is declared to indicate whether the video object unit VOBU is the last VOBU in the interleaved unit ILVU. Because the interleaved unit ILVU is the data unit for continuous reading, the Unit END flag is set to 1 if the VOBU currently being read is the last VOBU in the interleaved unit ILVU. Otherwise the Unit END flag is set to 0.

An Interleaved Unit End Address (ILVU_EA) identifying the address of the last pack in the ILVU to which the VOBU belongs, and the starting address of the next interleaved unit ILVU, Next Interleaved Unit Start Address (NT_ILVU_SA), are also declared when a video object unit VOBU is in an interleaved block. Both the Interleaved Unit End Address (ILVU_EA) and Next Interleaved Unit Start Address (NT_ILVU_SA) are expressed as the number of sectors from the navigation pack NV of that VOBU.

When two system streams are seamlessly connected but the audio components of the two system streams are not contiguous, particularly immediately before and after the seam, it is necessary to pause the audio output to synchronize the audio and video components of the system stream following the seam. Note that non-contiguous audio may result from different audio signals being recorded with the corresponding video blocks. With an NTSC signal, for example, the video frame cycle is approximately 33.33 msec while the AC-3 audio frame cycle is 32 msec.

To enable this resynchronization, audio reproduction stopping times 1 and 2, i.e., Audio Stop PTM 1 in VOB (VOB_A_STP_PTM1), and Audio Stop PTM2 in VOB (VOB_A_STP_PTM2), indicating the time at which the audio is to be paused; and audio reproduction stopping periods 1 and 2, i.e., Audio Gap Length 1 in VOB (VOB_A_GAP_LEN1) and Audio Gap Length 2 in VOB (VOB_A_GAP LEN2), indicating for how long the audio is to be paused, are also declared in the DSI packet. Note that-these times are specified at the system clock precision (90 Khz).

The Angle Information for Seamless playback (SML_AGLI) declares the read start address when the angle is changed. Note that this field is valid when seamless, multi-angle control is enabled. This address is also expressed as the number of sectors from the navigation pack NV of that VOBU. Because there are nine or fewer angles, there are nine angle address declaration cells: Destination Address of Angle Cell #1 for Seamless playback (SML_AGL_C1_DSTA) to Destination Address of Angle Cell #9 for Seamless playback (SML_AGL_C9_DSTA).

Note also that each title is edited in video object (VOB) units. Interleaved video objects (interleaved title editing units) are referenced as "VOBS"; and the encoded range of the source data is the encoding unit.

DVD encoder

A preferred embodiment of a digital video disk system authoring encoder ECD in which the multimedia bitstream authoring system according to the present invention is applied to a digital video disk system is described below and shown in FIG. 25. It will be obvious that the authoring encoder ECD applied to the digital video disk system, referred to below as a DVD encoder, is substantially identical to the authoring encoder EC shown in FIG. 2. The basic difference between these encoders is the replacement in the DVD encoder ECD of the video zone formatter 1300 of the authoring encoder EC above with a VOB buffer 1000 and formatter 1100. It will also be obvious that the bitstream encoded by this DVD encoder ECD is recorded to a digital video disk medium M. The operation of this DVD encoder ECD is therefore described below in comparison with the authoring encoder EC described above.

As in the above authoring encoder EC, the encoding system controller 200 generates control signals St9, St11, St13, St21, St23, St25, St33, and St39 based on the scenario data St7 describing the user-defined editing instructions input from the scenario editor 100, and controls the video encoder 300, sub-picture encoder 500, and audio encoder 700 in the DVD encoder ECD. Note that the user-defined editing instructions in the DVD encoder ECD are a superset of the editing instructions of the authoring encoder EC described above.

Specifically, the user-defined editing instructions (scenario data St7) in the DVD encoder ECD similarly describe what source data is selected from all or a subset of the source data containing plural titles within a defined time period, and how the selected source data is reassembled to reproduce the scenario (sequence) intended by the user. The scenario data St7 of the DVD encoder ECD, however, further contains such information as: the number of streams contained in the editing units, which are obtained by splitting a multi-title source stream into blocks at a constant time interval; the number of audio and sub-picture data cells contained in each stream, and the sub-picture display time and period; whether the title is a multi-rated title enabling parental lock control; whether the user content is selected from plural streams including, for example, multiple viewing angles; and the method of connecting scenes when the angle is switched among the multiple viewing angles.

The scenario data St7 of the DVD encoder ECD also contains control information on a video object VOB unit basis. This information is required to encode the media source stream, and specifically includes such information as whether there are multiple angles or parental control features. When multiple angle viewing is enabled, the scenario data St7 also contains the encoding bit rate of each stream considering data interleaving and the disk capacity, the start and end times of each control, and whether a seamless connection should be made between the preceding and following streams.

The encoding system controller 200 extracts this information from the scenario data St7, and generates the encoding information table and encoding parameters required for encoding control. The encoding information table and encoding parameters are described with reference to FIGS. 27, 28, and 29 below.

The stream encoding data St33 contains the system stream encoding parameters and system encoding start and end timing values required by the DVD system to generate the VOBs. These system stream encoding parameters include the conditions for connecting one video object VOB with those before and after, the number of audio streams, the audio encoding information and audio Ids, the number of sub-pictures and the sub-picture Ids, the video playback starting time information VPTS, and the audio playback starting time information APTS.

The title sequence control signal St39 supplies the multimedia bitstream MBS formatting start and end timing information and formatting parameters declaring the reproduction control information and interleave information.

Based on the video encoding parameter and encoding start/end timing signal St9, the video encoder 300 encodes a specific part of the video stream St1 to generate an elementary stream conforming to the MPEG2 Video standard defined in ISO-13818. This elementary stream is output to the video stream buffer 400 as encoded video stream St15.

Note that while the video encoder 300 generates an elementary stream conforming to the MPEG2 Video standard defined in ISO-13818, specific encoding parameters are input via the video encoding parameter signal St9, including the encoding start and end timing, bit rate, the encoding conditions for the encoding start and end, the material type, including whether the material is an NTSC or PAL video signal or telecine converted material, and whether the encoding mode is set for either open GOP or closed GOP encoding.

The MPEG2 coding method is basically an interframe coding method using the correlation between frames for maximum signal compression, i.e., the frame being coded (the target frame) is coded by referencing frames before and/or after the target frame. However, intra-coded frames, i.e., frames that are coded based solely on the content of the target frame, are also inserted to avoid error propagation and enable accessibility from mid-stream (random access). The coding unit containing at least one intra-coded frame ("intra-frame") is called a group_of_pictures GOP.

A group_of_pictures GOP in which coding is closed completely within that GOP is known as a "closed GOP." A group_of_pictures GOP containing a frame coded with reference to a frame in a preceding or following (ISO-13818 DOES NOT LIMIT P- and B-picture CODING to referencing PAST frames) group_of_pictures GOP is an "open GOP." It is therefore possible to playback a closed GOP using only that GOP. Reproducing an open GOP, however, also requires the presence of the referenced GOP, generally the GOP preceding the open GOP.

The GOP is often used as the access unit. For example, the GOP may be used as the playback start point for reproducing a title from the middle, as a transition point in a movie, or for fast-forward play and other special reproduction modes. High speed reproduction can be achieved in such cases by reproducing only the intra-frame coded frames in a GOP or by reproducing only frames in GOP units.

Based on the sub-picture stream encoding parameter signal St11, the sub-picture encoder 500 encodes a specific part of the sub-picture stream St3 to generate a variable length coded bitstream of bitmapped data. This variable length coded bitstream data is output as the encoded sub-picture stream St17 to the sub-picture stream buffer 600.

Based on the audio encoding parameter signal St13, the audio encoder 700 encodes a specific part of the audio stream St5 to generate the encoded audio data. This encoded audio data may be data based on the MPEG1 audio standard defined in ISO-11172 and the MPEG2 audio standard defined in ISO-13818, AC-3 audio data, or PCM (LPCM) data. Note that the methods and means of encoding audio data according to these standards are known and commonly available.

The video stream buffer 400 is connected to the video encoder 300 and to the encoding system controller 200. The video stream buffer 400 stores the encoded video stream St15 input from the video encoder 300, and outputs the stored encoded video stream St15 as the time-delayed encoded video stream St27 based on the timing signal St21 supplied from the encoding system controller 200.

The sub-picture stream buffer 600 is similarly connected to the sub-picture encoder 500 and to the encoding system controller 200. The sub-picture stream buffer 600 stores the encoded sub-picture stream St17 input from the sub-picture encoder 500, and then outputs the stored encoded sub-picture stream St17 as time-delayed encoded sub-picture stream St29 based on the timing signal St23 supplied from the encoding system controller 200.

The audio stream buffer 800 is similarly connected to the audio encoder 700 and to the encoding system controller 200. The audio stream buffer 800 stores the encoded audio stream St19 input from the audio encoder 700, and then outputs the encoded audio stream St19 as the time-delayed encoded audio stream St31 based on the timing signal St25 supplied from the encoding system controller 200.

The system encoder 900 is connected to the video stream buffer 400, sub-picture stream buffer 600, audio stream buffer 800, and the encoding system controller 200, and is respectively supplied thereby with the time-delayed encoded video stream St27, time-delayed encoded sub-picture stream St29, time-delayed encoded audio stream St31, and the system stream encoding parameter data St33. Note that the system encoder 900 is a multiplexer that multiplexes the time-delayed streams St27, St29, and St31 based on the stream encoding data St33 (timing signal) to generate title editing units (VOBs) St35.

The VOB buffer 1000 temporarily stores the video objects VOBs produced by the system encoder 900. The formatter 1100 reads the delayed video objects VOB from the VOB buffer 1000 based on the title sequence control signal St39 to generate one video zone VZ, and adds the volume file structure VFS to generate the edited multimedia stream data St43.

The multimedia bitstream MBS St43 edited according to the user-defined scenario is then sent to the recorder 1200. The recorder 1200 processes the edited multimedia stream data St43 to the data stream St45 format of the recording medium M, and thus records the formatted data stream St45 to the recording medium M.

DVD Decoder

A preferred embodiment of a digital video disk system authoring decoder DCD in which the multimedia bitstream authoring system of the present invention is applied to a digital video disk system is described below and shown in FIG. 26. The authoring decoder DCD applied to the digital video disk system, referred to below as a DVD decoder DCD, decodes the multimedia bitstream MBS edited using the DVD encoder ECD of the present invention, and recreates the content of each title according to the user-defined scenario. It will also be obvious that the multimedia bitstream St45 encoded by this DVD encoder ECD is recorded to a digital video disk medium M.

The basic configuration of the DVD decoder DCD according to this embodiment is the same as that of the authoring decoder DC shown in FIG. 3. The differences are that a different video decoder 3801 (shown as 3800 in FIG. 23) is used in place of the video decoder 3800, and a reordering buffer 3300 and selector 3400 are disposed between the video decoder 3801 and synthesizer 3500.

Note that the selector 3400 is connected to the synchronizer 2900, and is controlled by a switching signal St103.

The operation of this DVD decoder DCD is therefore described below in comparison with the authoring decoder DC described above.

Figure 26:
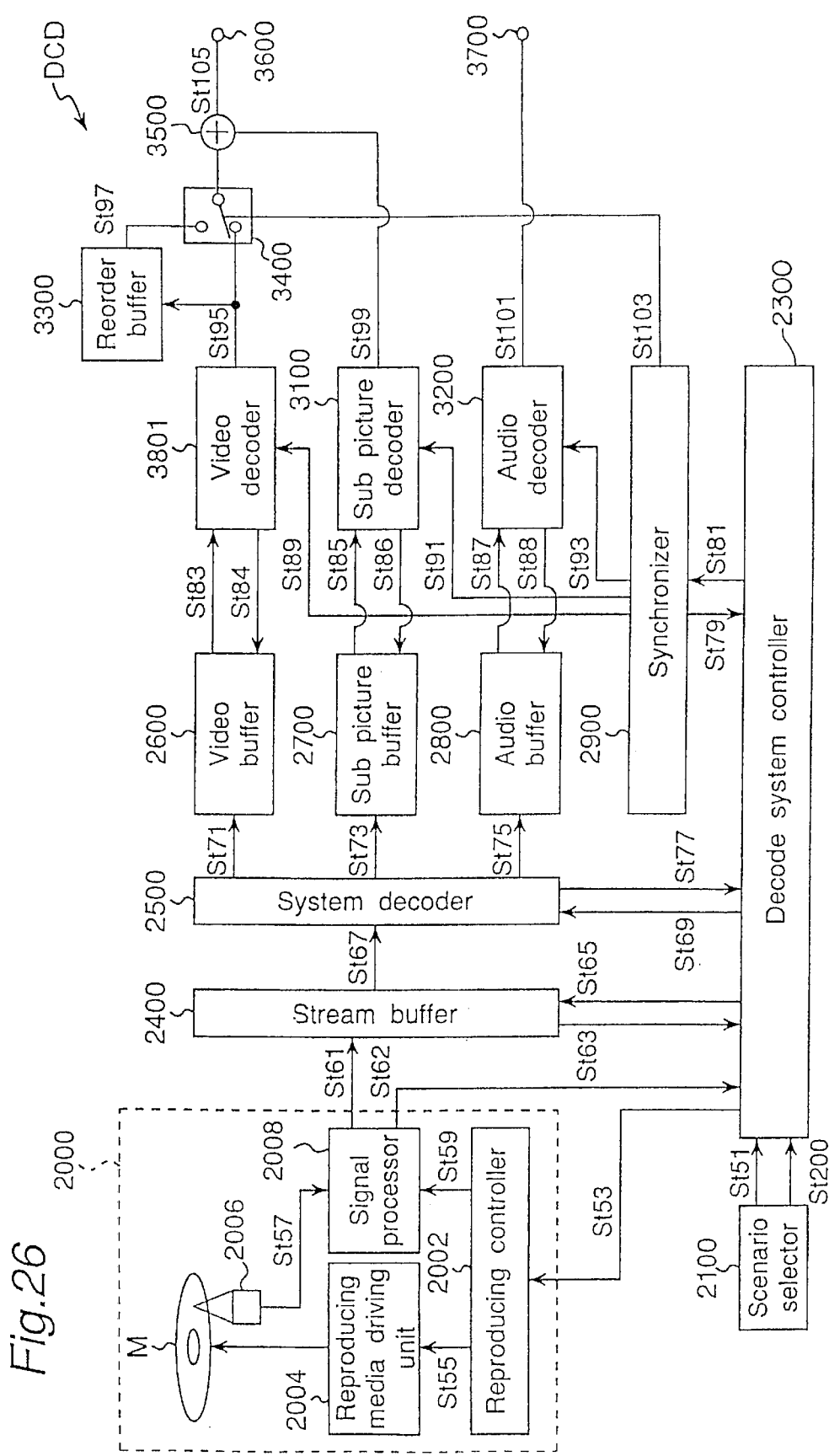
FIG. 26 is a block diagram showing a DVD decoder according to the present invention.

As shown in FIG. 26, the DVD decoder DCD comprises a multimedia bitstream producer 2000, scenario selector 2100, decoding system.controller 2300, stream buffer 2400, system decoder 2500, video buffer 2600, sub-picture buffer 2700, audio buffer 2800, synchronizer 2900, video decoder 3801, reordering buffer 3300, sub-picture decoder 3100, audio decoder 3200, selector 3400, synthesizer 3500, video data output terminal 3600, and audio data output terminal 3700.

The bitstream producer 2000 comprises a recording media drive unit 2004 for driving the recording medium M; a reading head 2006 for reading the information recorded to the recording medium M and producing the binary read signal St57; a signal processor 2008 for variously processing the read signal St57 to generate the reproduced bitstream St61; and a reproduction controller 2002.

The reproduction controller 2002 is connected to the decoding system controller 2300 from which the multimedia bitstream reproduction control signal St53 is supplied, and in turn generates the reproduction control signals St55 and St59 respectively controlling the recording media drive unit (motor) 2004 and signal processor 2008.

So that the user-defined video, sub-picture, and audio portions of the multimedia title edited by the authoring encoder EC are reproduced, the authoring decoder DC comprises a scenario selector 2100 for selecting and reproducing the corresponding scenes (titles). The scenario selector 2100 then outputs the selected titles as scenario data to the DVD decoder DCD.

The scenario selector 2100 preferably comprises a keyboard, CPU, and monitor. Using the keyboard, the user then inputs the desired scenario based on the content of the scenario input by the DVD encoder ECD. Based on the keyboard input, the CPU generates the scenario selection data St51 specifying the selected scenario. The scenario selector 2100 is connected to the decoding system controller 2300 by an infrared communications device, for example, and inputs the generated scenario selection data St51 to the decoding system controller 2300.

The stream buffer 2400 has a specific buffer capacity used to temporarily store the reproduced bitstream St61 input from the bitstream producer 2000, extract the volume file structure VFS, the initial synchronization data SCR (system clock reference) in each pack, and the VOBU control information (DSI) in the navigation pack NV, to generate the bitstream control data St63. The stream buffer 2400 is also connected to the decoding system controller 2300, to which it supplies the generated bitstream control data St63.

Based on the scenario selection data St51 supplied by the scenario selector 2100, the decoding system controller 2300 then generates the bitstream reproduction control signal St53 controlling the operation of the bitstream producer 2000. The decoding system controller 2300 also extracts the user-defined playback instruction data from the bitstream reproduction control signal St53, and generates the decoding information table required for decoding control. This decoding information table is described further below with reference to FIGS. 26 and 32. The decoding system controller 2300 also extracts the title information recorded to the optical disk M from the file data structure area FDS of the bitstream control data St63 to generate the title information signal St200. Note that the extracted title information includes the video manager VMG, VTS information VTSI, the PGC information entries C_PBI #j, and the cell presentation time C_PBTM.

Note that the bitstream control data St63 is generated in pack units as shown in FIG. 19, and is supplied from the stream buffer 2400 to the decoding system controller 2300, to which the stream buffer 2400 is connected.

The synchronizer 2900 is connected to the decoding system controller 2300 from which it receives the system clock reference SCR contained in the synchronization control data St81 to set the internal system clock STC and supply the reset system clock St79 to the decoding system controller 2300.

Based on this system clock St79, the decoding system controller 2300 also generates the stream read signal St65 at a specific interval and outputs the read signal St65 to the stream buffer 2400. Note that the read unit in this case is the pack.

The method of generating the stream read signal St65 is described next.

The decoding system controller 2300 compares the system clock reference SCR contained in the stream control data extracted from the stream buffer 2400 with the system clock St79 supplied from the synchronizer 2900, and generates the read request signal St65 when the system clock St79 is greater than the system clock reference SCR of the bitstream control data St63. Pack transfers are controlled by executing this control process on a pack unit.

Based on the scenario selection data St51, the decoding system controller 2300 generates the decoding signal St69 defining the stream Ids for the video, sub-picture, and audio bitstreams corresponding to the selected scenario, and outputs to the system decoder 2500.

When a title contains plural audio tracks, e.g. audio tracks in Japanese, English, French, and/or other languages, and plural sub-picture tracks for subtitles in Japanese, English, French, and/or other languages, for example, a discrete ID is assigned to each of the language tracks. As described above with reference to FIG. 19, a stream ID is assigned to the video data and MPEG audio data, and a substream ID is assigned to the sub-picture data, AC-3 audio-data, linear PCM data, and navigation pack NV information. While the user need never be aware of these ID numbers, the user can select the language of the audio and/or subtitles using the scenario selector 2100. If English language audio is selected, for example, the ID corresponding to the English audio track is sent to the decoding system controller 2300 as scenario selection data St51. The decoding system controller 2300 then adds this ID to the decoding signal St69 output to the system decoder 2500.

Based on the instructions contained in the decoding signal St69, the system decoder 2500 respectively outputs the video, sub-picture, and audio bitstreams input from the stream buffer 2400 to the video buffer 2600, sub-picture buffer 2700, and audio buffer 2800 as the encoded video stream St71, encoded sub-picture stream St73, and encoded audio stream St75. Thus, when the stream ID input from the scenario selector 2100 and the pack ID input from the stream buffer 2400 match, the system decoder 2500 outputs the corresponding packs to the respective buffers (i.e., the video buffer 2600, sub-picture buffer 2700, and audio buffer 2800).

The system decoder 2500 detects the presentation time stamp PTS and decoding time stamp DTS of the smallest control unit in each bitstream St67 to generate the time information signal St77. This time information signal St77 is supplied to the synchronizer 2900 through the decoding system controller 2300 as the synchronization control data St81.

Based on this synchronization control data St81, the synchronizer 2900 determines the decoding start timing whereby each of the bitstreams will be arranged in the correct sequence after decoding, and then generates and inputs the video stream decoding start signal St89 to the video decoder 3801 based on this decoding timing. The synchronizer 2900 also generates and supplies the sub-picture decoding start signal St91 and audio stream decoding start signal St93 to the sub-picture decoder 3100 and audio decoder 3200, respectively.

The video decoder 3801 generates the video output request signal St84 based an the video stream decoding start signal St89, and outputs to the video buffer 2600. In response to the video output request signal St84, the video buffer 2600 outputs the video stream St83 to the video decoder 3801. The video decoder 3801 thus detects the presentation time information contained in the video stream St83, and disables the video output request signal St84 when the length of the received video stream St83 is equivalent to the specified presentation time. A video stream equal in length to the specified presentation time is thus decoded by the video decoder 3801, which outputs the reproduced video signal St95 to the reordering buffer 3300 and selector 3400.

Because the encoded video stream is coded using the interframe correlations between pictures, the coded order and display order do not necessarily match on a frame unit basis. The video cannot, therefore, be displayed in the decoded order. The decoded frames are therefore temporarily stored to the reordering buffer 3300. The synchronizer 2900 therefore controls the switching signal St103 so that the reproduced video signal St95 output from the video decoder 3800 and the reordering buffer output St97 are appropriately selected and output in the display order to the synthesizer 3500.

The sub-picture decoder 3100 similarly generates the sub-picture output request signal St86 based on the sub-picture decoding start signal St91, and outputs to the sub-picture buffer 2700. In response to the sub-picture output request signal St86, the sub-picture buffer 2700 outputs the sub-picture stream St85 to the sub-picture decoder 3100.

Based on the presentation time information contained in the sub-picture stream St85, the sub-picture decoder 3100 decodes a length of the sub-picture stream St85 corresponding to the specified presentation time to reproduce and supply to the synthesizer 3500 the sub-picture signal St99.

The synthesizer 3500 superimposes the selector 3400 output with the sub-picture signal St99 to generate and output the video signal St105 to the video data output terminal 3600.

The audio decoder 3200 generates and supplies to the audio buffer 2800 the audio output request signal St88 based on the audio stream decoding start signal St93. The audio buffer 2800 thus outputs the audio stream St87 to the audio decoder 3200. The audio decoder 3200 decodes a length of the audio stream St87 corresponding to the specified presentation time based on the presentation time information contained in the audio stream St87, and outputs the decoded audio stream St101 to the audio data output terminal 3700.

It is thus possible to reproduce a user-defined multimedia bitstream MBS in real-time according to a user-defined scenario. More specifically, each time the user selects a different scenario, the DVD decoder DCD is able to reproduce the title content desired by the user in the desired sequence by reproducing the multimedia bitstream MBS corresponding to the selected scenario.

It should be noted that the decoding system controller 2300 may supply the title information signal St200 to the scenario selector 2100 by means of the infrared communications device mentioned above or another means. Interactive scenario selection controlled by the user can also be made possible by the scenario selector 2100 extracting the title information recorded to the optical disk M from the file data structure area FDS of the bitstream control data St63 contained in the title information signal St200, and displaying this title information on a display for user selection.

Note, further, that the stream buffer 2400, video buffer 2600, sub-picture buffer 2700, audio buffer 2800, and reordering buffer 3300 are expressed above and in the figures as separate entities because they are functionally different. It will be obvious, however, that a single buffer memory can be controlled to provide the same discrete functionality by time-share controlled use of a buffer memory with an operating speed plural times faster than the read and write rates of these separate buffers.

Multi-scene Control

The concept of multiple angle scene control according to the present invention is described below with reference to FIG. 21. As described above, titles that can be played back with numerous variations are constructed from basic scene periods containing data common to each title, and multi-scene periods comprising groups of different scenes corresponding to the various scenario requests. In FIG. 21, scenes 1, 5, and 8 are the common scenes of the basic scene periods. The multi-angle scenes (angles 1, 2, and 3) between scenes 1 and 5, and the parental locked scenes (scenes 6 and 7) between scenes 5 and 8, are the multi-scene periods.

Scenes taken from different angles, i.e., angles 1, 2, and 3 in this example, can be dynamically selected and reproduced during playback in the multi-angle scene period. In the parental locked scene period, however, only one of the available scenes, scenes 6 and 7, having different content can be selected, and must be selected statically before playback begins.

Which of these scenes from the multi-scene periods is to be selected and reproduced is defined by the user operating the scenario selector 2100 and thereby generating the scenario selection data St51. In scenario 1 in FIG. 21 the user can freely select any of the multi-angle scenes, and scene 6 has been preselected for output in the parental locked scene period. Similarly in scenario 2, the user can freely select any of the multi-angle scenes, and scene 7 has been preselected for output in the parental locked scene period.

Figure 30:
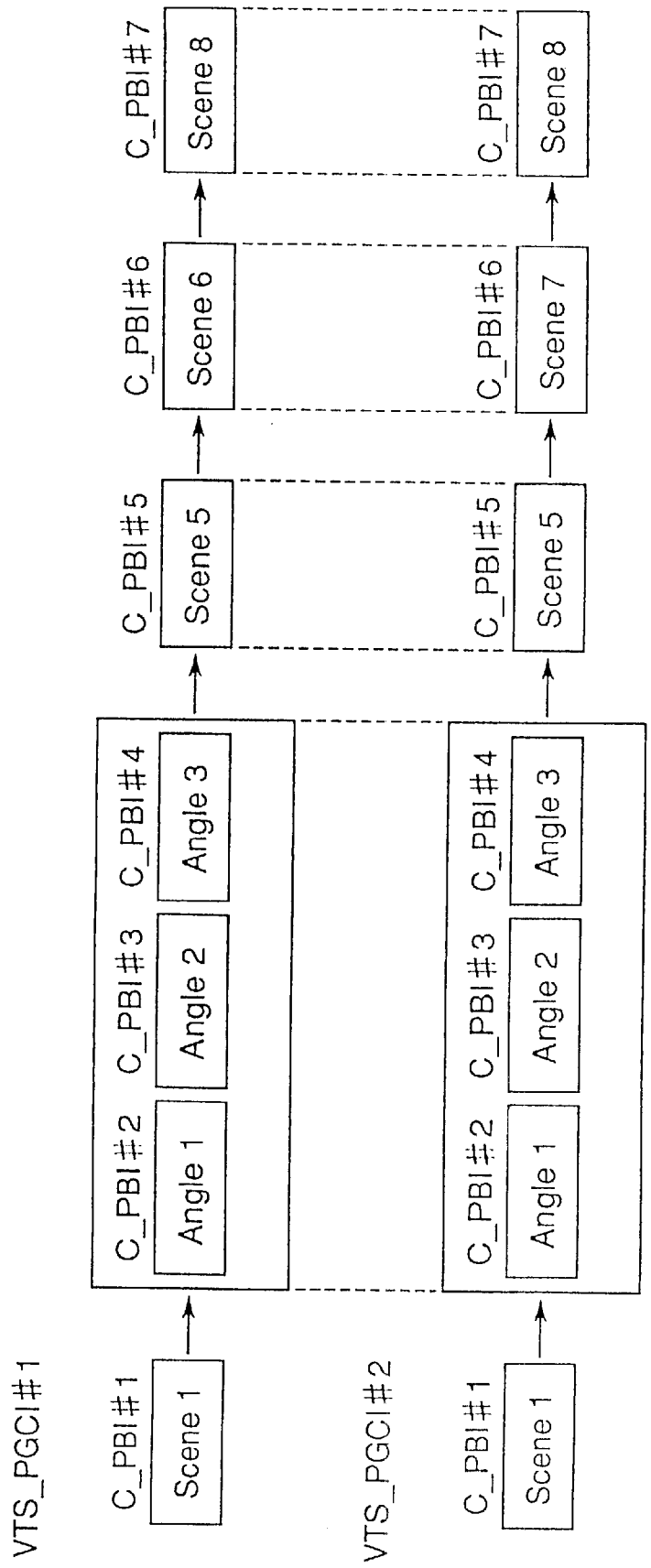
FIG. 30 is a graph schematically showing an example of the contents of the program chain information according to the present invention.
Figure 31:
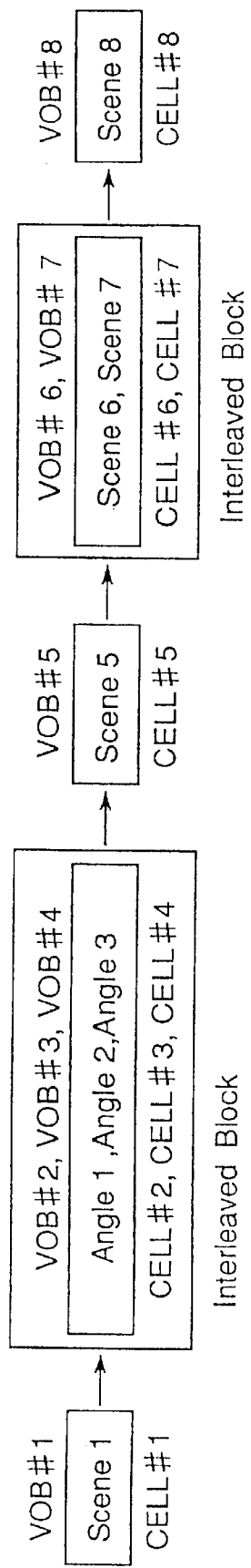
FIG. 31 is a graph schematically showing another example of the contents of the program chain information according to the present invention.

With reference to FIGS. 30 and 31, furthermore, the contents of the program chain information VTS_PGCI is described. In FIG. 30, the case that a scenario requested by the user is shown with respect to a VTSI data construction. The scenario 1 and scenario 2 shown in FIG. 21 are described as program chain information VTS_PGC#1 and VTS_PGC#2. VTS_PGC#1 describing the scenario 1 consists of cell playback information C_PBI#1 corresponding to scene 1, C_PBI#2, C_PBI#3, and C_PBI#4 within a multi-angle cell block, C_PBI#5 corresponding to scene 5, C_PBI#6 corresponding to scene 6, and C_PBI#7 corresponding to scene 8.

VTS_PGCI#2 describing the scenario 2 consists of cell playback information C_PBI#1 corresponding to scene 1, C_PBI#2, C_PBI#3, and C_PBI#4 within a multi-angle cell block corresponding to a multi-angle scene, C_PBI#5 corresponding to scene 5, C_PBI#6 corresponding to scene 7, and C_PBI#7 corresponding to scene 8. According to the digital video system data structure, a scene which is a control unit of a scenario is described as a cell which is a unit thereunder, thus a scenario requested by a user can be obtained.

Figure 21:
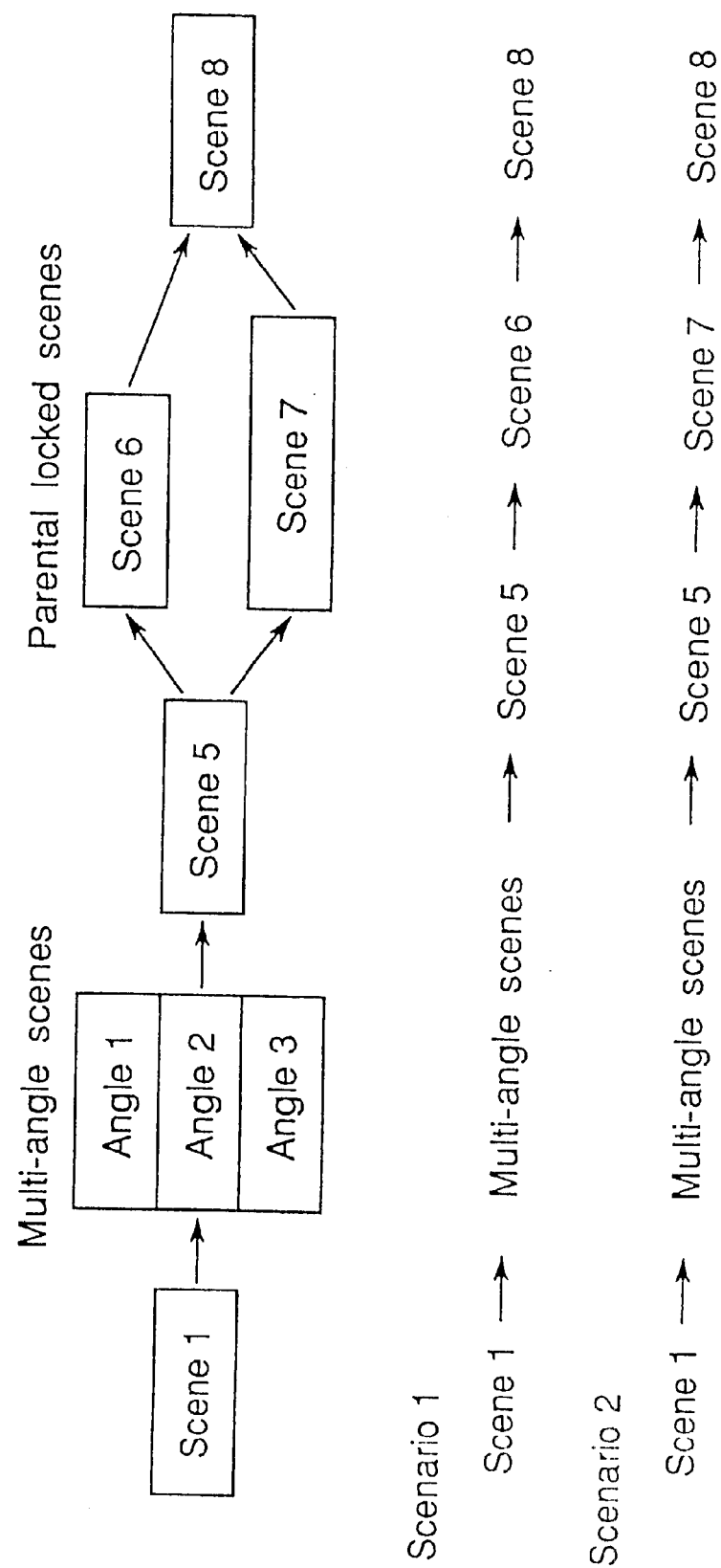
FIG. 21 is a graph in assistance of explaining a concept of parental look playback control according to the present invention.

In FIG. 31, the case that a scenario requested by the user shown in FIG. 21 is shown with respect to a VOB data construction VTSTT_VOBS. As specifically shown in FIG. 31, the two scenarios 1 and 2 use the same VOB data in common. With respect to a single scene commonly owned by each scenario, VOB#1 corresponding to scene 1, VOB#5 corresponding to scene 5, and VOB#8 corresponding to scene 8 are arranged in non-interleaved block which is the contiguous block.

With respect to the multi-angle data commonly owned by scenarios 1 and 2, one angle scene data is constructed by a single VOB. Specifically speaking, angle 1 is constructed by VOB#2, and angle 2 is constructed by VOB#3, angle 3 is constructed by VOB#4. Thus constructed multi-angle data is formed as the interleaved block for the sake of switching between each angle and seamless reproduction of each angle data. Scenes 6 and 7 peculiar to scenarios 1 and 2, respectively, are formed as the interleaved block for the sake of seamless reproduction between common scenes before and behind thereof as well as seamless reproduction between each scene.

As described in the above, the user's requesting scenario shown in FIG. 21 can be realized by utilizing the video title playback control information shown in FIG. 30 and the title playback VOB data structure shown in FIG. 31.

Seamless Playback

The seamless playback capability briefly mentioned above with regard to the digital video disk system data structure is described below. Note that seamless playback refers to the reproduction in a digital video disk system of multimedia data including video, audio, and sub-picture data without intermittent breaks in the data or information between basic scene periods, between basic scene periods and multi-scene periods, and between multi-scene periods.

Hardware factors contributing to intermittent playback of this data and title content include decoder underflow, i.e., an imbalance between the source data input speed and the decoding speed of the input source data.

Other factors relate to the properties of the playback data. When the playback data is data that must be continuously reproduced for a constant time unit in order for the user to understand the content or information, e.g., audio data, data continuity is lost when the required continuous presentation time cannot be assured. Reproduction of such information whereby the required continuity is assured is referred to as "contiguous information reproduction," or "seamless information reproduction." Reproduction of this information when the required continuity cannot be assured is referred to as "non-continuous information reproduction," or "non-seamless information reproduction." It is obvious that continuous information reproduction and non-continuous information reproduction are, respectively, seamless and non-seamless reproduction.

Note that seamless reproduction can be further categorized as seamless data reproduction and seamless information reproduction. Seamless data reproduction is defined as preventing physical blanks or interruptions in the data playback (intermittent reproduction) as a result of a buffer underflow state, for example. Seamless information reproduction is defined as preventing apparent interruptions in the information when perceived by the user (intermittent presentation) when recognizing information from the playback data where there are no actual physical breaks in the data reproduction. The specific method enabling seamless reproduction as thus described is described later below with reference to FIGS. 23 and 24.

Interleaving

The DVD data system streams described above are recorded using an appropriate authoring encoder EC as a movie or other multimedia title on a DVD recording medium. Note that the following description refers to a movie as the multimedia title being processed, but it will be obvious that the invention shall not be so limited.

Supplying a single movie in a format enabling the movie to be used in plural different cultural regions or countries requires the script to be recorded in the various languages used in those regions or countries. It may even necessitate editing the content to conform to the mores and moral expectations of different cultures. Even using such a large-capacity storage system as the DVD system, however, it is necessary to reduce the bit rate, and therefore the image quality, if plural full-length titles edited from a single common source title are recorded to a single disk. This problem can be solved by recording the common parts of plural titles only once, and recording the segments different in each title for each different title only. This method makes it possible to record plural titles for different countries or cultures to a single optical disk without reducing the bit rate, and, therefore, retaining high image quality.

As shown in FIG. 21, the titles recorded to a single optical disk contain basic scene periods of scenes common to all scenarios, and multi-scene periods containing scenes specific to certain scenarios, to provide parental lock control and multi-angle scene control functions.

In the case of the parental lock control function, titles containing sex scenes, violent scenes, or other scenes deemed unsuitable for children, i.e., so-called "adult scenes," are recorded with a combination of common scenes, adult scenes, and children's scenes. These title streams are achieved by arraying the adult and children's scenes to multi-scene periods between the common basic scene periods.

Multi-angle control can be achieved in a conventional single-angle title by recording plural multimedia scenes obtained by recording the subjects from the desired plural camera angles to the multi-scene periods arrayed between the common basic scene periods. Note, however, that while these plural scenes are described here as scenes recorded from different camera angles (positions), it will be obvious that the scenes may be recorded from the same camera angle but at different times, data generated by computer graphics, or other video data.

When data is shared between different scenarios of a single title, it is obviously necessary to move the laser beam LS from the common scene data to the non-common scene data during reproduction, i.e., to move the optical pickup to a different position on the DVD recording medium RC1. The problem here is that the time required to move the optical pickup makes it difficult to continue reproduction without creating breaks in the audio or video, i.e., to sustain seamless reproduction. This problem can be theoretically solved by providing a track buffer (stream buffer 2400) to delay data output an amount equivalent to the worst access time. In general, data recorded to an optical disk is read by the optical pickup, appropriately processed, and temporarily stored to the track buffer. The stored data is subsequently-decoded and reproduced as video or audio data.

To thus enable the user to selectively excise scenes and choose from among plural scenes, a state wherein non-selected scene data is recorded inserted between common scene data and selective scene data necessarily occurs because the data units associated with individual scenes are contiguously recorded to the recording tracks of the recording medium. If data is then read in the recorded sequence, non-selected scene data must be accessed before accessing and decoding the selected scene data, and seamless connections with the selected scene is difficult. The excellent random access characteristics of the digital video disk system, however, make seamless connections with the selected scenes possible.

In other words, by splitting scene-specific data into plural units of a specified data size, and interleaving plural split data units for different scenes in a predefined sequence that is recorded to the disk within the jumping range whereby a data underflow state does not occur, it is possible to reproduce the selected scenes without data interruption by intermittently accessing and decoding the data specific to the selected scenes using these split data units. Seamless data reproduction is thereby assured.

Interleaved Block and Interleave Unit

Figure 24:
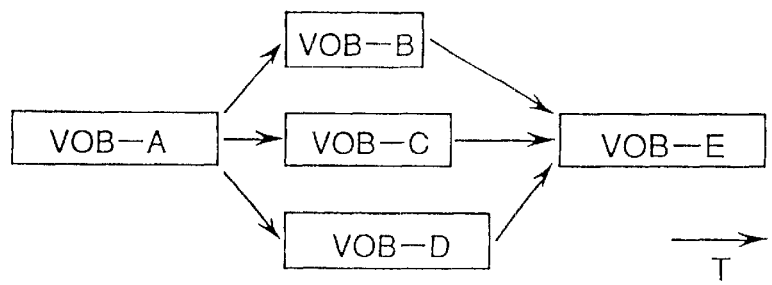
FIG. 24 is a graph in assistance of explaining a concept of multi scene data connection.

The interleaving method enabling seamless data reproduction according to the present invention is described below with reference to FIG. 24. and FIG. 71. Shown in FIG. 24 is a case from which three scenarios may be derived, i.e., branching from one video object VOB-A to one of plural video objects VOB-B, VOB-C, and VOB-D, and then merging back again to a single video object VOB-E. The actual arrangement of these blocks recorded to a data recording track TR on disk is shown in FIG. 71.

Figure 71:
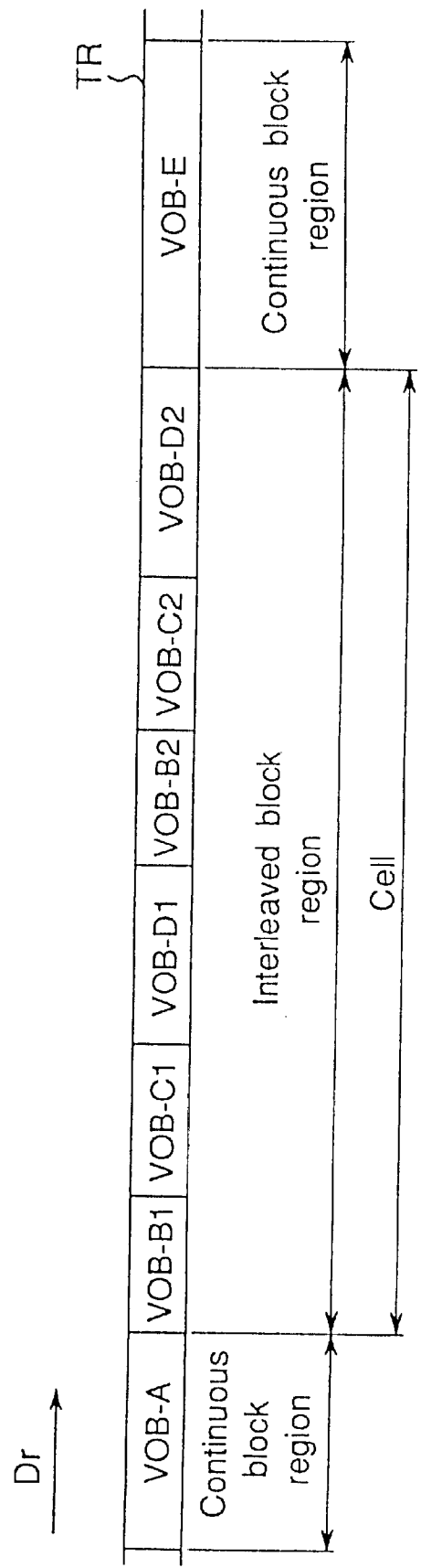
FIG. 71 is a graph schematically showing an actual arrangement of data blocks recorded to a data recording track on a recording medium according to the present invention.

Referring to FIG. 71, VOB-A and VOB-E are video objects with independent playback start and end times, and are in principle arrayed to contiguous block regions. As shown in FIG. 24, the playback start and end times of VOB-B, VOB-C, and VOB-D are aligned during interleaving. The interleaved data blocks are then recorded to the disk to a contiguous interleaved block region. The contiguous block regions and interleaved block regions are then written to disk in the track path Dr direction in the playback sequence. Plural video objects VOB, i.e., interleaved video objects VOBS, arrayed to the data recording track TR are shown in FIG. 71.

Figure 72:
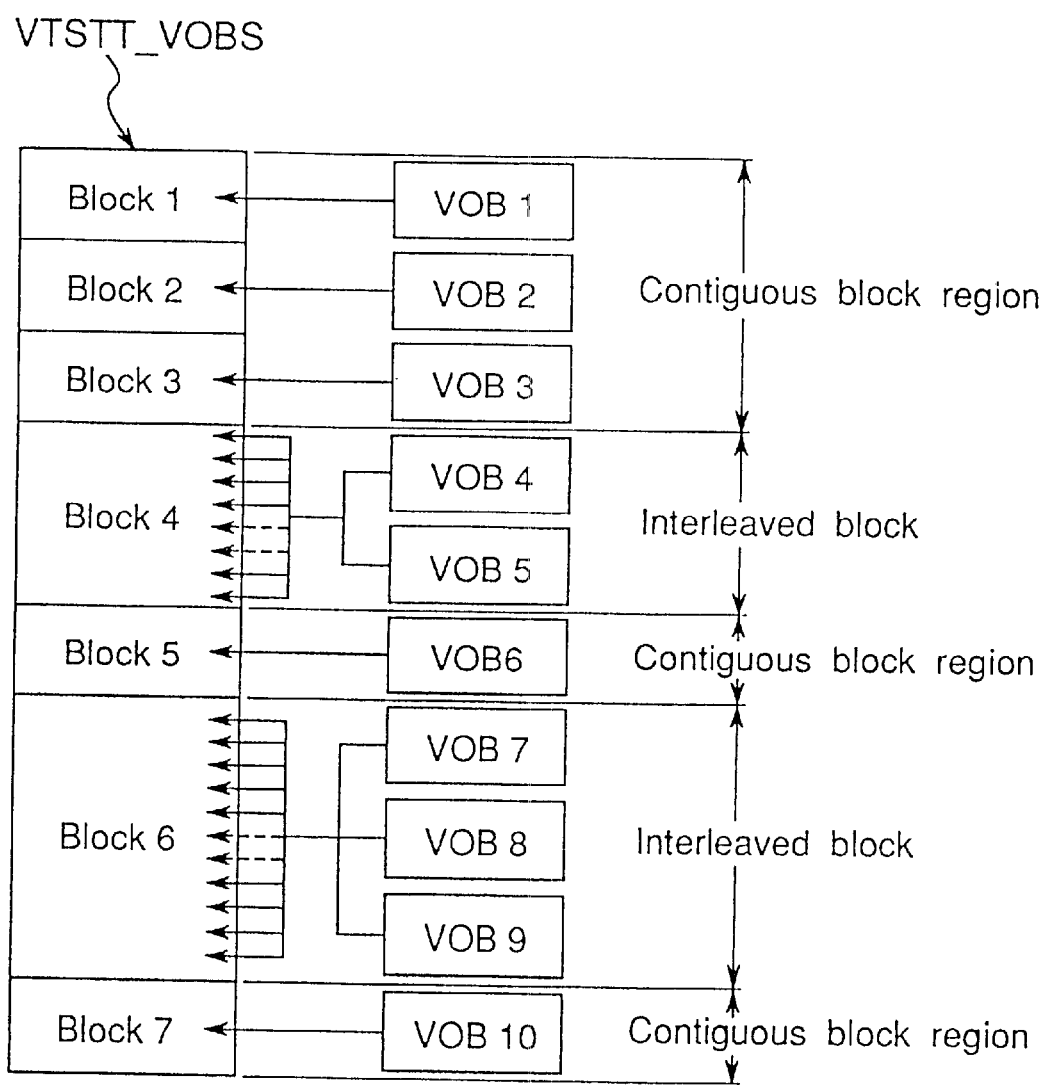
FIG. 72 is a graph schematically showing contiguous block regions and interleaved block regions array.
Figure 74:
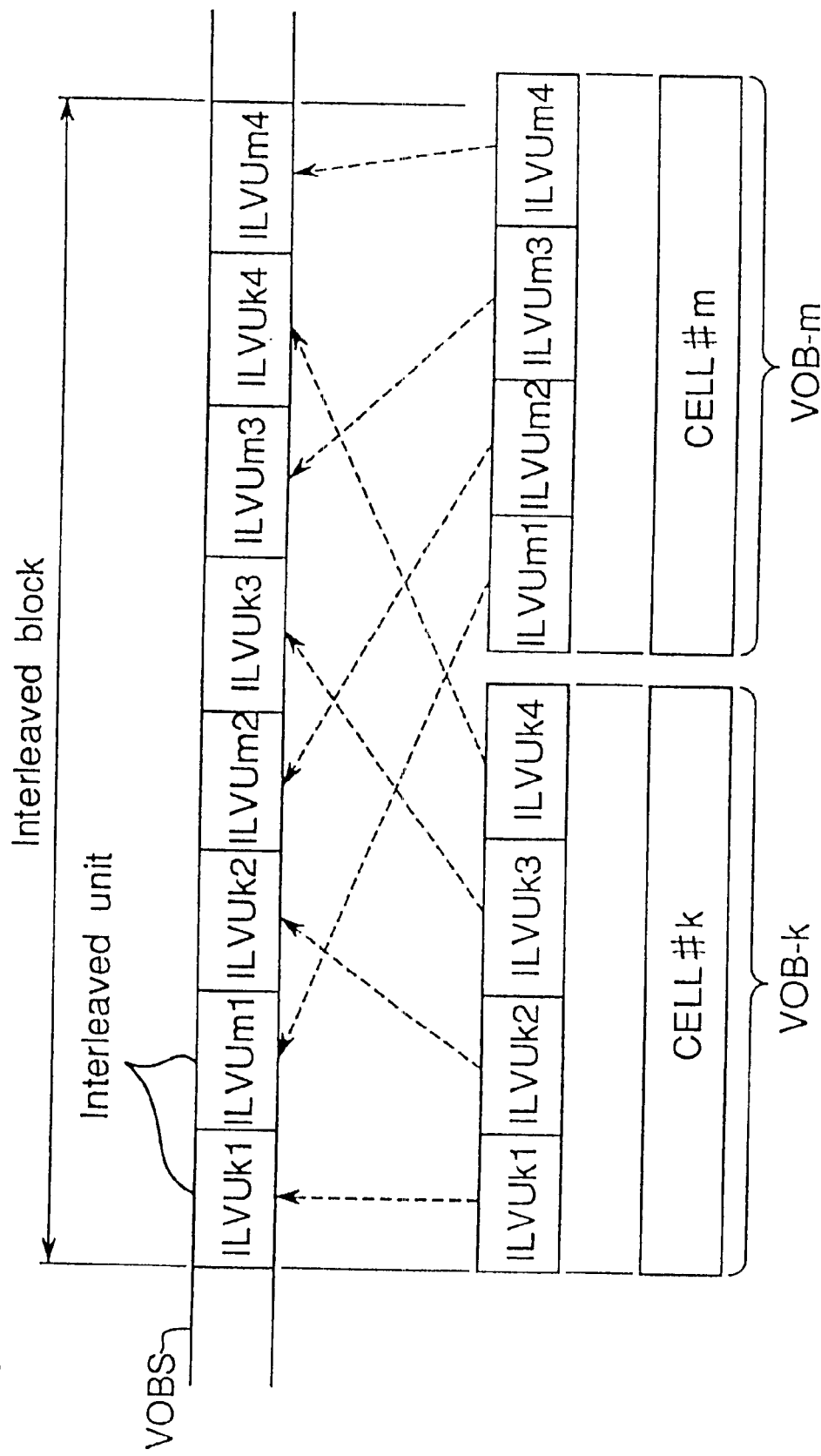
FIG. 74 is a graph schematically showing an internal data structure of the interleaved block regions according to the present invention.

Referring to FIG. 72, data regions to which data is continuously arrayed are called "blocks," of which there are two types: "contiguous block regions" in which VOB with discrete starting and end points are contiguously arrayed, and "interleaved block regions" in which plural VOB with aligned starting and end points are interleaved. The respective blocks are arrayed as shown in FIG. 74 in the playback sequence, i.e., block 1, block 2, block 3, . . . block 7.

As shown in FIG. 72, the VTS title VOBS (VTSTT_VOBS) consist of blocks 1–7, inclusive. Block 1 contains VOB 1 alone. Blocks 2, 3, 5, and 7 similarly discretely contain VOBS 2, 3, 6, and 10. Blocks 2, 3, 5, and 7 are thus contiguous block regions.

Block 4, however, contains VOB 4 and VOB 5 interleaved together, while block 6 contains VOB 7, VOB 8, and VOB 9 interleaved together. Blocks 4 and 6 are thus interleaved block regions.

Figure 73:
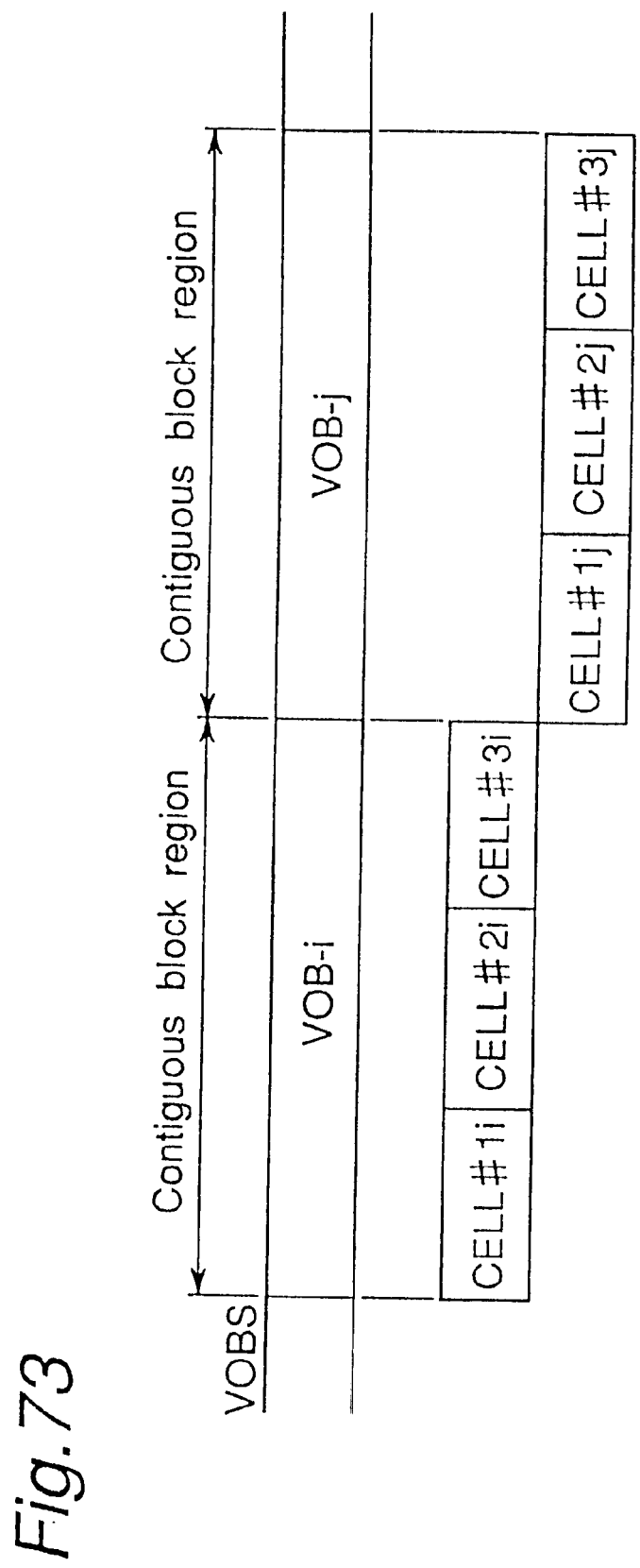
FIG. 73 is a graph schematically showing a content of a VTS title VOBS according to the present invention.

The internal data structure of the contiguous block regions is shown in FIG. 73 with VOB-i and VOB-j arrayed as the contiguous blocks in the VOBs. As described with reference to FIG. 16, VOB-i and VOB-j inside the contiguous block regions are further logically divided into cells as the playback unit. Both VOB-i and VOB-j in this figure are shown comprising three cells CELL #1, CELL #2, and CELL #3.

Each cell comprises one or more video object unit VOBU with the video object unit VOBU defining the boundaries of the cell. Each cell also contains information identifying the position of the cell in the program chain PGC (the playback control information of the digital video disk system). More specifically, this position information is the address of the first and last VOBU in the cell. As also shown in FIG. 73, these VOB and the cells defined therein are also recorded to a contiguous block region so that contiguous blocks are contiguously reproduced. Reproducing these contiguous blocks is therefore not a problem.

The internal data structure of the interleaved block regions is shown in FIG. 74. In the interleaved block regions each video object VOB is divided into interleaved units ILVU, and the interleaved units ILVU associated with each VOB are alternately arrayed. Cell boundaries are defined independently of the interleaved units ILVU. For example, VOB-k is divided into four interleaved units ILVUk1, ILVUk2, ILVUk3, and ILVUk4, and are confined by a single cell CELL#k. VOB-k is likewise divided into four interleaved units ILVUm1, ILVUm2, ILVUm3, and ILVUm4, and is confined by a single cell CELL#m. Note that instead of a single cell CELL#k or CELL#m, each of VOB-k and VOB-m can be divided into more than two cells. The interleaved units ILVU thus contains both audio and video data.

In the example shown in FIG. 74, the interleaved units ILVUk1, ILVUk2, ILVUk3, and ILVUk4, and ILVUm1, ILVUm2, ILVUm3, and ILVUm4, from two different video objects VOB-k and VOB-m are alternately arrayed within a single interleaved block. By interleaving the interleaved units ILVU of two video objects VOB in this sequence, it is possible to achieve seamless reproduction branching from one scene to one of plural scenes, and from one of plural scenes to one scene.

Multi-scene control

The multi-scene period is described together with the concept of multi-scene control according to the present invention using, by way of example, a title comprising scenes recorded from different angles.

Each scene in multi-scene control is recorded from the same angle, but may be recorded at different times or may even be computer graphics data. The multi-angle scene periods may therefore also be called multi-scene periods.

Parental Control

The concept of recording plural titles comprising alternative scenes for such functions as parental lock control and recording director's cuts is described below using FIG. 15.

Figure 15:
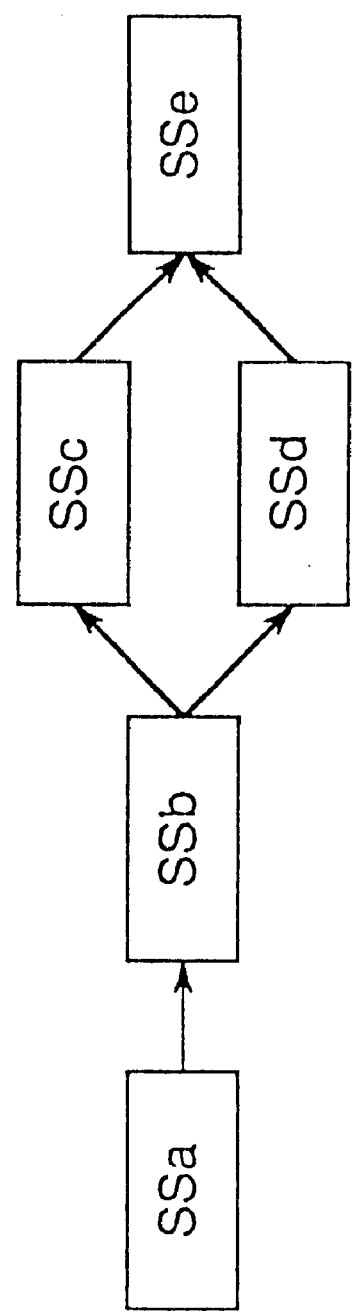
FIG. 15 is a graph in assistance of explaining a concept of parental control according to the present invention.

An example of a multi-rated title stream providing for parental lock control is shown in FIG. 15. When so-called "adult scenes" containing sex, violence, or other scenes deemed unsuitable for children are contained in a title implementing parental lock control, the title stream is recorded with a combination of common system streams SSa, SSb, and Sse, an adult-oriented system stream SSc containing the adult scenes, and a child-oriented system stream SSd containing only the scenes suitable for children. Title streams such as this are recorded as a multi-scene system stream containing the adult-oriented system stream Ssc and the child-oriented system stream Ssd arrayed to the multi-scene period between common system streams Ssb and Sse.

The relationship between each of the component titles and the system stream recorded to the program chain PGC of a title stream thus comprised is described below.

The adult-oriented title program chain PGC1 comprises in sequence the common system streams Ssa and Ssb, the adult-oriented system stream Ssc, and the common system stream Sse. The child oriented title program chain PGC2 comprises in sequence the common system streams Ssa and Ssb, the child-oriented system stream Ssd, and the common system stream Sse.

By thus arraying the adult-oriented system stream Ssc and child-oriented system stream Ssd to a multi-scene period, the decoding method previously described can reproduce the title containing adult-oriented content by reproducing the common system streams Ssa and Ssb, then selecting and reproducing the adult-oriented system stream Ssc, and then reproducing the common system stream Sse as instructed by the adult-oriented title program chain PGC1. By alternatively following the child-oriented title program chain PGC2 and selecting the child-oriented system stream Ssd in the multi-scene period, a child-oriented title from which the adult-oriented scenes have been expurgated can be reproduced.

This method of providing in the title stream a multi-scene period containing plural alternative scenes, selecting which of the scenes in the multi-scene period are to be reproduced before playback begins, and generating plural titles containing essentially the same title content but different scenes in part, is called parental lock control.

Note that parental lock control is so named because of the perceived need to protect children from undesirable content. From the perspective of system stream processing, however, parental lock control is a technology for statically generating different title streams by means of the user pre-selecting specific scenes from a multi-scene period. Note, further, that this contrasts with multi-angle scene control, which is a technology for dynamically changing the content of a single title by means of the user selecting scenes from the multi-scene period freely and in real-time during title playback.

This parental lock control technology can also be used to enable title stream editing such as when making the director's cut. The director's cut refers to the process of editing certain scenes from a movie to, for example, shorten the total presentation time. This may be necessary, for example, to edit a feature-length movie for viewing on an airplane where the presentation time is too long for viewing within the flight time or certain content may not be acceptable. The movie director thus determines which scenes may be cut to shorten the movie. The title can then be recorded with both a full-length, unedited system stream and an edited system stream in which the edited scenes are recorded to multi-scene periods. At the transition from one system stream to another system stream in such applications, parental lock control must be able to maintain smooth playback image output. More specifically, seamless data reproduction whereby a data underflow state does not occur in the audio, video, or other buffers, and seamless information reproduction whereby no unnatural interruptions are audibly or visibly perceived in the audio and video playback, are necessary.

Multi-angle Control

Figure 33:
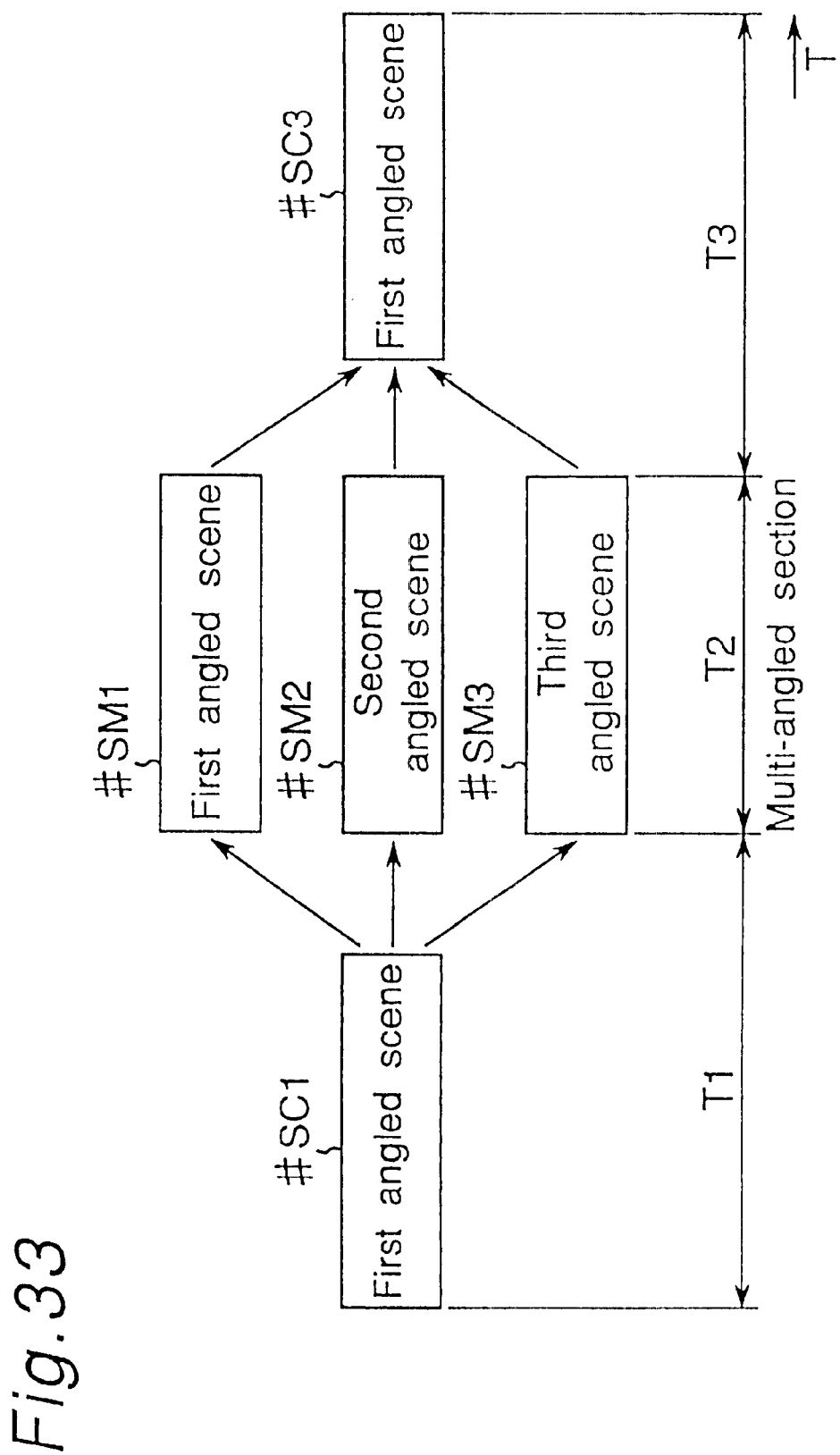
FIG. 33 is a graph in assistance of explaining a concept of multi-angle scene control according to the present in invention.

The concept of multi-angle scene control in the present invention is described next with reference to FIG. 33. In general, multimedia titles are obtained by recording both the audio and video information (collectively "recording" below) of the subject over time T. The angled scene blocks #SC1, #SM1, #SM2, #SM3, and #SC3 represent the multimedia scenes obtained at recording unit times Ti, T2, and T3 by recording the subject at respective camera angles. Scenes #SM1, #SM2, and #SM3 are recorded at mutually different (first, second, and third) camera angles during recording unit time T2, and are referenced below as the first, second, and third angled scenes.

Note that the multi-scene periods referenced herein are basically assumed to comprise scenes recorded from different angles. The scenes may, however, be recorded from the same angle but at different times, or they may be computer graphics data. The multi-angle scene periods are thus the multi-scene periods from which plural scenes can be selected for presentation in the same time period, whether or not the scenes are actually recorded at different camera angles.

Scenes #SC1 and #SC3 are scenes recorded at the same common camera angle during recording unit times T1 and T3, i.e., before and after the multi-angle scenes. These scenes are therefore called "common angle scenes." Note that one of the multiple camera angles used in the multi-angle scenes is usually the same as the common camera angle.

To understand the relationship between these various angled scenes, multi-angle scene control is described below using a live broadcast of a baseball game for example only.

The common angle scenes #SC1 and #SC3 are recorded at the common camera angle, which is here defined as the view from center field on the axis through the pitcher, batter, and catcher.

The first angled scene #SM1 is recorded at the first multi-camera angle, i.e., the camera angle from the backstop on the axis through the catcher, pitcher, and batter. The second angled scene #SM2 is recorded at the second multi-camera angle, i.e., the view from center field on the axis through the pitcher, batter, and catcher. Note that the second angled scene #SM2 is thus the same as the common camera angle in this example. It therefore follows that the second angled scene #SM2 is the same as the common angle scene #SC2 recorded during recording unit time T2. The third angled scene #SM3 is recorded at the third multi-camera angle, i.e., the camera angle from the backstop focusing on the infield.

The presentation times of the multiple angle scenes #SM1, #SM2, and #SM3 overlap in recording unit time T2; this period is called the "multi-angle scene period." By freely selecting one of the multiple angle scenes #SM1, #SM2, and #SM3 in this multi-angle scene period, the viewer is able to change his or her virtual viewing position to enjoy a different view of the game as though the actual camera angle is changed. Note that while there appears to be a time gap between common angle scenes #SC1 and #SC3 and the multiple angle scenes #SM1, #SM2, and #SM3 in FIG. 33, this is simply to facilitate the use of arrows in the figure for easier description of the data reproduction paths reproduced by selecting different angled scenes. There is no actual time gap during playback.

Multi-angle scene control of the system stream based on the present invention is described next with reference to FIG. 23 from the perspective of connecting data blocks. The multimedia data corresponding to common angle scene #SC is referenced as common angle data BA, and the common angle data BA in recording unit times T1 and T3 are referenced as BA1 and BA3, respectively. The multimedia data corresponding to the multiple angle scenes #SM1, #SM2, and #SM3 are referenced as first, second, and third angle scene data MA1, MA2, and MA3. As previously described with reference to FIG. 33, scenes from the desired angled can be viewed by selecting one of the multiple angle data units MA1, MA2, and MA3. There is also no time gap between the common angle data BA1 and BA3 and the multiple angle data units MA1, MA2, and MA3.

In the case of an MPEG system stream, however, intermittent breaks in the playback information can result between the reproduced common and multiple angle data units depending upon the content of the data at the connection between the selected multiple angle data unit MA1, MA2, and MA3 and the common angle data BA (either the first common angle data BA1 before the angle selected in the multi-angle scene period or the common angle data BA3 following the angle selected in the multi-angle scene period). The result in this case is that the title stream is not naturally reproduced as a single contiguous title, i.e., seamless data reproduction is achieved but non-seamless information reproduction results.

The multi-angle selection process whereby one of plural scenes is selectively reproduced from the multi-angle scene period with seamless information presentation to the scenes before and after is described below with application in a digital video disk system using FIG. 23.

Changing the scene angle, i.e., selecting one of the multiple angle data units MA1, MA2, and MA3, must be completed before reproduction of the preceding common angle data BA1 is completed. It is extremely difficult, for example, to change to a different angle data unit MA2 during reproduction of common angle data BA1. This is because the multimedia data has a variable length coded MPEG data structure, which makes it difficult to find the data break points (boundaries) in the selected data blocks. The video may also be disrupted when the angle is changed because inter-frame correlations are used in the coding process. The group_of_pictures GOP processing unit of the MPEG standard contains at least one refresh frame, and closed processing not referencing frames belonging to another GOP is possible within this GOP processing unit.

In other words, if the desired angle data, e.g., MA3, is selected before reproduction reaches the multi-angle scene period, and at the latest by the time reproduction of the preceding common angle data BA1 is completed, the angle data selected from within the multi-angle scene period can be seamlessly reproduced. However, it is extremely difficult while reproducing one angle to select and seamlessly reproduce another angle within the same multi-angle scene period. It is therefore difficult when in a multi-angle scene period to dynamically select a different angle unit presenting, for example, a view from a different camera angle.

Flow Chart: Encoder

The encoding information table generated by the encoding system controller 200 from information extracted from the scenario data St7 is described below referring to FIG. 27.

The encoding information table contains VOB set data streams containing plural VOB corresponding to the scene periods beginning and ending at the scene branching and connecting points, and VOB data streams corresponding to each scene. These VOB set data streams shown in FIG. 27 are the encoding information tables generated at step #100 in FIG. 34 by the encoding system controller 200 for creating the DVD multimedia stream based on the user-defined title content.

The user-defined scenario contains branching points from common scenes to plural scenes, or connection points to other common scenes. The VOB corresponding to the scene period delimited by these branching and connecting points is a VOB set, and the data generated to encode a VOB set is the VQB set data stream. The title number specified by the VOB set data stream is the title number TITLE_NO of the VOB set data stream.

Figure 27:
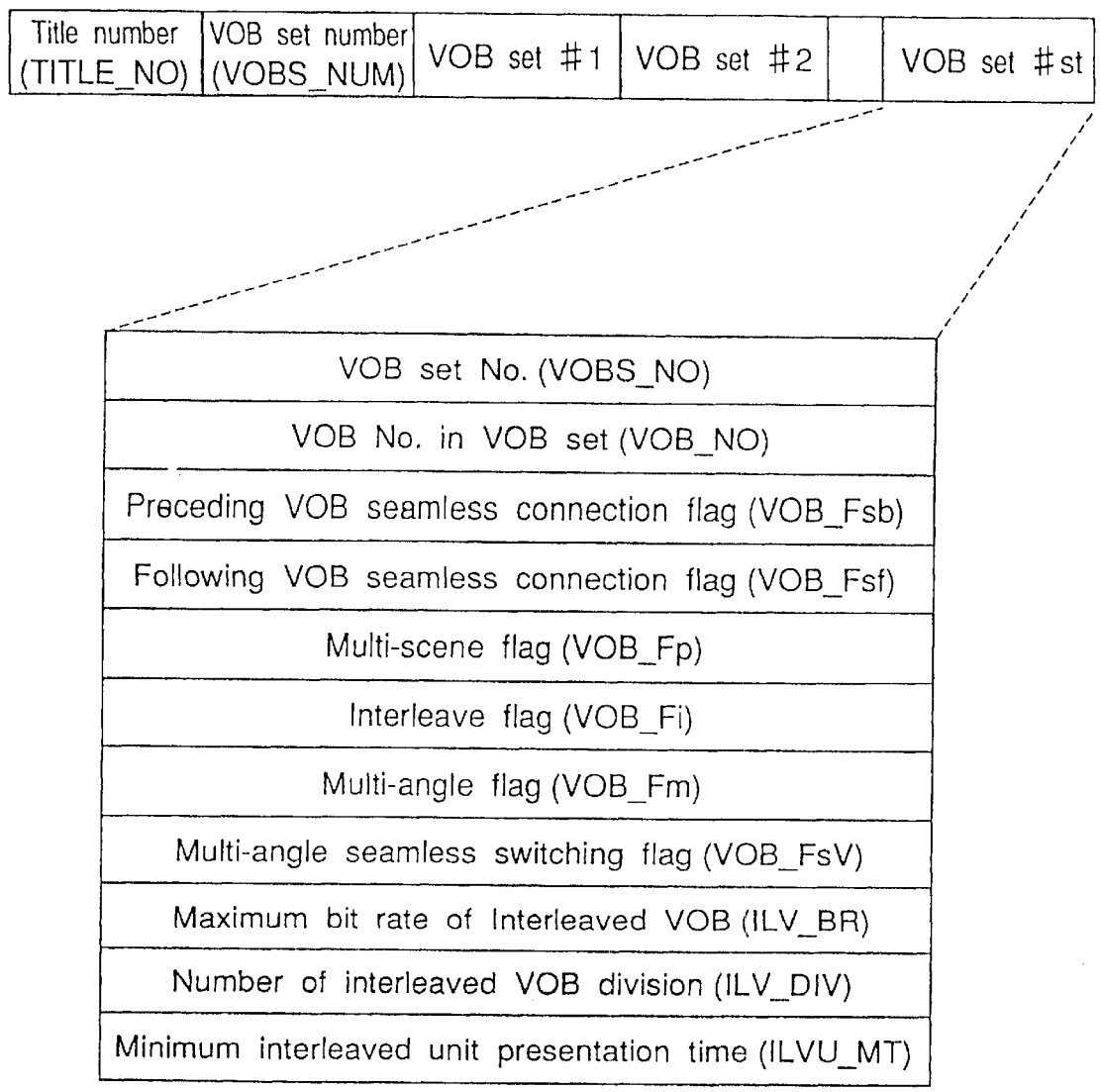
FIG. 27 is a graph schematically showing an encoding information table generated by the encoding system controller of FIG. 25.

The VOB Set data structure in FIG. 27 shows the data content for encoding one VOB set in the VOB set data stream, and comprises: the VOB set number VOBS_NO, the VOB number VOB_NO in the VOB set, the preceding VOB seamless connection flag VOB_Fsb, the following VOB seamless connection flag VOB_Fsf, the multi-scene flag VOB_Fp, the interleave flag VOB_Fi, the multi-angle flag VOB_Fm, the multi-angle seamless switching flag VOB_FsV, the maximum bit rate of the interleaved VOB ILV_BR, the number of interleaved VOB divisions ILV_DIV, and the minimum interleaved unit presentation time ILVU_MT.

The VOB set number VOBS_NO is a sequential number identifying the VOB set and the position of the VOB set in the reproduction sequence of the title scenario.

The VOB number VOB_NO is a sequential number identifying the VOB and the position of the VOB in the reproduction sequence of the title scenario.

The preceding VOB seamless connection flag VOB_Fsb indicates whether a seamless connection with the preceding VOB is required for scenario reproduction.

The following VOB seamless connection flag VOB_Fsf indicates whether there is a seamless connection with the following VOB during scenario reproduction.

The multi-scene flag VOB_Fp identifies whether the VOB set comprises plural video objects VOB.

The interleave flag VOB_Fi identifies whether the VOB in the VOB set are interleaved.

The multi-angle flag VOB_Fm identifies whether the VOB set is a multi-angle set.

The multi-angle seamless switching flag VOB_FsV identifies whether angle changes within the multi-angle scene period are seamless or not.

The maximum bit rate of the interleaved VOB ILV_BR defines the maximum bit rate of the interleaved VOBs.

The number of interleaved VOB divisions ILV_DIV identifies the number of interleave units in the interleaved VOB.

The minimum interleave unit presentation time ILVU_MT defines the time that can be reproduced when the bit rate of the smallest interleave unit at which a track buffer data underflow state does not occur is the maximum bit rate of the interleaved VOB ILV_BR during interleaved block reproduction.

The encoding information table for each VOB generated by the encoding system controller 200 based on the scenario data St7 is described below referring to FIG. 28. The VOB encoding parameters described below and supplied to the video encoder 300, audio encoder 700, and system encoder 900 for stream encoding are produced based on this encoding information table.

Figure 28:
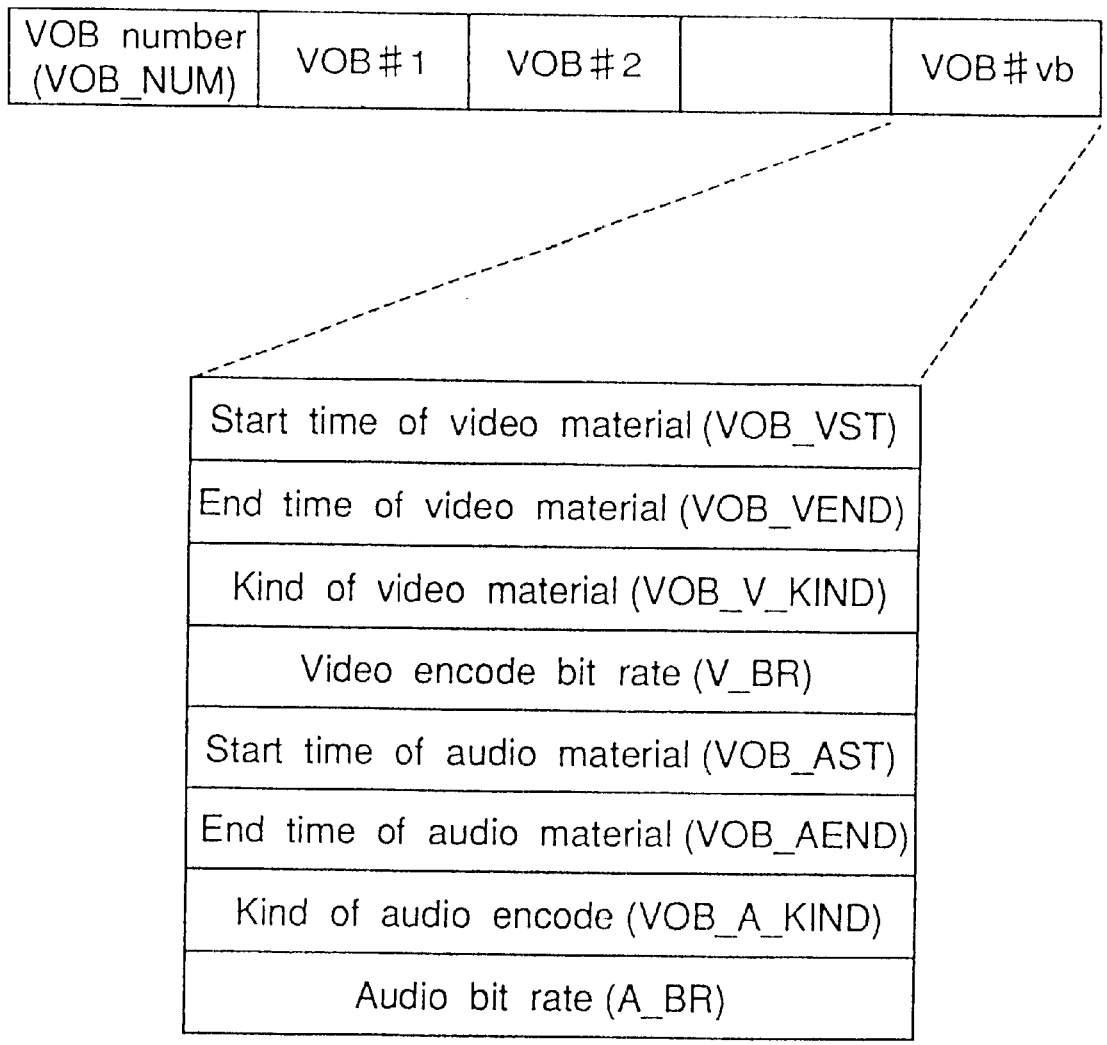
FIG. 28 is a graph schematically showing an encoding information table.

The VOB data streams shown in FIG. 28 are the encoding information tables generated at step #100 in FIG. 34 by the encoding system controller 200 for creating the DVD multimedia stream based on the user-defined title content.

The encoding unit is the video object VOB, and the data generated to encode each video object VOB is the VOB data stream. For example, a VOB set comprising three angle scenes comprises three video objects VOB. The data structure shown in FIG. 28 shows the content of the data for encoding one VOB in the VOB data stream.

The VOB data structure contains the video material start time VOB_VST, the video material end time VOB_VEND, the video signal type VOB_V_KIND, the video encoding bit rate V_BR, the audio material start time VOB_AST, the audio material end time VOB_AEND, the audio coding method VOB_A_KIND, and the audio encoding bit rate A_BR.

The video material start time VOB_VST is the video encoding start time corresponding to the time of the video signal.

The video material end time VOB_VEND is the video encoding end time corresponding to the time of the video signal.

The video material type VOB_V_KIND identifies whether the encoded material is in the NTSC or PAL format, for example, or is photographic material (a movie, for example) converted to a television broadcast format (so-called telecine conversion).

The video encoding bit rate V_BR is the bit rate at which the video signal is encoded.

The audio material start time VOB AST is the audio encoding start time corresponding to the time of the audio signal.

The audio material end time VOB_AEND is the audio encoding end time corresponding to the time of the audio signal.

The audio coding method VOB_A_KIND identifies the audio encoding method as AC-3, MPEG, or linear PCM, for example.

The audio encoding bit rate A_BR is the bit rate at which the audio signal is encoded.

The encoding parameters used by the video encoder 300, sub-picture encoder 500, and audio encoder 700, and system encoder 900 for VOB encoding are shown in FIG. 29. The encoding parameters include: the VOB number VOB_NO, video encode start time V_STTM, video encode end time V_ENDTM, the video encode mode V_ENCMD, the video encode bit rate V_RATE, the maximum video encode bit rate V_MRATE, the GOP structure fixing flag GOP_Fxflag, the video encode GOP structure GOPST, the initial video encode data V_INTST, the last video encode data V_ENDST, the audio encode start time A_STTM, the audio encode end time A_ENDTM, the audio encode bit rate A_RATE, the audio encode method A_ENCMD, the audio start gap A_STGAP, the audio end gap A_ENDGAP, the preceding VOB number B_VOB_NO, and the following VOB number F_VOB_NO.

The VOB number VOB_NO is a sequential number identifying the VOB and the position of the VOB in the reproduction sequence of the title scenario.

The video encode start time V_STTM is the start time of video material encoding.

The video encode end time V_ENDTM is the end time of video material encoding.

The video encode mode V_ENCMD is an encoding mode for declaring whether reverse telecine conversion shall be accomplished during video encoding to enable efficient coding when the video material is telecine converted material.

The video encode bit rate V_RATE is the average bit rate of video encoding.

The maximum video encode bit rate V_MRATE is the maximum bit rate of video encoding.

The GOP structure fixing flag GOP_Fxflag specifies whether encoding is accomplished without changing the GOP structure in the middle of the video encoding process. This is a useful parameter for declaring whether seamless switch is enabled in a multi-angle scene period.

The video encode GOP structure GOPST is the GOP structure data from encoding.

The initial video encode data V_INTST sets the initial value of the VBV buffer (decoder buffer) at the start of video encoding, and is referenced during video decoding to initialize the decoding buffer. This is a useful parameter for declaring seamless reproduction with the preceding encoded video stream.

The last video encode data V_ENDST sets the end value of the VBV buffer (decoder buffer) at the end of video encoding, and is referenced during video decoding to initialize the decoding buffer. This is a useful parameter for declaring seamless reproduction with the preceding encoded video stream.

The audio encode start time A_STTM is the start time of audio material encoding.

The audio encode end time A_ENDTM is the end time of audio material encoding.

The audio encode bit rate A_RATE is the bit rate used for audio encoding.

The audio encode method A_ENCMD identifies the audio encoding method as AC-3, MPEG, or linear PCM, for example.

The audio start gap A_STGAP is the time offset between the start of the audio and video presentation at the beginning of a VOB. This is a useful parameter for declaring seamless reproduction with the preceding encoded system stream.

The audio end gap A_ENDGAP is the time offset between the end of the audio and video presentation at the end of a VOB. This is a useful parameter for declaring seamless reproduction with the preceding encoded system stream.

The preceding VOB number B_VOB_NO is the VOB_NO of the preceding VOB when there is a seamlessly connected preceding VOB.

The following VOB number F_VOB_NO is the VOB_NO of the following VOB when there is a seamlessly connected following VOB.

The operation of a DVD encoder ECD according to the present invention is described below with reference to the flow chart in FIG. 34. Note that the steps shown with a double line are subroutines. It should be obvious that while the operation described below relates specifically in this case to the DVD encoder ECD of the present invention, the operation described also applies to an authoring encoder EC.

At step #100, the user inputs the editing commands according to the user-defined scenario while confirming the content of the multimedia source data streams St1, St2, and St3.

At step #200, the scenario editor 100 generates the scenario data St7 containing the above edit command information according to the user's editing instructions.

When generating the scenario data St7 in step #200, the user editing commands related to multi-angle and parental lock multi-scene periods in which interleaving is presumed must be input to satisfy the following conditions.

First, the VOB maximum bit rate must be set to assure sufficient image quality, and the track buffer capacity, jump performance, jump time, and jump distance of the DVD decoder DCD used as the reproduction apparatus of the DVD encoded data must be determined. Based on these values, the reproduction time of the shortest interleaved unit is obtained from equations 3 and 4. Based on the reproduction time of each scene in the multi-scene period, it must then be determined whether equations 5 and 6 are satisfied. If equations 5 and 6 are not satisfied, the user must change the edit commands until equations 5 and 6 are satisfied by, for example, connecting part of the following scene to each scene in the multi-scene period.

When multi-angle edit commands are used, equation 7 must be satisfied for seamless switching, and edit commands matching the audio reproduction time with the reproduction time of each scene in each angle must be entered. If non-seamless switching is used, the user must enter commands to satisfy equation 8.

At step #300, the encoding system controller 200 first determines whether the target scene is to be seamlessly connected to the preceding scene based on the scenario data St7.

Note that when the preceding scene period is a multi-scene period comprising plural scenes but the presently selected target scene is a common scene (not in a multi-scene period), a seamless connection refers to seamlessly connecting the target scene with any one of the scenes contained in the preceding multi-scene period. When the target scene is a multi-scene period, a seamless connection still refers to seamlessly connecting the target scene with any one of the scenes from the same multi-scene period.

If step #300 returns NO, i.e., a non-seamless connection is valid, the procedure moves to step #400.

At step #400, the encoding system controller 200 resets the preceding VOB seamless connection flag VOB_Fsb indicating whether there is a seamless connection between the target and preceding scenes. The procedure then moves to step #600.

On the other hand, if step #300 returns YES, i.e., there is a seamless connection to the preceding scene, the procedure moves to step #500.

At step #500 the encoding system controller 200 sets the preceding VOB seamless connection flag VOB_Fsb. The procedure then moves to step #600.

At step #600 the encoding system controller 200 determines whether there is a seamless connection between the target and following scenes based on scenario data St7. If step #600 returns NO, i.e., a non-seamless connection is valid, the procedure moves to step #700.

At step #700, the encoding system controller 200 resets the following VOB seamless connection flag VOB_Fsf indicating whether there is a seamless connection with the following scene. The procedure then moves to step #900.

However, if step #600 returns YES, i.e., there is a seamless connection to the following scene, the procedure moves to step #800.

At step #800 the encoding system controller 200 sets the following VOB seamless connection flag VOB_Fsf. The procedure then moves to step #900.

At step #900 the encoding system controller 200 determines whether there is more than connection target scene, i.e., whether a multi-scene period is selected, based on the scenario data St7. As previously described, there are two possible control methods in multi-scene periods: parental lock control whereby only one of plural possible reproduction paths that can be constructed from the scenes in the multi-scene period is reproduced, and multi-angle control whereby-the reproduction path can be switched within the multi-scene period to present different viewing angles.

If step #900 returns NO, i.e., there are not multiple scenes, the procedure moves to step #1000.

At step #1000 the multi-scene flag VOB_Fp identifying whether the VOB set comprises plural video objects VOB (a multi-scene period is selected) is reset, and the procedure moves to step #1800 for encode parameter production. This encode parameter production subroutine is described below.

However, if step #900 returns YES, there is a multi-scene connection, the procedure moves to step #1100.

At step #1100, the multi-scene flag VOB_Fp is set, and the procedure moves to step #1200 whereat it is judged whether a multi-angle connection is selected, or not.

At step #1200 it is determined whether a change is made between plural scenes in the multi-scene period, i.e., whether a multi-angle scene period is selected. If step #1200 returns NO, i.e., no scene change is allowed in the multi-scene period as parental lock control reproducing only one reproduction path has been selected, the procedure moves to step #1300.

At step #1300 the multi-angle flag VOB_Fm identifying whether the target connection scene is a multi-angle scene is reset, and the procedure moves to step #1302.

At step #1302 it is determined whether either the preceding VOB seamless connection flag VOB_Fsb or following VOB seamless connection flag VOB_Fsf is set. If step #1302 returns YES, i.e., the target connection scene seamlessly connects to the preceding, the following, or both the preceding and following scenes, the procedure moves to step #1304.

At step #1304 the interleave flag VOB_Fi identifying whether the VOB, the encoded data of the target scene, is interleaved is set. The procedure then moves to step #1800.

However, if step #1302 returns NO, i.e., the target connection scene does not seamlessly connect to the preceding or following scene, the procedure moves to step #1306.

At step #1306 the interleave flag VOB_Fi is reset, and the procedure moves to step #1800.

If step #1200 returns YES, however, i.e., there is a multi-angle connection, the procedure moves to step #1400.

At step #1400, the multi-angle flag VOB_Fm and interleave flag VOB_Fi are set, and the procedure moves to step #1500.

At step #1500 the encoding system controller 200 determines whether the audio and video can be seamlessly switched in a multi-angle scene period, i.e., at a reproduction unit smaller than the VOB, based on the scenario data St7. If step #1500 returns NO, i.e., non-seamless switching occurs, the procedure moves to step #1600.

At step #1600 the multi-angle seamless switching flag VOB_FsV indicating whether angle changes within the multi-angle scene period are seamless or not is reset, and the procedure moves to step #1800.

However, if step #1500 returns YES, i.e., seamless switching occurs, the procedure moves to step #1700.

At step #1700 the multi-angle seamless switching flag VOB_FsV is set, and the procedure moves to step #1800.

Figure 34B:
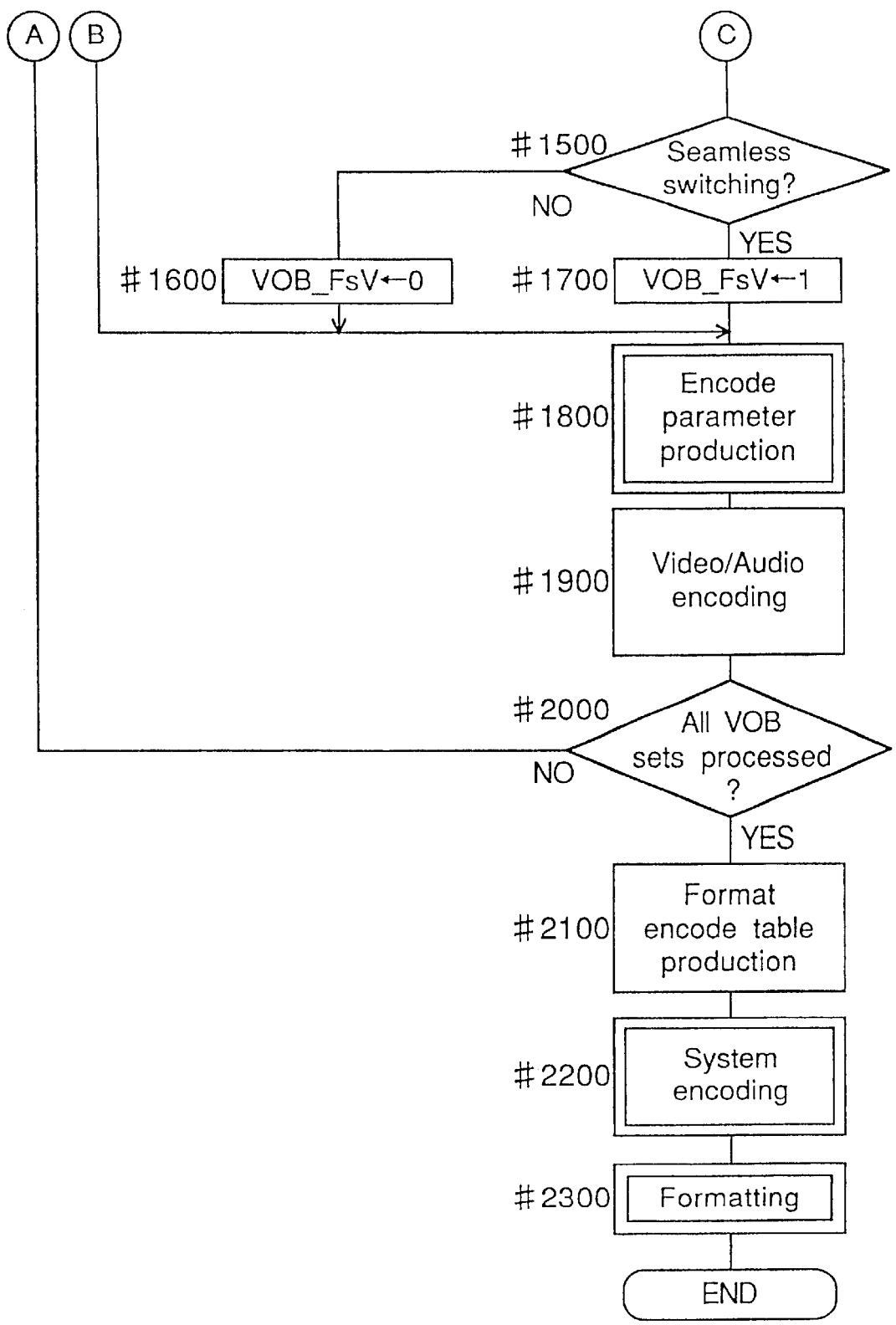
FIG. 34 is a flow chart, formed by FIGS. 34A and 34B, showing an operation of the DVD encoder of FIG. 25.

Therefore, as shown by the flow chart in FIG. 34B, encode parameter production (step #1800) is only begun after the editing information is detected from the above flag settings in the scenario data St7 reflecting the user-defined editing instructions.

Based on the user-defined editing instructions detected from the above flag settings in the scenario data St7, information is added to the encoding information tables for the VOB Set units and VOB units as shown in FIGS. 27 and 28 to encode the source streams, and the encoding parameters of the VOB data units shown in FIG. 29 are produced, in step #1800. The procedure then moves to step #1900 for audio and video encoding.

The encode parameter production steps (step #1800) are described in greater detail below referring to FIGS. 35, 36, 37, and 38.

Based on the encode parameters produced in step #1800, the video data and audio data are encoded in step #1900, and the procedure-moves to step #2000.

Note that the sub-picture data is normally inserted during video reproduction on an as-needed basis, and contiguity with the preceding and following scenes is therefore not usually necessary. Moreover, the sub-picture data is normally video information for one frame, and unlike audio and video data having an extended time-base, sub-picture data is usually static, and is not normally presented continuously. Because the present invention relates specifically to seamless and non-seamless contiguous reproduction as described above, description of sub-picture data encoding is omitted herein for simplicity.

Step #2000 is the last step in a loop comprising steps #300 to step #2000, and causes this loop to be repeated as many times as there are VOB Sets. This loop formats the program chain VTS_PGC#i to contain the reproduction sequence and other reproduction information for each VOB in the title (FIG. 16) in the program chain data structure, interleaves the VOB in the multi-scene periods, and completes the VOB Set data stream and VOB data stream needed for system stream encoding. The procedure then moves to step #2100.

At step #2100 the VOB Set data stream is completed as the encoding information table by adding the total number of VOB Sets VOBS_NUM obtained as a result of the loop through step #2000 to the VOB Set data stream, and setting the number of titles TITLE_NO defining the number of scenario reproduction paths in the scenario data St7. The procedure then moves-to-step #2200.

System stream encoding producing the VOB (VOB#i) data in the VTS title VOBS (VTSTT_VOBS) (FIG. 16) is accomplished in step #2200 based on the encoded video stream and encoded audio stream output from step #1900, and the encode parameters in FIG. 29. The procedure then moves to step #2300.

At step #2300 the VTS information VTSI, VTSI management table VTSI_MAT, VTSPGC information table VTS_PGCIT, and the program chain information VTS_PGCI#i controlling the VOB data reproduction sequence shown in FIG. 16 are produced, and formatting to, for example, interleave the VOB contained in the multi-scene periods, is accomplished. The specific steps executed in this formatting operation are described below with reference to FIGS. 49, 50, 51, 52, and 53.

The encode parameter production subroutine shown as step #1800 in FIG. 34B is described next using FIGS. 35, 36, 37, and 38 using by way of example the operation generating the encode parameters for multi-angle control.

Figure 35:
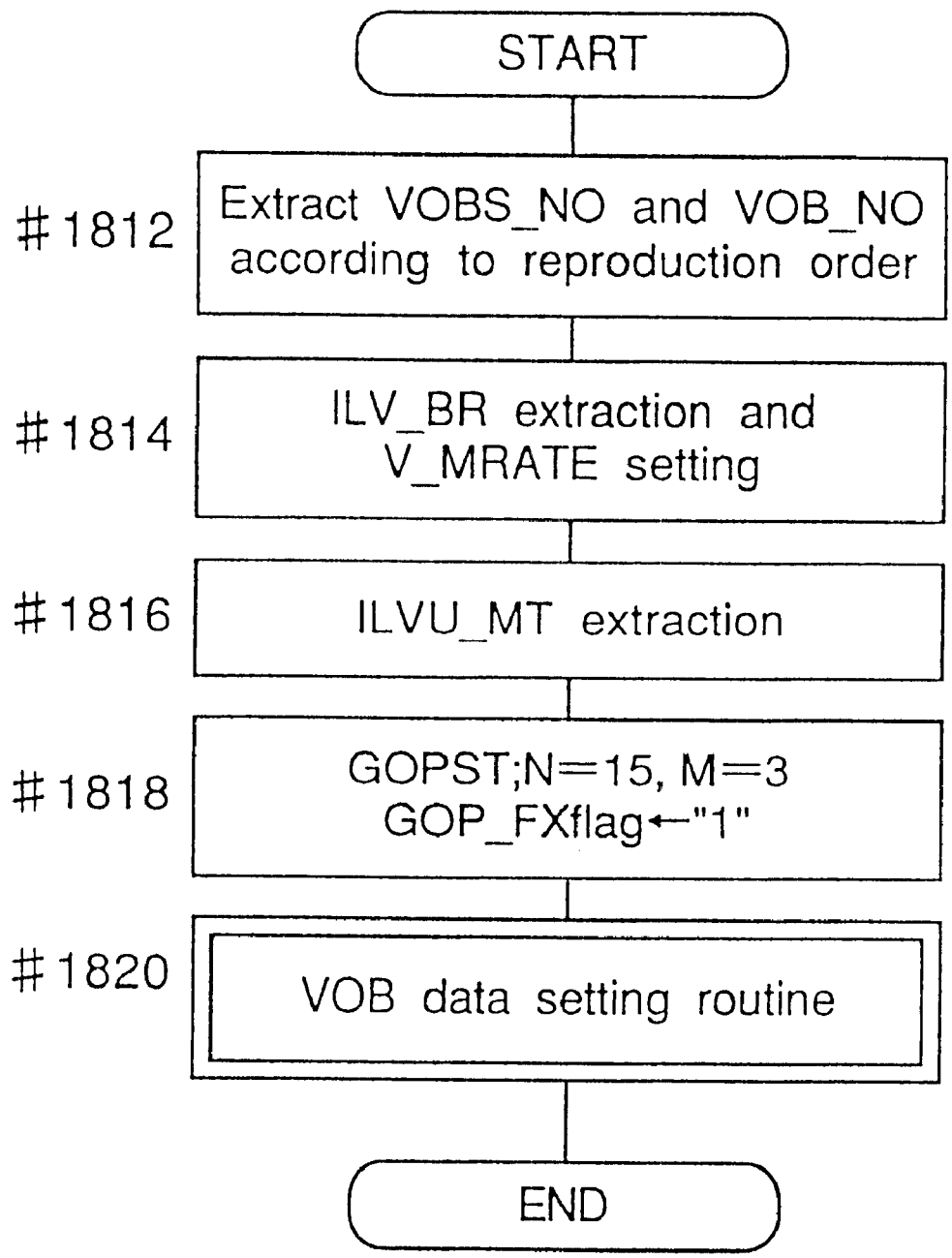
FIG. 35 is a flow chart showing details of the encode parameter production sub-routine of FIG. 34.

Starting from FIG. 35, the process for generating the encode parameters of a non-seamless switching stream with multi-angle control is described first. This stream is generated when step #1500 in FIG. 34 returns NO and the following flags are set as shown: VOB_Fsb =1 or VOB_Fsf 1, VOB_Fp =1, VOB_Fi =1, VOB_Fm =1, and VOB_FsV =0. The following operation produces the encoding information tables. shown in FIG. 27 and FIG. 28, and the encode parameters shown in FIG. 29.

At step #1812, the scenario reproduction sequence (path) contained in the scenario data St7 is extracted, the VOB Set number VOBS_NO is set, and the VOB number VOB_NO is set for one or more VOB in the VOB Set.

At step #1814 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1816, the minimum interleaved unit presentation time ILVU_MT is extracted from the scenario data St7.

At step #1818, the video encode GOP structure GOPST values N=15 and M=3 are set, and the GOP structure fixing flag GOP_Fxflag is set (=1), based on the multi-scene flag VOB_Fp setting (=1).

Figure 36:
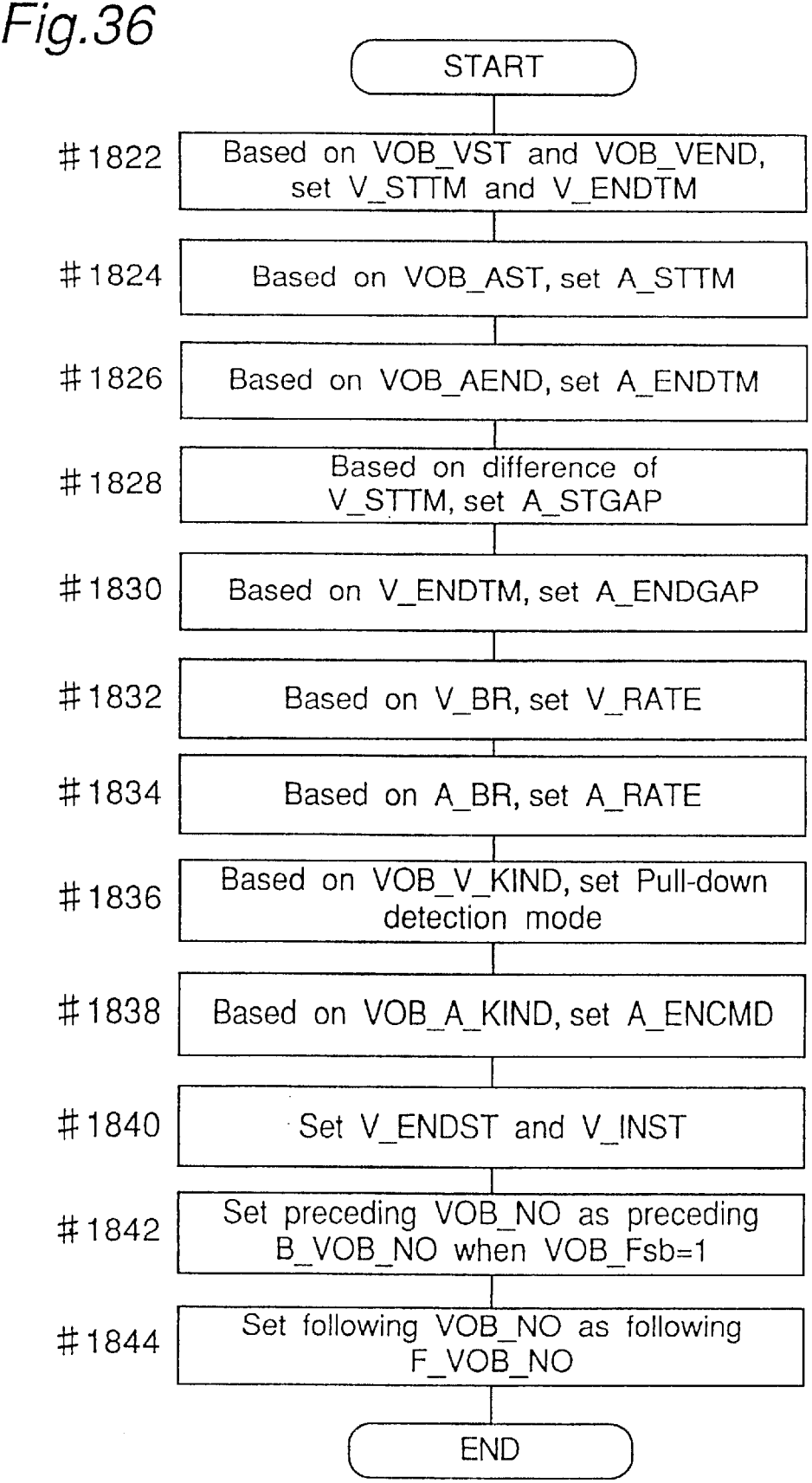
FIG. 36 is a flow chart showing the details of the VOB data setting routine of FIG. 35.

Step #1820 is the common VOB data setting routine, which is described below referring to the flow chart in FIG. 36. This common VOB data setting routine produces the encoding information tables shown in FIGS. 27 and 28, and the encode parameters shown in FIG. 29.

At step #1822 the video material start time VOB_VST and video material end time VOB_VEND are extracted for each VOB, and the video encode start time V_STTM and video encode end time V_ENDTM are used as video encoding parameters.

At step #1824 the audio material start time VOB_AST of each VOB is extracted from the scenario data St7, and the audio encode start time A_STTM is set as an audio encoding parameter.

At step #1826 the audio material end time VOB_AEND is extracted for each VOB from the scenario data St7, and at a time not exceeding the VOB_AEND time. This time extracted at an audio access unit (AAU) is set as the audio encode end time A_ENDTM which is an audio encoding parameter. Note that the audio access unit AAU is determined by the audio encoding method.

At step #1828 the audio start gap A_STGAP obtained from the difference between the video encode start time V_STTM and the audio encode start time A_STTM is defined as a system encode parameter.

At step #1830 the audio end gap A_ENDGAP obtained from the difference between the video encode end time V_ENDTM and the audio encode end time A_ENDTM is defined as a system encode parameter.

At step #1832 the video encoding bit rate V_BR is extracted from the scenario data St7, and the video encode bit rate V_RATE, which is the average bit rate of video encoding, is set as a video encoding parameter.

At step #1834 the audio encoding bit rate A_BR is extracted from the scenario data St7, and the audio encode bit rate A_RATE is set as an audio encoding parameter.

At step #1836 the video material type VOB_V_KIND is extracted from the scenario data St7. If the material is a film type, i.e., a movie converted to television broadcast format (so-called-telecine conversion), reverse telecine conversion is set for the video encode mode V_ENCMD, and defined as a video encoding parameter.

At step #1838 the audio coding method VOB_A_KIND is extracted from the scenario data St7, and the encoding method is set as the audio encode method A_ENCMD and set as, an audio encoding parameter.

At step #1840 the initial video encode data V_INTST sets the initial value of the VBV buffer to a value less than the VBV buffer end value set by the last video encode data V_ENDST, and defined as a video encoding parameter.

At step #1842 the VOB number VOB_NO of the preceding connection is set to the preceding VOB number B_VOB_NO based on the setting (=1) of the preceding VOB seamless connection flag VOB_Fsb, and set as a system encode parameter.

At step #1844 the VOB number VOB_NO of the following connection is set to the following VOB number F_VOB_NO based on the setting (=1) of the following VOB seamless connection flag VOB_Fsf, and set as a system encode parameter.

The encoding information table and encode parameters are thus generated for a multi-angle VOB Set with non-seamless multi-angle switching control enabled.

The process for generating the encode parameters of a seamless switching stream with multi-angle control is described below with reference to FIG. 37, This stream is generated when step #1500 in FIG. 34 returns YES and the following flags are set as shown: VOB_Fsb =1 or VOB_Fsf =1, VOB_Fp =1, VOB_Fi =1, VOB_Fm =1, and VOB_FsV =1.

The following operation produces the encoding information tables shown in FIG. 27 and FIG. 28, and the encode parameters shown in FIG. 29.

The following operation produces the encoding information tables shown in FIG. 27 and FIG. 28, and the encode parameters shown in FIG. 29.

At step #1850, the scenario reproduction sequence (path) contained in the scenario data St7 is extracted, the VOB Set number VOBS_NO is set, and the VOB number VOB_NO is set for one or more VOB in the VOB Set.

At step #1852 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1854, the minimum interleaved unit presentation time ILVU_MT is extracted from the scenario data St7.

At step #1856, the video encode GOP structure GOPST values N=15 and M=3 are set, and the GOP structure fixing flag GOP_Fxflag is set (=1), based on the multi-scene flag VOB_Fp setting (=1).

At step #1858, the video encode GOP GOPST is set to "closed GOP" based on the multi-angle seamless switching flag VOB_FsV setting (=1), and the video encoding parameters are thus defined.

Step #1860 is the common VOB data setting routine, which is as described referring to the flow chart in FIG. 35. Further description thereof is thus omitted here.

The encode parameters of a seamless switching stream with multi-angle control are thus defined for a VOB Set with multi-angle control as described above.

Figure 38:
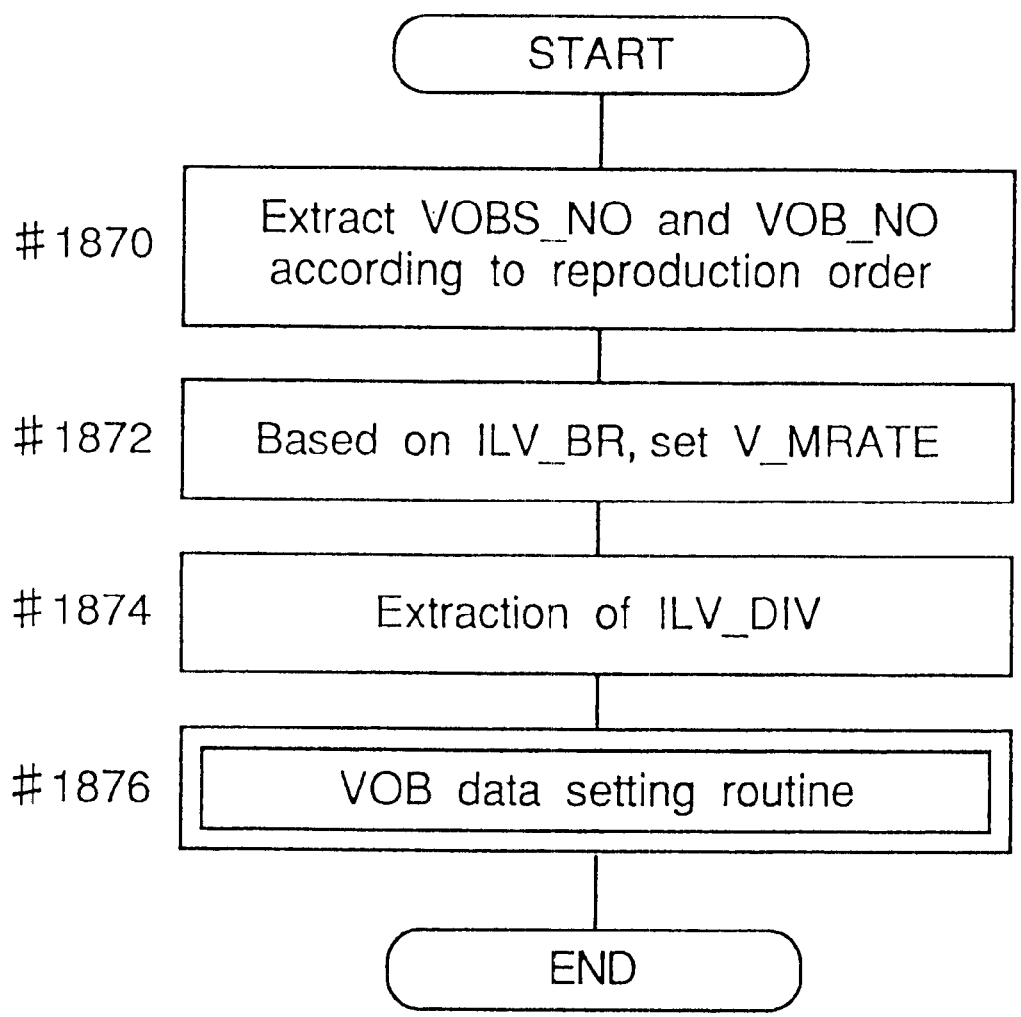
FIG. 38 is a flow chart showing the encode parameters generating operation for a system stream.

The process for generating the encode parameters for a system stream in which parental lock control is implemented is described below with reference to FIG. 38. This stream is generated when step #1200 in FIG. 34 returns NO and step #1304 returns YES, i.e., the following flags are set as shown: VOB_Fsb=1 or VOB_Fsf=1, VOB_Fp=1, VOB_Fi=1, VOB_Fm=0. The following operation produces the encoding information tables shown in FIG. 27 and FIG. 28, and the encode parameters shown in FIG. 29.

At step #1870, the scenario reproduction sequence (path) contained in the scenario data St7 is extracted, the VOB Set number VOBS_NO is set, and the VOB number VOB_NO is set for one or more VOB in the VOB Set.

At step #1872 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1874 the number of interleaved VOB divisions ILV_DIV is extracted from the scenario data St7.

Step #1876 is the common VOB data setting routine, which is as described referring to the flow chart in FIG. 35. Further description thereof is thus omitted here.

The encode parameters of a system stream in which parental lock control is implemented are thus defined for a VOB Set with multi-scene selection control enabled as described above.

Figure 70:
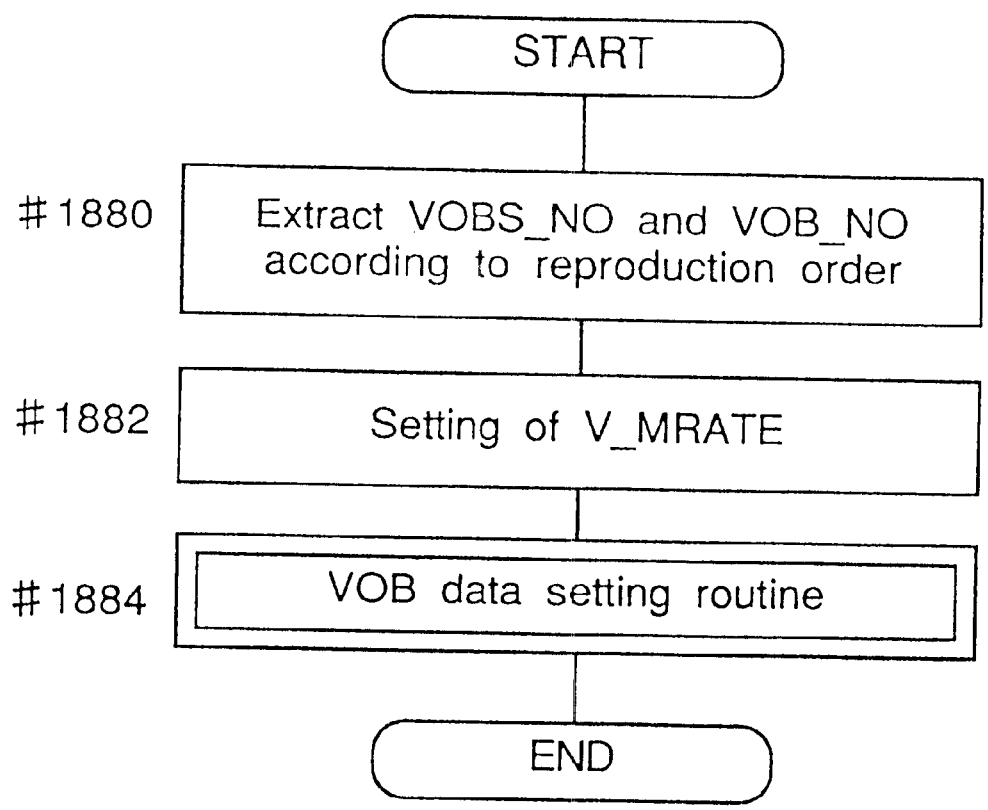
FIG. 70 is a flow chart showing the encode parameters generating operation for a system stream containing a single scene.

The process for generating the encode parameters for a system stream containing a single scene is described below with reference to FIG. 70. This stream is generated when step #900 in FIG. 34 returns NO, i.e., when VOB_Fp=0.

The following operation produces the encoding information tables shown in FIG. 27 and FIG. 28, and the encode parameters shown in FIG. 29.

At step #1880, the scenario reproduction sequence (path) contained in the scenario data St7 is extracted, the VOB Set number VOBS_NO is set, and the VOB number VOB_NO is set for one or more VOB in the VOB Set.

At step #1882 the maximum bit rate ILV_BR of the interleaved VOB is extracted from the scenario data St7, and the maximum video encode bit rate V_MRATE from the encode parameters is set based on the interleave flag VOB_Fi setting (=1).

Step #1884 is the common VOB data setting routine, which is as described referring to the flow chart in FIG. 35. Further description thereof is thus omitted here.

These flow charts for defining the encoding information table and encode parameters thus generate the parameters for DVD video, audio, and system stream encoding by the DVD formatter.

Flow Chart: Formatter

The operation of the subroutine executed by the DVD formatter shown as step #2300 in FIG. 34B is described next with reference to FIGS. 49, 59, 51, 52, and 53. This formatter subroutine generates the DVD multimedia bitstream.

The operation of the DVD encoder ECD 1100 according to the present invention is described with reference to the flow chart in FIG. 49. Note that those steps shown in FIG. 49 with a double line are subroutines.

At step #2310 the program chain information VTS_PGCI is set to the VTSI management table VTSI_MAT for the number of titles TITLE_NUM based on the number of titles TITLE_NUM in the VOB Set data stream.

At step #2312 it is determined whether multi-scene selection control is enabled based on the multi-scene flag VOB_Fp in the VOB Set data stream. If step #2312 returns NO, i.e., multi-scene control is not enabled, the procedure moves to step #2314.

At step #2314 the operation for coding a single scene (VOB) executed by the formatter 1100 of the authoring encoder EC shown in FIG. 25 is accomplished. This routine is described later.

If step #2312 returns YES, i.e., multi-scene control is enabled, the procedure moves to step #2316.

At step #2316 it is determined whether the information is to be interleaved or not based on the interleave flag VOB_Fi state in the VOB Set data stream. If step #2316 returns NO, i.e., the information is not to be interleaved, the procedure moves to step #2314. If step #2316 returns YES, i.e., the information is to be interleaved, the procedure moves to step #2318.

At step #2318 it is determined whether multi-angle control is to be implemented based on the multi-angle flag VOB_Fm in the VOB Set data stream. If step #2318 returns NO, the parental lock control routine in step #2320 is executed. If step #2318 returns YES, the procedure moves to step #2322.

Figure 52:
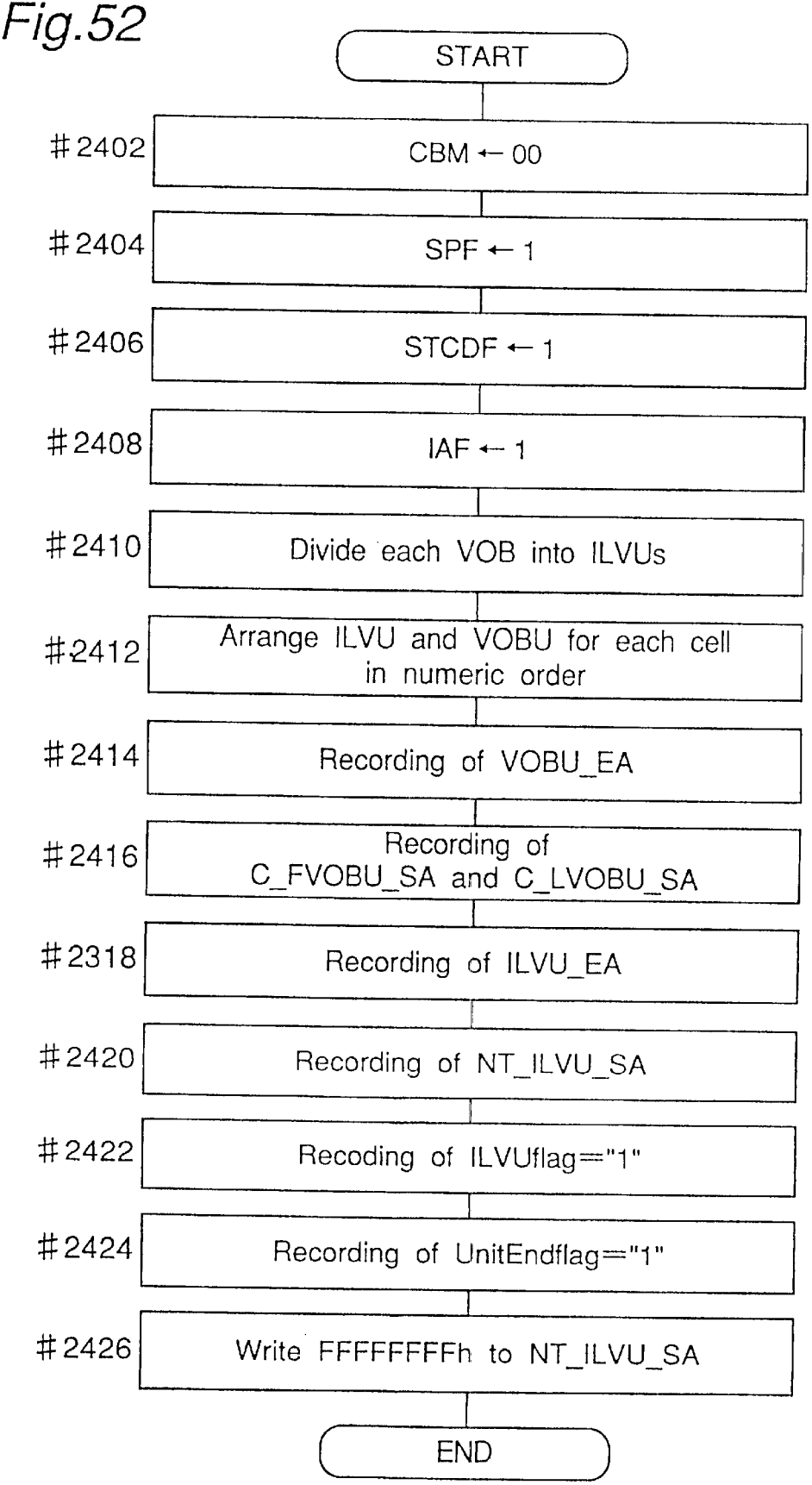
FIG. 52 is a flow chart showing details of the parental lock sub-routine of FIG. 49.

At step #2320 the operation for formatting the VOB Set for parental lock control is executed. This subroutine is shown in FIG. 52 and described below.

At step #2322 it is determined whether multi-angle seamless switching is required based on the multi-angle seamless switching flag VOB_FsV. If multi-angle switching is accomplished without seamless switching, i.e., with non-seamless switching and step #2322 returns NO, the procedure moves to step #2326.

The multi-angle non-seamless switching control routine executed in step #2326 by the formatter 1100 of the authoring encoder EC in FIG. 25 is described later with reference to FIG. 50.

If multi-angle switching is accomplished with seamless switching control, i.e., step #2322 returns YES, the procedure moves to step #2324.

The multi-angle seamless switching control routine executed in step #2324 by the formatter 1100 of the authoring encoder EC in FIG. 25 is described later with reference to FIG. 51.

The cell playback information (PCG information entries C_PBI) of the VTS information VTSI set as previously described is then recorded.

At step #2330 it is determined whether all VOB Sets declared by the VOB Set number VOBS_NUM have been processed by the formatter. If NO, control loops back to step #2312, and the process runs again. If YES, all sets have been formatted, the procedure terminates.

Figure 49:
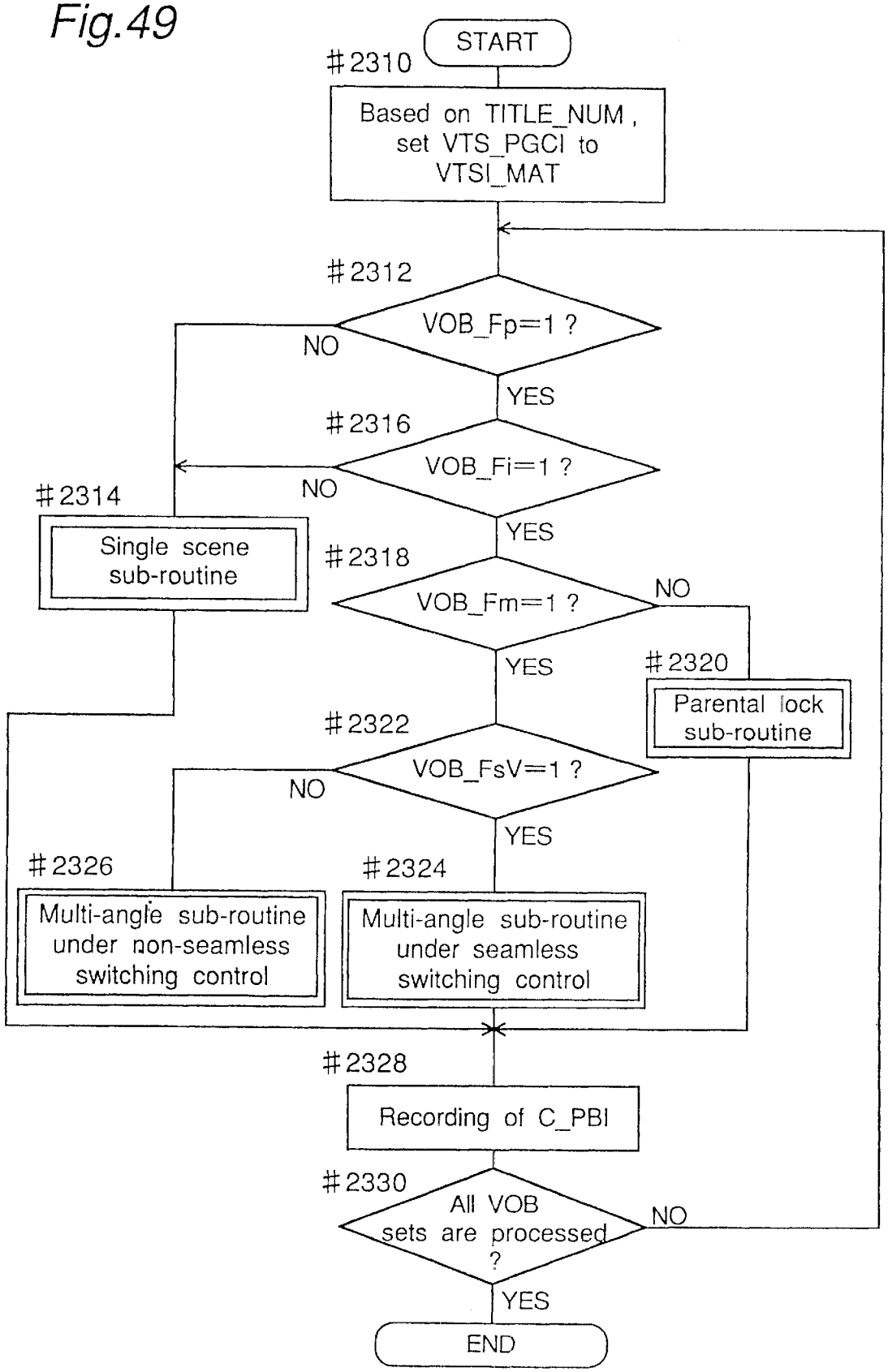
FIG. 49 is a flow chart showing the operation of the DVD encoder of FIG. 26.
Figure 50:
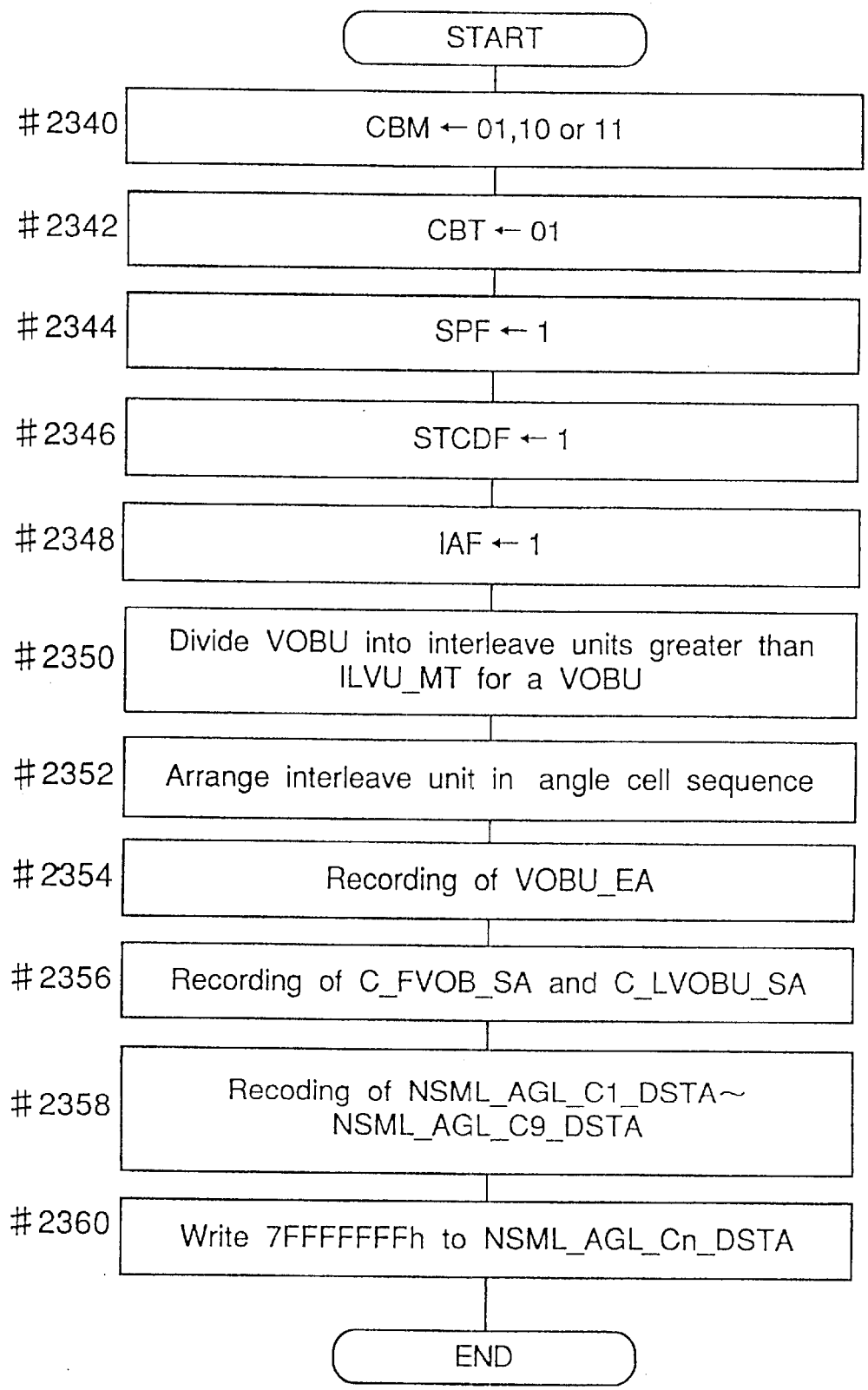
FIG. 50 is a flow chart showing details of the multi-angle non-seamless switching control routine of FIG. 49.

Referring to FIG. 50, the multi-angle non-seamless switching control routine executed in step #2326 when step #2322, FIG. 49, returns NO is described. This routine defines the interleaved arrangement of the multimedia bitstream MBS, the content of the cell playback information (C_PBI#i) shown in FIG. 16, and the information stored to the navigation pack NV shown in FIG. 20, in the generated DVD multimedia bitstream MBS.

At step #2340 based on the multi-angle flag VOB_Fm setting (=1) declaring whether multi-angle control is applied in the multi-scene period, the cell block mode CBM (FIG. 16) of the cell playback information blocks C_PBI #i containing the VOB control information for each scene is declared according to the position of the angle data. For example, the cell block mode CBM of the MA1 cell (FIG. 23) is declared as 01b to indicate the beginning of the cell block, the CBM of MA2 is declared as lob to indicate a cell between the first and last cells in the block, and the CBM of MA3 is declared as 11b to indicate the end of the cell block.

At step #2342 based on the multi-angle flag VOB_Fm setting (=1) declaring whether multi-angle control is applied in the multi-scene period, the cell block type CBT (FIG. 16) of the cell playback information blocks C_PBI #i containing the VOB control information for each scene is declared as 01b to indicate an "angle."

At step #2344 the seamless playback flag SPF (FIG. 16) is set to 1 in the cell playback information blocks C_PBI #i containing the VOB control information for each scene based on the preceding VOB seamless connection flag VOB_Fsb state, which is set to 1 to indicate a seamless connection.

At step #2346 the STC resetting flag STCDF is set to 1 in the cell playback information blocks C_PBI #i containing the VOB control information for each scene based on the preceding VOB seamless connection flag VOB_Fsb state, which is set to 1 to indicate a seamless connection.

At step #2348 the interleaved allocation flag IAF (FIG. 16) is set to 1 in the cell playback information blocks C_PBI #i containing the VOB control information for each scene based on the multi-angle seamless switching flag VOB_FsV state, which is set to 1 to indicate interleaving is required.

At step #2350 the location of the navigation pack NV (relative sector number from the VOB beginning) is detected from the title editing unit (VOB below) obtained from the system encoder 900 in FIG. 25, the navigation pack NV is detected based on the-minimum interleaved unit presentation time ILVU_MT information (a formatter parameter obtained in step #1816, FIG. 35), the location of the VOBU expressed as the number of sectors from the VOB beginning, for example, is thus obtained, and the title editing unit VOB is divided into interleave units using VOBU units.

For example, if in this example the minimum interleaved unit presentation time ILVU_MT is 2 sec and the presentation time of one VOBU is 0.5 sec., then the VOB is divided into interleave units of 4 VOBU each. Note that this allocation operation is applied to the VOB constituting each multi-scene data unit.

At step #2352 the interleave units of each VOB obtained from step #2350 are arranged in the cell block mode CBM sequence (cell block beginning, middle, and end cells) written as the VOB control information for each scene in step #2340 to form the interleaved blocks as shown in FIG. 71 or 72. The interleaved blocks are then added to the VTS title VOBS (VTSTT_VOBS). Using the cell block mode CBM declarations above, for example, the angle data MA1, MA2, and MA3 (FIG. 23) are arranged in that sequence.

At step #2354 the relative sector number from the VOBU start is written to the VOB end pack address VOBU_EA (FIG. 20) in the navigation pack NV of each VOBU based on the VOBU position information obtained in step #2350.

At step #2356 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_VOBS) data obtained in step #2352.

The angle #i VOBU start address NSML_AGL_C1_DSTA NSML_AGL_C9_DSTA of the non-seamless angle information NSML_AGLI (FIG. 20) in the navigation pack NV of each VOBU is written at step #2358. This address is expressed as the relative sector number inside the data of the interleaved blocks formed in step #2352, and declares the address information (FIG. 50) of the navigation pack NV contained in the VOBU of all angle scenes near the presentation start time of the VOBU being processed.

At step #2360 "7FFFFFFFh" is written to the angle #i VOBU start address NSML_AGL_C1_DSTA–NSML_AGL_C9_DSTA of the non-seamless angle information NSML_AGLI (FIG. 20) in the navigation pack NV of each VOBU if the VOBU being processed is the last VOBU of each scene in the multi-scene period.

This routine thus formats the interleaved blocks for multi-angle non-seamless switching control in the multi-scene period, and formats the cell control information as the reproduction control information for those multiple scenes.

Figure 51:
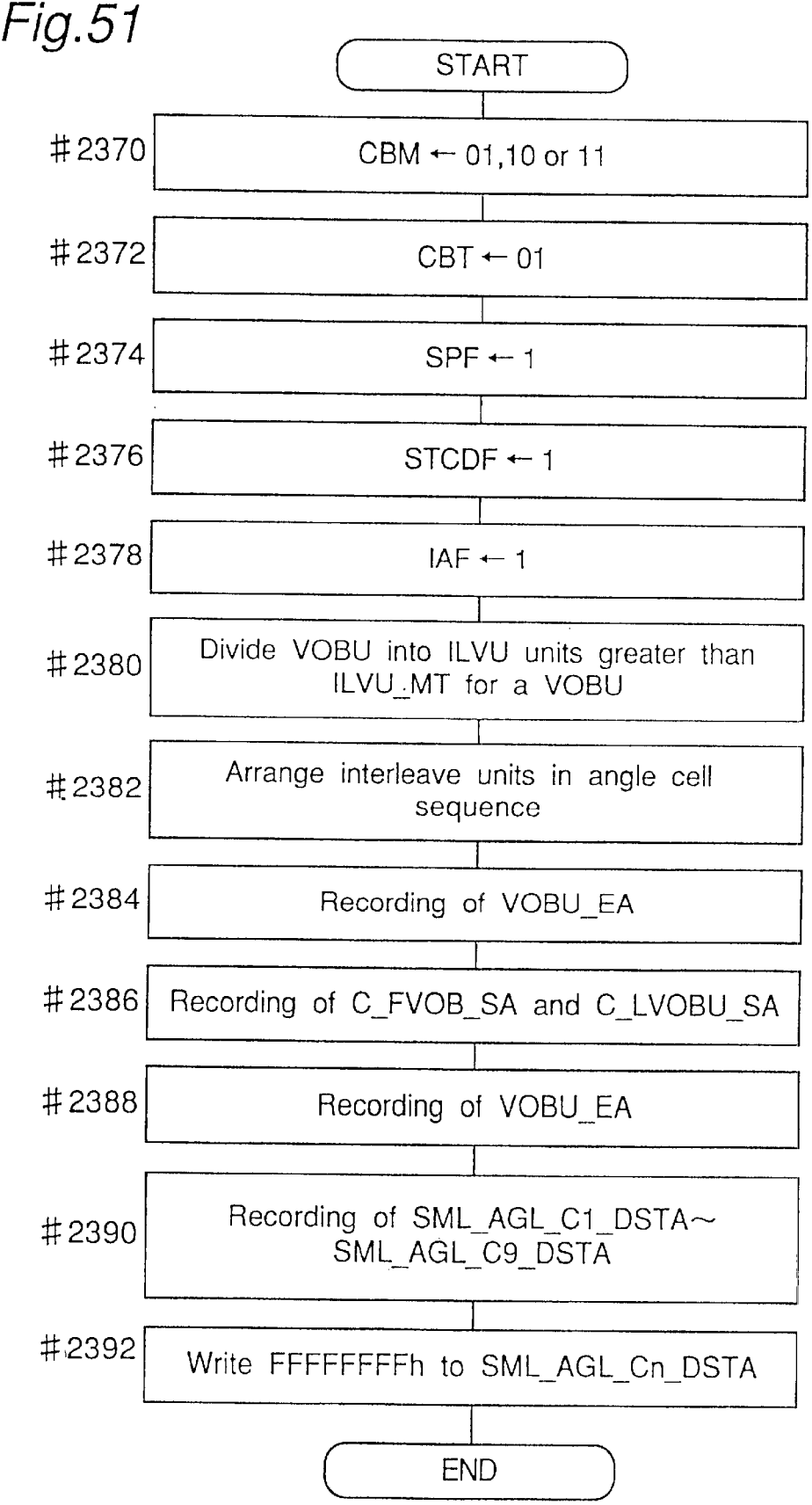
FIG. 51 is a flow chart showing details of the multi-angle seamless switching control routine of FIG. 49.

Referring to FIG. 51, the multi-angle seamless switching control routine executed in step #2324 when step #2322, FIG. 49, returns YES is described. This routine defines the interleaved arrangement of the multimedia bitstream MBS, the content of the cell playback information (C_PBI#i) shown in FIG. 16, and the information stored to the navigation pack NV shown in FIG. 20, in the generated DVD multimedia bitstream MBS.

At step #2370 based on the multi-angle flag VOB_Fm setting (=1) declaring whether multi-angle control is applied in the multi-scene period, the cell block mode CBM (FIG. 16) of the cell playback information blocks C_PBI #i containing the VOB control information for each scene is declared according to the position of the angle data. For example, the cell block mode CBM of the MA1 cell (FIG. 23) is declared as 01b to indicate the beginning of the cell block, the CBM of MA2 is declared as l0b to indicate a cell between the first and last cells in the block, and the CBM of MA3 is declared as 11b to indicate the end of the cell block.

At step #2372 based on the multi-angle flag VOB_Fm setting (=1) declaring whether multi-angle control is applied in the multi-scene period, the cell block type CBT (FIG. 16) of the cell playback information blocks C_PBI #i containing the VOB control information for each scene is declared as 01b to indicate an "angle."

At step #2374 the seamless playback flag SPF (FIG. 16) is set to 1 in the cell playback information blocks C_PBI #i containing the VOB control information for each scene based on the preceding VOB seamless connection flag VOB_Fsb state, which is set to 1 to indicate a seamless connection.

At step #2376 the STC resetting flag STCDF is set to 1 in the cell playback information blocks C_PBI #i containing the VOB control information for each scene based on the preceding VOB seamless connection flag VOB_Fsb state, which is set to 1 to indicate a seamless connection.

At step #2378 the interleaved allocation flag IAF (FIG. 16) is set to 1 in the cell playback information blocks C_PBI #i containing the VOB control information for each scene based on the multi-angle seamless switching flag VOB_FsV state, which is set to 1 to indicate interleaving is required.

At step #2380 the location of the navigation pack NV (relative sector number from the VOB beginning) is detected from the title editing unit (VOB below) obtained from the system encoder 900 in FIG. 25, the navigation pack NV is detected based on the minimum interleaved unit presentation time ILVU_MT information (a formatter parameter obtained in step #1854, FIG. 37), the location of the VOBU expressed as the number of sectors from the VOB beginning, for example, is thus obtained, and the title editing unit VOB is divided into interleave units using VOBU units.

For example, if in this example the minimum interleaved unit presentation time ILVU_MT is 2 sec and the presentation time of one VOBU is 0.5 sec., then the VOB is divided into interleave units of 4 VOBU each. Note that this allocation operation is applied to the VOB constituting each multi-scene data unit.

At step #2382 the interleave units of each VOB obtained from step #2380 are arranged in the cell block mode CBM sequence (cell block beginning, middle, and end cells) written as the VOB control information for each scene in step #2360 to form the interleaved blocks as shown in FIG. 71 or 72. The interleaved blocks are then added to the VTS title VOBS (VTSTT_VOBS). Using the cell block mode CBM declarations above, for example, the angle data MA1, MA2, and MA3 (FIG. 23) are arranged in that sequence.

At step #2384 the relative sector number from the VOBU start is written to the VOB end pack address VOBU_EA (FIG. 20) in the navigation pack NV of each VOBU based on the VOBU position information obtained in step #2360.

At step #2386 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_VOBS) data obtained in step #2382.

At step #2388 the relative sector number from the VOBU start is written to the VOB end pack address VOBU_EA (FIG. 20) in the navigation pack NV of each VOBU based on the interleave unit data obtained in step #2370.

The angle #i VOBU start address SML_AGL_C1_DSTA_SML_AGL_C9_DSTA of the seamless angle information SML_AGLI (FIG. 20) in the navigation pack NV of each VOBU is written at step #2390. This address is expressed as the relative sector number inside the data of the interleaved blocks formed in step #2382, and declares the address information of the navigation pack NV contained in the VOBU of all angle scenes with a start time contiguous to the reproduction end time of the VOBU being processed.

At step #2392 "7FFFFFFFh" is written to the angle #i VOBU start address SML_AGL_C1_DSTA–SML_AGL_C9_DSTA of the seamless angle information SML_AGLI (FIG. 20) in the navigation pack NV of the VOBU contained in the interleaved unit if the interleave unit arranged in step #2382 is the last interleave unit of each scene in the multi-scene period.

This routine thus formats the interleaved blocks for multi-angle seamless switching control in the multi-scene period, and formats the cell control information as the reproduction control information for those multiple scenes.

The parental lock subroutine (step #2320, FIG. 49) executed when step #2318 in FIG. 49 returns NO, i.e.; when it is determined that parental lock control is implemented and not multi-angle control, is described next with reference to FIG. 52.

The parental lock subroutine described below writes the interleave unit arrangement of the multimedia bitstream, the content of the PGC information entries C_PBI #i (cell playback information) shown in FIG. 16, and the navigation pack NV information shown in FIG. 20, to the generated DVD multimedia bitstream.

At step #2402 a value 00 is written to the cell block mode CBM (FIG. 16) of the cell playback information blocks C_PBI #i containing the VOB control information for each scene based on the multi-angle flag VOB_Fm state, which is set to 0 to indicate that multi-angle control is not enabled in the multi-scene period.

At step #2404 the seamless playback flag SPF (FIG. 16) is set to 1 in the cell playback information blocks C_PBI #i containing the VOB control information for each scene based on the preceding VOB seamless connection flag VOB_Fsb state, which is set to 1 to indicate a seamless connection.

At step #2406 the STC resetting flag STCDF is set to 1 in the cell playback information blocks C_PBI #i containing the VOB control information for each scene based on the preceding VOB seamless connection flag VOB_Fsb state, which is set to 1 to indicate a seamless connection.

At step #2408 the interleaved allocation flag IAF (FIG. 16) is set to 1 in the cell playback information blocks C_PBI #i containing the VOB control information for each scene based on the multi-angle seamless switching flag VOB_FsV state, which is set to 1 to indicate interleaving is required.

At step #2410 the navigation pack NV position information (the relative sector number from the VOB start) is detected from the title editing unit (VOB) obtained from the system encoder 900 (FIG. 25). The navigation pack NV is then detected based on the number of interleaved VOB divisions ILV_DIV, a formatter parameter obtained in step #1874 in FIG. 38, to obtain the VOBU position information (number of sectors from the VOB start), and divide each VOB into the specified number of interleave units in VOBU units.

At step #2412 the interleave units obtained in step #2410 are then interleaved. For example, the interleave units are arranged in ascending VOB number sequence to create the interleaved blocks as shown in FIG. 71 or 72, and the interleaved blocks are added to the VTS title VOBS (VTSTT_VOBS).

At step #2414 the relative sector number from the VOBU start is written to the VOB end pack address VOBU_EA (FIG. 20) in the navigation pack NV of each VOBU based on the VOBU position information obtained in step #2186.

At step #2416 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_VOBS) data obtained in step #2412.

At step #2418 the relative sector number to the last interleave unit pack is written to the ILVU end pack address ILVU_EA in the navigation pack NV of the VOBU forming the interleaved units based on the interleaved unit data obtained from step #2412.

At step #2420, the relative sector number in the interleaved block data formed in step #2412 is written to the next-ILVU start address NT_ILVU_SA as the position information of the next ILVU in the navigation packs NV of the VOBU contained in the interleaved unit ILVU.

At step #2422 the interleaved unit flag ILVU flag is set to 1 in the navigation packs NV of the VOBU contained in the interleaved unit ILVU.

At step #2424, the Unit END flag of the navigation pack NV in the last VOBU of the interleaved unit ILVU is set to 1.

At step #2426 "FFFFFFFFh" is written to the next-ILVU start address NT_ILVU_SA of the navigation pack NV of the VOBU in the last interleaved unit ILVU of each VOB.

The operation described above thus formats the interleaved blocks to enable parental lock control in the multi-scene periods, and formats the control information in the cells, i.e., the cell playback control information for the multi-scene periods.

Figure 53:
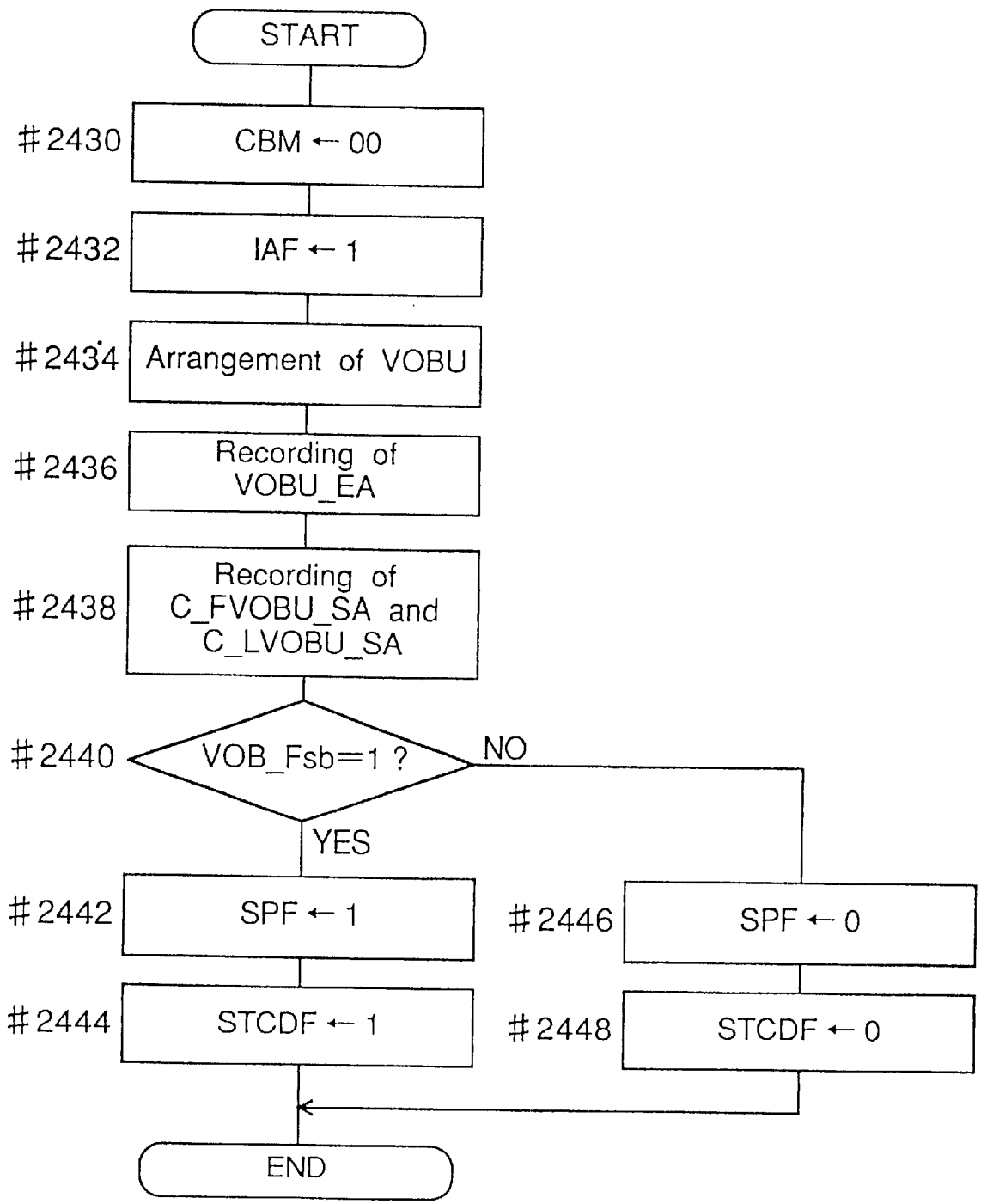
FIG. 53 is a flow chart showing details of the single scene subroutine of FIG. 49, FIGS. 54 and 55 are graphs showing decoding information table produced by the decoding system controller of FIG. 26.

The single scene subroutine executed as step #2314 in FIG. 49 when steps #2312 or #2316 return NO, i.e. when the scene is determined to be a single scene and not a multi-scene period, is described next using FIG. 53.

The single scene subroutine described below writes the interleave unit arrangement of the multimedia bitstream, the content of the PGC information entries C_PBI #i (cell playback information) shown in FIG. 16, and the navigation pack NV information shown in FIG. 20, to the generated DVD multimedia bitstream.

At step #2430 a value 00 indicating a "non-cell block", i.e., that there is only one cell in the functional block, is written to the cell block mode CBM (FIG. 16) of the cell playback information blocks C_PBI #i containing the VOB control information for each scene based on the multi-scene flag VOB_Fp state, which is set to 0 to indicate that the scene is a single scene and not part of a multi-scene period.

At step #2432 the interleaved allocation flag IAF (FIG. 16) is set to 0 in the cell playback information blocks C_PBI #i containing the VOB control information for each scene based on the multi-angle seamless switching flag VOB_FsV state, which is set to 0 to indicate interleaving is not required.

At step #2434 the navigation pack NV position information (the relative sector number from the VOB start) is detected from the title editing unit (VOB) obtained from the system encoder 900 (FIG. 25), placed in the VOBU unit, and added to the VTS title VOBS (VTSTT_VOBS), the video and other stream data of the multimedia bitstream.

At step #2436 the relative sector number from the VOBU start is written to the VOB end pack address VOBU_EA (FIG. 20) in the navigation pack NV of each VOBU based on the VOBU position information obtained in step #2434.

At step #2438 the first cell VOBU start address C_FVOBU_SA and the last cell VOBU start address C_LVOBU_SA expressed as the number of sectors from the beginning of and the end of, respectively, the VTS title VOBS (VTSTT_VOBS) of the value written as the addresses of the navigation packs NV of the first and last VOBU in cell based on the VTS title VOBS (VTSTT_VOBS) data obtained in step #2434.

At step #2440 the state determined as a result of step #300 or #600 in FIG. 34, i.e., whether preceding VOB seamless connection flag VOB_Fsb is set to 1 indicating a seamless connection to the preceding or following scenes, is evaluated. If step #2440 returns YES, the procedure moves to step #2442.

At step #2442 the seamless playback flag SPF (FIG. 16) is set to 1 in the cell playback information blocks C_PBI #i containing the VOB control information for each scene based on the preceding VOB seamless connection flag VOB_Fsb state, which is set to 1 to indicate a seamless connection.

At step #2444 the STC resetting flag STCDF is set to 1 in the cell playback information blocks C_PBI #i containing the VOB control information for each scene based on the preceding VOB seamless connection flag VOB_Fsb state, which is set to 1.

If step #2440 returns NO, i.e., there is not a seamless connection to the preceding scene, the procedure moves to step #2446.

At step #2446 the seamless playback flag SPF (FIG. 16) is set to 0 in the cell playback information blocks C_PBI #i containing the VOB control information for each scene based on the preceding VOB seamless connection flag VOB_Fsb state, which is set to 0 to indicate a non-seamless connection.

At step #2448 the STC resetting flag STCDF is set to 0 in the cell playback information blocks C_PBI #i containing the VOB control information for each scene based on the preceding VOB seamless connection flag VOB_Fsb state, which is set to 0.

The operation described above thus formats a multimedia bitstream for a single scene period, and records the control information in the cells, i.e., the cell playback control information (C_PBI #i, FIG. 16), and the information in the navigation pack NV (FIG. 20), to the produced DVD multimedia bitstream.

Decoder Flow Charts

A. Disk-to-stream Buffer Transfer Flow:

The decoding information table produced by the decoding system controller 2300 based on the scenario selection data St51 is described below referring to FIGS. 54 and 55. The decoding information table comprises the decoding system table shown in FIG. 54, and the decoding table shown in FIG. 55.

As shown in FIG. 54, the decoding system table comprises a scenario information register and a cell information register. The scenario information register records the title number and other scenario reproduction information selected by the user and extracted from the scenario selection data St51. The cell information register extracts and records the information required to reproduce the cells constituting the program chain PGC based on the user-defined scenario information extracted into the scenario information register.

More specifically, the scenario information register contains plural sub-registers, i.e., the angle number ANGLE_

NO_reg, VTS number VTS_NO_reg, PGC number VTS_PGCI_NO_reg, audio ID AUDIO_ID_reg, sub-picture ID SP_ID_reg, and the system clock reference SCR buffer SCR_buffer.

The angle number ANGLE_NO_reg stores which angle is reproduced when there are multiple angles in the reproduction program chain PGC.

The VTS number VTS_NO_reg records the number of the next VTS reproduced from among the plural VTS on the disk.

The PGC number VTS_PGCI_NO_reg records which of the plural program chains PGC present in the video title set VTS is to be reproduced for parental lock control or other applications.

The audio ID AUDIO_ID_reg records which of the plural audio streams in the VTS are to be reproduced.

The sub-picture ID SP_ID_reg records which of the plural sub-picture streams is to be reproduced when there are plural sub-picture streams in the VTS.

The system clock reference SCR buffer SCR_buffer is the buffer for temporarily storing the system clock reference SCR recorded to the pack header as shown in FIG. 19. As described using FIG. 26, this temporarily stored system clock reference SCR is output to the decoding system controller 2300 as the bitstream control data St63.

The cell information register contains the following sub-registers: the cell block mode CBM_reg, cell block type CBT_reg, seamless reproduction flag SPF_reg, interleaved allocation flag IAF_reg, STC resetting flag STCDF_reg, seamless angle change flag SACF_reg, first cell VOBU start address C_FVOBU_SA_reg, and last cell VOBU start address C_LVOBU_SA_reg.

The cell block mode CBM_reg stores a value indicating whether plural cells constitute one functional block. If there are not plural cells in one functional block, CBM_reg stores N_BLOCK. If plural cells constitute one functional block, the value F_CELL is stored as the CBM_reg value of the first cell in the block, L_CELL is stored as the CBM_reg value of the last cell in the block, and BLOCK is stored as the CBM_reg of value all cells between the first and last cells in the block.

The cell block type CBT_reg stores a value defining the type of the block indicated by the cell block mode CBM_reg. If the cell block is a multi-angle block, A_BLOCK is stored; if not, N_BLOCK is stored.

The seamless reproduction flag SPF_reg stores a value defining whether that cell is seamless connected with the cell or cell block reproduced therebefore. If a seamless connection is specified, SML is stored; if a seamless connection is not specified, NSML is stored.

The interleaved allocation flag IAF reg stores a value identifying whether the cell exists in a contiguous or interleaved block. If the cell is part of a an interleaved block, ILVB is stored; otherwise N_ILVB is stored.

The STC resetting flag STCDF_reg defines whether the system time clock STC used for synchronization must be reset when the cell is reproduced; when resetting the system time clock STC is necessary, STC_RESET is stored; if resetting is not necessary, STC_NRESET is stored.

The seamless angle change flag SACF reg stores a value indicating whether a cell in a multi-angle period should be connected seamlessly at an angle change. If the angle change is seamless, the seamless angle change flag SACF is set to SML; otherwise it is set to NSML.

The first cell VOBU start address C_FVOBU_SA_reg stores the VOBU start address of the first cell in a block. The value of this address is expressed as the distance from the logic sector of the first cell in the VTS title VOBS (VTSTT_VOBS) as measured by and expressed (stored) as the number of sectors.

The last cell VOBU start address C_LVOBU_SA_reg stores the VOBU start address of the last cell in the block. The value of this address is also expressed as the distance from the logic sector of the first cell in the VTS title VOBS (VTSTT_VOBS) measured by and expressed (stored) as the number of sectors.

The decoding table shown in FIG. 55 is described below. As shown in FIG. 55, the decoding table comprises the following registers: information registers for non-seamless multi-angle control, information registers for seamless multi-angle control, a VOBU information register, and information registers for seamless reproduction.

The information registers for non-seamless multi-angle control comprise sub-registers NSML_AGL_C1_DSTA_reg–NSML_AGL_C9_DSTA_reg.

NSML_AGL_C1_DSTA reg–NSML_AGL_C9_DSTA_reg record the NMSL_AGL_C1_DSTA–NMSL_AGL_C9_DSTA values in the PCI packet shown in FIG. 20.

The information registers for seamless multi-angle control comprise sub-registers SML_AGL_C1_DSTA_reg_SML_AGL_C9_DSTA_reg.

SML_AGL_C1_DSTA_reg–SML_AGL_C9_DSTA reg record the SML_AGL_C1_DSTA–SML_AGL_C9_DSTA values in the DSI packet shown in FIG. 20.

The VOBU information register stores the end pack address VOBU_EA in the DSI packet shown in FIG. 20.

The information registers for seamless reproduction comprise the following sub-registers: an interleaved unit flag ILVU_flag_reg, Unit END flag UNIT_END_flag_reg, Interleaved Unit End Address ILVU_EA_reg, Next Interleaved Unit Start Address NT_ILVU_SA_reg, the presentation start time of the first video frame in the VOB (Initial Video Frame Presentation Start Time) VOB_V_SPTM_reg, the presentation end time of the last video frame in the VOB (Final Video Frame Presentation Termination Time) VOB_V_EPTM_reg, audio reproduction stopping time 1 VOB_A_STP_PTM1_reg, audio reproduction stopping time 2 VOB_A_STP_PTM2_reg, audio reproduction stopping period 1 VOB_A_GAP_LEN1_reg, and audio reproduction stopping period 2 VOB_A_GAP_LEN2_reg.

The interleaved unit flag ILVU_flag_reg stores the value indicating whether the video object unit VOBU is in an interleaved block, and stores ILVU if it is, and N_ILVU if not.

The Unit END flag UNIT_END_flag_reg stores the value indicating whether the video object unit VOBU is the last VOBU in the interleaved unit ILVU. Because the interleaved unit ILVU is the data unit for continuous reading, the UNIT_END_flag_reg stores END if the VOBU currently being read is the last VOBU in the interleaved unit ILVU, and otherwise stores N_END.

The Interleaved Unit End Address ILVU_EA_reg stores the address of the last pack in the ILVU to which the VOBU belongs if the VOBU is in an interleaved block. This address is expressed as the number of sectors from the navigation pack NV of that VOBU.

The Next Interleaved Unit Start Address NT_ILVU_SA_reg stores the start address of the next interleaved unit ILVU if the VOBU is in an interleaved block. This address is also expressed as the number of sectors from the navigation pack NV of that VOBU.

The Initial Video Frame Presentation Start Time register VOB_V_SPTM_reg stores the time at which presentation of the first video frame in the VOB starts.

The Final Video Frame Presentation Termination Time register VOB_V_EPTM_reg stores the time at which presentation of the last video frame in the VOB ends.

The audio reproduction stopping time 1 VOB_A_STP_PTM1 reg stores the time at which the audio is to be paused to enable resynchronization, and the audio reproduction stopping period 1 VOB_A_GAP_LEN1 reg stores the length of this pause period.

The audio reproduction stopping time 2 VOB_A_STP_PTM2_reg and audio reproduction stopping period 2 VOB_A_GAP_LEN2_reg store the same values.

Figure 56:
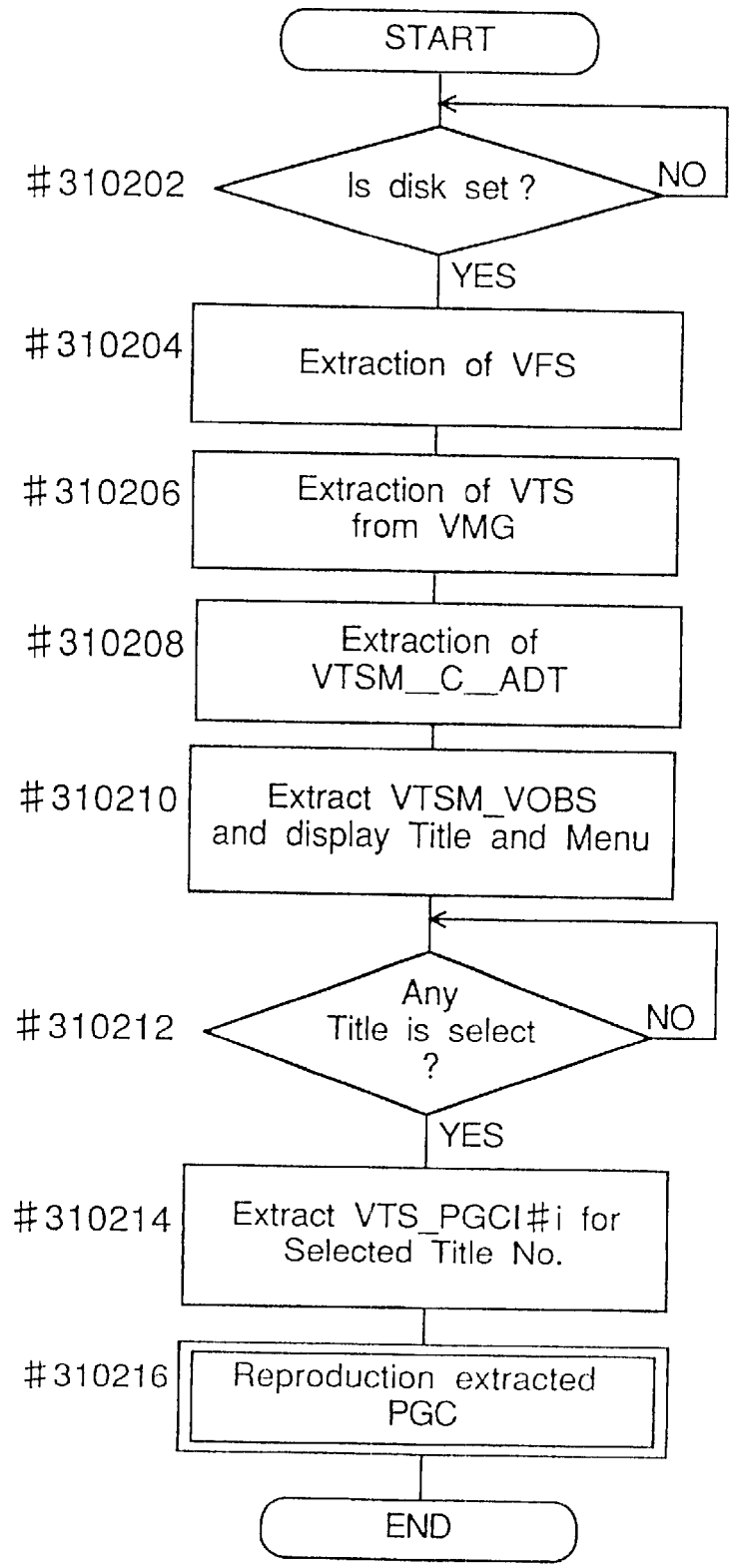
FIG. 56 is a flow chart showing the operation of the DVD decoder DCD of FIG. 26.

The operation of the DVD decoder DCD according to the present invention as shown in FIG. 26 is described next below with reference to the flow chart in FIG. 56.

At step #310202 it is first determined whether a disk has been inserted. If it has, the procedure moves to step #310204.

At step #310204, the volume file structure VFS (FIG. 21) is read, and the procedure moves to step #310206.

At step #310206, the video manager VMG (FIG. 21) is read and the video title set VTS to be reproduced is extracted. The procedure then moves to step #310208.

At step #310208, the video title set menu address information VTSM_C_ADT is extracted from the VTS information VTSI, and the procedure moves to step #310210.

At step #310210 the video title set menu VTSM VOBS is read from the disk based on the video title set menu address information VTSM_C_ADT, and the title selection menu is presented.

The user is thus able to select the desired title from this menu in step #310212. If the titles include both contiguous titles with no user-selectable content, and titles containing audio numbers, sub-picture numbers, or multi-angle scene content, the user must also enter the desired angle number. Once the user selection is completed, the procedure moves to step #310214.

At step #310214, the VTS_PGCI #i program chain (PGC) data block corresponding to the title number selected by the user is extracted from the VTSPGC information table VTS_PGCIT, and the procedure moves to step #310216.

Reproduction of the program chain PGC then begins at step #310216. When program chain PGC reproduction is finished, the decoding process ends. If a separate title is thereafter to be reproduced as determined by monitoring key entry to the scenario selector, the title menu is presented again (step #310210).

Program chain reproduction in step #310216 above is described in further detail below referring to FIG. 57. The program chain PGC reproduction routine consists of steps #31030, #31032, #31034, and #31035 as shown.

At step. #31030 the decoding system table shown in FIG. 54 is defined. The angle number ANGLE_NO_reg, VTS number VTS_NO_reg, PGC number VTS_PGCI_NO_reg, audio ID AUDIO_ID_reg, and sub-picture ID SP_ID_reg, are set according to the selections made by the user using the scenario selector 2100.

Once the PGC to be reproduced is determined, the corresponding cell information (PGC information entries C_PBI #j) is extracted and the cell information register is defined. The sub-registers therein that are defined are the cell block mode CBM_reg, cell block type CBT_reg, seamless reproduction flag SPF_reg, interleaved allocation flag IAF_reg, STC resetting flag STCDF, seamless angle change flag SACF_reg, first cell VOBU start address C_FVOBU_SA_reg, and last cell VOBU start address C_LVOBU_SA_reg.

Once the decoding system table is defined, the process transferring data to the stream buffer (step #31032) and the process decoding the data in the stream buffer (step #31034) are activated in parallel.

The process transferring data to the stream buffer (step #31032) is the process of transferring data from the recording medium M to the stream buffer 2400. This is, therefore, the processing of reading the required data from the recording medium M and inputting the data to the stream buffer 2400 according to the user-selected title information and the playback control information (navigation packs NV) written in the stream.

The routine shown as step #31034 is the process for decoding the data stored to the stream buffer 2400 (FIG. 26), and outputting the decoded data to the video data output terminal 3600 and audio data output terminal 3700. Thus, is the process for decoding and reproducing the data stored to the stream buffer 2400.

Note that step #31032 and step #31034 are executed in parallel.

The processing unit of step #31032 is the cell, and as processing one cell is completed, it is determined in step #31035 whether the complete program chain PGC has been processed. If processing the complete program chain PGC is not completed, the decoding system table is defined for the next cell in step #31030. This loop from step #31030 through step #31035 is repeated until the entire program chain PGC is processed.

The stream buffer data transfer process of step #31032 is described in further detail below referring to FIG. 62. The stream buffer data transfer process (step #31032) comprises steps #31040, #31042, #31044, #31046, and #31048 shown in the figure.

At step #31040 it is determined whether the cell is a multi-angle cell. If not, the procedure moves to step #30144.

At step #31044 the non-multi-angle cell decoding process is executed.

However, if step #31040 returns YES because the cell is a multi-angle cell, the procedure moves to step #31042 where the seamless angle change flag SACF is evaluated to determine whether seamless angle reproduction is specified.

If seamless angle reproduction is specified, the seamless multi-angle decoding process is executed in step #31046. If seamless angle reproduction is not specified, the non-seamless multi-angle decoding process is executed in step #31048.

The non-multi-angle cell decoding process (step #31044, FIG. 62) is described further below with reference to FIG. 63. Note that the non-multi-angle cell decoding process (step #31044) comprises the steps #31050, #31052, and #31054.

The first step #31050 evaluates the interleaved allocation flag IAF_reg to determine whether the cell is in an interleaved block. If it is, the non-multi-angle interleaved block process is executed in step #31052.

The non-multi-angle interleaved block process (step #31052) processes scene branching and connection where seamless connections are specified in, for example, a multi-scene period.

However, if the cell is not in an interleaved block, the non-multi-angle contiguous block process is executed in step #31054. Note that the step #31054 process is the process executed when there is no scene branching or connection.

The non-multi-angle interleaved block process (step #31052, FIG. 63) is described further below with reference to FIG. 64.

At step #31060 the reading head 2006 is jumped to the first cell VOBU start address C_FVOBU_SA read from the C_FVOBU_SA_reg register.

More specifically, the address data C_FVOBU_SA_reg stored in the decoding system controller 2300 (FIG. 26) is input as bitstream reproduction control signal St53 to the reproduction controller 2002. The reproduction controller 2002 thus controls the recording media drive unit 2004 and signal processor 2008 to move the reading head 2006 to the specified address, data is read, error correction code ECC and other signal processing is accomplished by the signal processor 2008, and the cell start VOBU data is output as the reproduced bitstream St61 to the stream buffer 2400. The procedure then moves to step #31062.

At step #31062 the DSI packet data in the navigation pack NV (FIG. 20) is extracted in the stream buffer 2400, the decoding table is defined, and the procedure moves to step #31064. The registers set in the decoding table are the ILVU_EA_reg, NT_ILVU_SA_reg, VOB_V_SPTM_reg, VOB_V_EPTM_reg, VOB_A_STP_PTM1-reg, VOB_A_STP_PTM2_reg, VOB_A_GAP_LEN1_reg, and VOB_A_GAP_LEN2_reg.

At step #31064 the data from the first cell VOBU start address C_FVOBU_SA_reg to the ILVU end pack address ILVU_EA_reg, i.e., the data for one interleaved unit ILVU, is transferred to the stream buffer 2400. The procedure then moves to step #31066.

More specifically, the address data ILVU_EA_reg stored in the decoding system controller 2300 (FIG. 26) is supplied to the reproduction controller 2002. The reproduction controller 2002 thus controls the recording media drive unit 2004 and signal processor 2008 to read the data to the ILVU_EA_reg address, and after error correction code ECC and other signal processing is accomplished by the signal processor 2008, the data for the first ILVU in the cell is output as the reproduced bitstream St61 to the stream buffer 2400. It is thus possible to output the data for one contiguous interleaved unit ILVU on the recording medium M to the stream buffer 2400.

At step #31066 it is determined whether all interleaved units in the interleaved block have been read and transferred. If the interleaved unit ILVU processed is the last ILVU in the interleaved block, "0x7FFFFFFF" indicating termination is set to the next-ILVU start address NT_ILVU_SA_reg as the next read address. If all interleaved units in the interleaved block have thus been processed, the procedure moves to step #31068.

At step #31068 the reading head 2006 is again jumped to the address NT_ILVU_SA_reg of the next interleave unit to be reproduced, and the procedure loops back to step #31062. Note that this jump is also accomplished as described above, and the loop from step #31062 to step #31068 is repeated.

However, if step #31066 returns YES, i.e., all interleaved unit ILVU in the interleaved block have been transferred, step #31052 terminates.

The non-multi-angle interleaved block process (step #31052) thus transfers the data of one cell to the stream buffer 2400.

Figure 63:
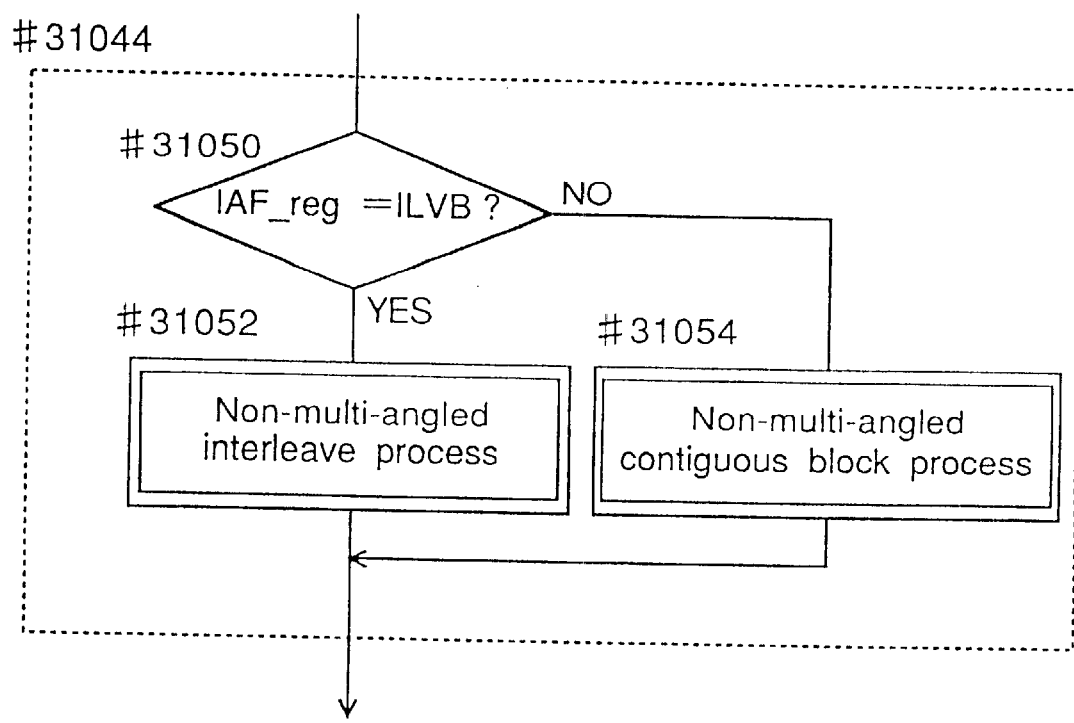
FIG. 63 is a flow chart showing details of the non multi-angle decoding process of FIG. 62.
Figure 64:
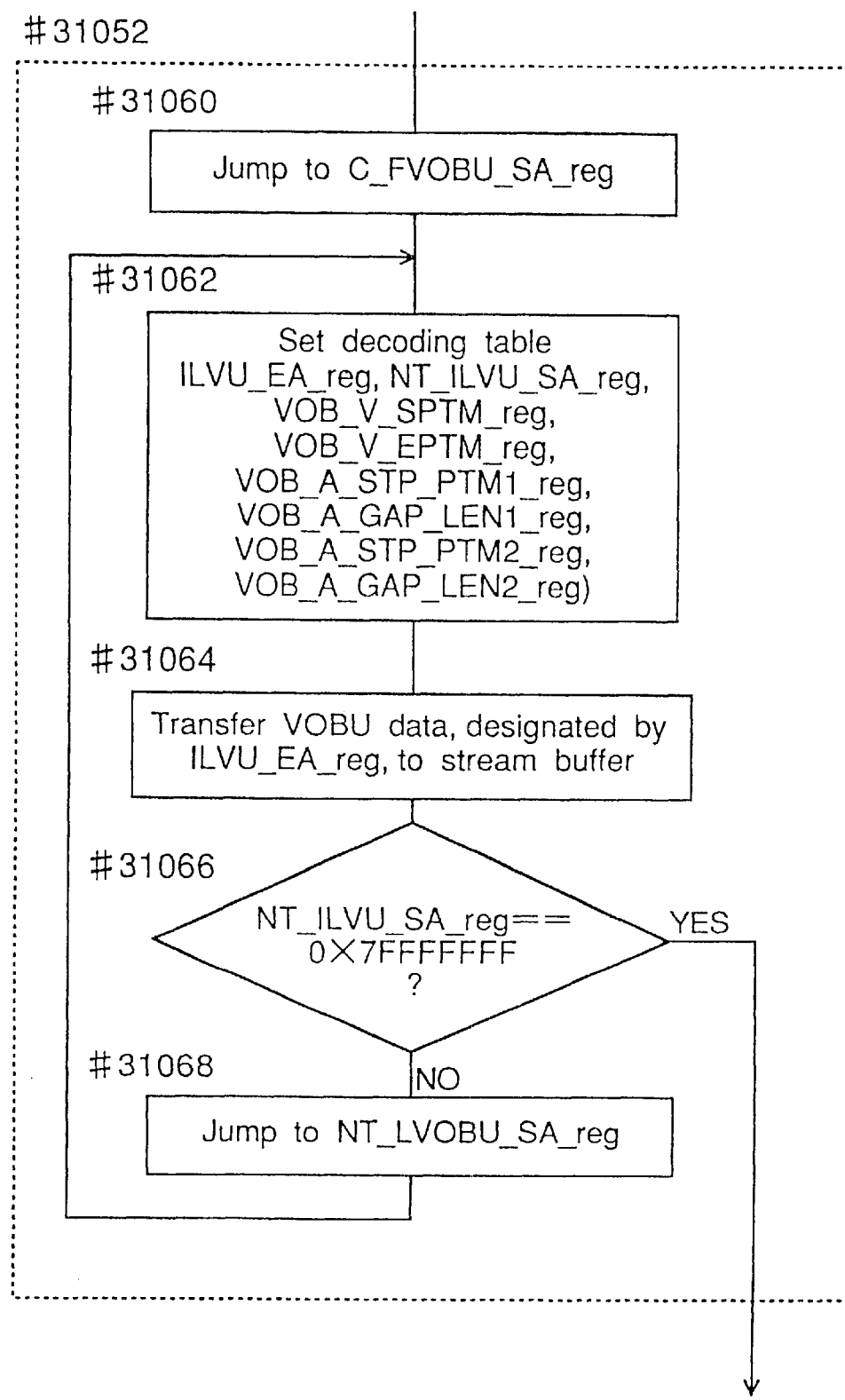
FIG. 64 is a flow chart showing details of the non-multi-angled interleave process of FIG. 63.
Figure 65:
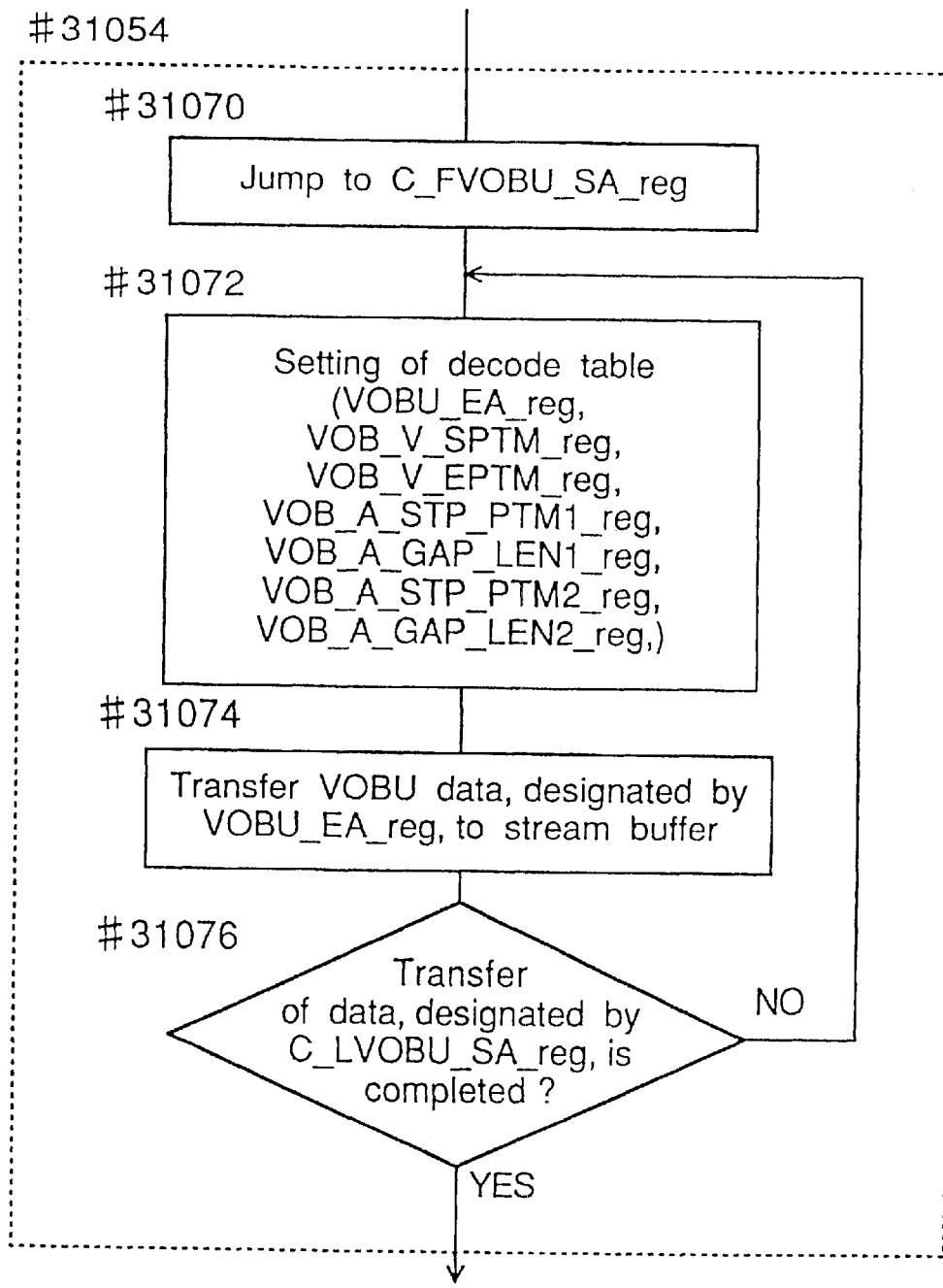
FIG. 65 is a flow chart showing details of the non-multi-angled contiguous block process of FIG. 63.

The non-multi-angle contiguous block process is executed in step #31054, FIG. 63, is described further below with reference to FIG. 65.

At step #31070 the reading head 2006 is jumped to the first cell VOBU start address C_FVOBU_SA_read from the C_FVOBU_SA_reg_register. This jump is also accomplished as described above, and the loop from step #31072 to step #31076 is initiated.

At step #31072 the DSI packet data in the navigation pack NV (FIG. 20) is extracted in the stream buffer 2400, the decoding table is defined and the procedure moves to step #31074. The registers set in the decoding table are the VOBU_EA_reg, VOB_V_SPTM_reg, VOB_V_EPTM_reg, VOB_A_STP_PTM_reg, VOB_A_STP_PTM2_reg, VOB_A_GAP LEN1_reg, and VOB_A_GAP LEN2_reg.

At step #31074 the data from the first cell VOBU start address C_FVOBU_SA_reg to the end pack address VOBU_EA_reg, i.e., the data for one video object unit VOBU, is transferred to the stream buffer 2400. The procedure then moves to step #31076. The data for one video object unit VOBU contiguously arrayed to the recording medium M can thus be transferred to the stream buffer 2400.

At step #31076 it is determined whether all cell data has been transferred. If all VOBU in the cell has not been transferred, the data for the next VOBU is read continuously, and the process loops back to step #31070.

However, if all VOBU data in the cell has been transferred as determined by the C_LVOBU_SA_reg value in step #31076, the non-multi-angle contiguous block process (step #31054) terminates. This process thus transfers the data of one cell to the stream buffer 2400.

Figure 66:
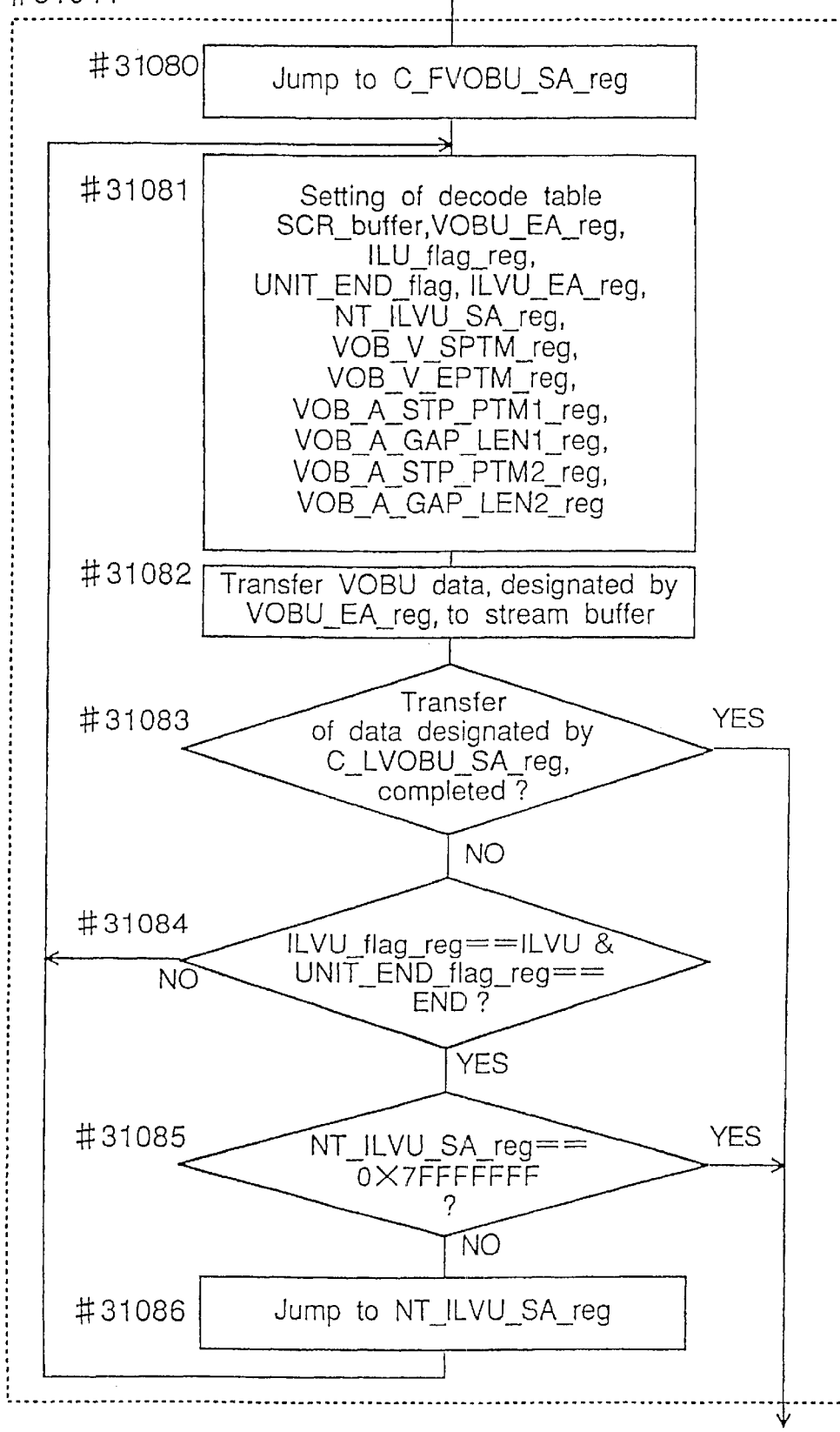
FIG. 66 is a flow chart showing a modification of FIG. 63.

Another method of accomplishing the non-multi-angle cell decoding process (step #31044, FIG. 62) is described below with reference to FIG. 66.

At step #31080 the reading head 2006 is jumped to the first cell VOBU start address C_FVOBU_SA_reg, and the first VOBU data in the cell is transferred to the stream buffer 2400. The procedure then moves to step #31081.

At step #31081 the DSI packet data in the navigation pack NV (FIG. 20) is extracted in the stream buffer 2400, the decoding table is defined, and the procedure moves to step #31082. The registers set in the decoding table are the SCR buffer, VOBU_EA_reg, ILVU_flag_reg, UNIT_END_flag_reg, ILVU_EA_reg, NT_ILVU_SA_reg, VOB_V_SPTM_reg, VOB_V_EPTM_reg, VOB_A_STP_PTM1_reg, VOB_DA_STP_PTM2_reg, VOB_A_GAP_LEN1_reg, and VOB_A_GAP_LEN2_reg.

At step #31082 the data from the first cell VOBU start address C_FVOBU_SA_reg to the end pack address VOBU_EA_reg, i.e., the data for one video object unit VOBU, is transferred to the stream buffer 2400. The procedure then moves to step #31083.

At step #31083 is determined whether all cell VOBU data has been transferred. If it has, the process (step #31044) terminates. If it has not, the procedure moves to step #31084.

At step #31084 it is determined whether the VOBU is the last VOBU in the interleaved unit. If not, the process loops back to step #31081. If so, the procedure advances to step #31085. It is thus possible to transfer one cell of data in VOBU units to the stream buffer 2400.

The loop from step #31081 to step #31084 repeats as described above.

At step #31085 it is determined whether the interleaved unit ILVU is the last in the interleaved block. If so, step #31044 terminates. If not, the procedure advances to step #31086.

At step #31086 the reading head 2006 is jumped to the address NT_ILVU_SA_reg of the next interleave unit, and the procedure loops back to step #31081. It is thus possible to transfer the data for one cell to the stream buffer 2400.

Figure 62:
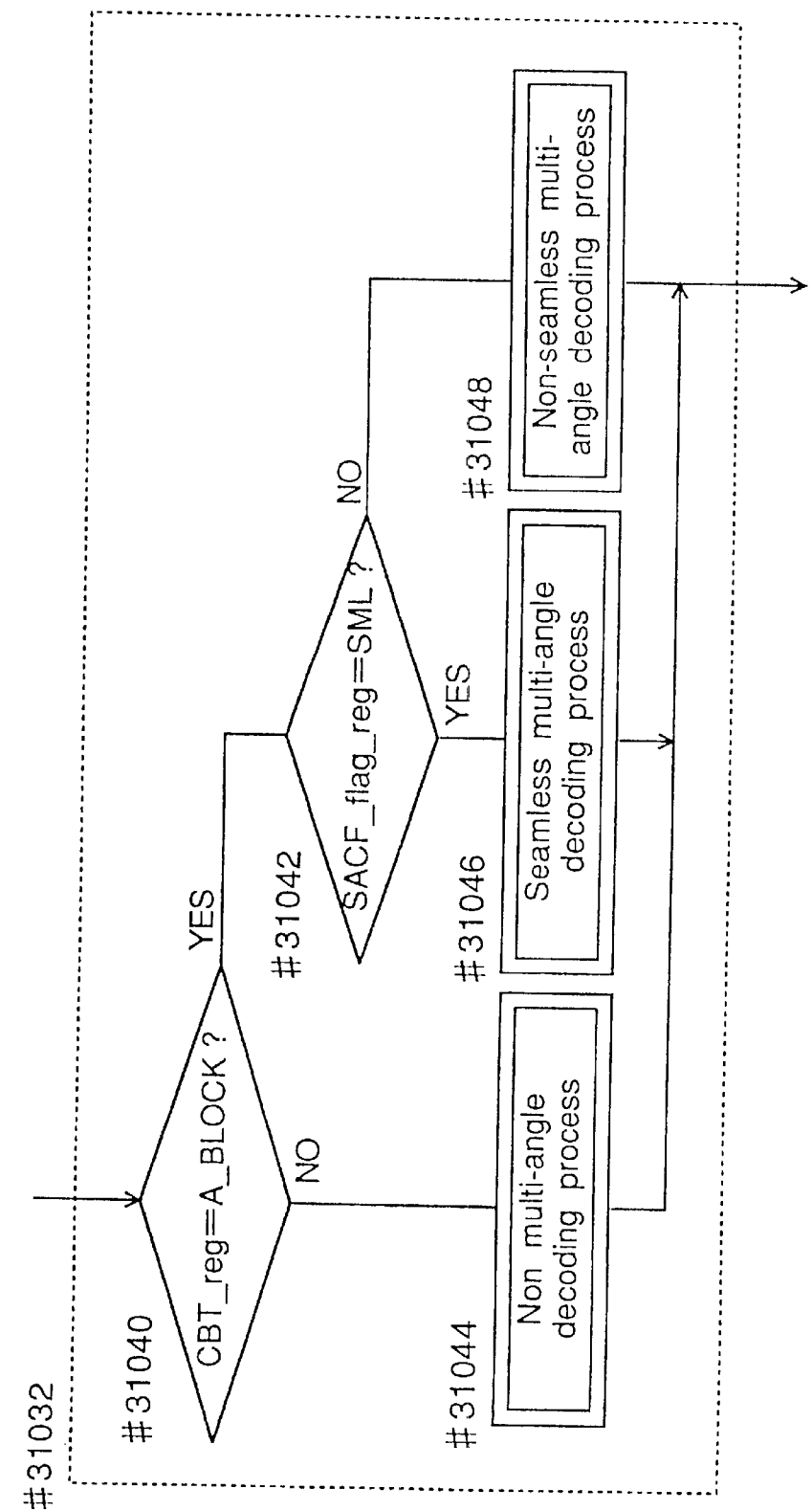
FIG. 62 is a flow chart showing the data transferring operation of FIG. 57.
Figure 67:
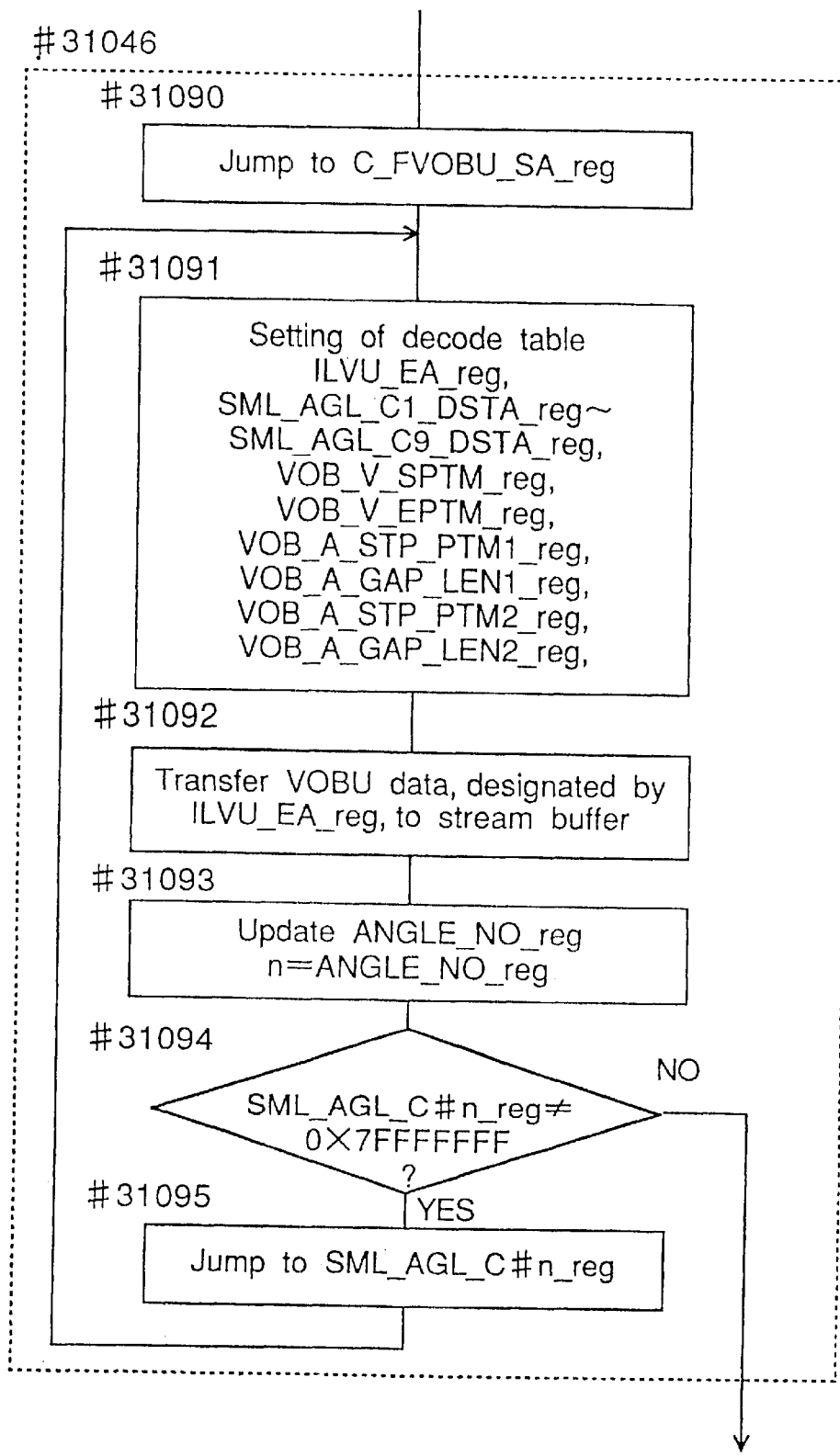
FIG. 67 is a flow chart showing details of the seamless multi-angle decoding process of FIG. 62.

The seamless multi-angle decoding process executed in step #31046, FIG. 62, is described below referring to FIG. 67.

At step #31090 the reading head 2006 is jumped to the first cell VOBU start address C_FVOBU_SA read from the C_FVOBU_SA_reg register, and the first VOBU data in the cell is transferred to the stream buffer 2400. The procedure then moves to step #31091. This jump is also accomplished as described above, and the loop from step #31091 to step #31095 is initiated.

At step #31091 the DSI packet data in the navigation pack NV (FIG. 20) is extracted in the stream buffer 2400, the decoding table is defined, and the procedure moves to step #31092. The registers set in the decoding table are the ILVU_EA_reg, SML_AGL_C1_DSTA_reg–SML_AGL_C9_DSTA_reg, VOB_V_SPTM_reg, VOB_V_EPTM_reg, VOB_A_STP_PTM1_reg, VOB_A_STP1_PTM2_reg, VOB_A_GAP_LEN1_reg, and VOB_A_GAP_LEN2_reg.

At step #31092 the data from the first cell VOBU start address C_FVOBU_SA_reg to the ILVU end pack address ILVU_EA_reg, i.e., the data for one ILVU, is transferred to the stream buffer 2400. The procedure then moves to step #31093. It is thus possible to output the data for one contiguous interleaved unit ILVU on the recording medium M to the stream buffer 2400.

At step #31093 the ANGLE_NO_reg is updated, and the procedure moves to step #31094. This update operation resets the ANGLE_NO_reg to the angle number of the angle selected by the user when the user changes the angle using the scenario selector 2100 (FIG. 26).

At step #31094 it is determined whether the angle cell data has all been transferred. If all ILVU in the cell have not been transferred, the procedure moves to step #31095. If all ILVU in the cell have been transferred, the process terminates.

At step #31095 the reading head 2006 is jumped to the next angle (SML_AGL_C#n_reg), and the process loops back to step #31091. Note that SML_AGL_C#n_reg is the address of the angle to which the ANGLE_NO_reg was updated in step #31093.

It is thus possible to transfer the data for the angle selected by the user to the stream buffer 2400 in ILVU units.

Figure 68:
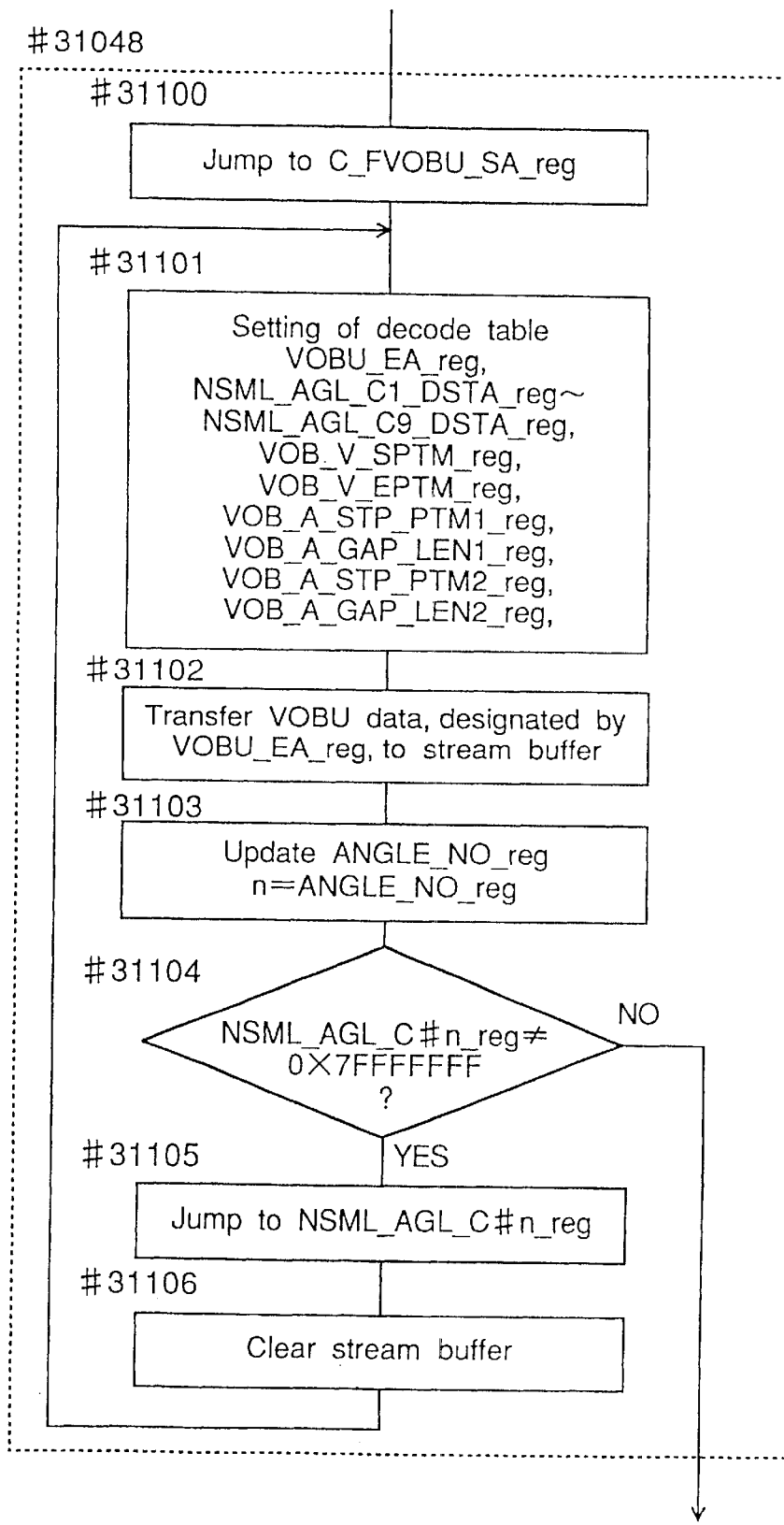
FIG. 68 is a flow chart showing details of the non-seamless multi-angle decoding process of FIG. 62.

The non-seamless multi-angle decoding process executed in step #31048, FIG. 62, is described below referring to FIG. 68.

At step #31100 the reading head 2006 is jumped to the first cell VOBU start address C_FVOBU_SA read from the C_FVOBU_SA_reg register, and the first VOBU data in the cell is transferred to the stream buffer 2400. The procedure then moves to step #31101. This jump is also accomplished as described above, and the loop from step #31101 to step #31106 is initiated.

At step #31101 the DSI packet data in the navigation pack NV (FIG. 20) is extracted in the stream buffer 2400, the decoding table is defined, and the procedure moves to step #31102. The registers set in the decoding table are the VOBU_EA_reg, NSML_AGL_C1_DSTA_reg, NSML_AGL_C9_DSTA_reg, VOB_V_SPTM_reg, VOB_V_EPTM_reg, VOB_A_STP_PTM1_reg, VOB_A_STP_PTM2_reg, VOB_A_GAP_LEN1_reg, and VOB_A_GAP_LEN2_reg.

At step #31102 the data from the first cell VOBU start address C_FVOBU_SA_reg to the end pack address VOBU_EA_reg, i.e., the data for one VOBU, is transferred to the stream buffer 2400. The procedure then moves to step #31103. It is thus possible to output the data for one contiguous video object unit VOBU on the recording medium M to the stream buffer 2400.

At step #31103 the ANGLE_NO_reg is updated, and the procedure moves to step #31104. This update operation resets the ANGLE_NO_reg to the angle number of the angle selected by the user when the user changes the angle using the scenario selector 2100 (FIG. 26).

At step #31104 it is determined whether the angle cell data has all been transferred. If all VOBU in the cell have not been transferred, the procedure moves to step #31105. If all VOBU in the cell have been transferred, the process terminates.

At step #31105 the reading head 2006 is jumped to the next angle (NSML_AGL_C#n_reg), and the process advances to step #31106. Note that NSML_AGL_C#n_reg is the address of the angle to which the ANGLE_NO_reg was updated in step #31103.

It is thus possible to transfer the data for the angle selected by the user to the stream buffer 2400 in VOBU units.

Step #31106 is an effective step for high speed angle switching, and simply clears the stream buffer 2400. By thus clearing the stream buffer 2400 the data for the newly selected angle can be reproduced without reproducing the angle data that is still not decoded. In other words, clearing the stream buffer 2400 enables faster response to user operations.

It is very important that DVD decoder according to the present invention can promptly move to the next data reading process and effectively performs the data reading once after the detection of the end of data such as interleave unit ILVU and video object unit VOBU for the sake of seamless reproduction which is one of the main targets of the present invention.

Figure 69:
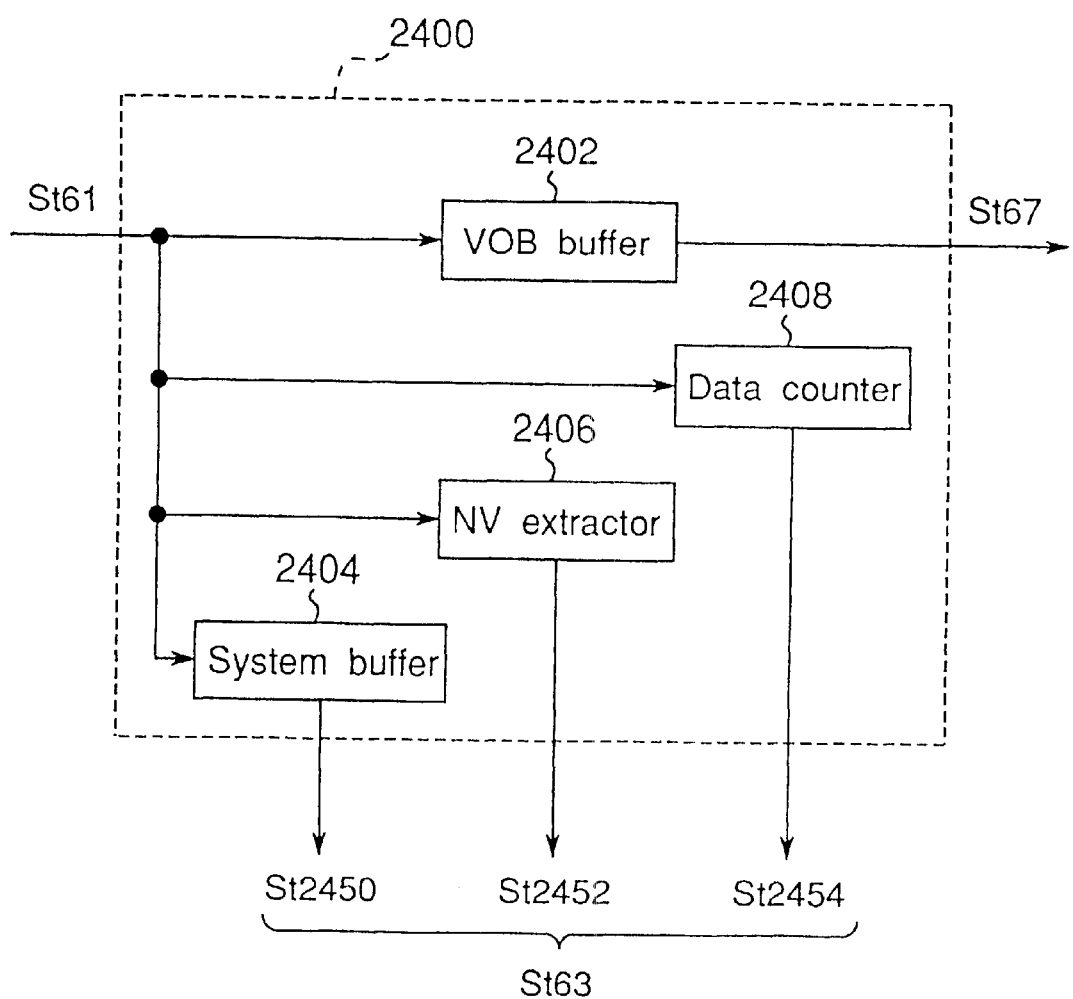
FIG. 69 is a block diagram showing details of the stream buffer of FIG. 26.

With reference to FIG. 69, a construction of the stream buffer 2400 which can performs the end detection of interleave unit ILVU is described briefly. The stream buffer 2400 comprises a VOB buffer 2402, a system buffer 2404, a navigation pack extractor 2406, and a data counter 2408. The system buffer 2404 temporarily stores the title control data VTSI(FIG. 16) included in signal St61, and outputs a control information St2450 (St63) such as VTS_PGC.

The VOB buffer 2402 temporarily stores the title VOB data VTSTT_VOB (FIG. 16), and the stream St67 to the system decoder 2500.

The NV (navigation pack) extractor 2406 receives the VOB data at the same time with the VOB buffer 2402, and extracts the navigation pack NV therefrom. The NV extractor 2406 furthermore extracts the VOBU final pack address COBU_EA or ILVU final pack address ILVU_EA which are the DSI generation information DSI_GI shown in FIG. 19 to produce a pack address information St2452 (St63).

The data counter 2408 receives the VOB data at the same time with the VOB buffer 2402, and counts each of pack data shown in FIG. 19 byte by byte. Then, the data counter 2408 produces a pack input terminating signal St2454 (St63) at the time when the inputting of pack data is completed.

Due to its construction shown in FIG. 69, the stream buffer 2400 performs the VOBU data transfer as examples at step #31064 of FIG. 64, as follows. The stream buffer 2400 outputs the VOBU data for the NV extractor 2406 and data counter 2408 at the same time when the VOBU buffer 2400 receives the VOBI data on the top of interleave unit ILVU. As a result, the NV extractor 2406 can extracts the data of ILVU_EA and NT_ILVU_SA at the same time with the inputting of navigation pack data NV, and outputs thereof as signal St2452 (St63) to the decode system controller 2300 (FIG. 26).

The decode system controller 2300 stores the signal St2452 into the ILVU_EA_reg and NT_ILVU_SA_reg, and then start to counts the number of packs based on the pack terminating signal 2452 from the data counter 2408. Based on the fore mentioned the counted value of packs and ILVU_EA_reg, the decode system controller 2300 detects the instance when the inputting of final pack data of ILVU is completed, or the inputting final byte data of the final pack of the ILVU is completed. Then, the controller 2300 further give a command for the bitstream reproducer 2000 to move to the position having a sector address indicated by NT_ILVU_SA_reg. The bitstream producer 2000 moves to the sector address indicated NT_ILVU_SA_reg, and starts to read the data. Thus, the detection of final end of ILVU and reading process for the next ILVU can be performed effectively.

In the above, an example where the multimedia data MBS is reproduced by the bitstream reproducer 2000 without a buffering process, and is inputted to the stream buffer 2499. However, in the case that the signal processor 2008 of the bitstream reproducer 2000 is incorporated with a buffer for error correction process, for example, the controller 2300 gives a moving command to reproducer 2000 so that the reproducer 2000 moves to the reading position indicated by NT_ILVU_SA_reg after completion of the final pack data of fore mentioned ILVU and clearing the internal buffer of the reproducer 2000. Thus, the effective reproduction of ILVU data even when the bitstream reproducer 2000 includes a buffer for error correction code (ECC) process.

Furthermore, when the bitstream producer 2000 has a buffer for ECC process, the data can be transferred effectively by providing any means having a function equivalent to that of data counter 2408 (FIG. 69). In other words, the bitstream reproducer 2000 generates the pack input completion signal St62; the decode system controller 2300 gives a command based on the signal St62 the bitstream reproducer 200 to move to the reading position having sector address designated by NT_ILVU_SA_reg. As apparent from the above, the data can be transferred effectively even when the bitstream reproducer 2000 has a function to buffer the data reproduced from the recording media M.

It is to be noted that the apparatus and method substantially the same as those described in the above with respect to the interleave unit ILVU can be used for the detection VOBU end. In other words, by replacing the extraction of ILVU_EA and NT_ILVU_Sa, and the storing of ILVU_EA_reg and NT_ILVU_SA_reg with the extraction of VOBU_EA and storing VOBU_EA_reg, the apparatus and method according to the present invention, described above, can be used for the detection of unatend. This is effective for the VOBU data transferring operations shown at steps #31074, #31082, #31092, and #31102.

Thus, the reading of data such as ILVU and VOBU can be performed effectively.

Decoding Process in the Stream Buffer

Figure 57:
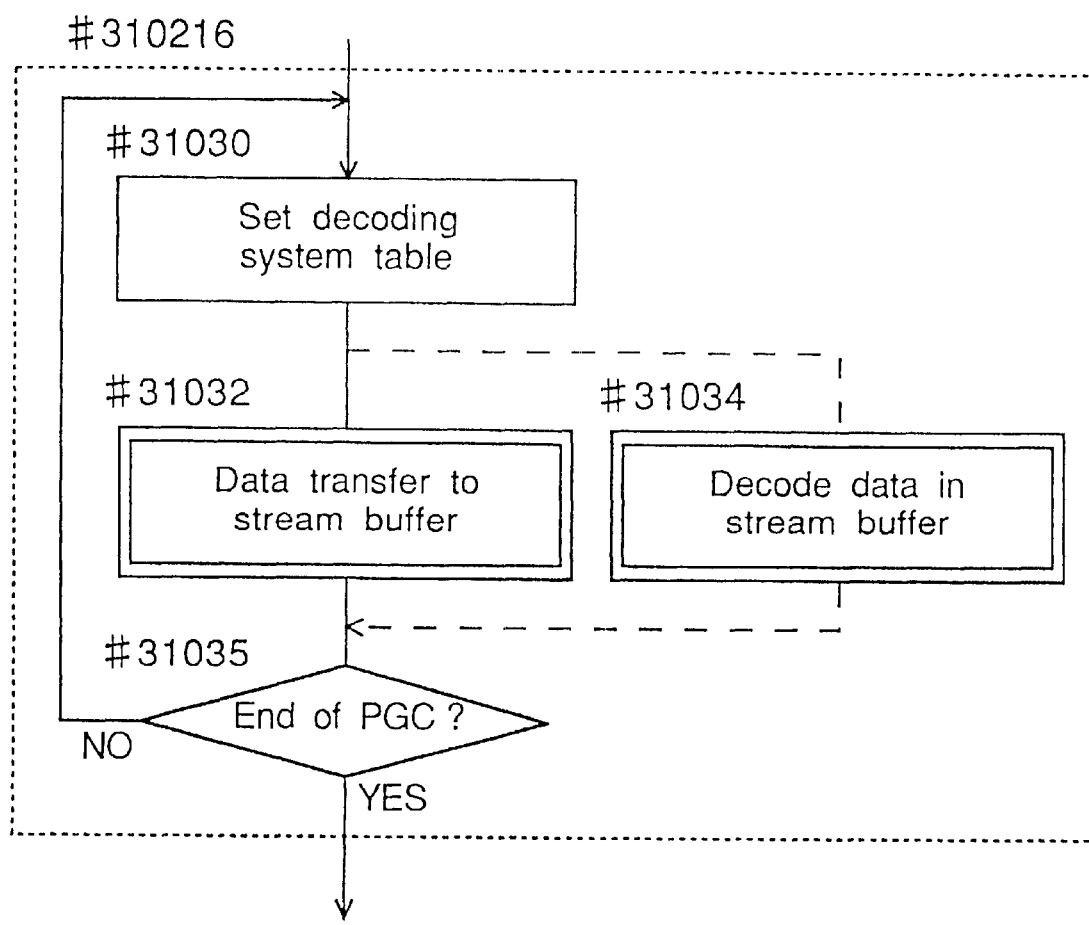
FIG. 57 is a flow chart showing details of reproduction extracted PGC routing of FIG. 56.

The process for decoding data in the stream buffer 2400 shown as step #31034 in FIG. 57 is described below referring to FIG. 58. This process (step #31034) comprises steps #31110, #31112, #31114, and #31116.

At step #31110 data is transferred in pack units from the stream buffer 2400 to the system decoder 2500 (FIG. 26). The procedure then moves to step #31112.

At step #31112 the pack data is from the stream buffer 2400 to each of the buffers, i.e., the video buffer 2600, sub-picture buffer 2700, and audio buffer 2800.

At step #31112 the Ids of the user-selected audio and sub-picture data, i.e., the audio ID AUDIO_ID_reg and the sub-picture ID SP_ID_reg stored to the scenario information register shown in FIG. 54, are compared with the stream ID and sub-stream ID read from the packet header (FIG. 19), and the matching packets are output to the respective buffers. The procedure then moves to step #31114.

The decode timing of the respective decoders (video, sub-picture, and audio decoders) is controlled in step #31114, i.e., the decoding operations of the decoders are synchronized, and the procedure moves to step #31116.

The respective elementary strings are then decoded at step #31116. The video decoder 3801 thus reads and decodes the data from the video buffer, the sub-picture decoder 3100 reads and decodes the data from the sub-picture buffer, and the audio decoder 3200 reads and decodes the data from the audio buffer.

This stream buffer data decoding process then terminates when these decoding processes are completed.

Figure 58:
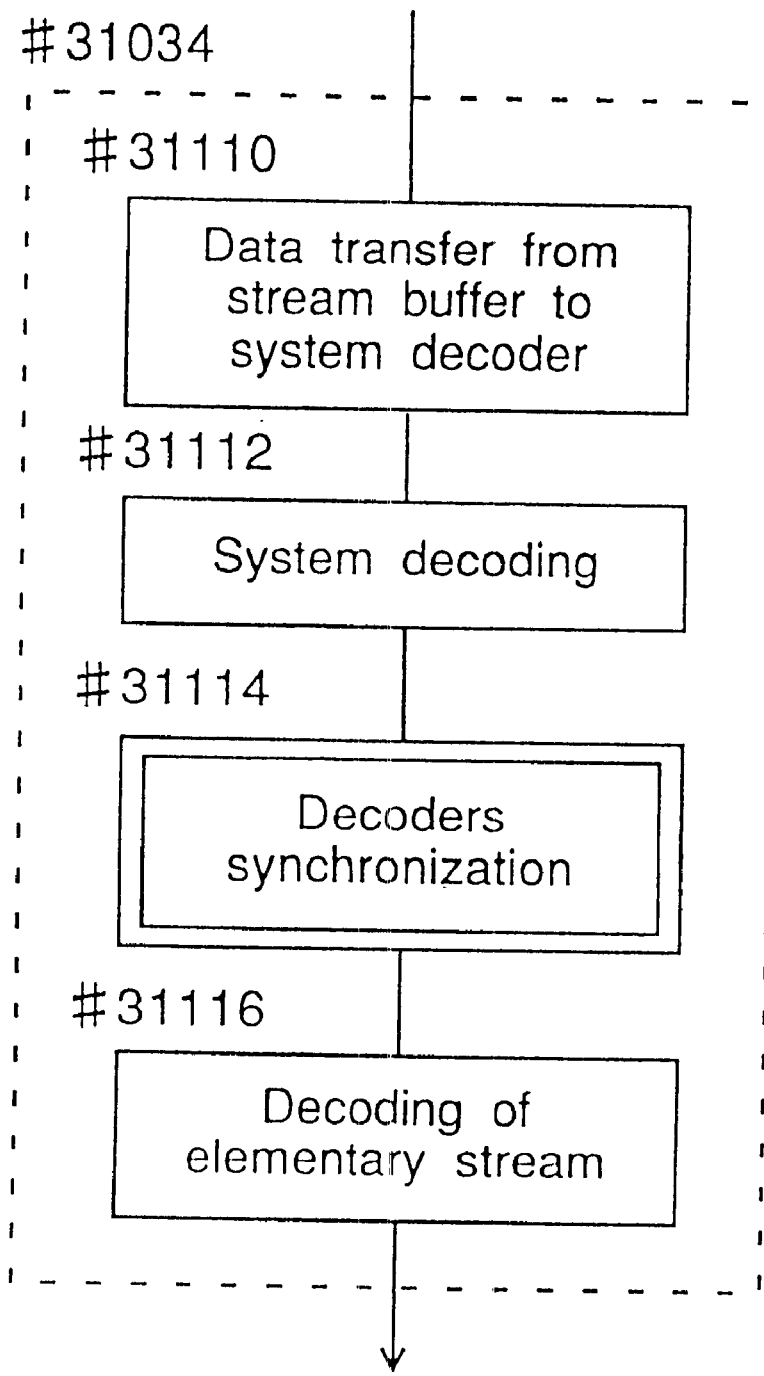
FIG. 58 is a flow chart showing details of decoding data process of FIG. 57, performed by the stream buffer.
Figure 59:
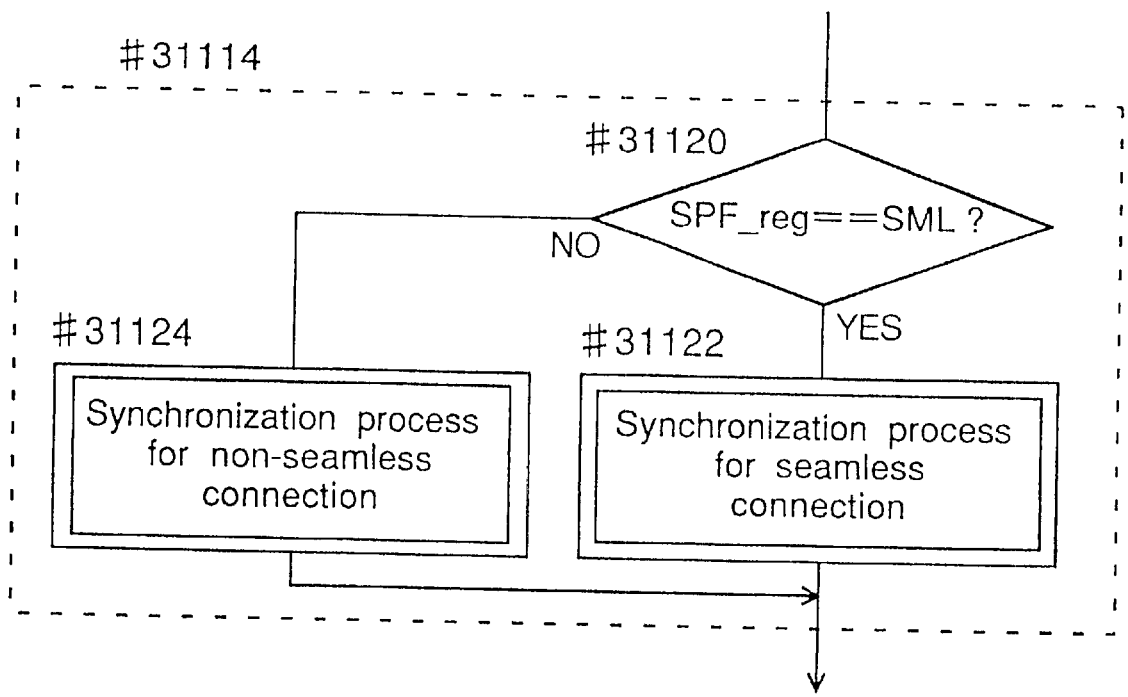
FIG. 59 is a flow chart showing details of the decoder synchronization process of FIG. 58.

The decoder synchronization process of step #31114, FIG. 58, is described below with reference to FIG. 59. This processes comprises steps #31120, #31122, and #31124.

At step #31120 it is determined whether a seamless connection is specified between the current cell and the preceding cell. If a seamless connection, the procedure moves to step #31122, if not, the procedure moves to step #31124.

A process synchronizing operation for producing seamless connections is executed in step #31122, and a process synchronizing operation for non-seamless connections is executed in step #31124.

To achieve seamless multi-scene reproduction control, it is necessary to seamlessly reproduce the connections between VOB. Except when a VOB, which is normally a single-stream title editing unit, is divided into discrete streams, however, there is no contiguity between the SCR and PTS at the connection. The problems relating to reproducing VOB of which the SCR and PTS are not contiguous are described below.

Note that the presentation time stamp PTS declaring the video presentation start time is referenced below as the VPTS, the decoding time stamp DTS declaring the video decode start time is referenced as VDTS, and the presentation time stamp PTS declaring the audio reproduction, or presentation, start time is referenced as APTS below.

Figure 47A:
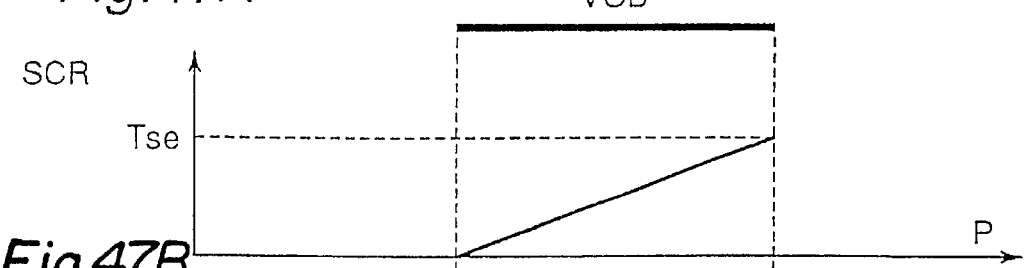
FIG. 47 is a graph in assistance of explaining the relationship between the SCR, APTS, and VPTS values and recording positions in the VOB.
Figure 47B:
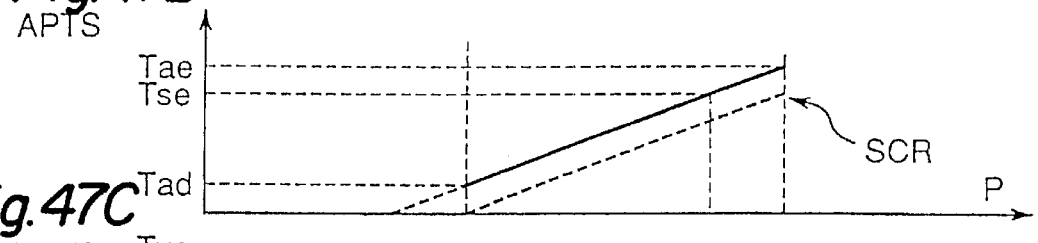
Figure 47C:
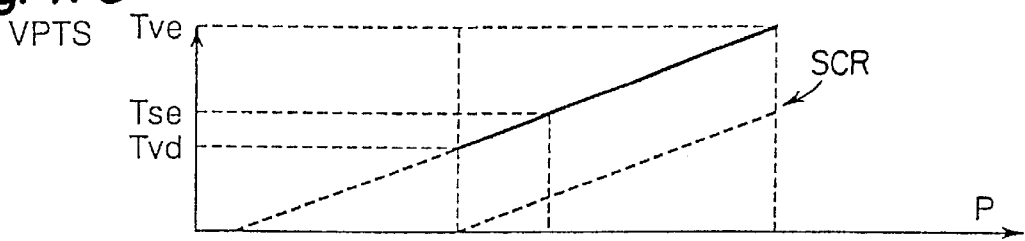

The relationship between the SCR, APTS, and VPTS values and recording positions in the VOB are shown in FIG. 47 and described below. For simplification this description is limited to the SCR and PTS parameters. The top SCR value is recorded with the PTS to both the middle audio stream and bottom video stream. If the positions on the horizontal axis are approximately the same, approximately the same SCR value is recorded to each stream.

Tse is the time indicated by the SCR of the last pack in the VOB; Tve is the time indicated by the VPTS of the last video pack in the VOB; Tae is the time indicated by the APTS of the last audio pack in the VOB; Tvd is the video decode buffer delay time; and Tad is the audio decode buffer delay time.

Figure 48A:
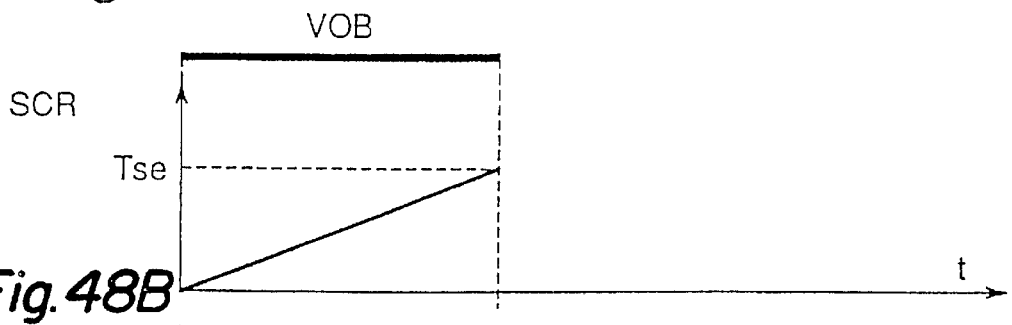
FIG. 48 is a graph showing a time line from input of the VOB in FIG. 47 to the system decoder to output of the last audio and video reproduction data.
Figure 48B:
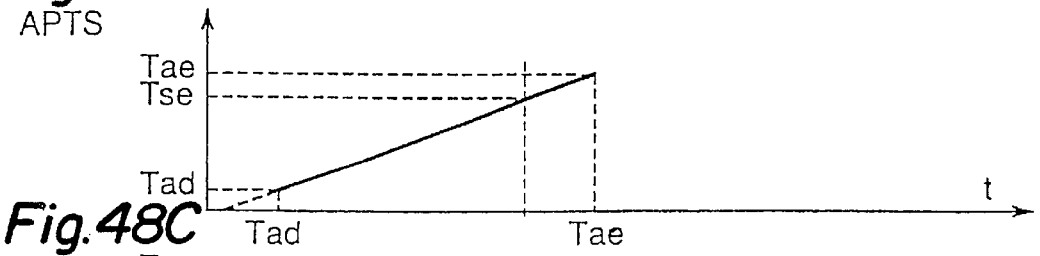
Figure 48C:
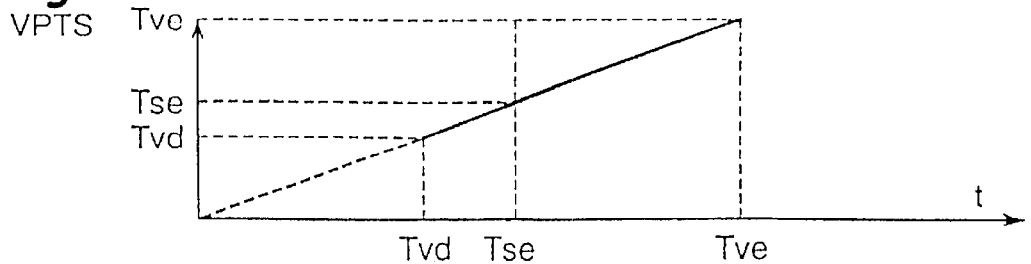

FIG. 48 is a time line from input of the VOB shown in FIG. 47 to the system decoder to output of the last audio and video reproduction data. The horizontal axis shows the passage of time t, and the vertical axis shows the SCR value, which indicates the time transfer should be accomplished, and the PTS values, which indicate the time reproduction should be accomplished.

Both audio and video outputs are thus delayed by the respective decode buffers referenced to the system clock reference SCR, and while the audio and video data are input substantially simultaneously, the video data is reproduced at a slight delay after the audio data. This delay is caused by the difference in the video and audio decode buffer delay times.

In addition, when two VOB are connected, there is no contiguity between the SCR and PTS at the connection except when a single-stream VOB is split into separate streams.

Contiguous reproduction of VOB #1 and VOB #2 having non-contiguous SCR and PTS parameters is described below referring to FIG. 46.

FIG. 46 also shows the relationship between the SCR, APTS, and VPTS values and recording positions in each VOB.

The system clock reference SCR is time information indicating the pack transfer time, and is recorded with each pack; APTS is the audio playback starting time information recorded with each audio packet; and VPTS is the video playback starting time information recorded with each video packet. The system clock STC is a reference clock for decoder synchronization control.

Tse1 is the time indicated by the SCR of the last pack in VOB #1; Tae1 is the time indicated by the last APTS in VOB #1; and Tve1 is the time indicated by the last VPTS in VOB #1.

Tad is the audio decode buffer delay time; Tvd is the video decode buffer delay time; and the horizontal axis indicates the passage of time t.

What is important to note here is that synchronizing the audio and video so that the reproduced audio and video signals are output at the time the system clock STC equals the APTS and VPTS values in the stream.

To maintain the reference clock for transferring VOB to the system decoder, the first system clock reference SCR value in VOB #2 must be set to the STC initializer at precisely time Tse1. However, because reproduction and output of VOB #1 have not been completed at this time point, the audio and video still to be output from VOB #1 after time Tse1 cannot be normally reproduced because the reference clock is lost.

Furthermore, even if the SCR value of the STC initializer is set at the audio end time Tae1, i.e., later than the system clock reference SCR time Tse1, the reference clock at which the first pack in VOB #2 should be transferred is lost, and the reference clock for the VOB #1 video output to be reproduced after time Tae1 is lost.

The same problem also occurs if the system clock reference SCR is set to the STC initializer at time Tve1.

When there is a one-to-one correspondence between the VOB reproduced first, i.e., the first VOB, and the VOB reproduced thereafter, i.e., the second VOB, this problem can be avoided by assuring that the first SCR value of the second VOB is contiguous to the last SCR of the first VOB. However, when common data is shared between plural titles, there is a many-to-one relationship between the first VOB and the many VOB that may be reproduced thereafter.

When contiguously reproducing a second VOB #2 following a first VOB #1, it is therefore necessary to destroy any remaining VOB #1 data in the decode buffer at time Tse1, and seamless reproduction in which the audio and video are not intermitted is not possible.

A method(s) for seamlessly reproducing VOB of which the SCR and PTS are not contiguous is described by means of the two embodiments of the invention below.

Synchronization Controller: Embodiment 1

Figure 32:
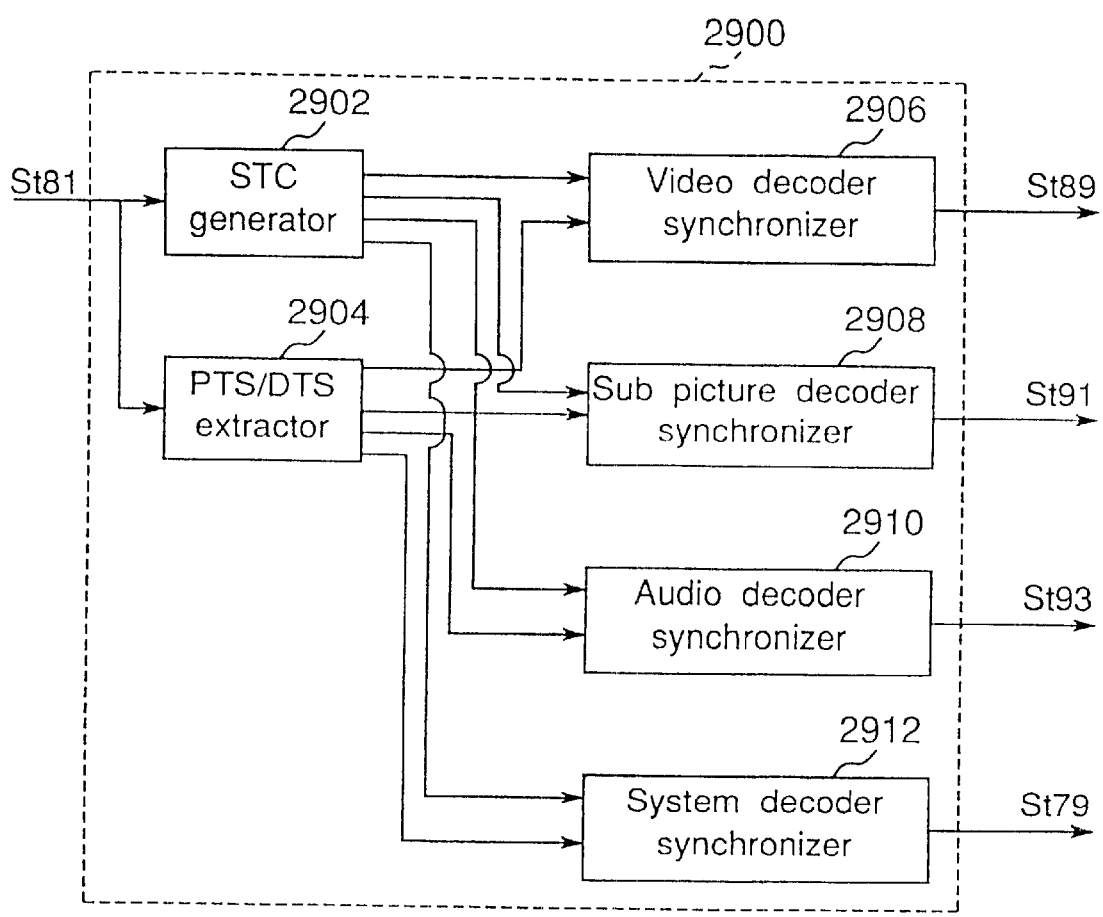
FIG. 32 is a block diagram showing a synchronizer of FIG. 26 according to the present invention.

A first embodiment of the synchronizer 2900 shown in FIG. 26 is described according to the present invention with reference to FIG. 32 below. As shown in FIG. 32, the synchronizer 2900 comprises a system clock STC generator 2902, PTS/DTS extractor 2904, video decoder synchronizer 2906, sub-picture decoder synchronizer 2908, audio decoder synchronizer 2910, and system decoder synchronizer 2912.

The STC generator 2902 generates the system clock for each decoder, and supplies the synchronization system clock STC to the video decoder synchronizer 2906, sub-picture decoder synchronizer 2908, audio decoder synchronizer 2910, and system decoder synchronizer 2912. The STC generator 2902 is described in detail below with reference to FIG. 39.

The PTS/DTS extractor 2904 extracts the presentation time stamp PTS and decoding time stamp DTS from the synchronization control data St81, and supplies the PTS and DTS to the decoder synchronizers.

The video decoder synchronizer 2906 generates the video stream decoding start signal St89 based on the STC from the STC generator 2902 and the decoding time stamp DTS for starting video decoding supplied from the PTS/DTS extractor 2904. More specifically, the video decoder synchronizer 2906 generates the video stream decoding start signal St89 when the STC-and DTS match.

The sub-picture decoder synchronizer 2908 generates the sub-picture stream decoding start signal St91 based on the STC from the STC generator 2902 and the decoding time stamp DTS for starting sub-picture decoding supplied from the PTS/DTS extractor 2904. More specifically, the sub-picture decoder synchronizer 2908 generates the sub-picture stream decoding start signal St91 when the STC and DTS match.

The audio decoder synchronizer 2910 generates the audio stream decoding start signal St93 based on the STC from the STC generator 2902 and the decoding time stamp DTS for starting audio decoding supplied from the PTS/DTS extractor 2904. More specifically, the audio decoder synchronizer 2910 generates the audio stream decoding start signal St93 when the STC and DTS match.

The system decoder synchronizer 2912 outputs the STC from the STC generator 2902 as the system clock St79. The system clock St79 is used to control pack transfers from the stream buffers to the system decoder. In other words, if the STC value exceeds the SCR value in the pack, the pack data is transferred from the stream buffer to the system decoder.

Figure 39:
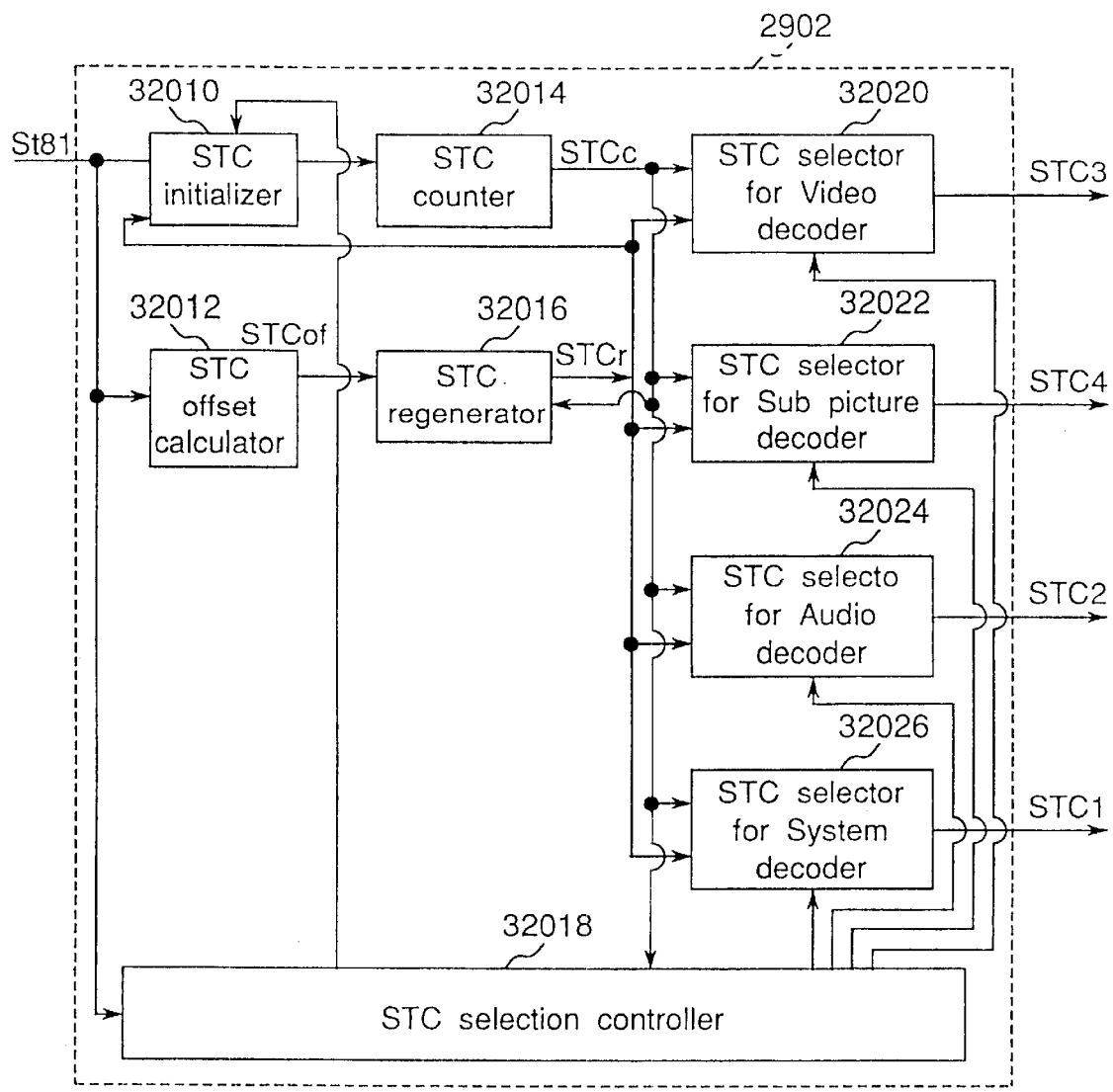
FIG. 39 is a block diagram showing the STC generator of FIG. 32.
Figure 40A:
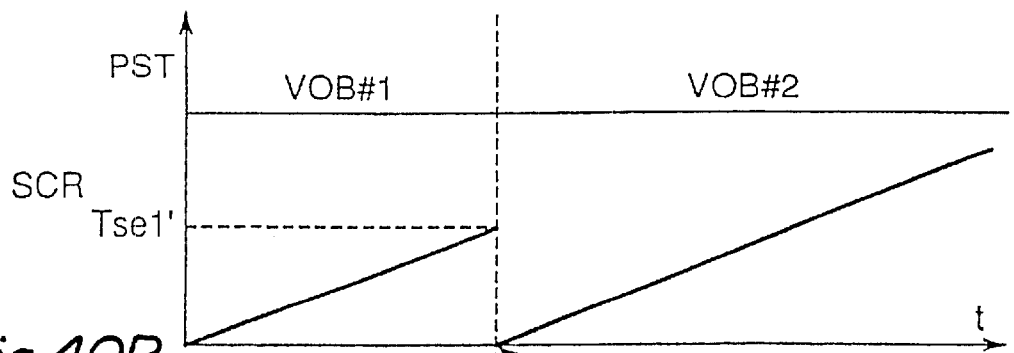
FIG. 40 is a graph in assistance of explaining the relationship between the SCR, APTS, VDTS, and VPTS values.
Figure 40B:
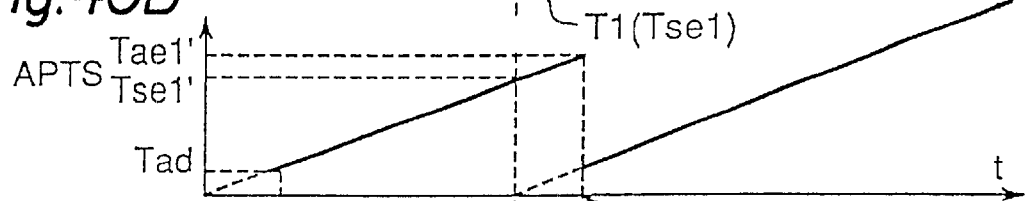
Figure 40C:
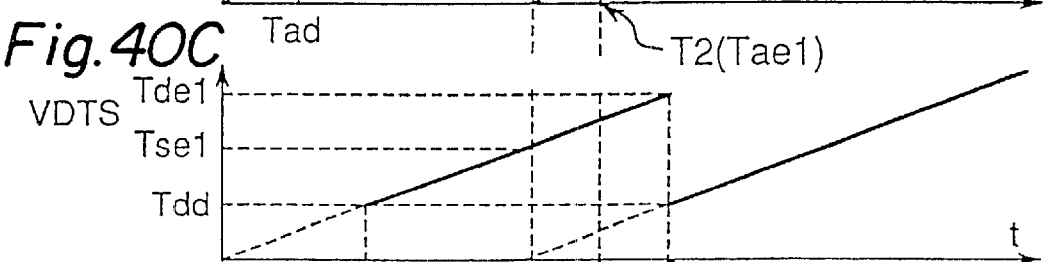
Figure 40D:
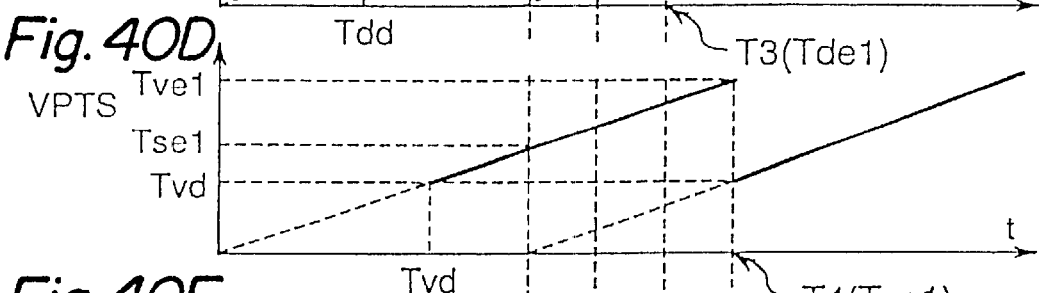
Figure 40E:
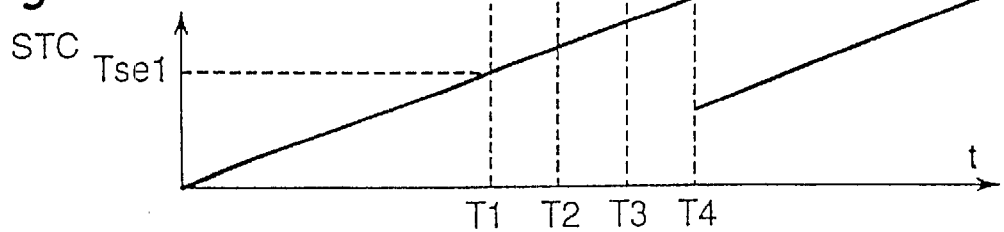

The structure and operation of the STC generator 2902 are described in detail below with reference to FIG. 39. As shown in FIG. 39, the STC generator 2902 comprises a system clock STC initializer 32010, STC offset calculator 32012, STC counter 32014, STC regenerator 32016, STC selection controller 32018, STC selector for video decoder 32020, STC selector for sub-picture decoder 32022, STC selector for audio decoder 32024, and STC selector for system decoder 32026.

The STC offset calculator 32012 calculates the offset value STCof used to update the system clock STC for contiguous reproduction of two VOBs with different initial system clock STC values (SCR).

More specifically, the offset value STCof is calculated by subtracting the Initial Video Frame Presentation Start Time VOB_V_SPTM_reg value of the next VOB to be reproduced from the Final Video Frame Presentation Termination Time VOB_V_EPTM_reg (see FIG. 39) of the VOB reproduced first.

The STC counter 32014 is a sequential counter that counts from a set value synchronized to the system clock, and generates the reference clock STCc for each decoder.

The STC regenerator 32016 outputs a reset system clock STCr by subtracting the offset value STCof calculated by the STC offset calculator 32012 from the reference clock STCc supplied from the STC counter 32014.

The system clock STC initializer 32010 selects and sets the SCR from the first pack in the VOB, or the reset system clock STCr output from the STC regenerator 32016, according to the control signal from the STC selection controller 32018. The value set by the STC initializer 32010 is the initial value used by the STC counter 32014.

The STC selector for video decoder 32020 selects either the output STCc from the STC counter 32014 or the output STCr from the STC regenerator 32016 according to the control signal from the STC selection controller 32018, and outputs the selected signal to the video decoder synchronizer 2906.

The STC selector for sub-picture decoder 32022 similarly selects either output STCc or output STCr according to the control signal from the STC selection controller 32018, and outputs the selected signal to the sub-picture decoder synchronizer 2908.

The STC selector for audio decoder 32024 similarly selects either output STCc or output STCr according to the control signal from the STC selection controller 32018, and outputs the selected signal to the audio decoder synchronizer 2910.

The STC selector for system decoder 32026 similarly selects either output STCc or output STCr according to the control signal from the STC selection controller 32018, and outputs the selected signal to the system decoder synchronizer 2912.

The operation of the STC selection controller 32018 during non-seamless reproduction is described below with reference to FIG. 60. During non-seamless operation (when the SPF_reg flag_SML), all STC selectors, i.e., STC selector for video decoder 32020, STC selector for sub-picture decoder 32022, STC selector for audio decoder 32024, and STC selector for system decoder 32026, select and output the reference clock STCc. More specifically, the STC selectors synchronize decoder operation based on the reference clock STCc output by the STC counter 32014.

The operation of the STC selection controller 32018 during seamless reproduction (when the SPF_reg flag= SML) is also described below with reference to FIG. 40 and FIG. 61.

FIG. 40 also shows the relationship between the SCR, APTS, VDTS, and VPTS values and recording positions in each stream when two VOBs #1 and #2 are connected and seamless reproduced.

The system clock reference SCR is time information indicating the pack transfer time, and is recorded with each pack; APTS is the audio playback starting time information recorded with each audio packet; VDTS is the video decode start time information recorded with each video packet; and VPTS is the video playback starting time information recorded with each video packet. The system clock STC is a reference clock for decoder synchronization control.

Tse1 (T1) is the time indicated by the SCR of the last pack in VOB #1; Tae1 (T2) is the time indicated by the last APTS in VOB #1; Tde1 (T3) is the time indicated by the last VDTS in VOB #1; and Tve1 (T4) is the time indicated by the last VPTS in VOB #1, i.e., the Final Video Frame Presentation Termination Time VOB_V_EPTM identified by the last VPTS in VOB #1.

Tad is the audio, decode buffer delaytime; and Tvd is the video decode buffer delay time.

Tad is the audio decode buffer delay time; Tdd is the video decode buffer delay time; and Tve is the sum of the video decode buffer delay time and the delay until video presentation.

Figure 61:
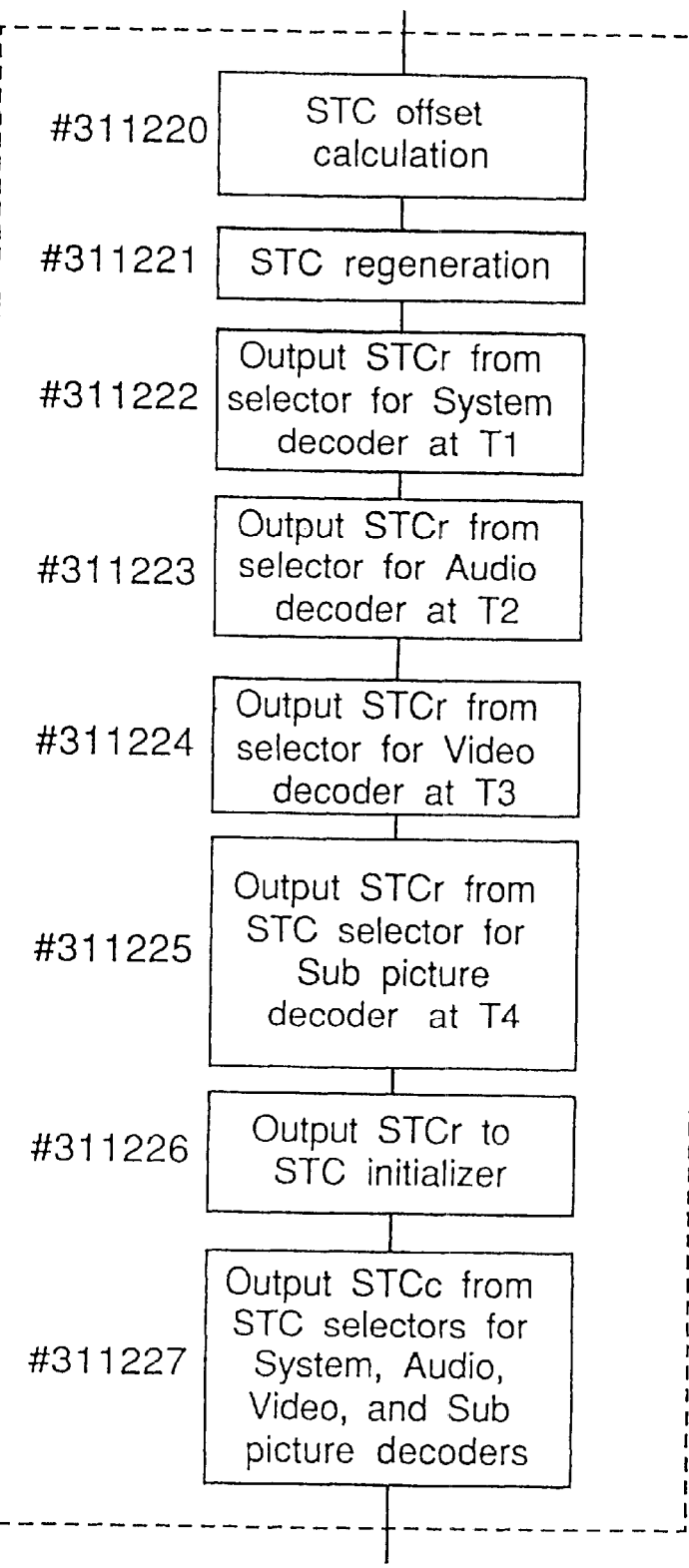
FIG. 61 is a flow chart showing the operation of the STC selection controller of FIG. 39 during a seamless reproduction operation.

FIG. 61 is a flow chart used to describe the operation of the STC selection controller 32018 shown in FIG. 39 during seamless reproduction operation.

At step #311220, the STC offset (offset value STCof) is calculated, and the procedure moves to step #311221.

As described above, the STC offset value STCof is calculated by subtracting the Initial Video Frame Presentation Start Time VOB_V_SPTM_reg value of the next VOB to be reproduced from the Final Video Frame Presentation Termination Time VOB_V_EPTM_reg (see FIG. 55) of the VOB reproduced first. Thus, the total reproduction time of the VOB reproduced first is calculated as the offset value STCof of the VOB reproduced next.

At step #311221 the calculated STC offset value STCof is applied to the STC regenerator 32016 to update the system clock STC. The procedure then moves to step #311222.

The STC regenerator 32016 updates the system clock STC by subtracting the output STCof from the STC offset calculator 32012 from the reference clock STCc output from the STC counter 32014 (STCc−STCof), and outputs the result as the reset system clock STCr.

At step #311222 the reset system clock STCr is selectively output by the STC selection controller 32018 to the STC selector for system decoder 32026 at time T1 (FIG. 40), i.e., at the time SCR changes from stream VOB #1 to VOB #2. The procedure then moves to step #311223. Thereafter the reset system clock STCr is applied as the system clock STC referenced by the system decoder, and the transfer timing of VOB #2 to the system decoder is determined by the SCR in the pack header of the pack and the STCr.

At step #311223 the reset system clock STCr is selectively output to the STC selector for audio decoder 32024 at time T2 (FIG. 40), i.e., at the time APTS changes from stream VOB #1 to VOB #2. The procedure then moves to step #311224. Thereafter the reset system clock STCr is applied as the system clock STC referenced by the audio decoder, and the VOB #2 audio output timing is determined by the APTS in the audio packet and the STCr. In other words, when the STCr matches the APTS, the audio data corresponding to that APTS is reproduced.

At step #311224 the reset system clock STCr is selectively output to the STC selector for video decoder 32020 at time T3 (FIG. 40), i.e., at the time VDTS changes from stream VOB #1 to VOB #2. The procedure then moves to step #311225. Thereafter the reset system clock STCr is applied as the system clock STC referenced by the video decoder, and the VOB #2 video decode timing is determined by the VDTS in the video packet and the STCr. In other words, when the STCr matches the VDTS, the video data corresponding to that VDTS is decoded.

At step #311225 the reset system clock STCr is selectively output to the STC selector for sub-picture decoder 32022 at time T4 (FIG. 40), i.e., at the time VPTS changes from stream VOB #1 to VOB #2. The procedure then moves to step #311226. Thereafter the reset system clock STCr is applied as the system clock STC referenced by the sub-picture decoder, and the VOB #2 sub-picture presentation timing is determined by the presentation time stamp PTS in the sub-picture packet and the STCr.

In other words, when the STCr matches the PTS, the sub-picture data corresponding to that PTS is reproduced. Note that the process from sub-picture decoding to presentation is accomplished instantaneously. As a result, the system clock STC value referenced by the sub-picture decoder changes at the same timing at which the video playback starting time information VPTS changes from VOB #1 to VOB #2.

At step #311226 the STCr is reset to the STC initializer 32010. The STC initializer 32010 thus supplies this updated clock to the STC counter 32014, which operates using this reset system clock STCr value as the initial value. The procedure then moves to step #311227.

At step #311227 all of the STC selectors, i.e., STC selector for video decoder 32020, STC selector for subpicture decoder 32022, STC selector for audio decoder 32024, and STC selector for system decoder 32026, output the reference clock STCc.

Thereafter, the system clock STC referenced by the video decoder, sub-picture decoder, audio decoder, and system decoder is the reference clock STCc output from the STC counter 32014.

The process from step #311226 to step #311227 must only be accomplished by the time the system clock reference SCR changes from the VOB #2 SCR to the first SCR in the VOB following VOB #2, i.e., by time Ti at which the change to the next VOB is accomplished.

Note that the STC switching time T1 can also be obtained by detecting the change in the Initial Video Frame Presentation Start Time VOB_V_SPTM or the Final Video Frame Presentation Termination Time VOB_V_EPTM in the navigation pack NV, and extracting the SCR in the pack immediately before the change. Note that the same VOB_V_SPTM and VOB_V_EPTM values are recorded to all navigation packs NV in the same VOB. As a result, when either of these values changes, the VOB has also changed, and by monitoring a change in either of these values, it is possible to know that the VOB has changed.

T1 can be obtained by adding the pack transfer time to the SCR value in the pack immediately before the VOB changed. Note that the pack transfer time is a constant value.

STC switching times T2 and T3 can also be calculated from the APTS, VDTS, and VPTS values extracted immediately before the VOB_V_SPTM or VOB_V_EPTM value in the navigation pack NV changes.

T2 is calculated by extracting the APTS from the audio packet immediately before the VOB changes, and adding the audio reproduction time contained in the audio packet of the corresponding APTS value. Note that the audio reproduction time contained in the audio packet can be calculated from the audio bit rate and the packet data size.

T3 can be obtained by extracting the VDTS from the video packet containing the corresponding VDTS immediately before the VOB changes. T3 is thus obtained as the time defined by the VDTS.

T4 is equivalent to the VOB_V_EPTM value, which is therefore used.

Synchronization Controller: Embodiment 2

Figure 41:
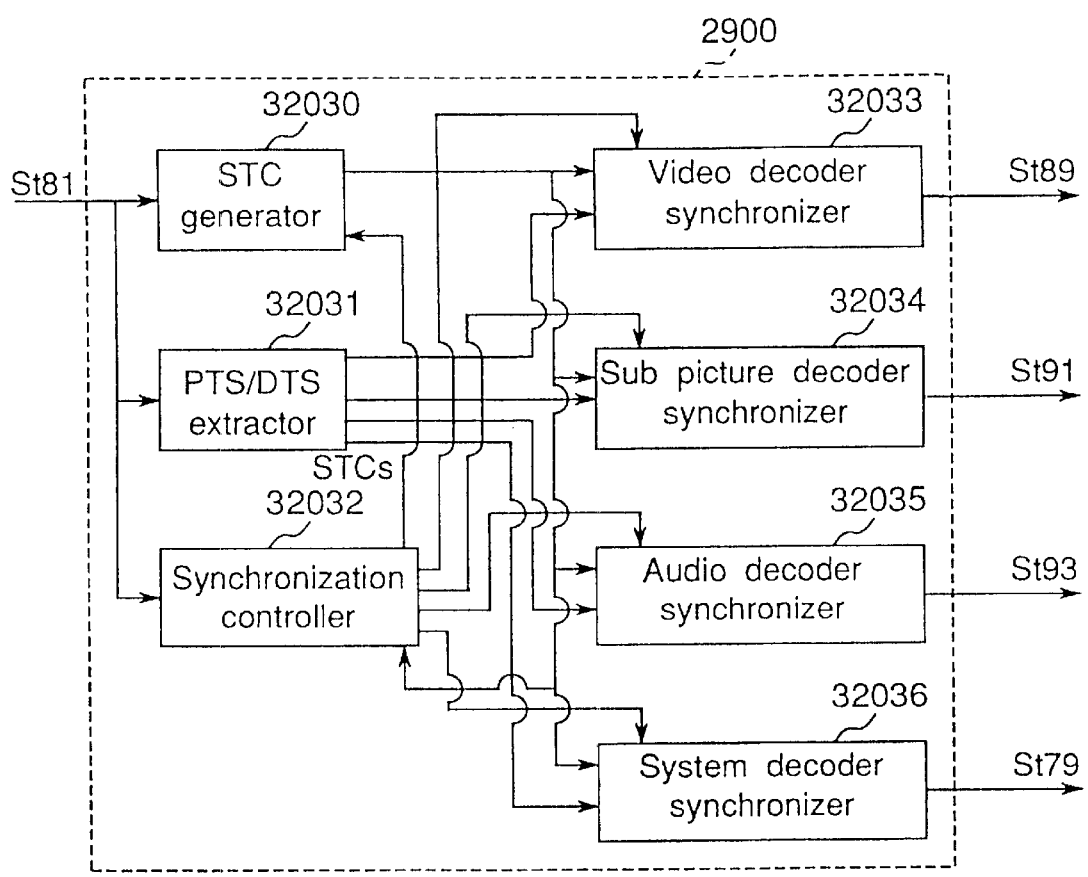
FIG. 41 is a block diagram showing a modification of the synchronizer of FIG. 32.

A second embodiment of the synchronizer 2900 shown in FIG. 26 is described according to the present invention with reference to FIG. 41 below. As shown in FIG. 41, the synchronizer 2900 comprises a system clock STC generator 32030, PTS/DTS extractor 32031, synchronization controller 32032, video decoder synchronizer 32033, sub-picture decoder synchronizer 32034, audio decoder synchronizer 32035, and system decoder synchronizer 32036.

The STC generator 32030 generates the system clock for each decoder, and supplies the synchronization system clock STC to the video decoder synchronizer 32033, sub-picture decoder synchronizer 32034, audio decoder synchronizer 32035, and system decoder synchronizer 32036. The STC generator 32030 is a counter that operates at the system clock. The SCR from the first pack in the first VOB in the program chain PGC is set as the initial counter value, and is thereafter-incremented based on the system clock. Note that the initial STC counter value may be reset to the APTS or VPTS value.

Both the audio and video outputs are reproduced synchronized to the respective output clocks. It is therefore possible for synchronization to be disrupted by the accumulated error in STC, audio output clock, and video output clock precision. When this accumulated error becomes great, the respective decoder buffers may be destroyed (by a data underflow or overflow state). Therefore, by periodically resetting the system clock STC to the APTS synchronized to the audio output clock, for example, APTS–STC error accumulation can be prevented, and the audio can be reproduced without interruption. In this case, video synchronization is controlled by skipping or freezing video output.

This type of synchronization control is defined as Audio Master synchronization control.

On the other hand, by periodically resetting the system clock STC to the VPTS synchronized to the video output clock, VPTS–STC error accumulation can be prevented, and the video can be seamlessly reproduced. In this case, audio synchronization is controlled by skipping or pausing audio output.

This type of synchronization control is defined as Video Master synchronization control.

In the following description of synchronization control, an ON synchronization mode refers to STC-referenced synchronization control, either Audio or Video Master. An OFF synchronization mode is when STC-referenced synchronization control is not applied. In an OFF synchronization mode the audio and video decoders sequentially output the audio and video at a defined frame frequency based on the respective internal reference clocks without referencing the time stamp values from the streams, and no timing control is applied to synchronize the audio and video.

The PTS/DTS extractor 32031 extracts the presentation time stamp PTS and decoding time stamp DTS from the synchronization control data St81, and supplies the PTS and DTS to the respective decoder synchronizers.

The synchronization controller 32032 generates the synchronization control signal specifying an ON or OFF synchronization mode for each of the decoder synchronizers. This synchronization controller 32032 is described in detail below with reference to FIG. 42.

If the synchronization control signal from the synchronization controller 32032 specifies an ON synchronization mode, the video decoder synchronizer 32033 generates the video stream decoding start signal St89 based on the STC from the STC generator 32030 and the decoding time stamp DTS for starting video decoding supplied from the PTS/DTS extractor 32031. More specifically, the video decoder synchronizer 32033 generates the video stream decoding start signal St89 when the STC and DTS match.

If the synchronization control signal from the synchronization controller 32032 specifies an OFF synchronization mode, the-video decoder synchronizer 32033 constantly outputs the video stream decoding start signal St89. Thus, the video decoder operates independently of external control, and is controlled by internal state information.

If the synchronization control signal from the synchronization controller 32032 specifies an ON synchronization mode, the sub-picture decoder synchronizer 32034 generates the sub-picture stream decoding start signal St91 based on the STC from the STC generator 32030 and the decoding time stamp DTS for starting sub-picture decoding supplied from the PTS/DTS extractor 32031. More specifically, the sub-picture decoder synchronizer 32034 generates the sub-picture stream decoding start signal St91 when the STC and DTS match.

If the synchronization control signal from the synchronization controller 32032 specifies an OFF synchronization mode, the sub-picture decoder synchronizer 32034 constantly outputs the sub-picture stream decoding start signal St91. Thus, the sub-picture decoder operates independently of external control, and is controlled by internal state information.

If the synchronization control signal from the synchronization controller 32032 specifies an ON synchronization mode, the audio decoder synchronizer 32035 generates the audio stream decoding start signal St93 based on the STC from the STC generator 32030 and the decoding time stamp DTS for starting audio decoding supplied from the PTS/DTS extractor 32031. More specifically, the audio decoder synchronizer 32035 generates the audio stream decoding start signal St93 when the STC and DTS match.

If the synchronization control signal from the synchronization controller 32032 specifies an OFF synchronization mode, the audio decoder synchronizer 32035 constantly outputs the audio stream decoding start signal St93. Thus, the audio decoder operates independently of external control, and is controlled by internal state information.

The system decoder synchronizer 32036 outputs the STC from the STC generator 32030 as the system clock St79. The system clock St79 is used to control pack transfers from the stream buffers to the system decoder. In other words, if the STC value matches the SCR value in the pack, the pack data is transferred from the stream buffer to the system decoder.

The structure and operation of the synchronization controller 32032 are described below with reference to FIG. 42 and FIG. 43.

Figure 42:
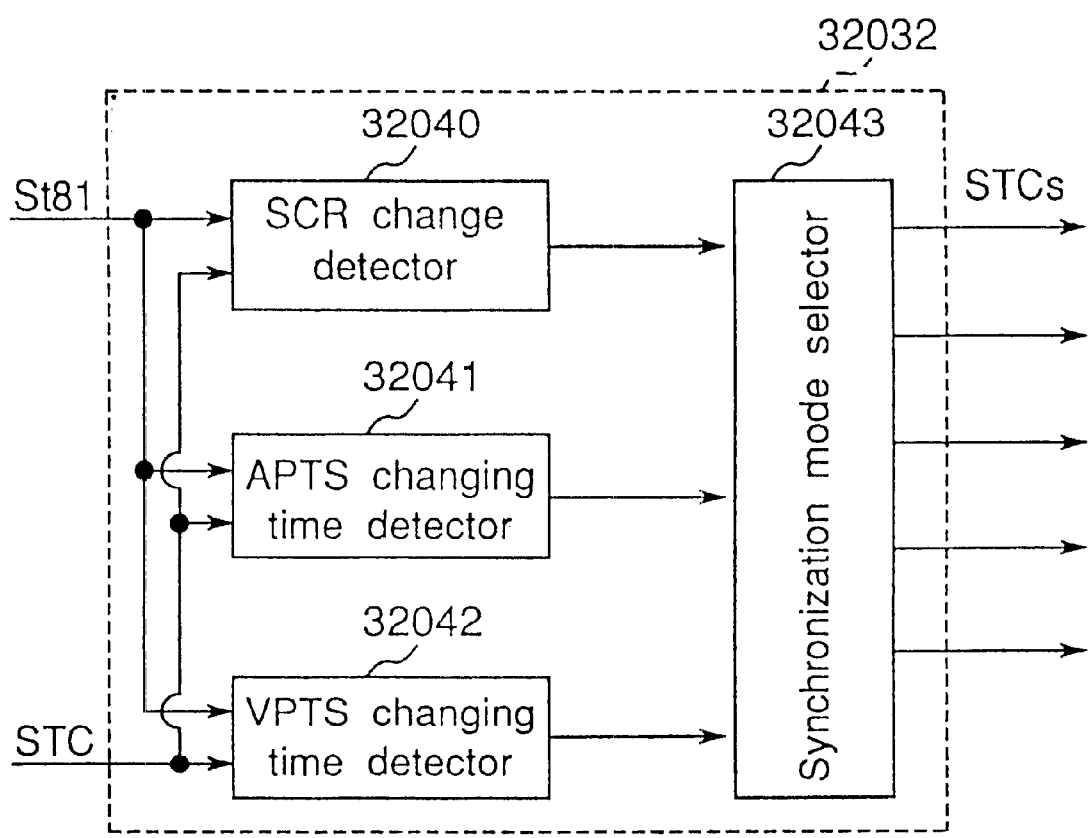
FIG. 42 is a block diagram showing a synchronization controller of FIG. 41.
Figure 43:
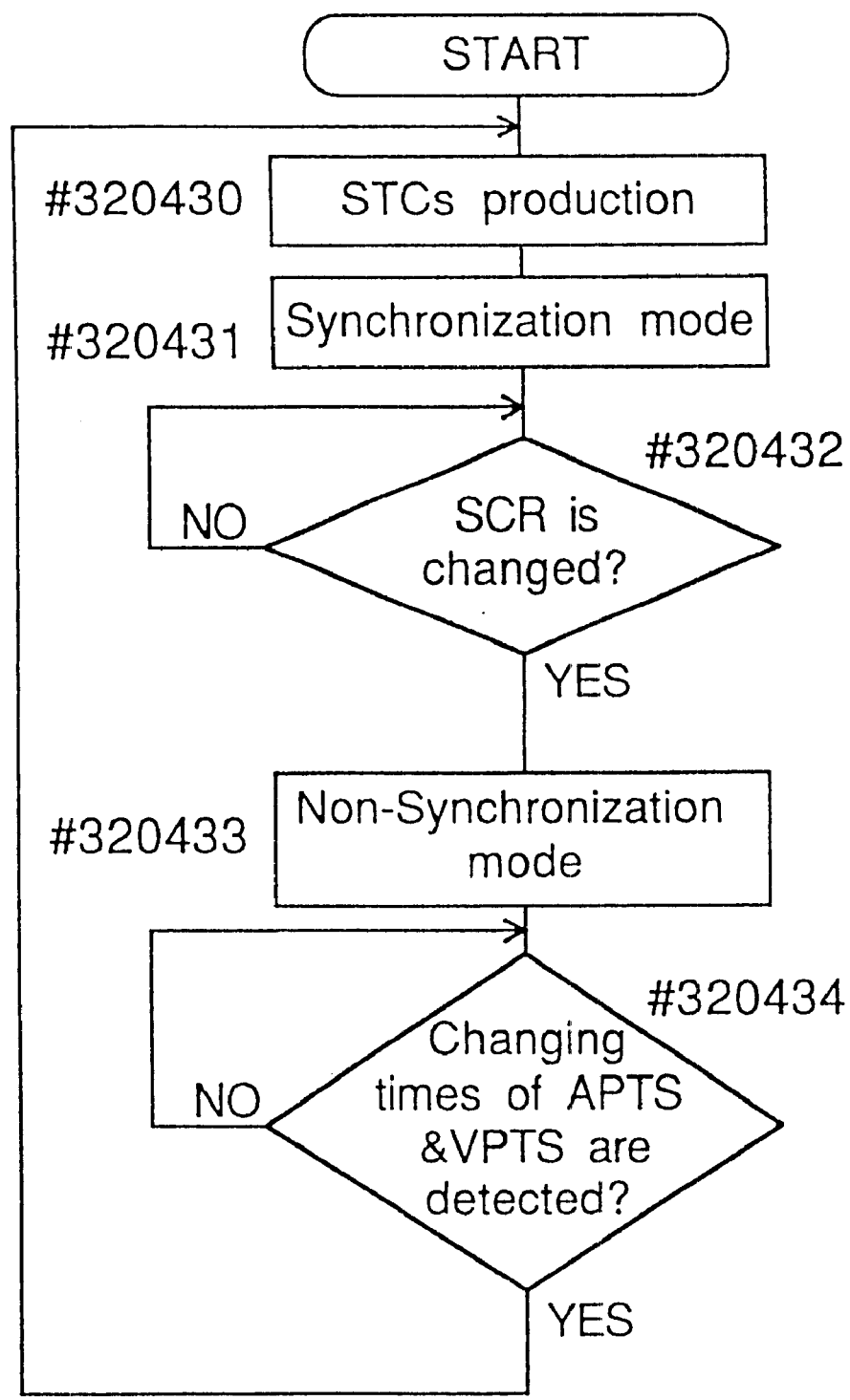
Figure 44A:
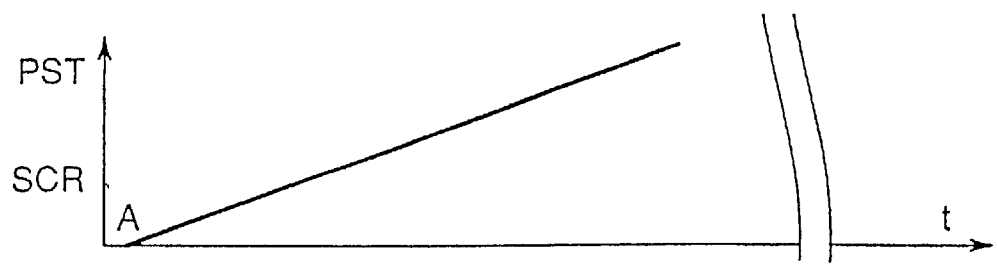
Figure 44B:
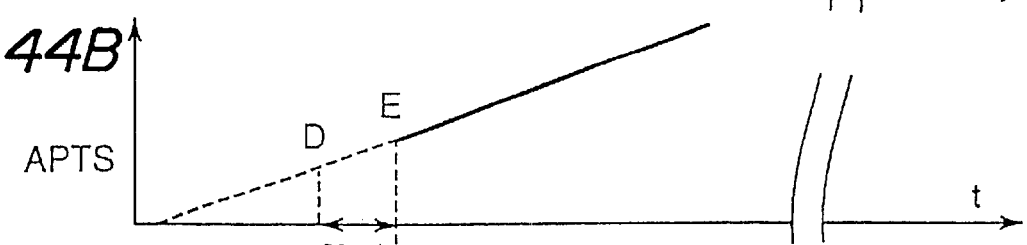
Figure 44C:
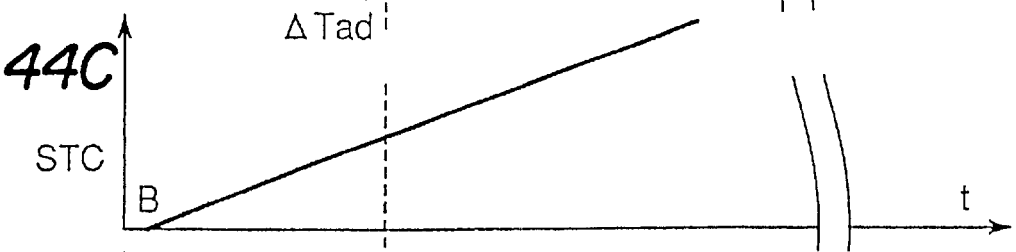
Figure 44D:
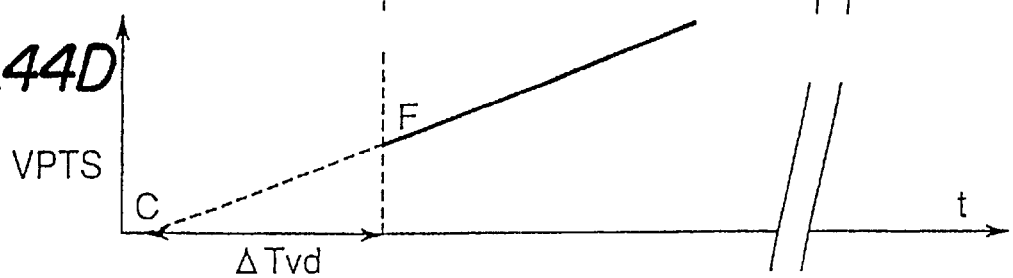
Figure 45A:
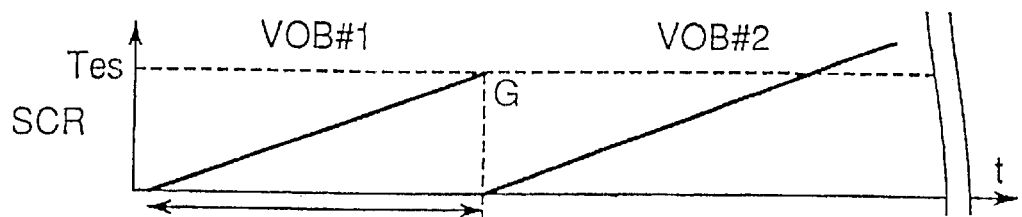
FIG. 45 is a graph in assistance of explaining the relationship between the recording positions and values of SCR, APTS, and VPTS when VOB #1 and VOB #2 are seamlessly reproduced.
Figure 45B:
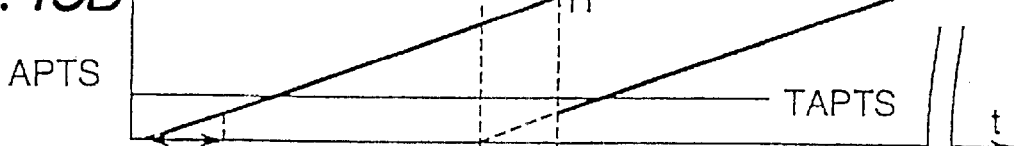
Figure 45C:
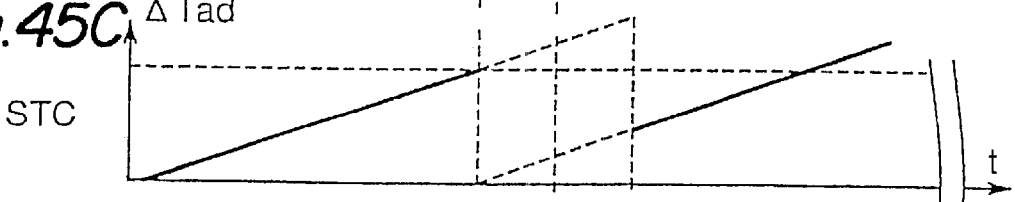
Figure 45D:
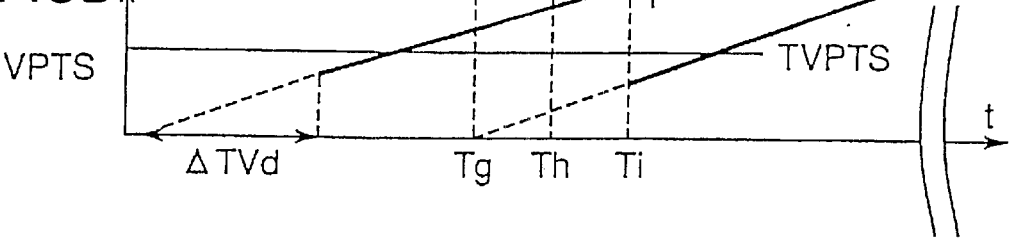
Figure 46A:
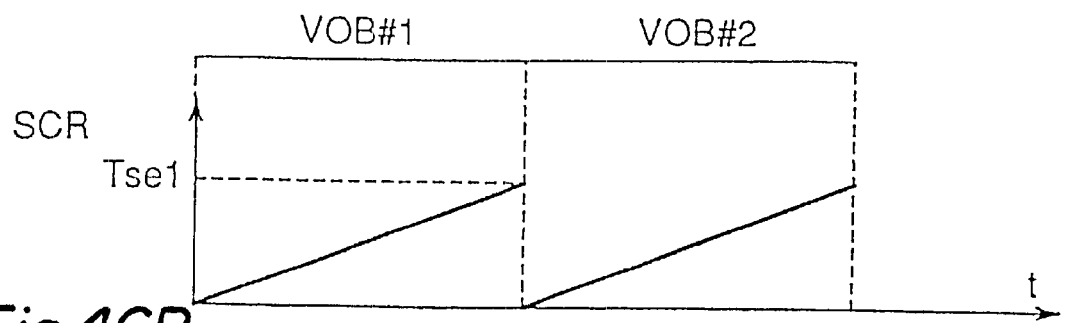
FIG. 46 is a graph in assistance of explaining the relationship between the. SCR, APTS, and VPTS values and recording positions in each VOB.
Figure 46B:
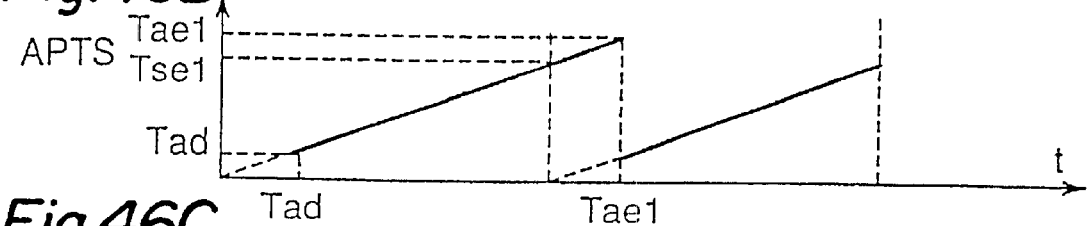
Figure 46C:
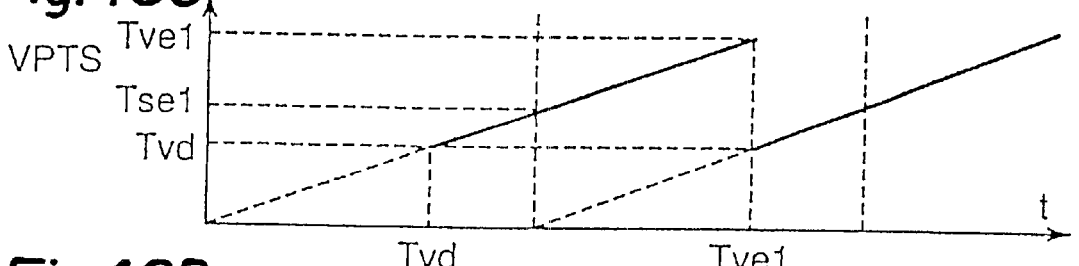
Figure 46D:
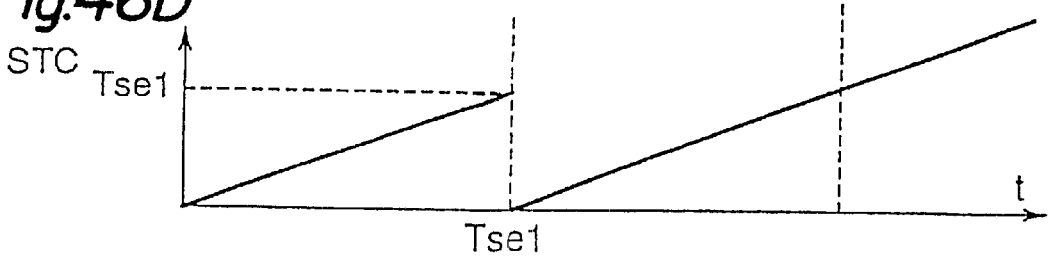

The structure of the synchronization controller 32032 is shown in FIG. 42. As shown in the figure, the synchronization controller 32032 comprises an SCR change detector 32040, APTS changing time detector 32041, VPTS changing time detector 32042, and synchronization mode selector 32043.

The SCR change detector 32040 generates and supplies to the synchronization mode selector 32043 an ACTIVE SCR change detection signal if the SCR value in the pack header in the synchronization control data St81 changes to 0. By thus setting the SCR to 0 in the first pack of the VOB reproduced later when seamlessly connecting and reproducing two VOB, the VOB break point can be easily detected. Note that the SCR is not set to 0 when an originally contiguous VOB is divided in two, i.e., when the SCR is contiguous between two VOB.

Note, further, that while a 0 value is described here, any value whereby the beginning and end of each VOB can be easily determined can be used.

In the case of parental lock control, for example, when a single stream, e.g., VOB #2, is reconnected to one of plural possible scenes, e.g., VOB #1, from the multi-scene period enabling parental lock control, each of the VOB in the multi-scene period may have a different reproduction time, and it is not possible to assign the first SCR value in each possible VOB #2 to account for all possible connections. A seamless can be achieved in such cases, however, by setting the ScR of the first pack in VOB #2 to 0.

The APTS changing time detector 32041 compares the APTS in the synchronization control data St81 when the VOB changes with the STC counter value supplied from the STC generator 32030 shown in FIG. 41. When the STC counter exceeds the APTS, the APTS changing time detector 32041 generates and inputs to the synchronization mode selector 32043 an ACTIVE APTS change time detection signal.

Note that the method of detecting the APTS when the VOB changes is described below with reference to FIG. 43.

The VPTS changing time detector 32042 compares the VPTS in the synchronization control data. St81 when the VOB changes with the STC counter value supplied from the STC generator 32030. When the STC counter exceeds the VPTS, the VPTS changing time detector 32042 generates and inputs to the synchronization mode selector 32043 an ACTIVE VPTS change time detection signal.

Note that the method of detecting the VPTS when the VOB changes is described below with reference to FIG. 43.

Based on the SCR change detection signal from the SCR change detector 32040, the APTS change time detection signal from the APTS changing time detector 32041, and the VPTS change time detection signal from the VPTS changing time detector 32042, the synchronization mode selector 32043 generates the synchronization mode selection signals, and outputs to the video decoder synchronizer 32033, subpicture decoder synchronizer 32034, audio decoder synchronizer 32035, and system decoder synchronizer 32036. The STC update signal STCs is also output to the STC generator 32030.

The respective decoder synchronizers control synchronization based on the system clock STC if an ON synchronization mode is specified. If an OFF synchronization mode is specified, the STC is not used for synchronization control as described above.

The operation of the synchronization mode selector 32043 is described next with reference to FIG. 43.

At step #320430 -the STC update signal STCs is generated and output to the STC generator 32030, and the procedure moves to step #320431. If the STC update signal STCs is ACTIVE, the STC generator 32030 sets a new SCR from the synchronization control data St81 as the initial value, and updates the STC.

At step #320431 the synchronization mode selector 32043 outputs a synchronization mode selection signal specifying an ON synchronization mode to the decoder synchronizers 32033, 32034, 32035, and 32036. The procedure then moves to step #320432.

At step #320432 the procedure moves to step #320433 if the SCR change detector 32040 detects that the SCR has changed. If an SCR change is not detected, this step is repeated until an SCR change is detected. As a result, an ON synchronization mode continues to be output to the decoder synchronizers as long as this step executes.

At step #320433 the synchronization mode selector 32043 outputs a synchronization mode selection signal specifying an OFF synchronization mode to the decoder synchronizers 32033, 32034, 32035, and 32036. The procedure then moves to step #320434. This step thus means that the synchronization mode is OFF from the time T1 the VOB changed during pack transfer.

If both the APTS changing time detector 32041 and VPTS changing time detector 32042 detect a changed time at step #320434, control loops back to step #320430, and the synchronization mode is set ON again at step #320431. However, if a changed time is not detected, step #320434 repeats until both the APT and VPTS are detected to change. This step thus means that the decoder synchronizers continue operating in an OFF synchronization mode. synchronization control at the start of normal reproduction, i.e., at a VOB start without contiguous reproduction from a preceding VOB, is described next with reference to FIG. 44.

FIG. 44 shows the relationship between the system clock reference SCR indicating the time a VOB is input to the system decoder data, the audio playback starting time information APTS, the decoder reference clock STC, and the video playback starting time VPTS, referenced to time shown on the horizontal axis with the values expressed in terms of the presentation start time PST on the vertical axis.

The point at which the first SCR in the VOB is 0 is point A. If the first SCR is not 0, e.g., if normal reproduction is resumed from the middle of a VOB after a special reproduction mode, the control procedure is the same. The times between input and output of the audio data and video data, respectively, to and from the system decoder are expressed as DTad and DTvd. Because DTad<DTvd, and data is recorded at the VOB beginning referenced to the time it is reproduced, only video data is present at point C at the VOB start, and the audio data is recorded at point D after a delay of DTvd–DTad.

Synchronization is controlled at this point as described below. Video and audio output is first stopped, the SCR value from the pack at point A is set to the STC generator 32030, and the STC generator 32030 operates an internal counter at the system clock and outputs the system clock STC. Transfer of the first pack in the VOB to the system decoder 2500 starts at the same time. The following packs are transferred at the SCR recorded in the pack header of each pack referenced to the system clock STC produced by the STC generator 32030.

The first video data is then decoded, and video output starts at point F when the STC output from the STC generator 32030 matches the first VPTS value.

Audio output is similarly controlled: the first audio data is decoded, and audio output starts at point E, the moment when the STC output from the STC generator 32030 matches the first APTS value.

After reproduction of the start of the VOB thus begins, the audio APTS value is periodically set to the STC generator 32030 to control synchronization under Audio Master or Video Master control.

The method of synchronizing seamless reproduction of two VOB is described next. The detection method of the SCR change detector 32040, APTS changing time detector 32041, and VPTS changing time detector 32042 in FIG. 42 is particularly described with reference to FIG. 45.

FIG. 45 shows the relationship between the recording positions and values of SCR, APTS, and VPTS when VOB #1 and VOB #2 are seamlessly reproduced. Why the synchronization mode of the decoder synchronizers must be switched ON and OFF to achieve seamless reproduction is described first.

Point G is the time at which the pack being transferred changes from VOB #1 to VOB #2, H is the time the audio output changes, and I is the time the video output changes. Because the audio output and video output thus change at different times, synchronization control cannot be achieved using a single system clock STC. It is therefore necessary to prevent synchronization control using the STC during the period from when the SCR changes at time G to when both the APTS and VPTS have changed at time I. After both the APTS and VPTS have changed at time I, synchronization control using the STC is again possible and necessary.

The method of detecting the timing at which synchronization control is stopped, i.e., when the synchronization mode is turned OFF, is described next.

The timing at which the synchronization mode is turned OFF is obtained from the SCR time chart in FIG. 45. VOB #1 is being output to the system decoder while the SCR value increases, and SCR becomes 0 only at time G, i.e., when VOB #1 transfer stops and VOB #2 transfer begins. Therefore, by detecting the time at which the SCR value becomes 0, it is known that VOB #2 is being input to the system decoder, and the synchronization mode is therefore set OFF at this time Tg.

It is also possible to detect that the SCR is 0 when the value is written to the stream buffer. The synchronization mode can also be set OFF when a 0 SCR value is detected written to the stream buffer.

The timing at which synchronization control begins, i.e., when the synchronization mode is turned from OFF to ON, is described next.

To start synchronization control it is necessary to know when both the audio and video output have switched from VOB #1 to VOB #2. The moment when the audio output changes to VOB #2 can be known by detecting the point H at which the APTS value stops increasing. Likewise, the moment when the video output changes to VOB #2 can be known by detecting the point I at which the VPTS value stops increasing. After both points H and I have appeared, the synchronization mode is immediately set ON at time Ti.

The timing at which the synchronization mode is set OFF can also be delayed to a time between time Tg and time Ti, rather than at time Tg when an SCR change is detected. By setting the synchronization mode OFF at time Th, i.e., the time at which a change in APTS or VPTS is _detected, between Tg and Ti, the duration of the OFF synchronization mode can be shortened.

However, when the timing is based on detecting whether both APTS and VPTS values continue increasing, it is clear that both APTS and VPTS values must decrease when VOB are connected. In other words, the last APTS and VPTS values in a VOB must be greater than the maximum initial APTS and VPTS values in a VOB.

The maximum initial (DTad and DTvd) APTS and VPTS values are defined as follows.

The initial APTS and VPTS values are the sums of the video data and audio data storage times in the video and audio buffers, and the video reordering time (in MPEG video, the picture decode order and presentation order are not necessarily the same, and presentation is delayed a maximum one picture from the decoder). Therefore, the sum of the time required for the video buffer and audio buffer to fill, and the presentation delay (1 frame period) from video reordering, determines the maximum initial values for APTS and VPTS.

As a result, the last APTS and VPTS values in a VOB are always assigned to exceed these maximum initial values when the VOB are produced.

While it is possible to control the timing at which the synchronization mode is turned ON following VOB connection by detecting whether both APTS and VPTS values continue increasing, it is also possible to achieve the same synchronization control by detecting the time at which the APTS value drops below an APTS threshold value, and the VPTS value drops below an VPTS threshold value.

These APTS and VPTS threshold values can be calculated by using values equal to the maximum initial APTS and VPTS values of the VOB as the threshold values, and calculating them as described above.

By applying ON/OFF synchronization mode control as described above, seamless reproduction that does not disturb the playback condition can be achieved in VOB connections.

Note that various methods can be used in the reproduction apparatus for audio and video synchronization control in the second embodiment described above. The most common of these methods (I) is to reset the system clock STC to the APTS value every few seconds, determine whether the VPTS value is fast or slow referenced to the system clock STC, and freeze or skip video output as necessary. This is the so-called Audio Master method described above.

Alternatively, it is also possible (2) to reset the system clock STC to the VPTS value every few seconds, determine whether the APTS value is fast or slow referenced to the system clock STC, and freeze or skip audio output as necessary. This is the so-called Video Master method described above.

Another method (3) is to directly compare the APTS and VPTS values, and use either the APTS or VPTS value for reference.

Regardless of which method is used for ON/OFF synchronization mode control, however, the same effect can be achieved.

As described above, two methods are used for audio-video synchronization according to the present embodiment, Audio Master and Video Master synchronization control. For Audio Master synchronization control the system clock STC is periodically reset to the APTS value, whether the VPTS value is earlier or later is determined referenced to the reset system clock STC, and the video presentation is frozen or skipped as necessary for synchronization. For Video Master synchronization control the system clock STC is periodically reset to the VPTS value, whether the APTS value is earlier or later is determined referenced to the reset system clock STC, and the audio presentation is paused or skipped as necessary for synchronization. It is also possible to directly compare the APTS and VPTS values, and control synchronization referenced to either the APTS or VPTS value. Regardless of which method is used for AV synchronization control, however, the same effects can be obtained.

Furthermore, while the above embodiments have been described using an initial VOB SCR value of 0, a value other than 0 can be used and the same control achieved by adding the first SCR value as an offset value to the APTS and VPTS values.

It is also possible in the second embodiment above to read the STC discontinuity flag STCDCF_reg, which specifies whether the next cell reproduced needs the STC to be reset. If the register reads STC_NRESET, the synchronization mode is constantly ON; if STC_RESET is stored, ON/OFF synchronization mode control can be applied.

It is thus possible to decode the data transferred to the stream buffer 2400 while synchronizing the operation of the various decoders.

It is therefore possible by means of the present invention thus described to maintain synchronization between the audio and video data, and seamlessly connect and reproduce two VOB during reproduction from a multi-scene period even when there is no continuity between the system clock reference SCR and presentation time stamp PTS values used for synchronization control of the VOB to be contiguously reproduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A machine readable optical disc comprising:
    a first area containing at least one cell;
    a second area containing at least one cell; and
    a management information area operable to record management information;
    wherein a cell contains one or more video object units;
    the video object unit contains a navigation pack;
    the management information contains information operable to indicate, when said optical disk is read by a machine, whether or not a second cell, which is a specific cell in the second area, shall be presented seamlessly after presentation of a first cell, which is a specific cell in the first area;
    the navigation pack contains information operable to indicate whether or not the video object unit in which the navigation pack is included is present in a specific area; and
    the specific area is one of areas obtained by dividing video objects in an area interleaving two or more video objects.

2. A reproduction apparatus for reproducing an optical disc containing a first area containing at least one cell, a second area containing at least one cell, and a management information area operable to record management information, wherein a cell contains one or more video object units, the video object unit contains a navigation pack, the management information contains first data operable to indicate whether or not a second cell, which is a specific cell in the second area, shall be presented seamlessly after presentation of a first cell, which is a specific cell in the first area, the navigation pack contains information operable to indicate whether or not the video object unit in which the navigation pack is included is present in a specific area, and the specific area is one of areas obtained by dividing video objects in an area interleaving two or more video objects, said reproduction apparatus comprising:
    a reading arrangement operable to read the management information and the first and second cells from the optical disc; and
    a determining arrangement operable to determine, based on the first data, whether or not to present the second cell seamlessly after presentation of the first cell.

3. A reproduction method for reproducing an optical disc containing a first area containing at least one cell, a second area containing at least one cell, and a management information area operable to record management information, wherein a cell contains one or more video object units, the video object unit contains a navigation pack, the management information contains first data operable to indicate whether or not a second cell, which is a specific cell in the second area, shall be presented seamlessly after presentation of a first cell, which is a specific cell in the first area, the navigation pack contains information operable to indicate whether or not the video object unit in which the navigation pack is included is present in a specific area, and the specific area is one of areas obtained by dividing video objects in an area interleaving two or more video objects, said reproduction method comprising:
    reading the management information and the first and second cells from the optical disc; and
    determining based on the first data, whether or not to present the second cell seamlessly after presentation of the first cell.

* * * * *

UNITED STATES PATENT AND TRADEMARK OFFICE
CERTIFICATE OF CORRECTION

PATENT NO. : 6,519,414 B2
DATED : February 11, 2003
INVENTOR(S) : Yoshiichiro Kashiwagi et al.

It is certified that error appears in the above-identified patent and that said Letters Patent is hereby corrected as shown below:

Column 2,
Lines 55-56, replace "reproducing.multi-scene data is, that" with -- reproducing multi-scene data is that --.

Column 4,
Line 11, replace "path.pattern" with -- path pattern --.

Column 5,
Line 30, replace "the.SCR" with -- the SCR --.
Delete lines 58-59.

Column 9,
Line 20, replace "controller.200" with -- controller 200 --.

Column 10,
Line 6, replace ".St29," with -- St29, --.

Column 12,
Line 11, replace "The.video decoder 3800.thus" with -- The video decoder 3800 thus --.

Column 15,
Line 51, replace "duallayer" with -- dual-layer --.

Column 20,
Line 8, replace "(2048-I," with -- (2048×I, --.

Column 23,
Line 18, replace "data.is" with -- data is --.

Column 24,
Line 8, replace "header-PTH" with -- header PTH --.

Column 26,
Line 14, replace "A_GAP LEN2)," with -- A_GAP_LEN2), --.
Line 15, replace "that-these" with -- that these --.

Column 35,
Line 19, replace "subsequently-decoded" with -- subsequently decoded --.

Column 38,
Line 16, replace "Ti," with -- T1, --.

Column 40,
Line 15, replace "VQB" with -- VOB --.

UNITED STATES PATENT AND TRADEMARK OFFICE
CERTIFICATE OF CORRECTION

PATENT NO.     : 6,519,414 B2
DATED          : February 11, 2003
INVENTOR(S)    : Yoshiichiro Kashiwagi et al.

It is certified that error appears in the above-identified patent and that said Letters Patent is hereby corrected as shown below:

Column 41,
Line 31, replace "VOB AST" with -- VOB_AST --.

Column 45,
Line 34, replace "moves-to-step" with -- moves to step --.
Lines 58-59, replace "VOB_Fsf 1," with -- VOB_Fsf = 1, --.

Column 46,
Line 51, replace "(so-called-telecine" with -- (so-called telecine --.

Figure 37:
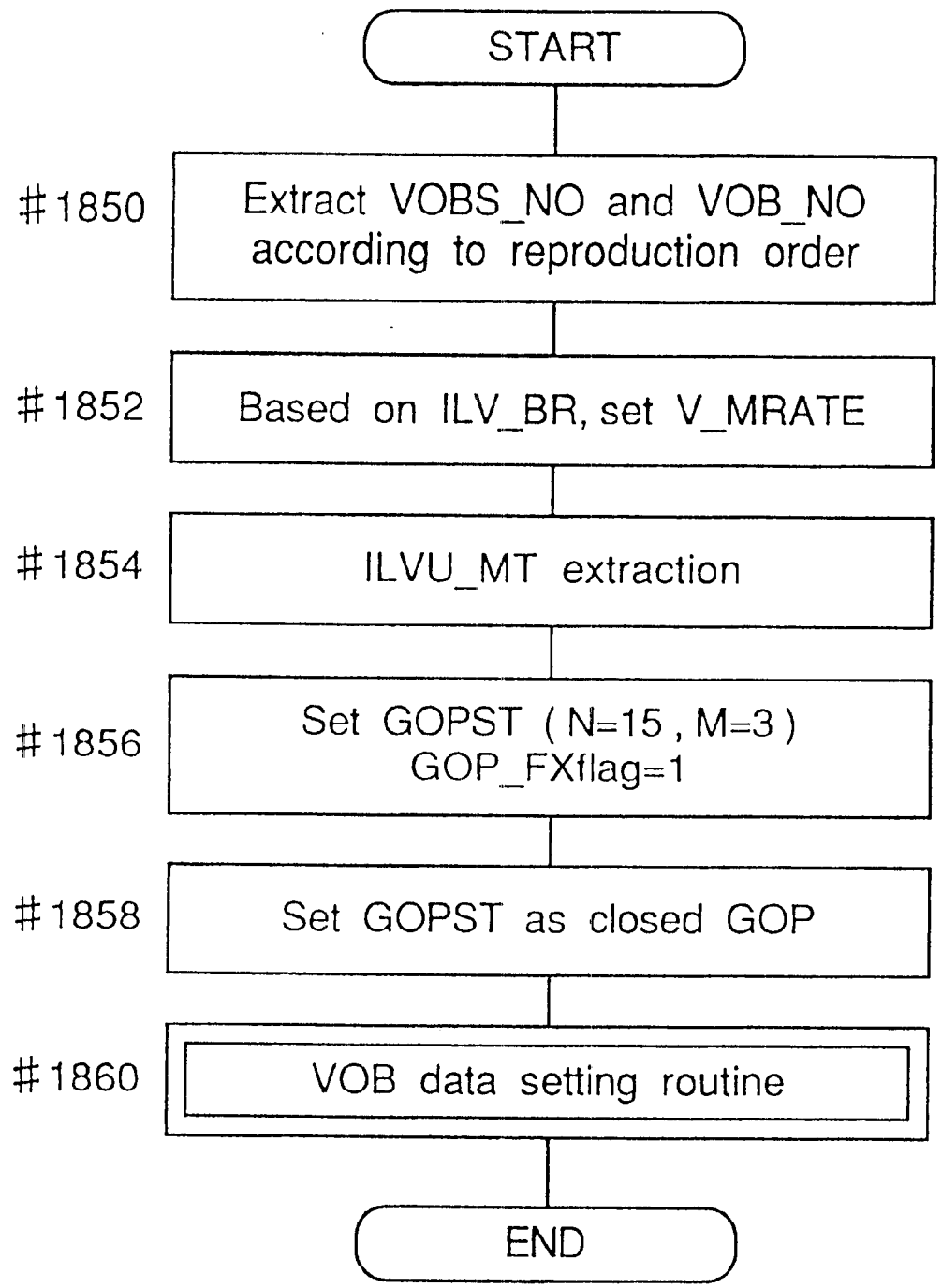
FIG. 37 is a flow chart showing the encode parameters generating operation for a seamless switching.

Column 47,
Line 9, replace "Fig. 37," with -- Fig. 37. --.

Column 50,
Line 3, replace "the-minimum" with -- the minimum --.
Line 37, replace "DATA NSML" with -- DATA_NSML --.

Column 51,
Line 3, replace "as 1ob" with -- as 10b --.
Line 44, replace "the-interleave units.of" with -- the interleave units of --.

Column 52,
Line 2, replace "DSTA_SML" with -- DSTA-SML --.
Line 5, replace "the-data" with -- the data --.

Column 55,
Line 61, replace "SACF reg" with -- SACF_reg --.

Column 56,
Line 24, replace "DSTA_reg_" with -- DSTA_reg --.
Line 26, replace "C9_DSTA" with -- C9_DSTA_ --.

Column 57,
Line 5, replace "PTM1 reg" with -- PTM1_reg --.
Line 7, replace "LEN1 reg" with -- LEN1_reg --.
Line 26, replace "VTSM VOBS" with -- VTSM_VOBS --.
Line 51, replace "step.#31030" with -- step #31030 --.

Column 59,
Line 17, replace "PTM1-reg," with -- PTM_reg, --.

UNITED STATES PATENT AND TRADEMARK OFFICE
CERTIFICATE OF CORRECTION

PATENT NO. : 6,519,414 B2
DATED : February 11, 2003
INVENTOR(S) : Yoshiichiro Kashiwagi et al.

It is certified that error appears in the above-identified patent and that said Letters Patent is hereby corrected as shown below:

Column 60,
Line 3, replace "STP_PTM_reg," with -- STP_PTM1_reg, --.
Line 5, replace "GAP LEN2" with -- GAP_LEN2 --.
Line 32, replace "are the SCR" with -- are the SCR_ --.
Line 36, replace "VOB_DA_STP" with -- VOB_A_STP --.

Column 61,
Line 11, replace "STP1_PTM2" with -- STP_PTM2 --.

Column 66,
Line 15, replace "STC-and" with -- STC and --.

Column 69,
Line 60, replace "thereafter-incremented" with -- thereafter incremented --.

Column 70,
Line 48, replace "the-video" with -- the video --.

Column 72,
Line 23, replace "#320430 -the" with -- #320430 the --.

Column 74,
Line 17, replace "is _detected," with -- is detected, --.

Signed and Sealed this

Seventh Day of October, 2003

JAMES E. ROGAN
*Director of the United States Patent and Trademark Office*